US011921978B2

(12) United States Patent
Manzari et al.

(10) Patent No.: US 11,921,978 B2
(45) Date of Patent: Mar. 5, 2024

(54) DEVICES, METHODS, AND GRAPHICAL USER INTERFACES FOR NAVIGATING, DISPLAYING, AND EDITING MEDIA ITEMS WITH MULTIPLE DISPLAY MODES

(71) Applicant: Apple Inc., Cupertino, CA (US)

(72) Inventors: Behkish J. Manzari, San Francisco, CA (US); Britt S. Miura, Menlo Park, CA (US); Stephen O. Lemay, Palo Alto, CA (US); Charles A. Mezak, Fairfield, CT (US); Andre Souza Dos Santos, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/853,775

(22) Filed: Jun. 29, 2022

(65) Prior Publication Data

US 2022/0326819 A1 Oct. 13, 2022

Related U.S. Application Data

(63) Continuation of application No. 16/953,281, filed on Nov. 19, 2020, now Pat. No. 11,487,402, which is a (Continued)

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0484* (2013.01); *G06F 3/0485* (2013.01);
(Continued)

(58) Field of Classification Search
CPC .... G06F 3/0482; G06F 3/0484; G06F 3/0488; G06F 3/04883; G06F 16/54
(Continued)

(56) References Cited

U.S. PATENT DOCUMENTS 4,472,066 A 9/1984 Murakami
5,404,316 A 4/1995 Klinger et al.
(Continued)

FOREIGN PATENT DOCUMENTS

CN 105103154 A 11/2015
JP 2002-157275 A 5/2002
(Continued)

OTHER PUBLICATIONS

Rehman, "How To Edit, Add Filters & Effects To Live Photos", https://www.redmondpie.com/how-to-edit-add-filters-effects-to-live-photos, Dec. 12, 2015, 8 pages.
(Continued)

*Primary Examiner* — Stephen S Hong
*Assistant Examiner* — Nicholas Hasty
(74) *Attorney, Agent, or Firm* — Morgan, Lewis & Bockius LLP

(57) ABSTRACT

An electronic device having a display and a touch-sensitive surface displays a mediate item representation corresponding to a sequence of images in a first display mode of user-selectable display modes, where the media item is part of a collection of ordered media items such that prior media item(s) precede the first media item and subsequent media item(s) follow the first media item in the order. In response to detecting touch input including movement in a direction, the device: upon determining that a subsequent media item corresponding to a second sequence of images is designated as being displayed in the first display mode, displays the subsequent media item in the first display mode, and upon determining that the subsequent media item is designated as being displayed in a second display mode different from the first display mode, displays the subsequent media item in the second display mode.

57 Claims, 164 Drawing Sheets

Related U.S. Application Data continuation of application No. 15/845,589, filed on Dec. 18, 2017, now Pat. No. 10,877,628.

(60) Provisional application No. 62/507,214, filed on May 16, 2017.

(51) Int. Cl.

| | |
|---|---|
| ***G06F 3/0485*** | (2022.01) |
| ***G06F 3/0488*** | (2022.01) |
| ***G06F 3/04883*** | (2022.01) |
| ***G06F 16/54*** | (2019.01) |

(52) U.S. Cl.
CPC ........ *G06F 3/0488* (2013.01); *G06F 3/04883* (2013.01); *G06F 16/54* (2019.01)

(58) Field of Classification Search
USPC .......................................................... 715/720
See application file for complete search history.

(56) References Cited

U.S. PATENT DOCUMENTS

| | | | | |
|---|---|---|---|---|
| 2005/0073532 | A1 | 4/2005 | Scott et al. | |
| 2008/0065992 | A1 | 3/2008 | Ma et al. | |
| 2010/0302409 | A1 | 12/2010 | Matas et al. | |
| 2011/0163971 | A1* | 7/2011 | Wagner | G06F 3/04817 345/173 |
| 2013/0332836 | A1 | 12/2013 | Cho | |
| 2014/0354845 | A1 | 12/2014 | Molgaard et al. | |
| 2014/0354850 | A1* | 12/2014 | Kosaka | H04N 1/00204 348/231.5 |
| 2015/0358582 | A1 | 12/2015 | Zhou et al. | |
| 2016/0283483 | A1* | 9/2016 | Jiang | G06F 21/6254 |
| 2016/0357353 | A1* | 12/2016 | Miura | G06F 3/0486 |
| 2016/0357400 | A1 | 12/2016 | Penha et al. | |
| 2016/0360116 | A1 | 12/2016 | Penha et al. | |
| 2016/0366344 | A1 | 12/2016 | Pan et al. | |
| 2017/0010771 | A1 | 1/2017 | Bernstein et al. | |
| 2017/0075644 | A1 | 3/2017 | Brown et al. | |
| 2017/0099431 | A1 | 4/2017 | Harada et al. | |
| 2017/0300189 | A1 | 10/2017 | Pendergast et al. | |
| 2018/0335901 | A1 | 11/2018 | Manzari et al. | |
| 2021/0072872 | A1 | 3/2021 | Manzari et al. | |

FOREIGN PATENT DOCUMENTS

| | | | |
|---|---|---|---|
| JP | 2014-089655 | A | 5/2014 |
| JP | 6082896 | B1 | 2/2017 |
| KR | 2009-0093904 | A | 9/2009 |
| KR | 2013-0138060 | A | 12/2013 |
| KR | 2014-0127131 | A | 11/2014 |
| KR | 2015-0071162 | A | 6/2015 |
| KR | 2017-0022227 | A | 3/2017 |
| WO | WO 2006/126055 | A2 | 11/2006 |
| WO | WO 2016/200587 | A1 | 12/2016 |

OTHER PUBLICATIONS

Office Action, dated Sep. 6, 2019, received in U.S. Appl. No. 15/845,589, 13 pages.
Final Office Action, dated Dec. 31, 2019, received in U.S. Appl. No. 15/845,589, 13 pages.
Notice of Allowance, dated Sep. 17, 2020, received in U.S. Appl. No. 15/845,589, 13 pages.
Notice of Acceptance, dated Nov. 29, 2019, received in Australian Patent Application No. 2018270746 (7484AU), which corresponds with U.S. Appl. No. 15/845,589, 3 pages.
Certificate of Grant, dated Jun. 25, 2020, received in Australian Patent Application No. 2018270746 (7484AU), which corresponds with U.S. Appl. No. 15/845,589, 3 pages.
Office Action, dated Jun. 16, 2020, received in Chinese Patent Application No. 201910893846.5 (7484CN), which corresponds with U.S. Appl. No. 15/845,589, 10 pages.
Office Action, dated May 25, 2021, received in Chinese Patent Application No. 201910893846.5 (7484CN), which corresponds with U.S. Appl. No. 15/845,589, 2 pages.
Office Action, dated Nov. 15, 2021, received in Chinese Patent Application No. 201910893846.5 (7484CN), which corresponds with U.S. Appl. No. 15/845,589, 1 page.
Office Action, dated May 7, 2018, received in Danish Patent Application No. 201770370 (7484DK), which corresponds with U.S. Appl. No. 15/845,589, 5 pages.
Office Action, dated Feb. 19, 2019, received in Danish Patent Application No. 201770370 (7484DK), which corresponds with U.S. Appl. No. 15/845,589, 3 pages.
Intention to Grant, dated May 2, 2019, received in Danish Patent Application No. 201770370 (7484DK), which corresponds with U.S. Appl. No. 15/845,589, 2 pages.
Intention to Grant, dated Jul. 22, 2019, received in Danish Patent Application No. 201770370 (7484DK), which corresponds with U.S. Appl. No. 15/845,589, 2 pages.
Notice of Allowance, dated Sep. 18, 2019, received in Danish Patent Application No. 201770370 (7484DK), which corresponds with U.S. Appl. No. 15/845,589, 2 pages.
Patent, dated Oct. 11, 2019, received in Danish Patent Application No. 201770370 (7484DK), which corresponds with U.S. Appl. No. 15/845,589, 5 pages.
Office Action, dated Nov. 13, 2019, received in European Patent Application No. 18726639.0 (7484EP), which corresponds with U.S. Appl. No. 15/845,589, 6 pages.
Intention to Grant, dated Dec. 1, 2020, received in European Patent Application No. 18726639.0 (7484EP), which corresponds with U.S. Appl. No. 15/845,589, 7 pages.
Intention to Grant, dated May 14, 2021, received in European Patent Application No. 18726639.0 (7484EP), which corresponds with U.S. Appl. No. 15/845,589, 7 pages.
Decision to Grant, dated Jul. 1, 2021, received in European Patent Application No. 18726639.0 (7484EP), which corresponds with U.S. Appl. No. 15/845,589, 1 page.
Patent, dated Jul. 28, 2021, received in European Patent Application No. 18726639.0 (7484EP), which corresponds with U.S. Appl. No. 15/845,589, 4 pages.
Notice of Allowance, dated May 25, 2020, received in Japanese Patent Application No. 2019-561881 (7484JP), which corresponds with U.S. Appl. No. 15/845,589, 5 pages.
Patent, dated Jun. 3, 2020, received in Japanese Patent Application No. 2019-561881 (7484JP), which corresponds with U.S. Appl. No. 15/845,589, 4 pages.
Office Action, dated Jan. 8, 2020, received in Korean Patent Application No. 2019-7032575 (7484KR), which corresponds with U.S. Appl. No. 15/845,589, 9 pages.
Office Action, dated May 21, 2020, received in Korean Patent Application No. 2019-7032575 (7484KR), which corresponds with U.S. Appl. No. 15/845,589, 3 pages.
Notice of Allowance, dated Jul. 3, 2020, received in Korean Patent Application No. 2019-7032575 (7484KR), which corresponds with U.S. Appl. No. 15/845,589, 5 pages.
Patent, dated Jul. 27, 2020, received in Korean Patent Application No. 2019-7032575 (7484KR), which corresponds with U.S. Appl. No. 15/845,589, 4 pages.
Office Action, dated Sep. 17, 2021, received in U.S. Appl. No. 16/953,281 (7636), 17 pages.
Final Office Action, dated Mar. 2, 2022, received in U.S. Appl. No. 16/953,281 (7636), 18 pages.
Notice of Allowance, dated Jun. 15, 2022, received in U.S. Appl. No. 16/953,281 (7636), 7 pages.
Office Action, dated Oct. 1, 2020, received in Australian Patent Application No. 2020201629 (7636AU), which corresponds with U.S. Appl. No. 16/953,281, 4 pages.
Notice of Acceptance, dated Apr. 15, 2021, received in Australian Patent Application No. 2020201629 (7636AU), which corresponds with U.S. Appl. No. 16/953,281, 3 pages.

(56) References Cited

OTHER PUBLICATIONS

Certificate of Grant, dated Aug. 26, 2021, received in Australian Patent Application No. 2020201629 (7636AU), which corresponds with U.S. Appl. No. 16/953,281, 3 pages.
Office Action, dated Aug. 31, 2021, received in Japanese Patent Application No. 2020-095625 (7636JP), which corresponds with U.S. Appl. No. 16/953,281, 2 pages.
Notice of Allowance, dated Nov. 12, 2021, received in Japanese Patent Application No. 2020-095625 (7636JP), which corresponds with U.S. Appl. No. 16/953,281, 2 pages.
Patent, dated Dec. 13, 2021, received in Japanese Patent Application No. 2020-095625 (7636JP), which corresponds with U.S. Appl. No. 16/953,281, 4 pages.
Office Action, dated Jan. 19, 2021, received in Korean Patent Application No. 2020-7021812 (7636KR), which corresponds with U.S. Appl. No. 16/953,281, 5 pages.
Office Action, dated Jun. 12, 2021, received in Korean Patent Application No. 2020-7021812 (7636KR), which corresponds with U.S. Appl. No. 16/953,281, 4 pages.
Office Action, dated Sep. 10, 2021, received in Korean Patent Application No. 2020-7021812 (7636KR), which corresponds with U.S. Appl. No. 16/953,281, 3 pages.
Office Action, dated Nov. 12, 2021, received in Korean Patent Application No. 2021-7036124 (7817KR), 12 pages.
Notice of Allowance, dated Jun. 20, 2022, received in Korean Patent Application No. 2021-7036124 (7817KR), 2 pages.
Office Action, dated Dec. 12, 2022, received in Chinese Patent Application No. 201880015192X (7636CN), which corresponds with U.S. Appl. No. 16/953,281, 2 pages.
Notice of Allowance, dated Feb. 26, 2023, received in Chinese Patent Application No. 201880015192X (7636CN), which corresponds with U.S. Appl. No. 16/953,281, 5 pages.
Office Action, dated Feb. 14, 2023, received in European Patent Application No. 21168122.6 (7636EP), which corresponds with U.S. Appl. No. 16/953,281, 9 pages.
Office Action, dated Jul. 25, 2022, received in Australian Patent Application No. 2021212001 (7817AU), which corresponds with U.S. Appl. No. 17/853,775, 3 pages.
Office Action, dated Feb. 10, 2023, received in Australian Patent Application No. 2021212001 (7817AU), which corresponds with U.S. Appl. No. 17/853,775, 3 pages.
Notice of Allowance, dated Jan. 6, 2023, received in Japanese Patent Application No. 2021-200361 (7817JP), which corresponds with U.S. Appl. No. 17/853,775, 2 pages.
Patent, Notice of Allowance, dated Jun. 20, 2022, received in Korean Patent Application No. 2021-7036124 (7817KR), 2 pages.
Office Action, dated Nov. 16, 2022, received in Korean Patent Application No. 2022-7027746 (7881KR), 10 pages.
International Search Report and Written Opinion, dated Aug. 24, 2018, received in International Patent Application No. PCT/US2018/030702 (7484WO), which corresponds with U.S. Appl. No. 15/845,589, 16 pages.
Extended European Search Report, dated Aug. 19, 2021, received in European Patent Application No. 21168122.6 (7636EP), which corresponds with U.S. Appl. No. 16/953,281, 3 pages.
Patent, dated Jun. 2, 2023, received in Chinese Patent Application No. 201880015192X, which corresponds with U.S. Appl. No. 16/953,281, 6 pages.
Certificate of Grant, dated Jun. 15, 2023, received in Australian Patent Application No. 2021212001, which corresponds with U.S. Appl. No. 17/853,775, 4 pages.
Notice of Allowance, dated Jun. 7, 2023, received in Korean Patent Application No. 2022-7027746, 2 pages.
Office Action, dated Aug. 23, 2023, received in Australian Patent Application No. 2023202756, 2 pages.
Notice of Allowance, dated Sep. 19, 2023, received in Australian Patent Application No. 2023202756, 3 pages.
Patent, dated Sep. 7, 2023, received in Korean Patent Application No. 2022-7027746, 5 pages.

* cited by examiner

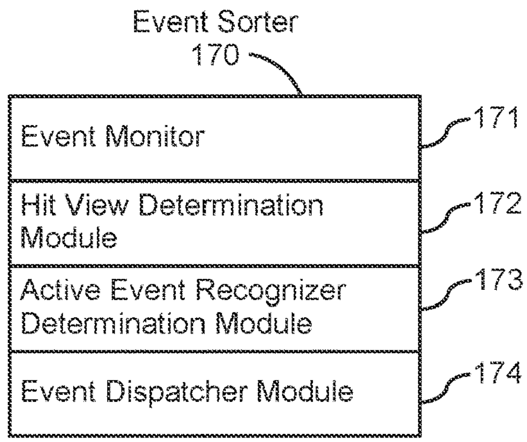
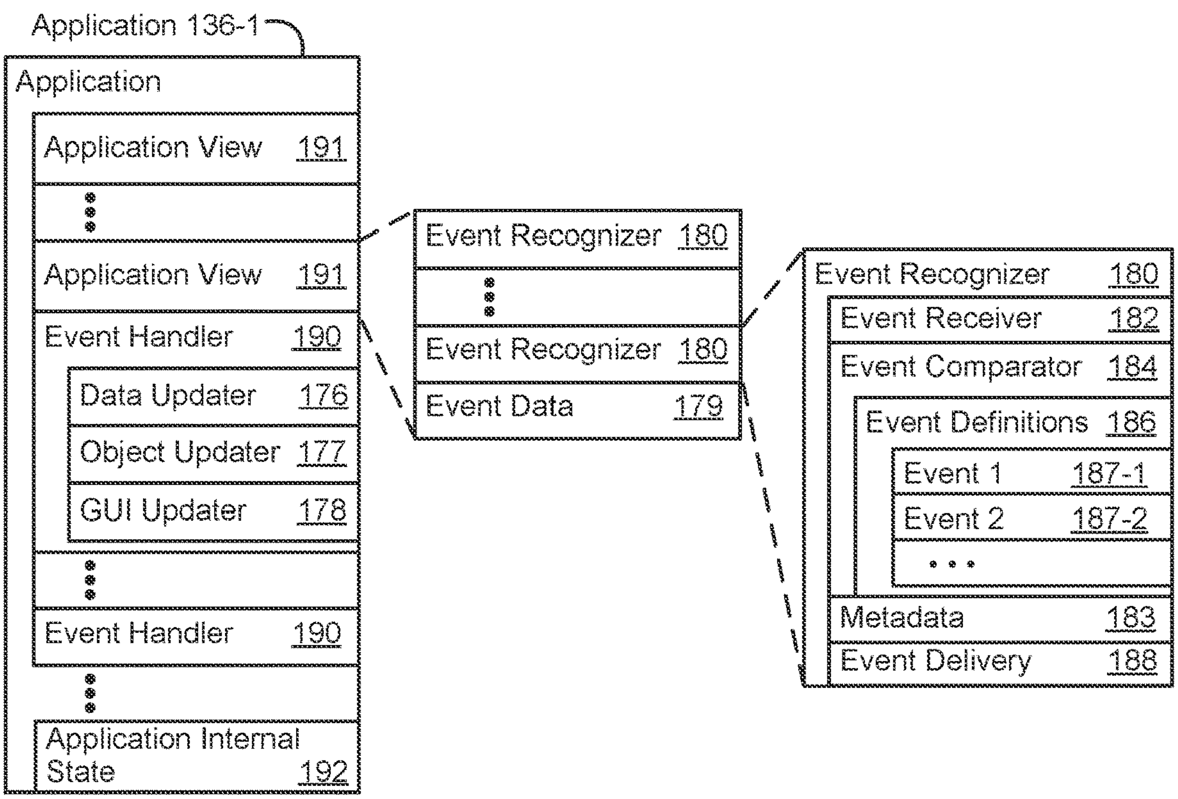
Figure 1B

Figure 6A:
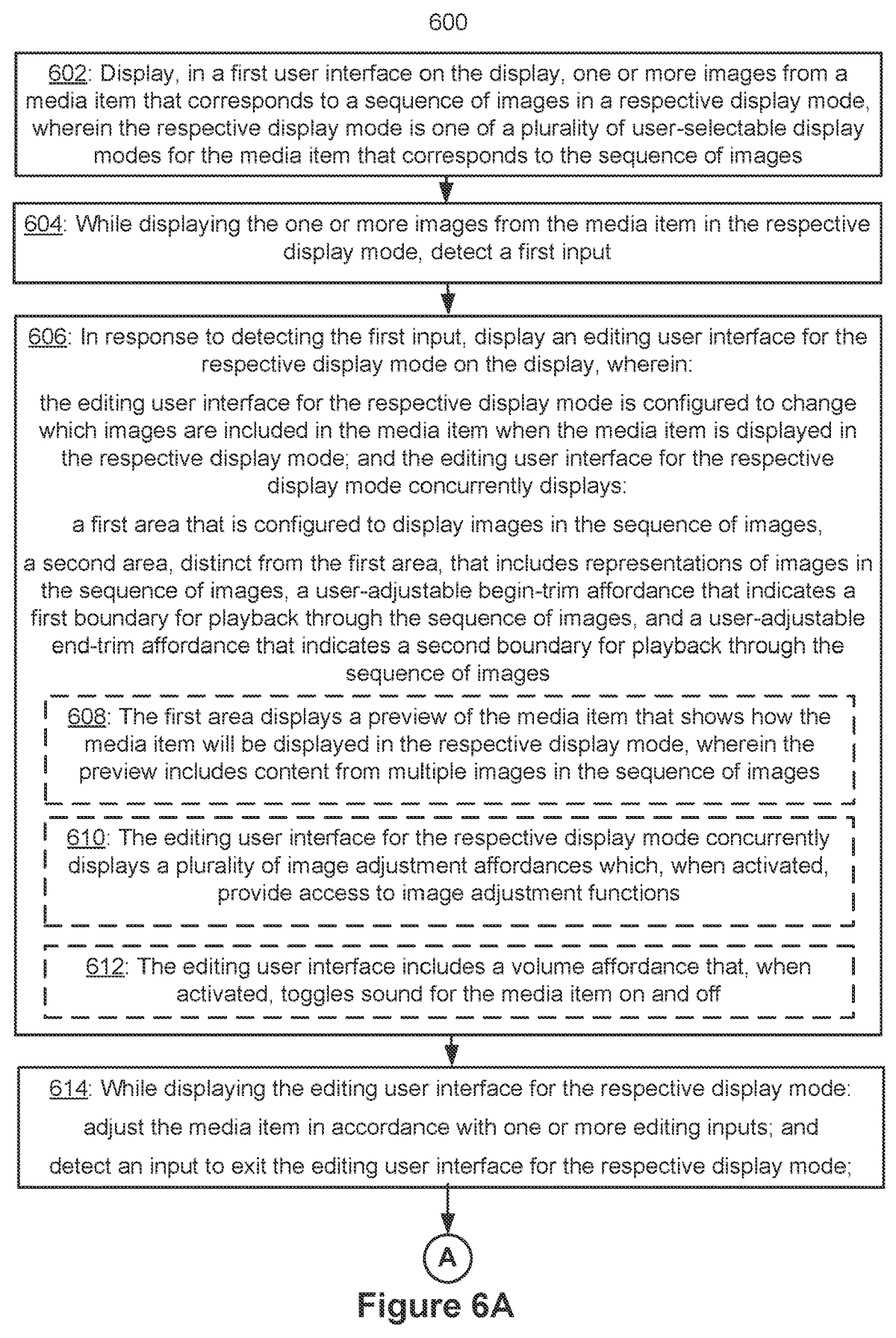

600

602: Display, in a first user interface on the display, one or more images from a media item that corresponds to a sequence of images in a respective display mode, wherein the respective display mode is one of a plurality of user-selectable display modes for the media item that corresponds to the sequence of images 604: While displaying the one or more images from the media item in the respective display mode, detect a first input 606: In response to detecting the first input, display an editing user interface for the respective display mode on the display, wherein:

the editing user interface for the respective display mode is configured to change which images are included in the media item when the media item is displayed in the respective display mode; and the editing user interface for the respective display mode concurrently displays:

a first area that is configured to display images in the sequence of images, a second area, distinct from the first area, that includes representations of images in the sequence of images, a user-adjustable begin-trim affordance that indicates a first boundary for playback through the sequence of images, and a user-adjustable end-trim affordance that indicates a second boundary for playback through the sequence of images 608: The first area displays a preview of the media item that shows how the media item will be displayed in the respective display mode, wherein the preview includes content from multiple images in the sequence of images 610: The editing user interface for the respective display mode concurrently displays a plurality of image adjustment affordances which, when activated, provide access to image adjustment functions 612: The editing user interface includes a volume affordance that, when activated, toggles sound for the media item on and off 614: While displaying the editing user interface for the respective display mode:

adjust the media item in accordance with one or more editing inputs; and detect an input to exit the editing user interface for the respective display mode;

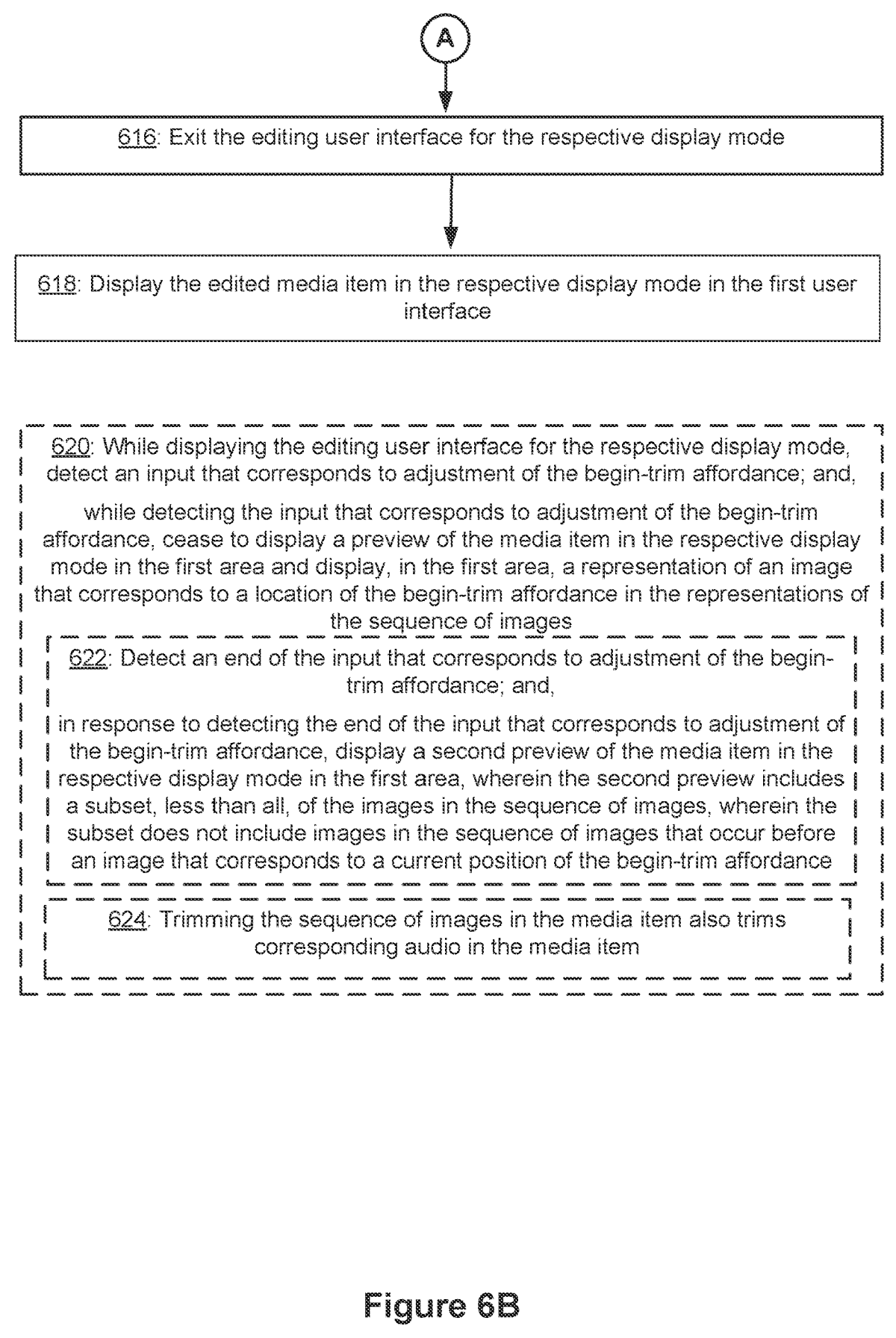

616: Exit the editing user interface for the respective display mode

618: Display the edited media item in the respective display mode in the first user interface 620: While displaying the editing user interface for the respective display mode, detect an input that corresponds to adjustment of the begin-trim affordance; and, while detecting the input that corresponds to adjustment of the begin-trim affordance, cease to display a preview of the media item in the respective display mode in the first area and display, in the first area, a representation of an image that corresponds to a location of the begin-trim affordance in the representations of the sequence of images 622: Detect an end of the input that corresponds to adjustment of the begin-trim affordance; and, in response to detecting the end of the input that corresponds to adjustment of the begin-trim affordance, display a second preview of the media item in the respective display mode in the first area, wherein the second preview includes a subset, less than all, of the images in the sequence of images, wherein the subset does not include images in the sequence of images that occur before an image that corresponds to a current position of the begin-trim affordance 624: Trimming the sequence of images in the media item also trims corresponding audio in the media item

Figure 6B

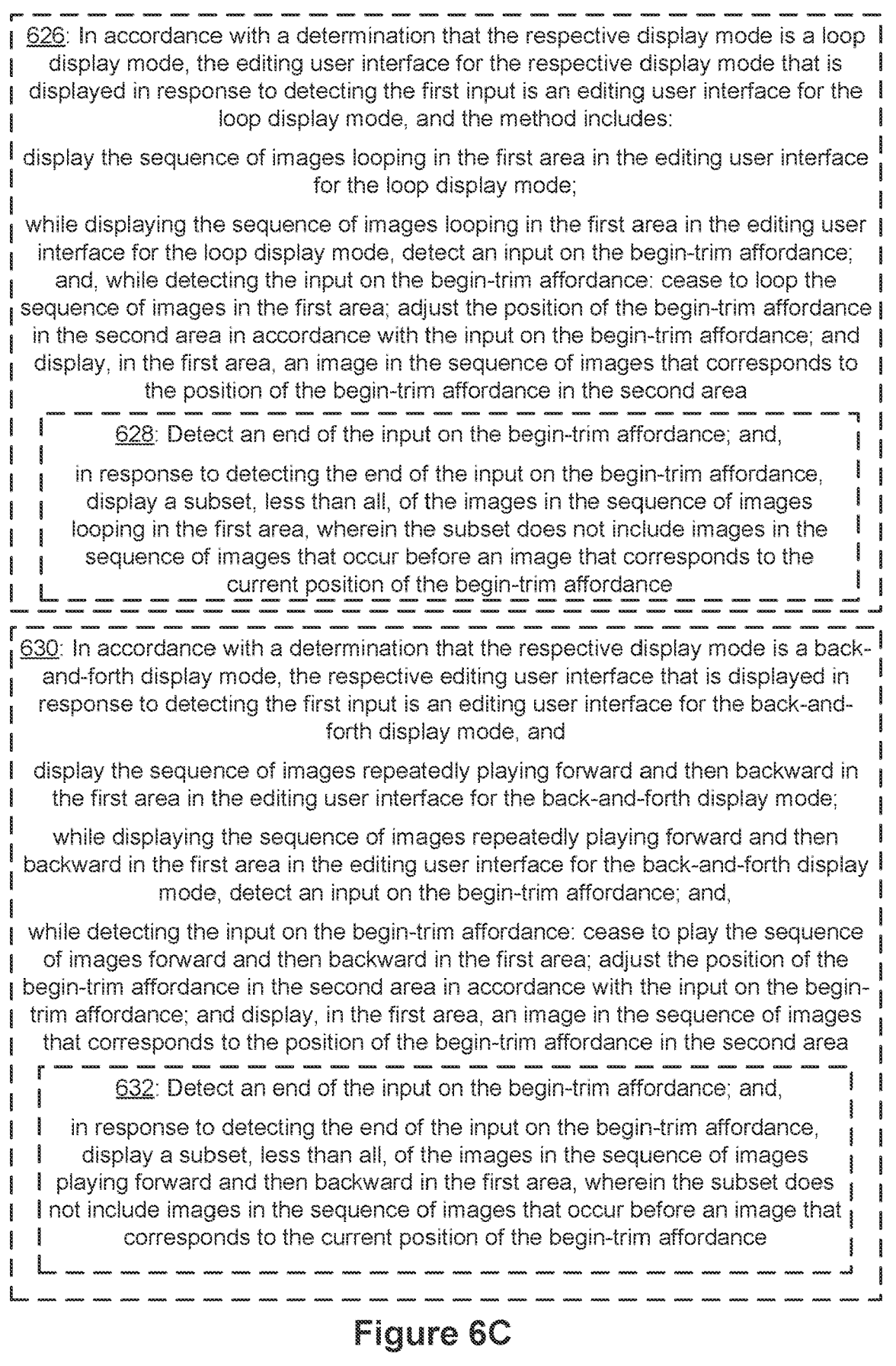

626: In accordance with a determination that the respective display mode is a loop display mode, the editing user interface for the respective display mode that is displayed in response to detecting the first input is an editing user interface for the loop display mode, and the method includes:

display the sequence of images looping in the first area in the editing user interface for the loop display mode;

while displaying the sequence of images looping in the first area in the editing user interface for the loop display mode, detect an input on the begin-trim affordance; and, while detecting the input on the begin-trim affordance: cease to loop the sequence of images in the first area; adjust the position of the begin-trim affordance in the second area in accordance with the input on the begin-trim affordance; and display, in the first area, an image in the sequence of images that corresponds to the position of the begin-trim affordance in the second area 628: Detect an end of the input on the begin-trim affordance; and, in response to detecting the end of the input on the begin-trim affordance, display a subset, less than all, of the images in the sequence of images looping in the first area, wherein the subset does not include images in the sequence of images that occur before an image that corresponds to the current position of the begin-trim affordance 630: In accordance with a determination that the respective display mode is a back-and-forth display mode, the respective editing user interface that is displayed in response to detecting the first input is an editing user interface for the back-and-forth display mode, and display the sequence of images repeatedly playing forward and then backward in the first area in the editing user interface for the back-and-forth display mode;

while displaying the sequence of images repeatedly playing forward and then backward in the first area in the editing user interface for the back-and-forth display mode, detect an input on the begin-trim affordance; and, while detecting the input on the begin-trim affordance: cease to play the sequence of images forward and then backward in the first area; adjust the position of the begin-trim affordance in the second area in accordance with the input on the begin-trim affordance; and display, in the first area, an image in the sequence of images that corresponds to the position of the begin-trim affordance in the second area 632: Detect an end of the input on the begin-trim affordance; and, in response to detecting the end of the input on the begin-trim affordance, display a subset, less than all, of the images in the sequence of images playing forward and then backward in the first area, wherein the subset does not include images in the sequence of images that occur before an image that corresponds to the current position of the begin-trim affordance

Figure 6C

Figure 6D:
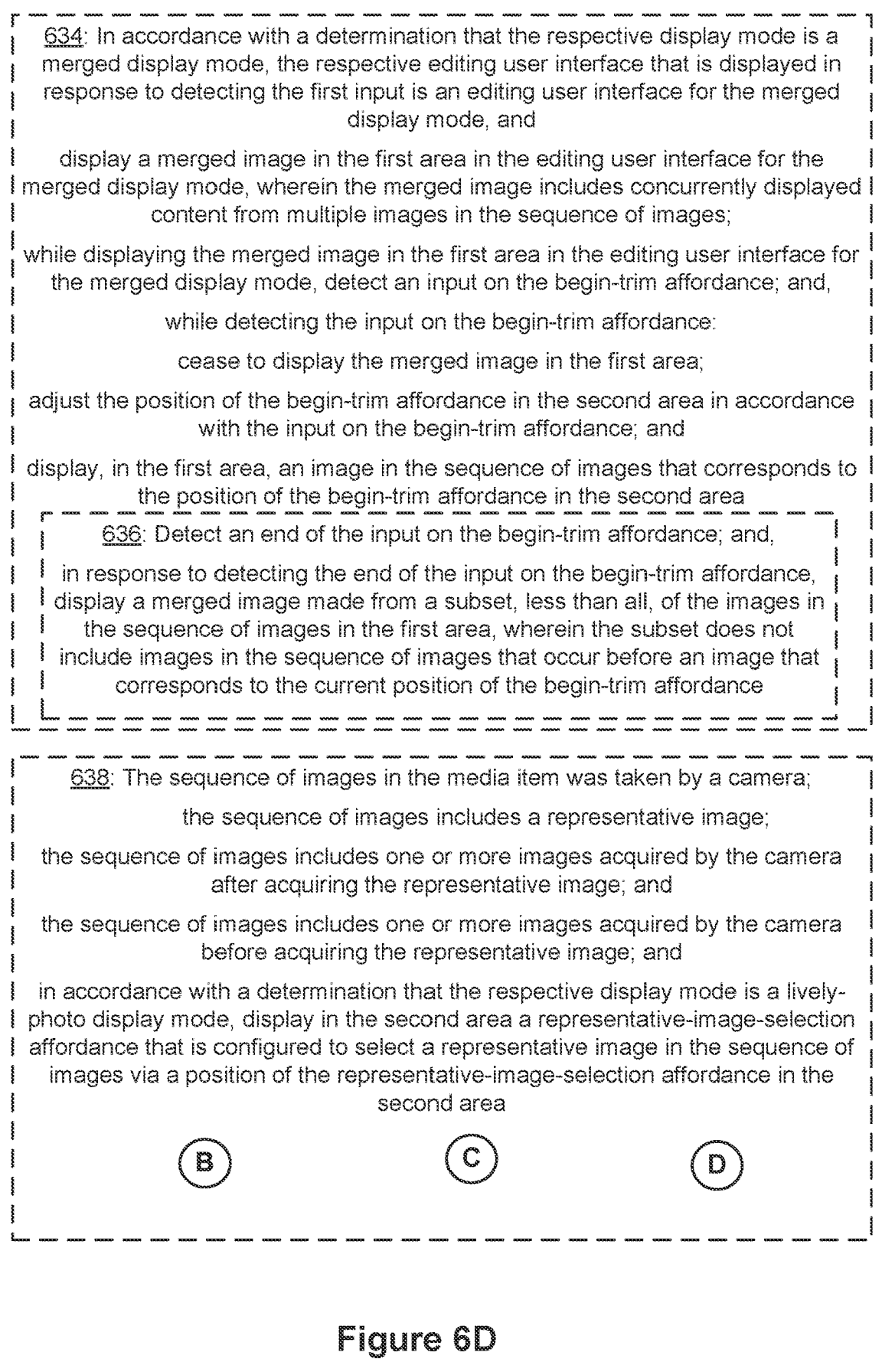

634: In accordance with a determination that the respective display mode is a merged display mode, the respective editing user interface that is displayed in response to detecting the first input is an editing user interface for the merged display mode, and display a merged image in the first area in the editing user interface for the merged display mode, wherein the merged image includes concurrently displayed content from multiple images in the sequence of images;

while displaying the merged image in the first area in the editing user interface for the merged display mode, detect an input on the begin-trim affordance; and, while detecting the input on the begin-trim affordance:

cease to display the merged image in the first area;

adjust the position of the begin-trim affordance in the second area in accordance with the input on the begin-trim affordance; and display, in the first area, an image in the sequence of images that corresponds to the position of the begin-trim affordance in the second area 636: Detect an end of the input on the begin-trim affordance; and, in response to detecting the end of the input on the begin-trim affordance, display a merged image made from a subset, less than all, of the images in the sequence of images in the first area, wherein the subset does not include images in the sequence of images that occur before an image that corresponds to the current position of the begin-trim affordance 638: The sequence of images in the media item was taken by a camera;

the sequence of images includes a representative image;

the sequence of images includes one or more images acquired by the camera after acquiring the representative image; and the sequence of images includes one or more images acquired by the camera before acquiring the representative image; and in accordance with a determination that the respective display mode is a lively-photo display mode, display in the second area a representative-image-selection affordance that is configured to select a representative image in the sequence of images via a position of the representative-image-selection affordance in the second area

Figure 6E:
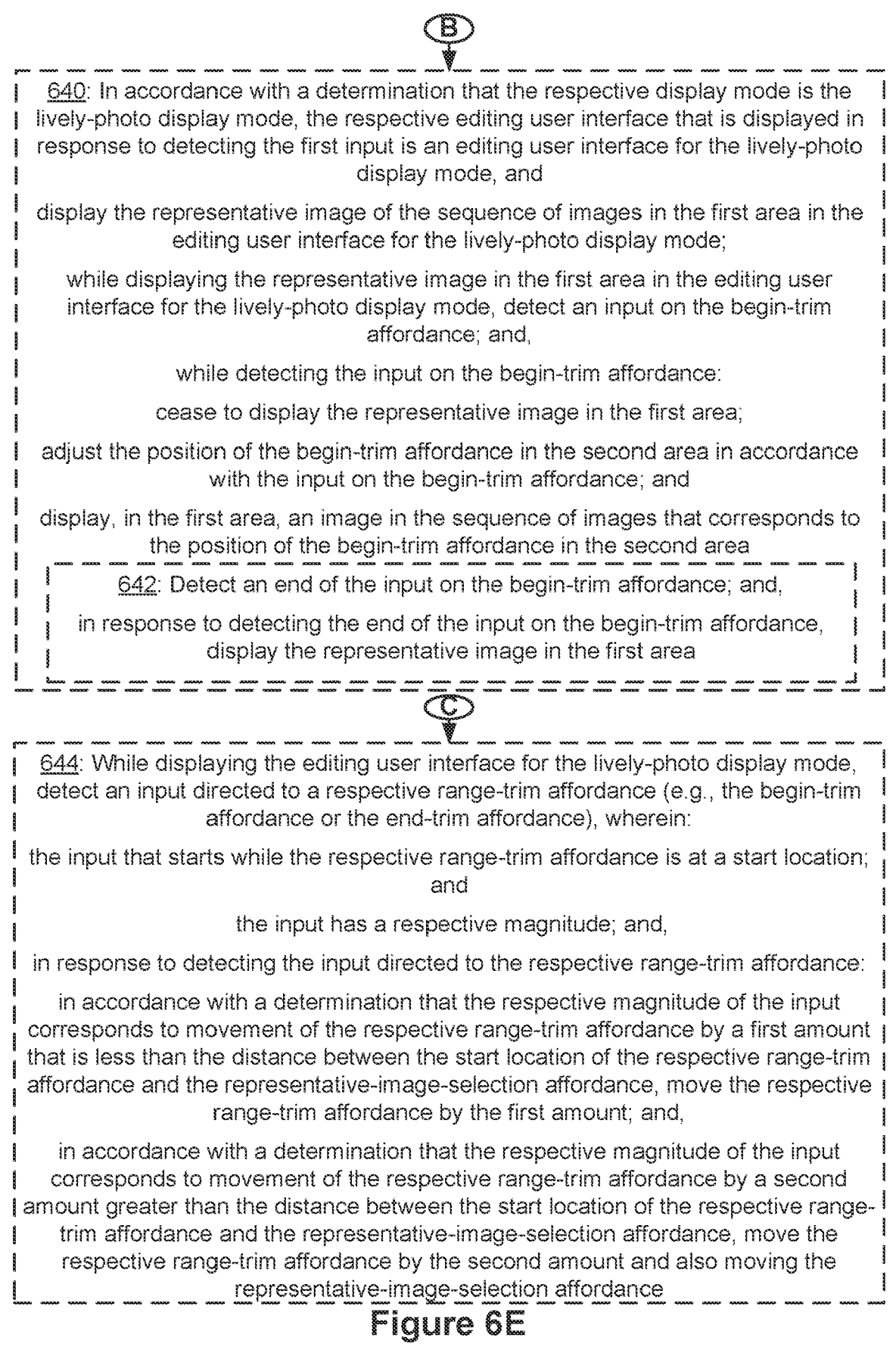

640: In accordance with a determination that the respective display mode is the lively-photo display mode, the respective editing user interface that is displayed in response to detecting the first input is an editing user interface for the lively-photo display mode, and display the representative image of the sequence of images in the first area in the editing user interface for the lively-photo display mode;

while displaying the representative image in the first area in the editing user interface for the lively-photo display mode, detect an input on the begin-trim affordance; and, while detecting the input on the begin-trim affordance:

cease to display the representative image in the first area;

adjust the position of the begin-trim affordance in the second area in accordance with the input on the begin-trim affordance; and display, in the first area, an image in the sequence of images that corresponds to the position of the begin-trim affordance in the second area 642: Detect an end of the input on the begin-trim affordance; and, in response to detecting the end of the input on the begin-trim affordance, display the representative image in the first area

C

644: While displaying the editing user interface for the lively-photo display mode, detect an input directed to a respective range-trim affordance (e.g., the begin-trim affordance or the end-trim affordance), wherein:

the input that starts while the respective range-trim affordance is at a start location; and the input has a respective magnitude; and, in response to detecting the input directed to the respective range-trim affordance:

in accordance with a determination that the respective magnitude of the input corresponds to movement of the respective range-trim affordance by a first amount that is less than the distance between the start location of the respective range-trim affordance and the representative-image-selection affordance, move the respective range-trim affordance by the first amount; and, in accordance with a determination that the respective magnitude of the input corresponds to movement of the respective range-trim affordance by a second amount greater than the distance between the start location of the respective range-trim affordance and the representative-image-selection affordance, move the respective range-trim affordance by the second amount and also moving the representative-image-selection affordance

Figure 6F:
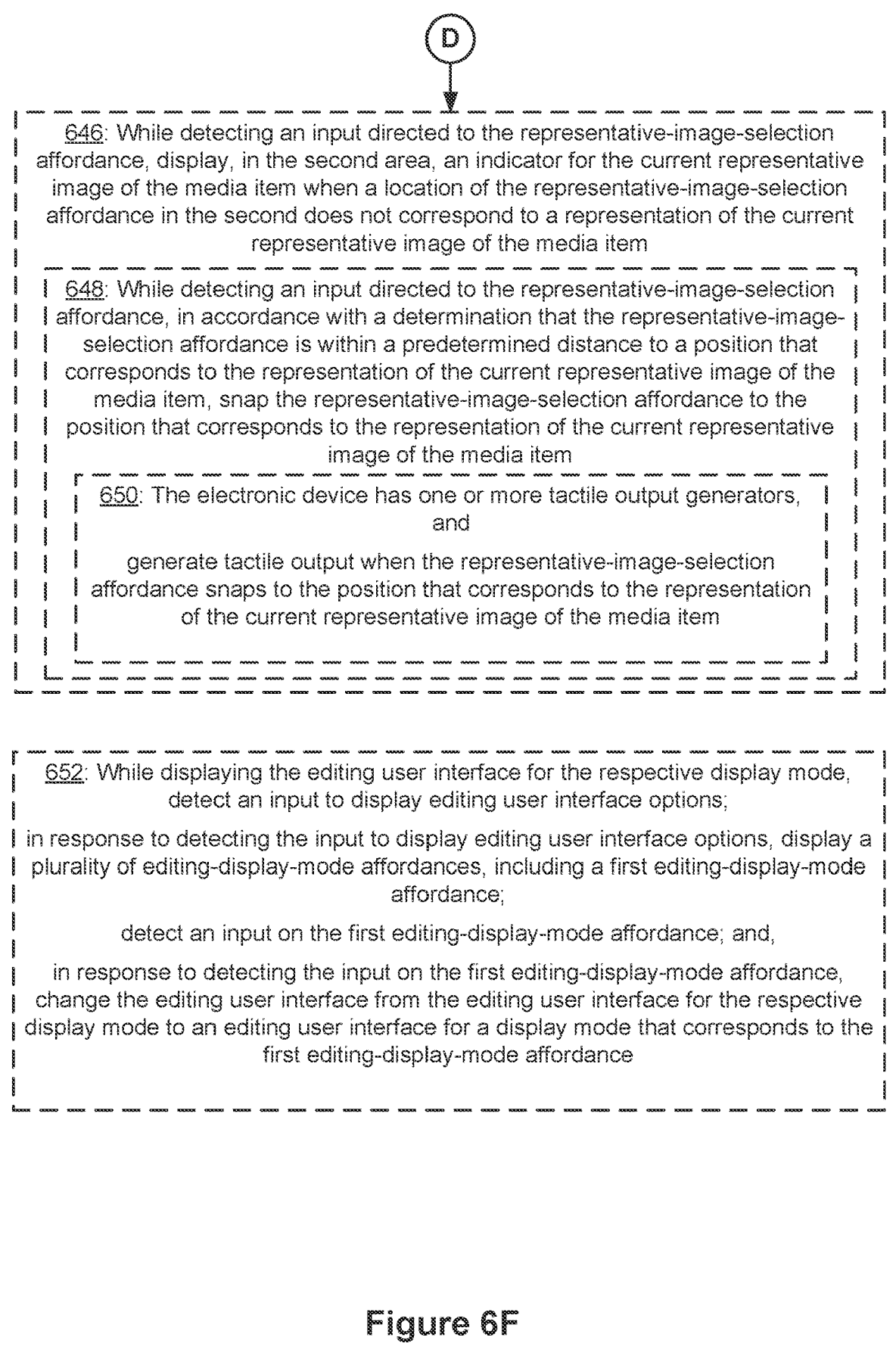

646: While detecting an input directed to the representative-image-selection affordance, display, in the second area, an indicator for the current representative image of the media item when a location of the representative-image-selection affordance in the second does not correspond to a representation of the current representative image of the media item 648: While detecting an input directed to the representative-image-selection affordance, in accordance with a determination that the representative-image-selection affordance is within a predetermined distance to a position that corresponds to the representation of the current representative image of the media item, snap the representative-image-selection affordance to the position that corresponds to the representation of the current representative image of the media item 650: The electronic device has one or more tactile output generators, and generate tactile output when the representative-image-selection affordance snaps to the position that corresponds to the representation of the current representative image of the media item 652: While displaying the editing user interface for the respective display mode, detect an input to display editing user interface options;

in response to detecting the input to display editing user interface options, display a plurality of editing-display-mode affordances, including a first editing-display-mode affordance;

detect an input on the first editing-display-mode affordance; and, in response to detecting the input on the first editing-display-mode affordance, change the editing user interface from the editing user interface for the respective display mode to an editing user interface for a display mode that corresponds to the first editing-display-mode affordance

Figure 7A:
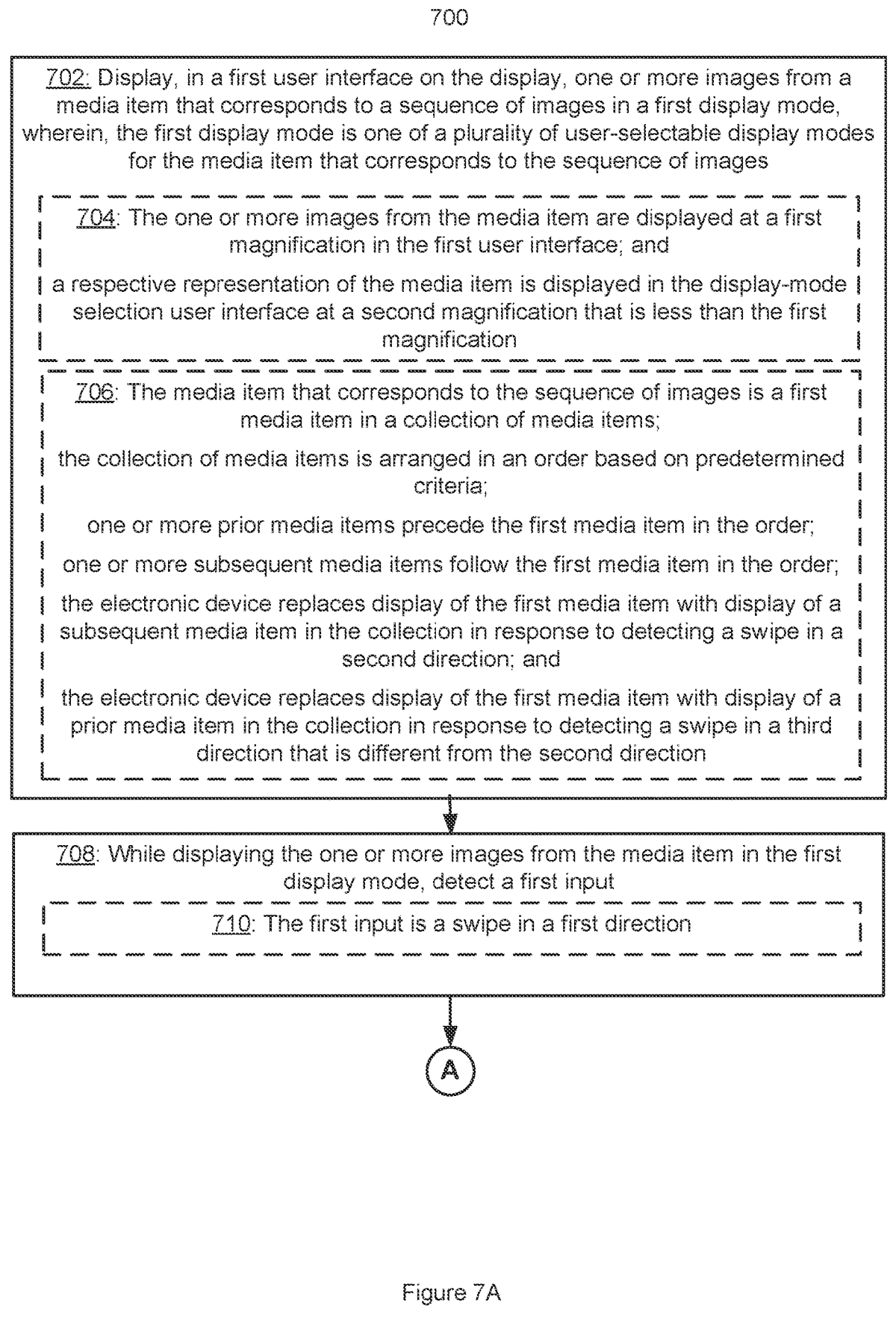

702: Display, in a first user interface on the display, one or more images from a media item that corresponds to a sequence of images in a first display mode, wherein, the first display mode is one of a plurality of user-selectable display modes for the media item that corresponds to the sequence of images 704: The one or more images from the media item are displayed at a first magnification in the first user interface; and a respective representation of the media item is displayed in the display-mode selection user interface at a second magnification that is less than the first magnification 706: The media item that corresponds to the sequence of images is a first media item in a collection of media items;

the collection of media items is arranged in an order based on predetermined criteria;

one or more prior media items precede the first media item in the order;

one or more subsequent media items follow the first media item in the order;

the electronic device replaces display of the first media item with display of a subsequent media item in the collection in response to detecting a swipe in a second direction; and the electronic device replaces display of the first media item with display of a prior media item in the collection in response to detecting a swipe in a third direction that is different from the second direction 708: While displaying the one or more images from the media item in the first display mode, detect a first input 710: The first input is a swipe in a first direction

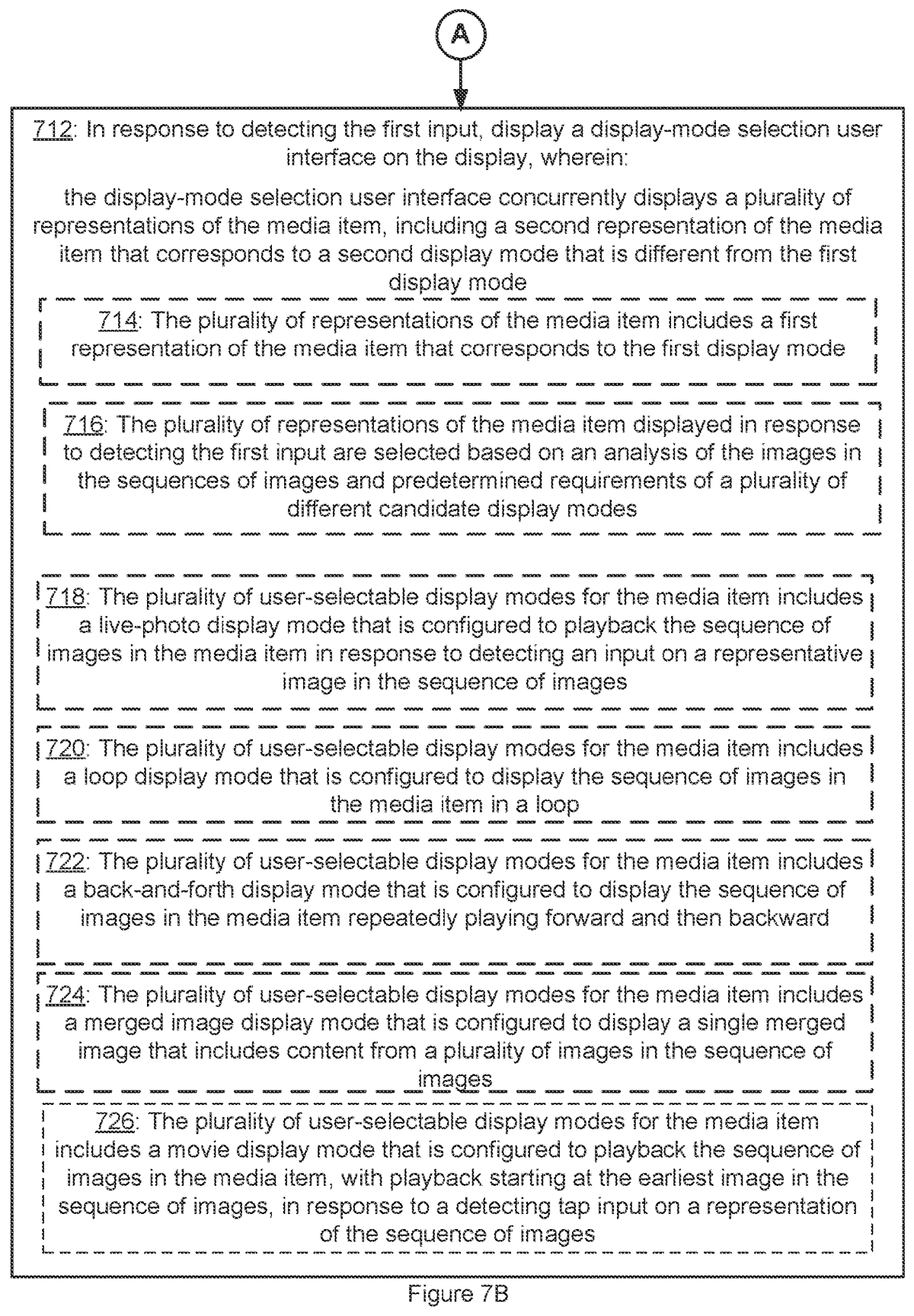

712: In response to detecting the first input, display a display-mode selection user interface on the display, wherein:

the display-mode selection user interface concurrently displays a plurality of representations of the media item, including a second representation of the media item that corresponds to a second display mode that is different from the first display mode 714: The plurality of representations of the media item includes a first representation of the media item that corresponds to the first display mode 716: The plurality of representations of the media item displayed in response to detecting the first input are selected based on an analysis of the images in the sequences of images and predetermined requirements of a plurality of different candidate display modes 718: The plurality of user-selectable display modes for the media item includes a live-photo display mode that is configured to playback the sequence of images in the media item in response to detecting an input on a representative image in the sequence of images 720: The plurality of user-selectable display modes for the media item includes a loop display mode that is configured to display the sequence of images in the media item in a loop 722: The plurality of user-selectable display modes for the media item includes a back-and-forth display mode that is configured to display the sequence of images in the media item repeatedly playing forward and then backward 724: The plurality of user-selectable display modes for the media item includes a merged image display mode that is configured to display a single merged image that includes content from a plurality of images in the sequence of images 726: The plurality of user-selectable display modes for the media item includes a movie display mode that is configured to playback the sequence of images in the media item, with playback starting at the earliest image in the sequence of images, in response to a detecting tap input on a representation of the sequence of images

Figure 7B

Figure 7D:
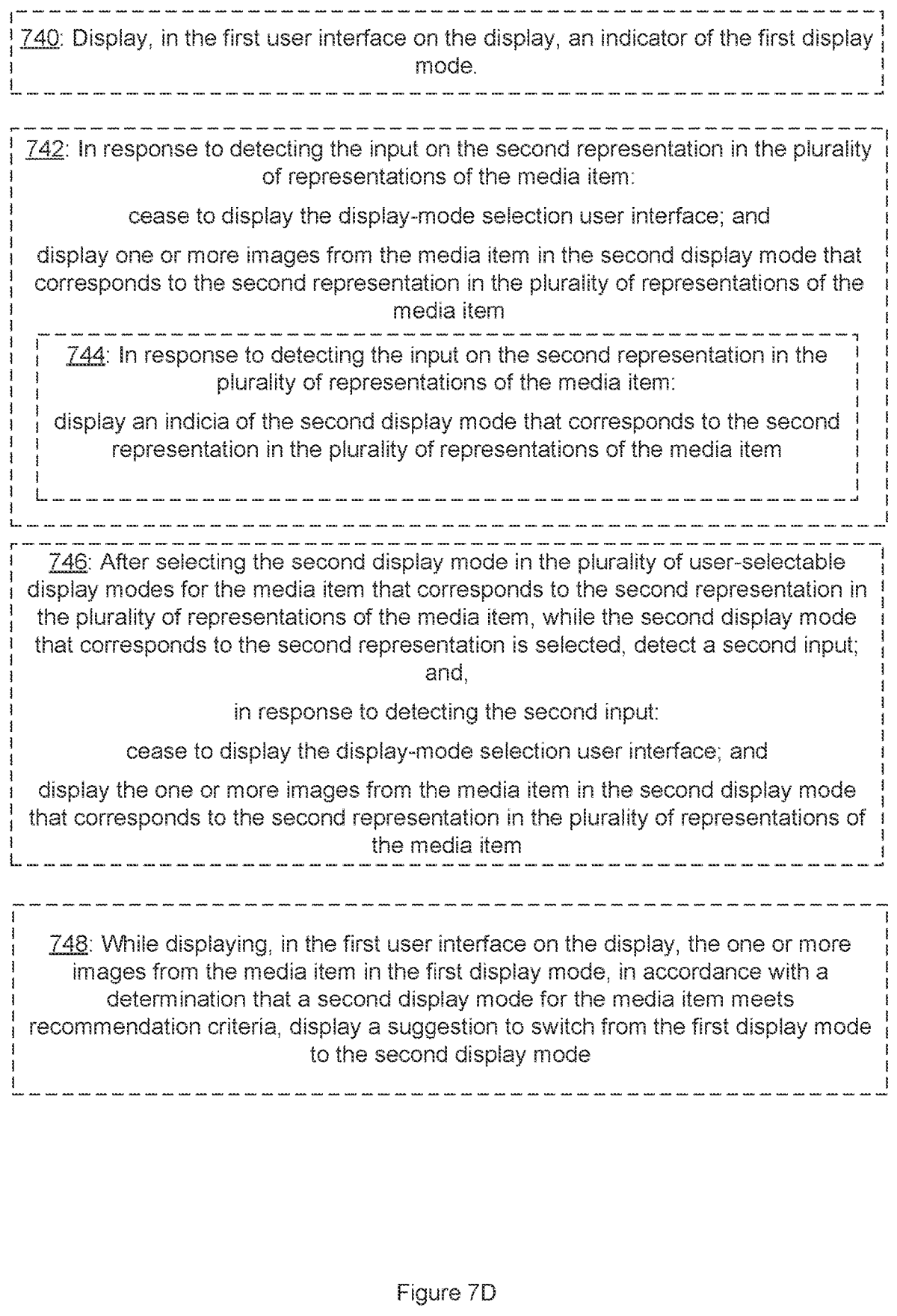

740: Display, in the first user interface on the display, an indicator of the first display mode.

742: In response to detecting the input on the second representation in the plurality of representations of the media item:

cease to display the display-mode selection user interface; and display one or more images from the media item in the second display mode that corresponds to the second representation in the plurality of representations of the media item 744: In response to detecting the input on the second representation in the plurality of representations of the media item:

display an indicia of the second display mode that corresponds to the second representation in the plurality of representations of the media item 746: After selecting the second display mode in the plurality of user-selectable display modes for the media item that corresponds to the second representation in the plurality of representations of the media item, while the second display mode that corresponds to the second representation is selected, detect a second input; and, in response to detecting the second input:

cease to display the display-mode selection user interface; and display the one or more images from the media item in the second display mode that corresponds to the second representation in the plurality of representations of the media item 748: While displaying, in the first user interface on the display, the one or more images from the media item in the first display mode, in accordance with a determination that a second display mode for the media item meets recommendation criteria, display a suggestion to switch from the first display mode to the second display mode

Figure 8A:
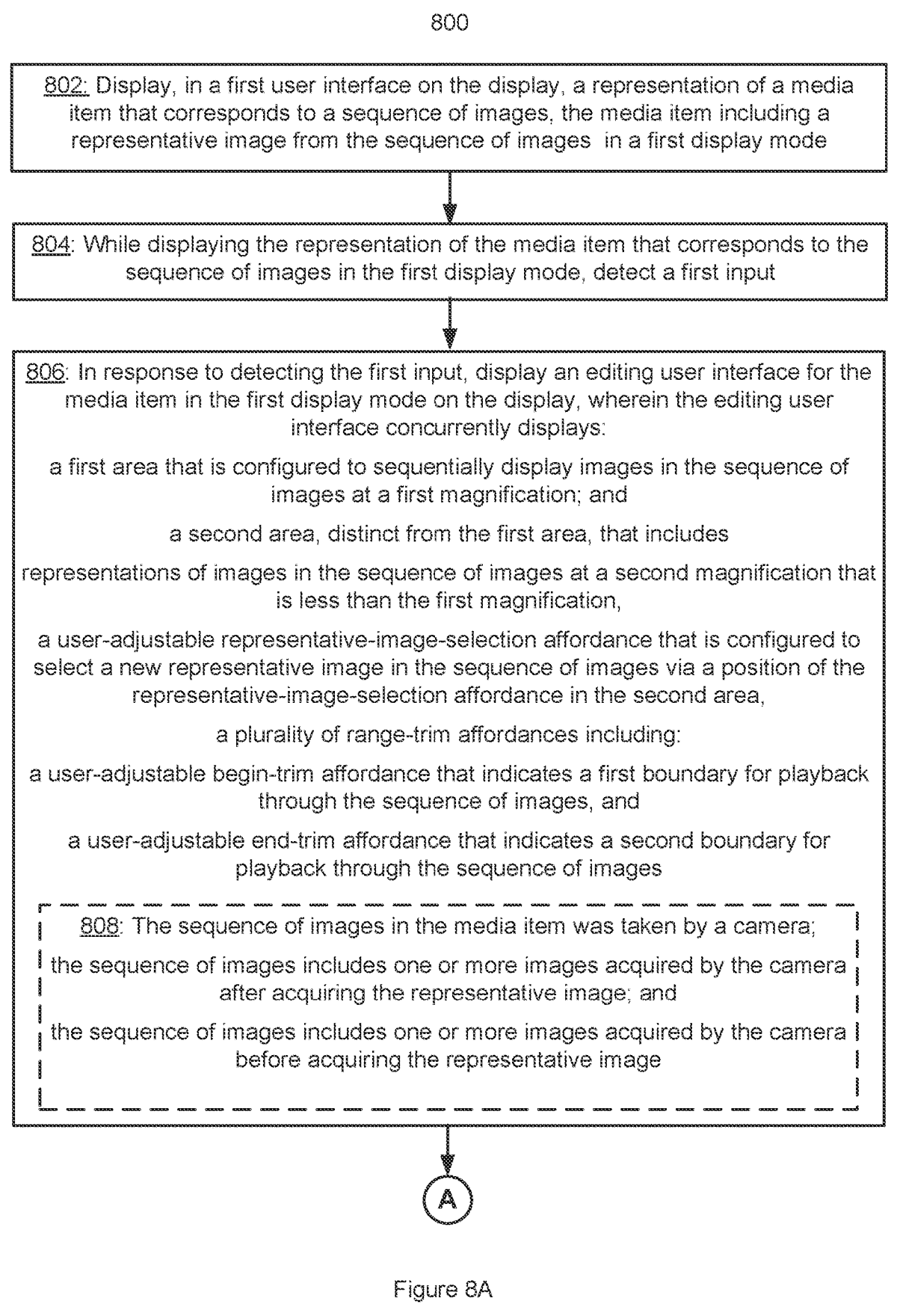

802: Display, in a first user interface on the display, a representation of a media item that corresponds to a sequence of images, the media item including a representative image from the sequence of images in a first display mode

↓

804: While displaying the representation of the media item that corresponds to the sequence of images in the first display mode, detect a first input

↓

806: In response to detecting the first input, display an editing user interface for the media item in the first display mode on the display, wherein the editing user interface concurrently displays:

a first area that is configured to sequentially display images in the sequence of images at a first magnification; and a second area, distinct from the first area, that includes representations of images in the sequence of images at a second magnification that is less than the first magnification, a user-adjustable representative-image-selection affordance that is configured to select a new representative image in the sequence of images via a position of the representative-image-selection affordance in the second area, a plurality of range-trim affordances including:

a user-adjustable begin-trim affordance that indicates a first boundary for playback through the sequence of images, and a user-adjustable end-trim affordance that indicates a second boundary for playback through the sequence of images 808: The sequence of images in the media item was taken by a camera;

the sequence of images includes one or more images acquired by the camera after acquiring the representative image; and the sequence of images includes one or more images acquired by the camera before acquiring the representative image

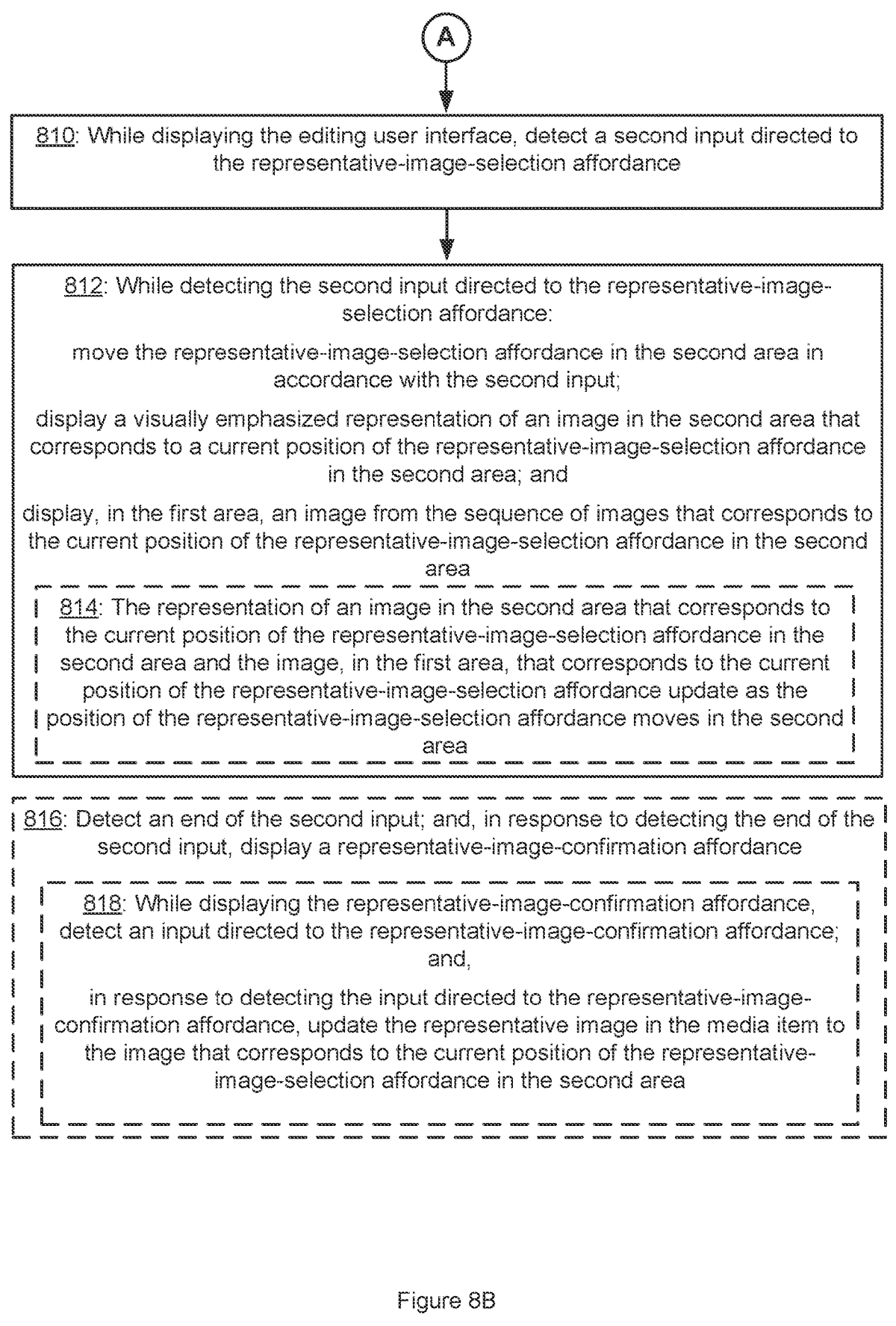

810: While displaying the editing user interface, detect a second input directed to the representative-image-selection affordance 812: While detecting the second input directed to the representative-image-selection affordance:

move the representative-image-selection affordance in the second area in accordance with the second input;

display a visually emphasized representation of an image in the second area that corresponds to a current position of the representative-image-selection affordance in the second area; and display, in the first area, an image from the sequence of images that corresponds to the current position of the representative-image-selection affordance in the second area 814: The representation of an image in the second area that corresponds to the current position of the representative-image-selection affordance in the second area and the image, in the first area, that corresponds to the current position of the representative-image-selection affordance update as the position of the representative-image-selection affordance moves in the second area 816: Detect an end of the second input; and, in response to detecting the end of the second input, display a representative-image-confirmation affordance 818: While displaying the representative-image-confirmation affordance, detect an input directed to the representative-image-confirmation affordance; and, in response to detecting the input directed to the representative-image-confirmation affordance, update the representative image in the media item to the image that corresponds to the current position of the representative-image-selection affordance in the second area

Figure 8B

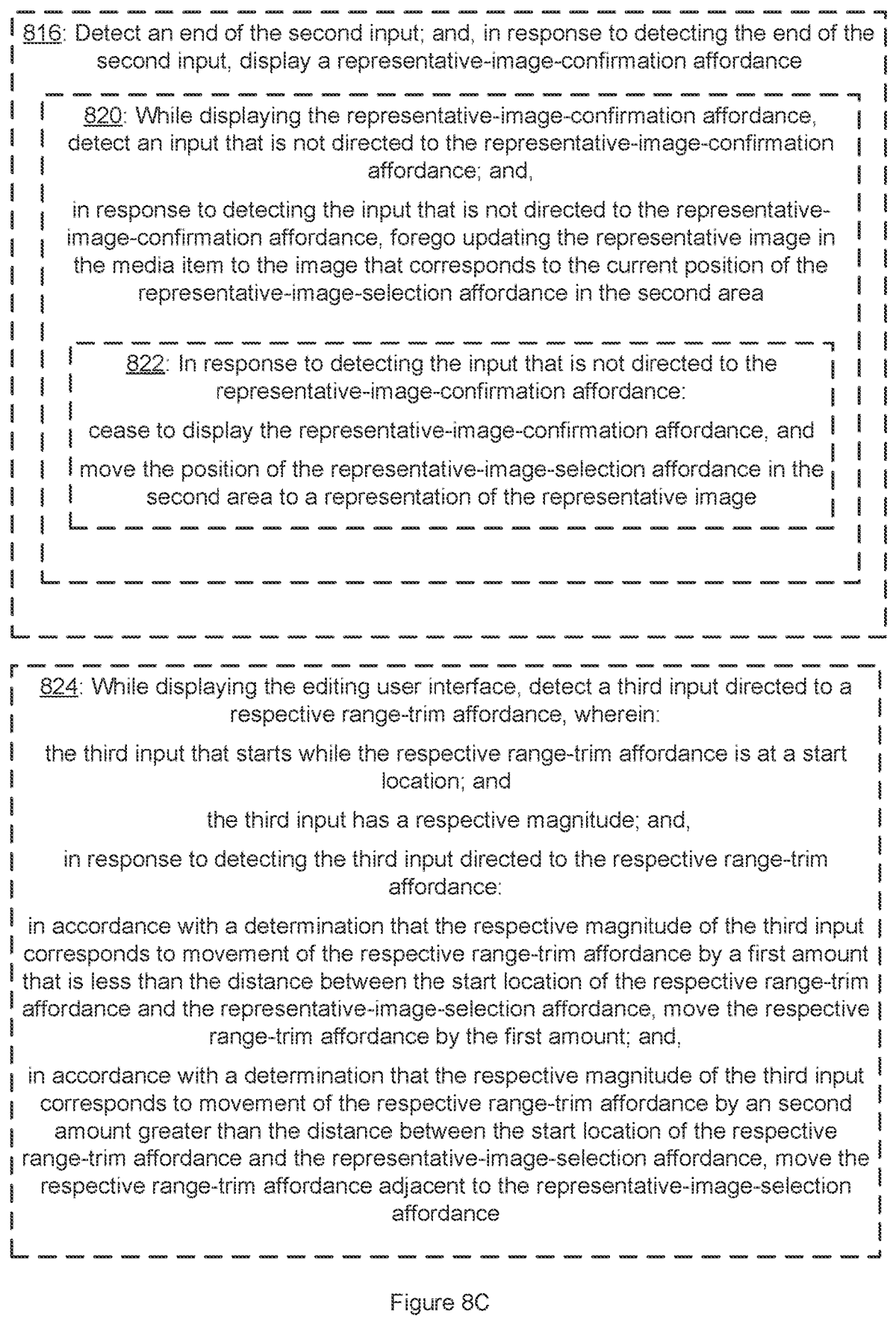

816: Detect an end of the second input; and, in response to detecting the end of the second input, display a representative-image-confirmation affordance 820: While displaying the representative-image-confirmation affordance, detect an input that is not directed to the representative-image-confirmation affordance; and, in response to detecting the input that is not directed to the representative-image-confirmation affordance, forego updating the representative image in the media item to the image that corresponds to the current position of the representative-image-selection affordance in the second area 822: In response to detecting the input that is not directed to the representative-image-confirmation affordance:

cease to display the representative-image-confirmation affordance, and move the position of the representative-image-selection affordance in the second area to a representation of the representative image 824: While displaying the editing user interface, detect a third input directed to a respective range-trim affordance, wherein:

the third input that starts while the respective range-trim affordance is at a start location; and the third input has a respective magnitude; and, in response to detecting the third input directed to the respective range-trim affordance:

in accordance with a determination that the respective magnitude of the third input corresponds to movement of the respective range-trim affordance by a first amount that is less than the distance between the start location of the respective range-trim affordance and the representative-image-selection affordance, move the respective range-trim affordance by the first amount; and, in accordance with a determination that the respective magnitude of the third input corresponds to movement of the respective range-trim affordance by an second amount greater than the distance between the start location of the respective range-trim affordance and the representative-image-selection affordance, move the respective range-trim affordance adjacent to the representative-image-selection affordance

Figure 8C

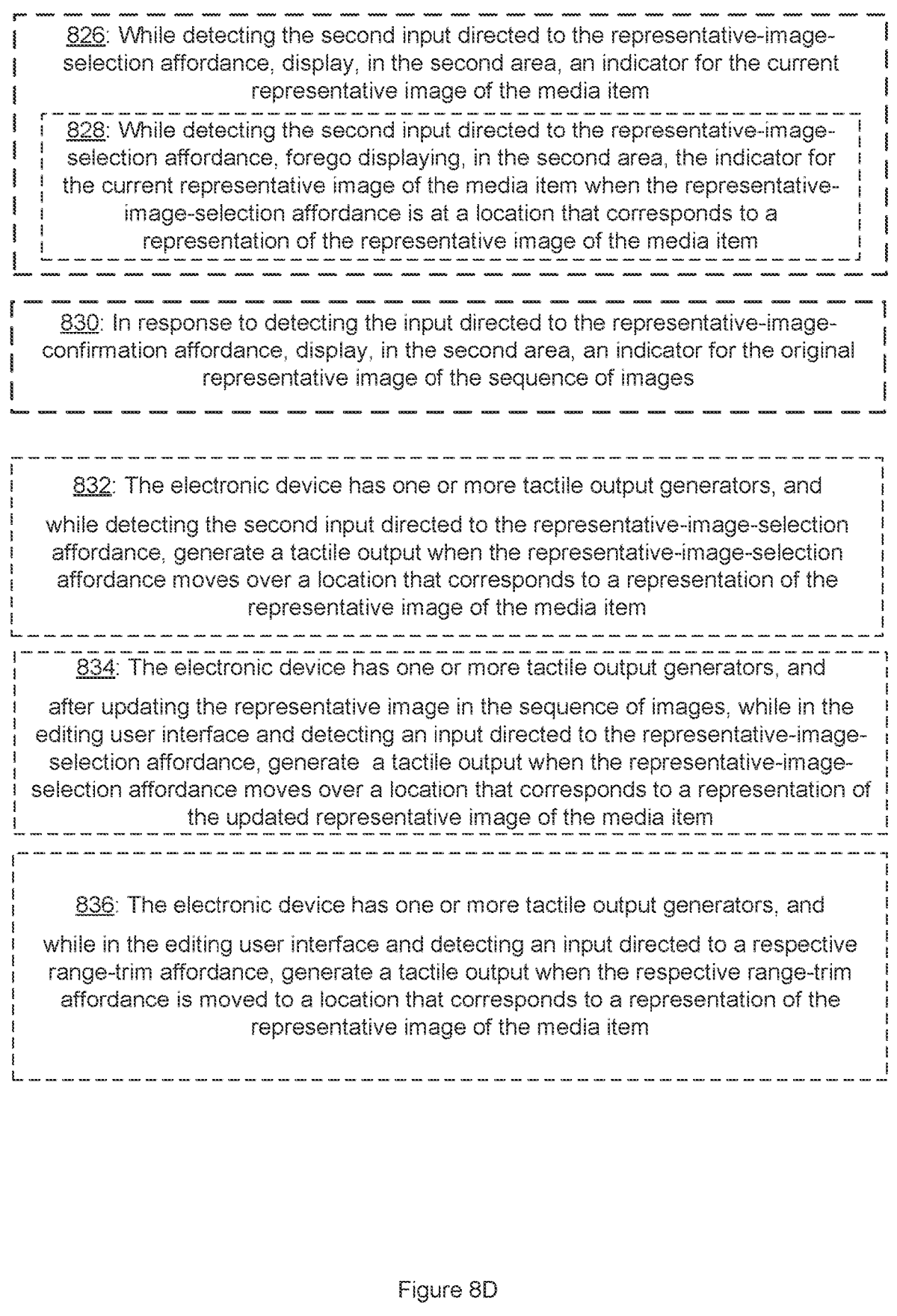

826: While detecting the second input directed to the representative-image-selection affordance, display, in the second area, an indicator for the current representative image of the media item 828: While detecting the second input directed to the representative-image-selection affordance, forego displaying, in the second area, the indicator for the current representative image of the media item when the representative-image-selection affordance is at a location that corresponds to a representation of the representative image of the media item 830: In response to detecting the input directed to the representative-image-confirmation affordance, display, in the second area, an indicator for the original representative image of the sequence of images 832: The electronic device has one or more tactile output generators, and while detecting the second input directed to the representative-image-selection affordance, generate a tactile output when the representative-image-selection affordance moves over a location that corresponds to a representation of the representative image of the media item 834: The electronic device has one or more tactile output generators, and after updating the representative image in the sequence of images, while in the editing user interface and detecting an input directed to the representative-image-selection affordance, generate a tactile output when the representative-image-selection affordance moves over a location that corresponds to a representation of the updated representative image of the media item 836: The electronic device has one or more tactile output generators, and while in the editing user interface and detecting an input directed to a respective range-trim affordance, generate a tactile output when the respective range-trim affordance is moved to a location that corresponds to a representation of the representative image of the media item

Figure 8D

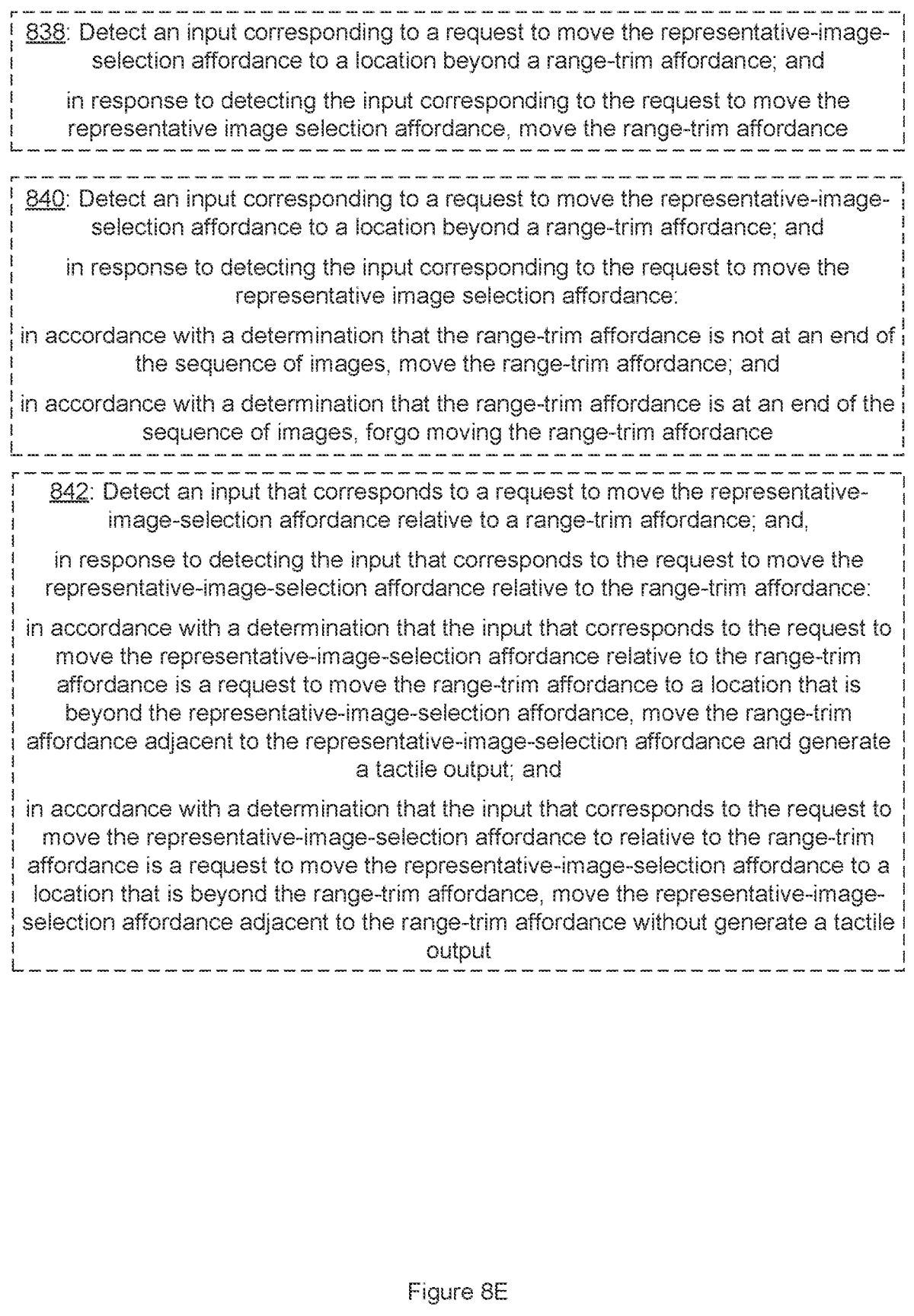

838: Detect an input corresponding to a request to move the representative-image-selection affordance to a location beyond a range-trim affordance; and in response to detecting the input corresponding to the request to move the representative image selection affordance, move the range-trim affordance 840: Detect an input corresponding to a request to move the representative-image-selection affordance to a location beyond a range-trim affordance; and in response to detecting the input corresponding to the request to move the representative image selection affordance:

in accordance with a determination that the range-trim affordance is not at an end of the sequence of images, move the range-trim affordance; and in accordance with a determination that the range-trim affordance is at an end of the sequence of images, forgo moving the range-trim affordance 842: Detect an input that corresponds to a request to move the representative-image-selection affordance relative to a range-trim affordance; and, in response to detecting the input that corresponds to the request to move the representative-image-selection affordance relative to the range-trim affordance:

in accordance with a determination that the input that corresponds to the request to move the representative-image-selection affordance relative to the range-trim affordance is a request to move the range-trim affordance to a location that is beyond the representative-image-selection affordance, move the range-trim affordance adjacent to the representative-image-selection affordance and generate a tactile output; and in accordance with a determination that the input that corresponds to the request to move the representative-image-selection affordance to relative to the range-trim affordance is a request to move the representative-image-selection affordance to a location that is beyond the range-trim affordance, move the representative-image-selection affordance adjacent to the range-trim affordance without generate a tactile output

Figure 8E

Figure 8F:
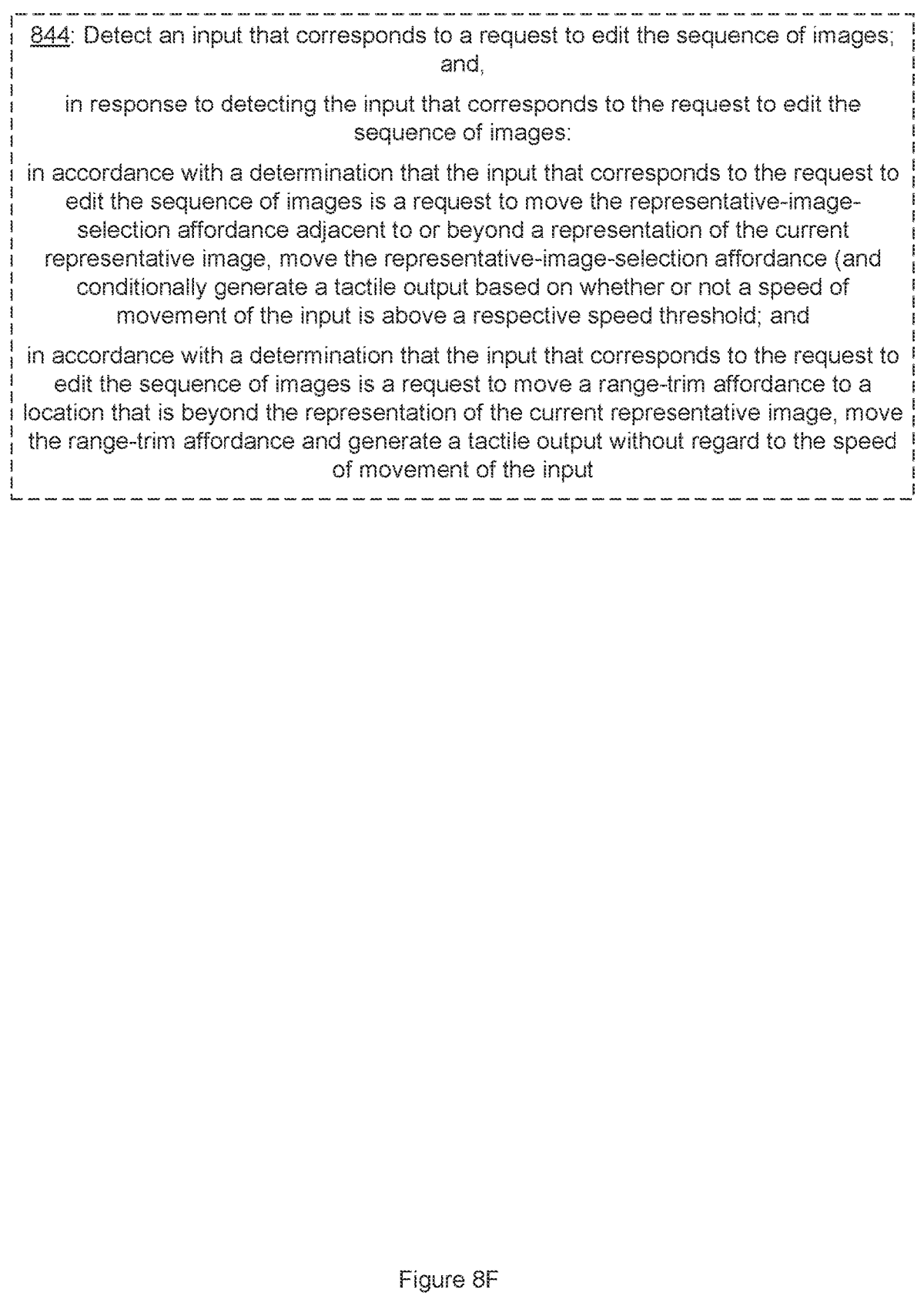

844: Detect an input that corresponds to a request to edit the sequence of images; and, in response to detecting the input that corresponds to the request to edit the sequence of images:

in accordance with a determination that the input that corresponds to the request to edit the sequence of images is a request to move the representative-image-selection affordance adjacent to or beyond a representation of the current representative image, move the representative-image-selection affordance (and conditionally generate a tactile output based on whether or not a speed of movement of the input is above a respective speed threshold; and in accordance with a determination that the input that corresponds to the request to edit the sequence of images is a request to move a range-trim affordance to a location that is beyond the representation of the current representative image, move the range-trim affordance and generate a tactile output without regard to the speed of movement of the input

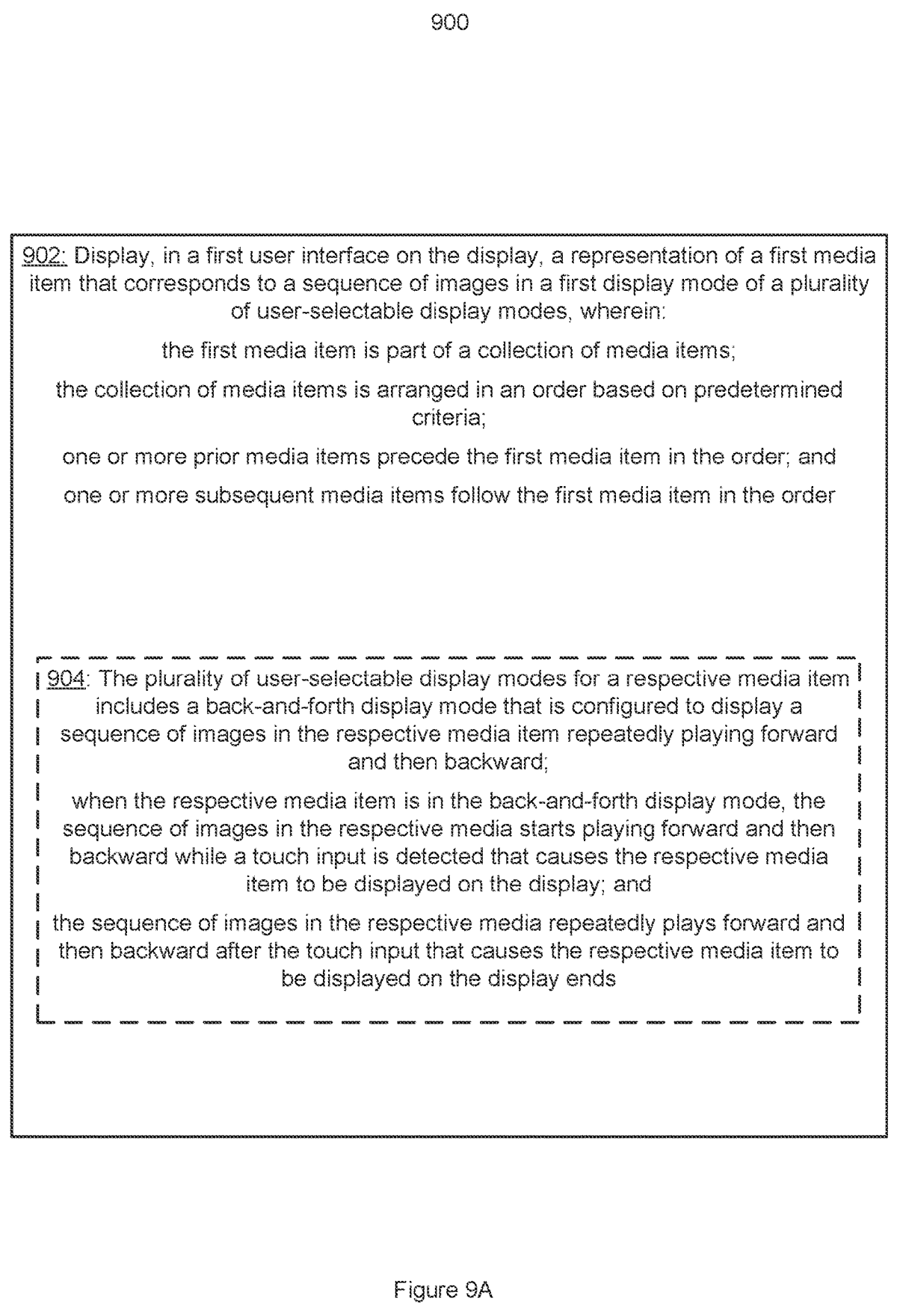

902: Display, in a first user interface on the display, a representation of a first media item that corresponds to a sequence of images in a first display mode of a plurality of user-selectable display modes, wherein:

the first media item is part of a collection of media items;

the collection of media items is arranged in an order based on predetermined criteria;

one or more prior media items precede the first media item in the order; and one or more subsequent media items follow the first media item in the order 904: The plurality of user-selectable display modes for a respective media item includes a back-and-forth display mode that is configured to display a sequence of images in the respective media item repeatedly playing forward and then backward;

when the respective media item is in the back-and-forth display mode, the sequence of images in the respective media starts playing forward and then backward while a touch input is detected that causes the respective media item to be displayed on the display; and the sequence of images in the respective media repeatedly plays forward and then backward after the touch input that causes the respective media item to be displayed on the display ends

Figure 9A

Figure 9B:
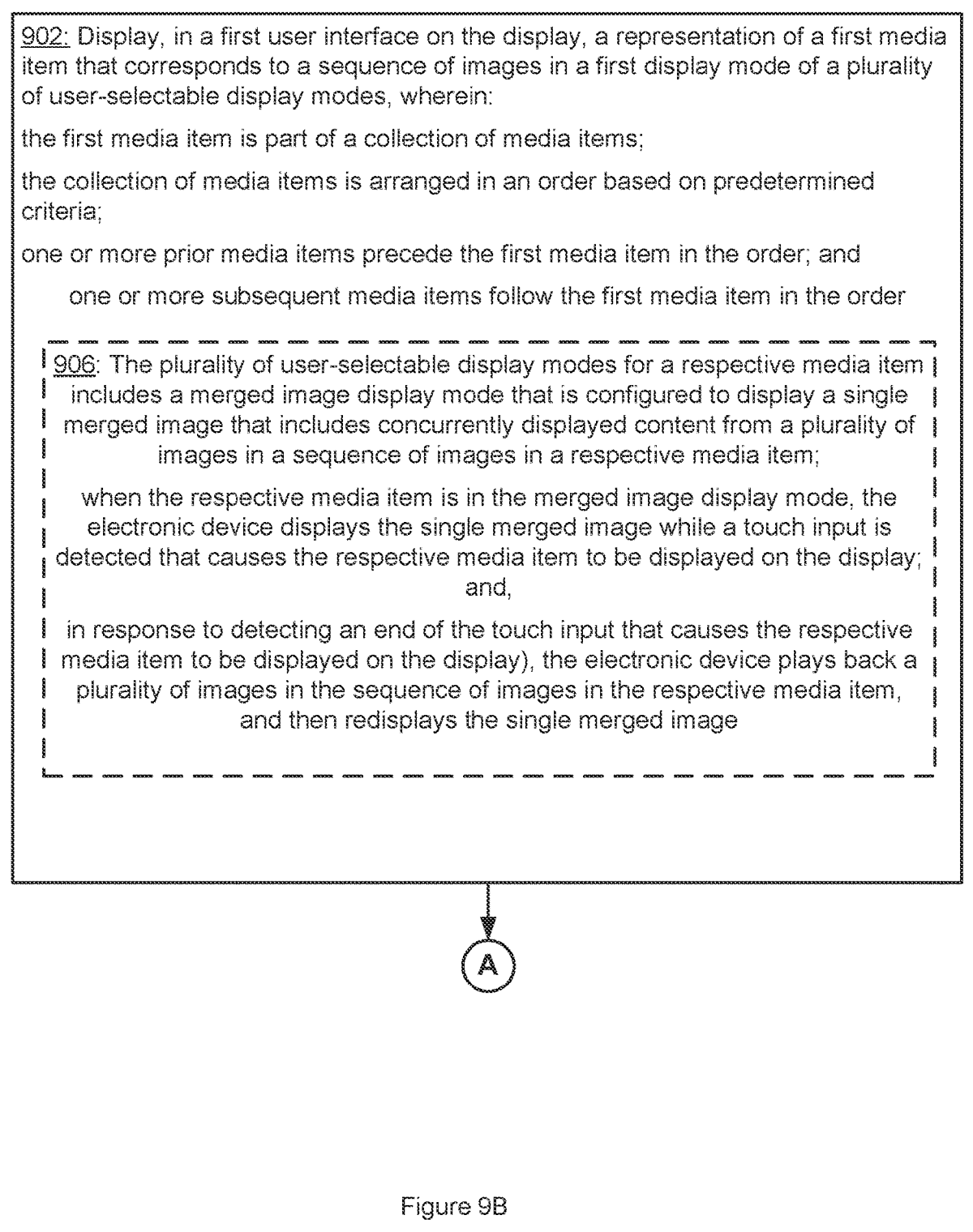

902: Display, in a first user interface on the display, a representation of a first media item that corresponds to a sequence of images in a first display mode of a plurality of user-selectable display modes, wherein:

the first media item is part of a collection of media items;

the collection of media items is arranged in an order based on predetermined criteria;

one or more prior media items precede the first media item in the order; and one or more subsequent media items follow the first media item in the order 906: The plurality of user-selectable display modes for a respective media item includes a merged image display mode that is configured to display a single merged image that includes concurrently displayed content from a plurality of images in a sequence of images in a respective media item;

when the respective media item is in the merged image display mode, the electronic device displays the single merged image while a touch input is detected that causes the respective media item to be displayed on the display; and, in response to detecting an end of the touch input that causes the respective media item to be displayed on the display), the electronic device plays back a plurality of images in the sequence of images in the respective media item, and then redisplays the single merged image

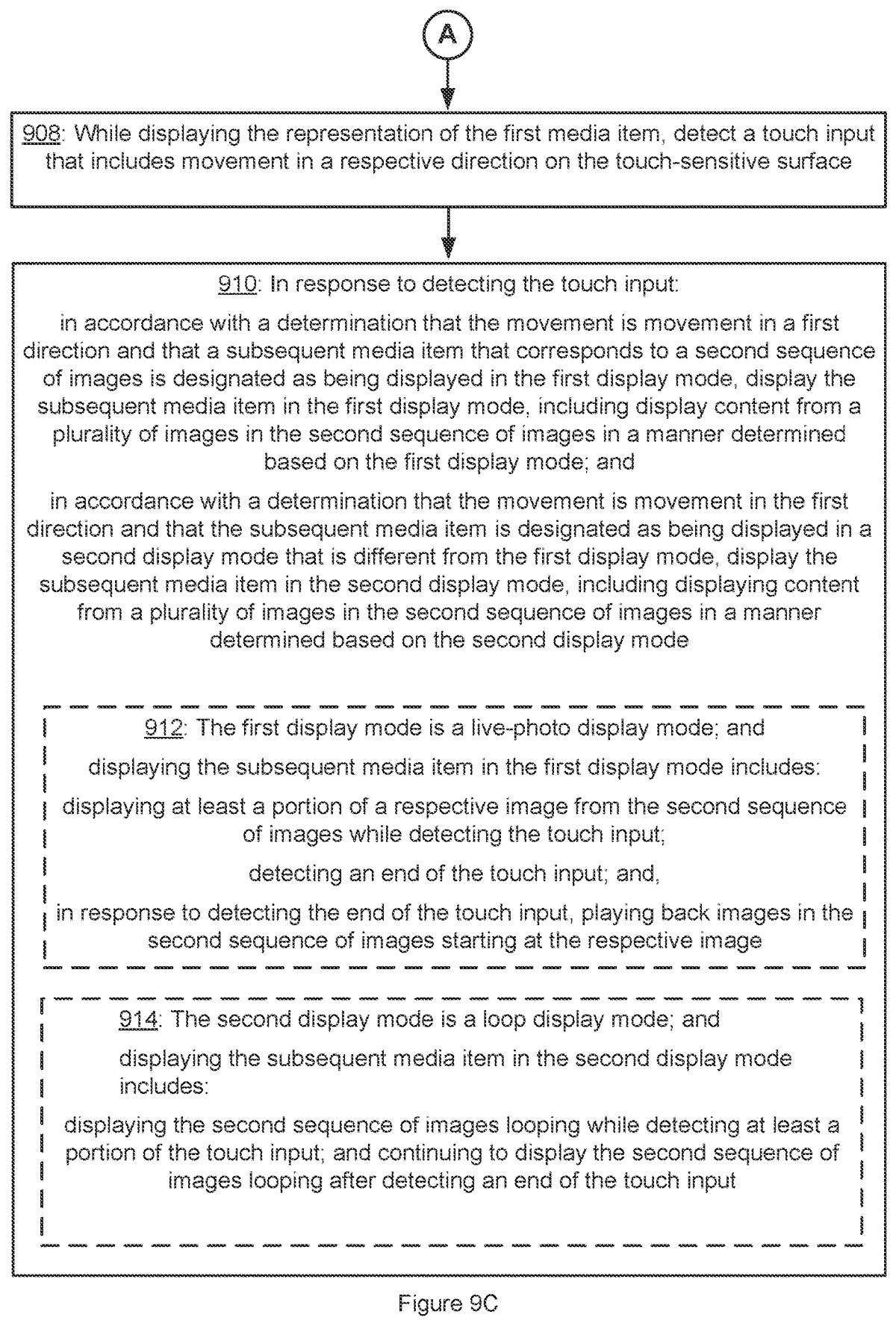

908: While displaying the representation of the first media item, detect a touch input that includes movement in a respective direction on the touch-sensitive surface 910: In response to detecting the touch input:

in accordance with a determination that the movement is movement in a first direction and that a subsequent media item that corresponds to a second sequence of images is designated as being displayed in the first display mode, display the subsequent media item in the first display mode, including display content from a plurality of images in the second sequence of images in a manner determined based on the first display mode; and in accordance with a determination that the movement is movement in the first direction and that the subsequent media item is designated as being displayed in a second display mode that is different from the first display mode, display the subsequent media item in the second display mode, including displaying content from a plurality of images in the second sequence of images in a manner determined based on the second display mode 912: The first display mode is a live-photo display mode; and displaying the subsequent media item in the first display mode includes:

displaying at least a portion of a respective image from the second sequence of images while detecting the touch input;

detecting an end of the touch input; and, in response to detecting the end of the touch input, playing back images in the second sequence of images starting at the respective image 914: The second display mode is a loop display mode; and displaying the subsequent media item in the second display mode includes:

displaying the second sequence of images looping while detecting at least a portion of the touch input; and continuing to display the second sequence of images looping after detecting an end of the touch input

Figure 9C

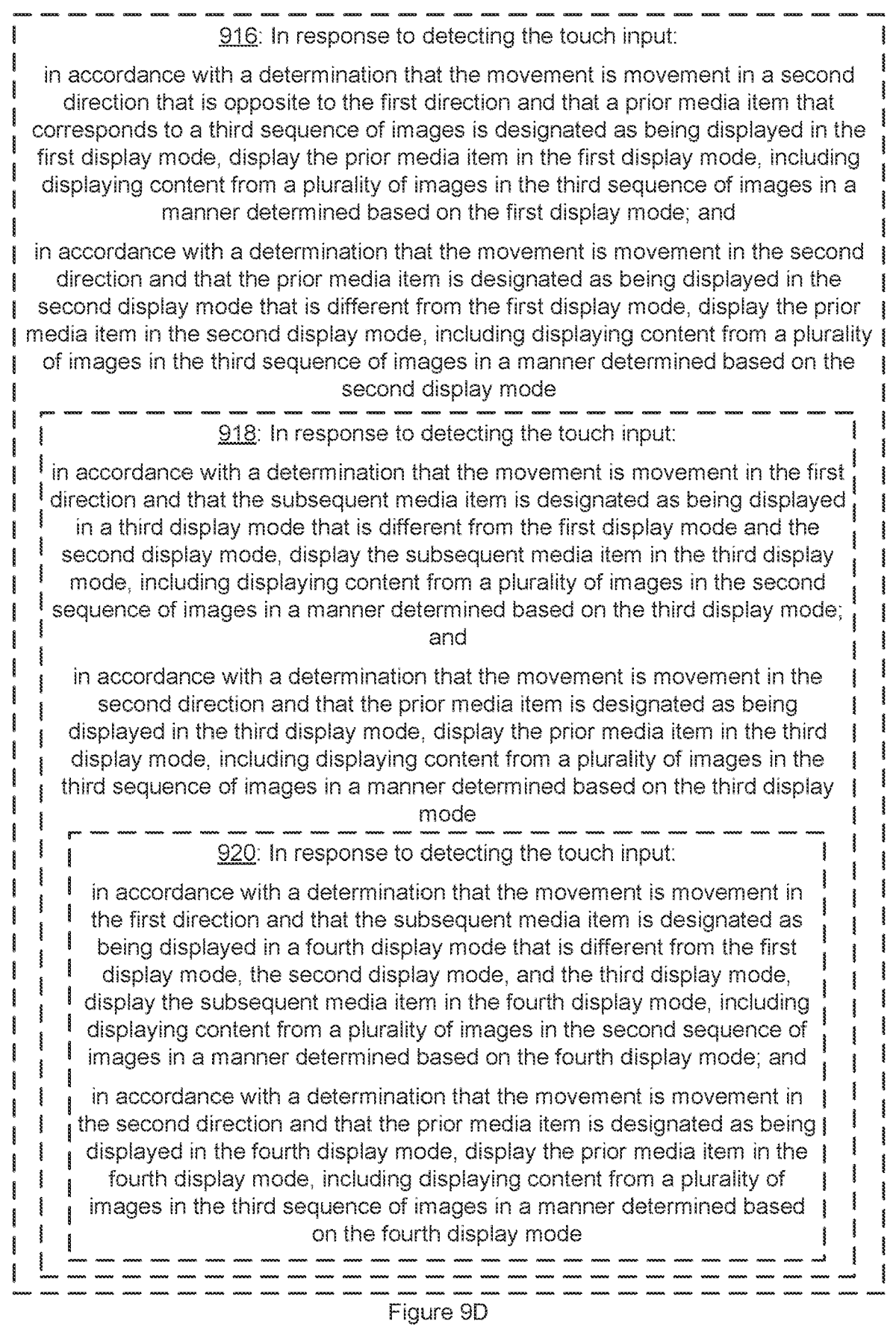

916: In response to detecting the touch input:

in accordance with a determination that the movement is movement in a second direction that is opposite to the first direction and that a prior media item that corresponds to a third sequence of images is designated as being displayed in the first display mode, display the prior media item in the first display mode, including displaying content from a plurality of images in the third sequence of images in a manner determined based on the first display mode; and in accordance with a determination that the movement is movement in the second direction and that the prior media item is designated as being displayed in the second display mode that is different from the first display mode, display the prior media item in the second display mode, including displaying content from a plurality of images in the third sequence of images in a manner determined based on the second display mode 918: In response to detecting the touch input:

in accordance with a determination that the movement is movement in the first direction and that the subsequent media item is designated as being displayed in a third display mode that is different from the first display mode and the second display mode, display the subsequent media item in the third display mode, including displaying content from a plurality of images in the second sequence of images in a manner determined based on the third display mode; and in accordance with a determination that the movement is movement in the second direction and that the prior media item is designated as being displayed in the third display mode, display the prior media item in the third display mode, including displaying content from a plurality of images in the third sequence of images in a manner determined based on the third display mode 920: In response to detecting the touch input:

in accordance with a determination that the movement is movement in the first direction and that the subsequent media item is designated as being displayed in a fourth display mode that is different from the first display mode, the second display mode, and the third display mode, display the subsequent media item in the fourth display mode, including displaying content from a plurality of images in the second sequence of images in a manner determined based on the fourth display mode; and in accordance with a determination that the movement is movement in the second direction and that the prior media item is designated as being displayed in the fourth display mode, display the prior media item in the fourth display mode, including displaying content from a plurality of images in the third sequence of images in a manner determined based on the fourth display mode

Figure 9D

Figure 9E:
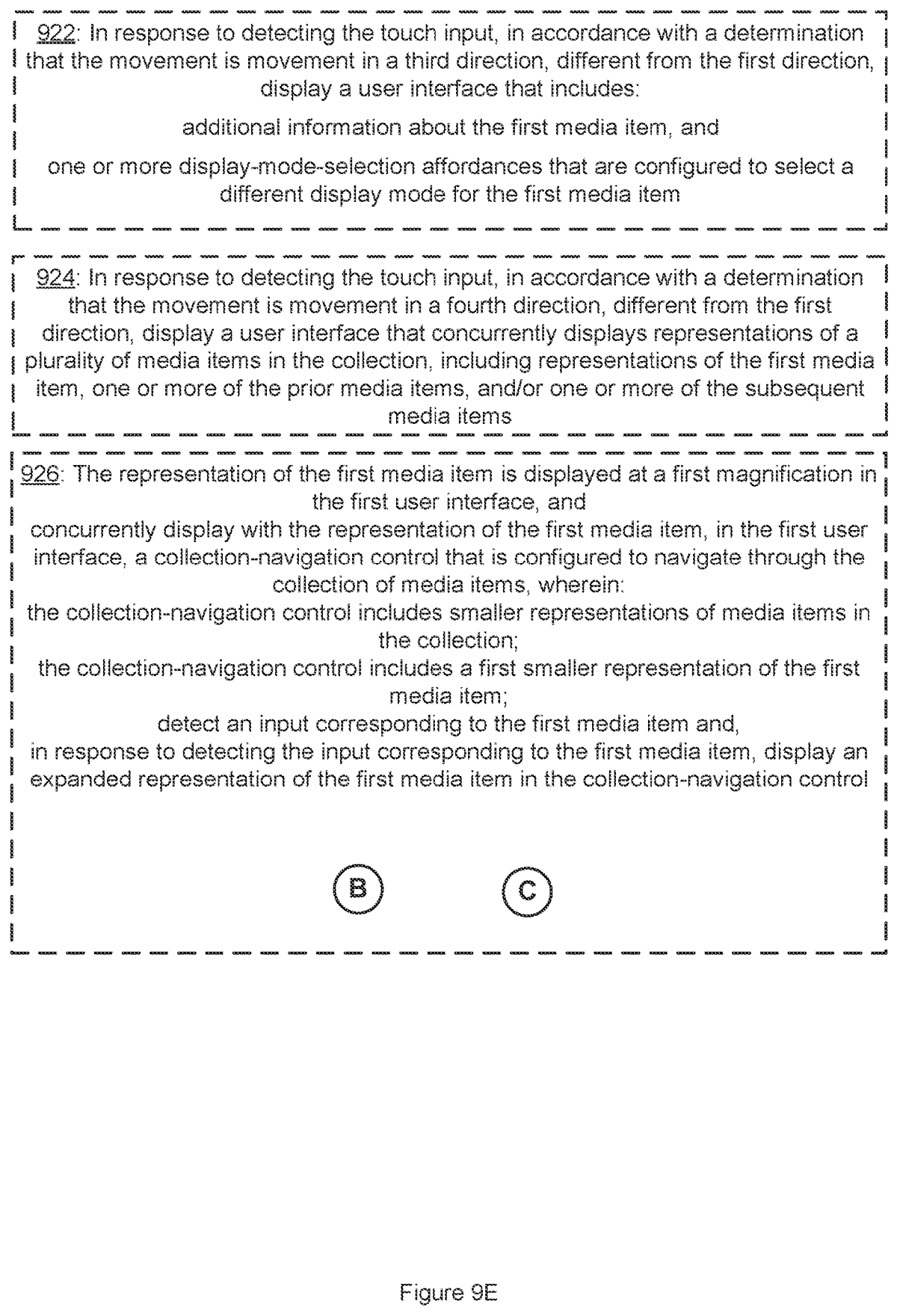

922: In response to detecting the touch input, in accordance with a determination that the movement is movement in a third direction, different from the first direction, display a user interface that includes:

additional information about the first media item, and one or more display-mode-selection affordances that are configured to select a different display mode for the first media item 924: In response to detecting the touch input, in accordance with a determination that the movement is movement in a fourth direction, different from the first direction, display a user interface that concurrently displays representations of a plurality of media items in the collection, including representations of the first media item, one or more of the prior media items, and/or one or more of the subsequent media items 926: The representation of the first media item is displayed at a first magnification in the first user interface, and concurrently display with the representation of the first media item, in the first user interface, a collection-navigation control that is configured to navigate through the collection of media items, wherein:

the collection-navigation control includes smaller representations of media items in the collection;

the collection-navigation control includes a first smaller representation of the first media item;

detect an input corresponding to the first media item and, in response to detecting the input corresponding to the first media item, display an expanded representation of the first media item in the collection-navigation control (B) (C)

Figure 9E (B)

Figure 9F:
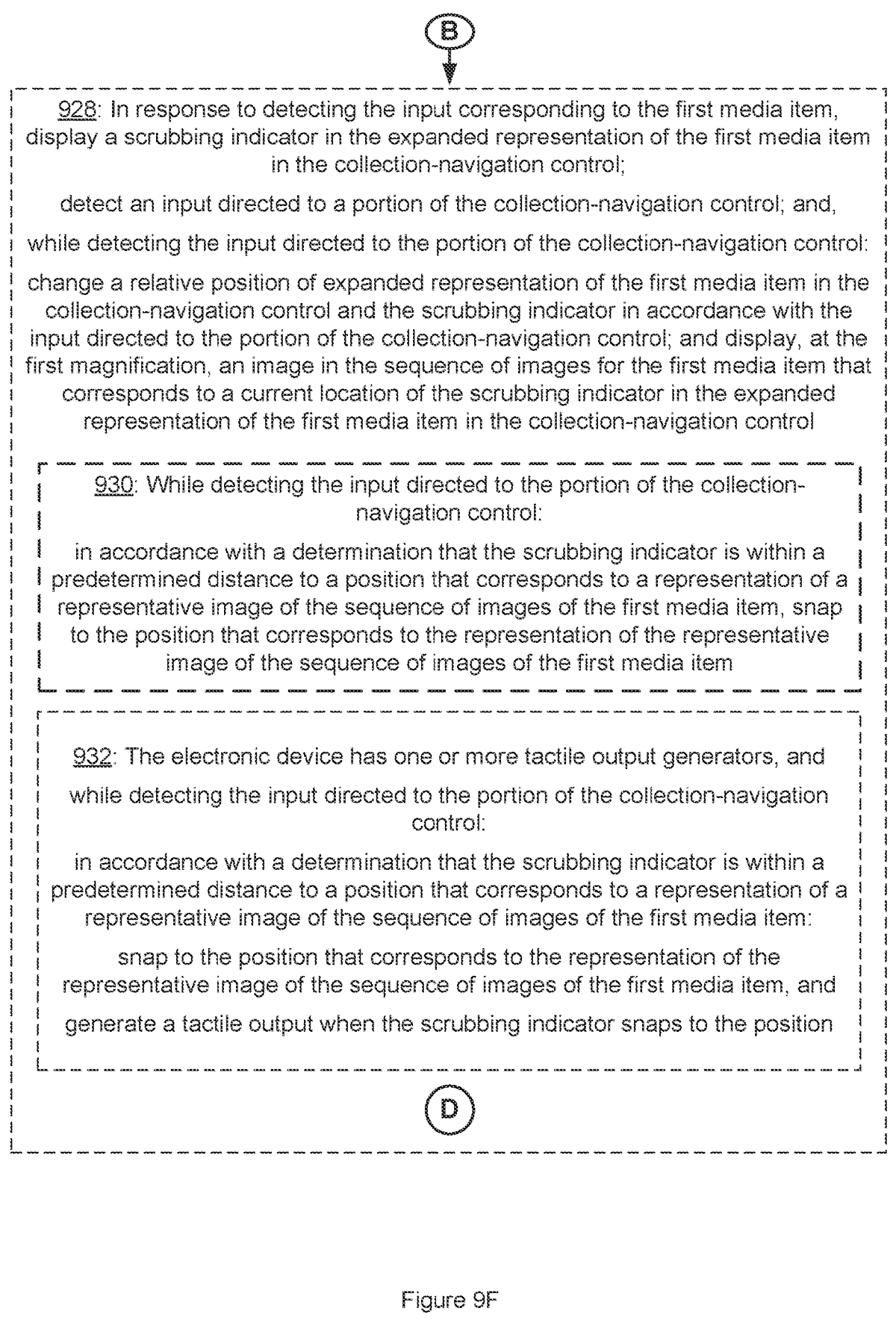

928: In response to detecting the input corresponding to the first media item, display a scrubbing indicator in the expanded representation of the first media item in the collection-navigation control;

detect an input directed to a portion of the collection-navigation control; and, while detecting the input directed to the portion of the collection-navigation control:

change a relative position of expanded representation of the first media item in the collection-navigation control and the scrubbing indicator in accordance with the input directed to the portion of the collection-navigation control; and display, at the first magnification, an image in the sequence of images for the first media item that corresponds to a current location of the scrubbing indicator in the expanded representation of the first media item in the collection-navigation control 930: While detecting the input directed to the portion of the collection-navigation control:

in accordance with a determination that the scrubbing indicator is within a predetermined distance to a position that corresponds to a representation of a representative image of the sequence of images of the first media item, snap to the position that corresponds to the representation of the representative image of the sequence of images of the first media item 932: The electronic device has one or more tactile output generators, and while detecting the input directed to the portion of the collection-navigation control:

in accordance with a determination that the scrubbing indicator is within a predetermined distance to a position that corresponds to a representation of a representative image of the sequence of images of the first media item:

snap to the position that corresponds to the representation of the representative image of the sequence of images of the first media item, and generate a tactile output when the scrubbing indicator snaps to the position (D)

Figure 9G:
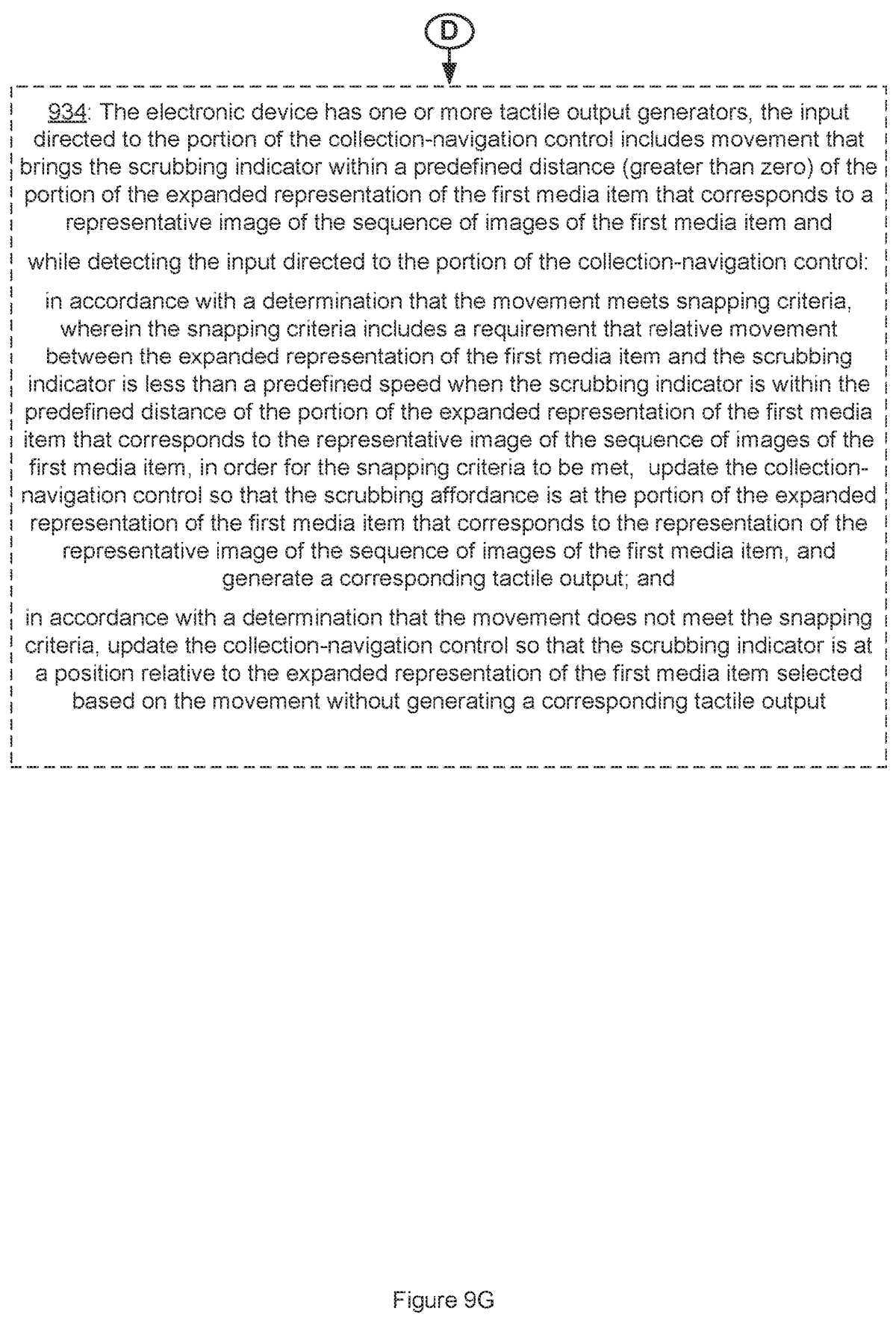

934: The electronic device has one or more tactile output generators, the input directed to the portion of the collection-navigation control includes movement that brings the scrubbing indicator within a predefined distance (greater than zero) of the portion of the expanded representation of the first media item that corresponds to a representative image of the sequence of images of the first media item and while detecting the input directed to the portion of the collection-navigation control:

in accordance with a determination that the movement meets snapping criteria, wherein the snapping criteria includes a requirement that relative movement between the expanded representation of the first media item and the scrubbing indicator is less than a predefined speed when the scrubbing indicator is within the predefined distance of the portion of the expanded representation of the first media item that corresponds to the representative image of the sequence of images of the first media item, in order for the snapping criteria to be met, update the collection-navigation control so that the scrubbing affordance is at the portion of the expanded representation of the first media item that corresponds to the representation of the representative image of the sequence of images of the first media item, and generate a corresponding tactile output; and in accordance with a determination that the movement does not meet the snapping criteria, update the collection-navigation control so that the scrubbing indicator is at a position relative to the expanded representation of the first media item selected based on the movement without generating a corresponding tactile output

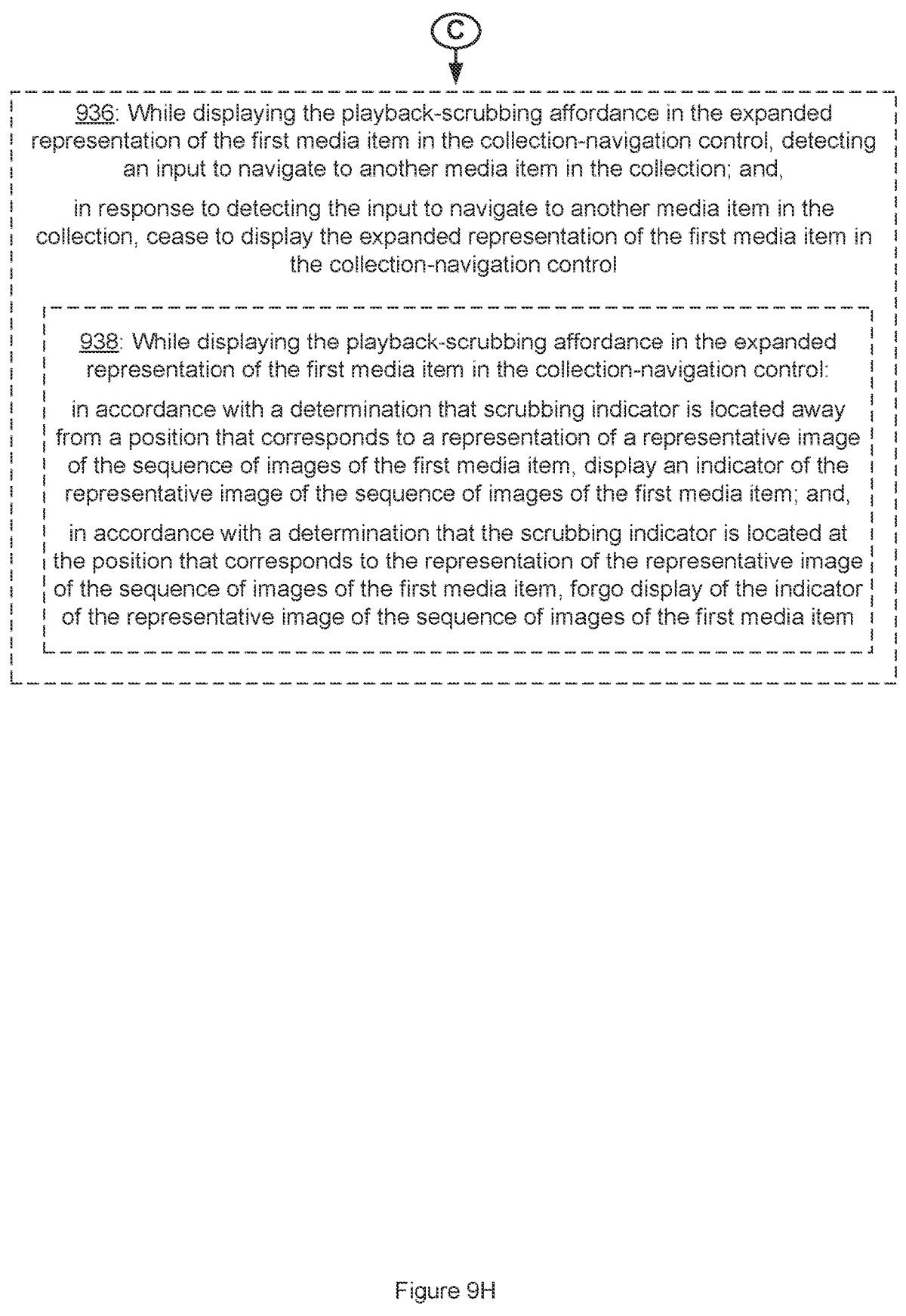

936: While displaying the playback-scrubbing affordance in the expanded representation of the first media item in the collection-navigation control, detecting an input to navigate to another media item in the collection; and, in response to detecting the input to navigate to another media item in the collection, cease to display the expanded representation of the first media item in the collection-navigation control 938: While displaying the playback-scrubbing affordance in the expanded representation of the first media item in the collection-navigation control:

in accordance with a determination that scrubbing indicator is located away from a position that corresponds to a representation of a representative image of the sequence of images of the first media item, display an indicator of the representative image of the sequence of images of the first media item; and, in accordance with a determination that the scrubbing indicator is located at the position that corresponds to the representation of the representative image of the sequence of images of the first media item, forgo display of the indicator of the representative image of the sequence of images of the first media item

Figure 9H

Figure 9I:
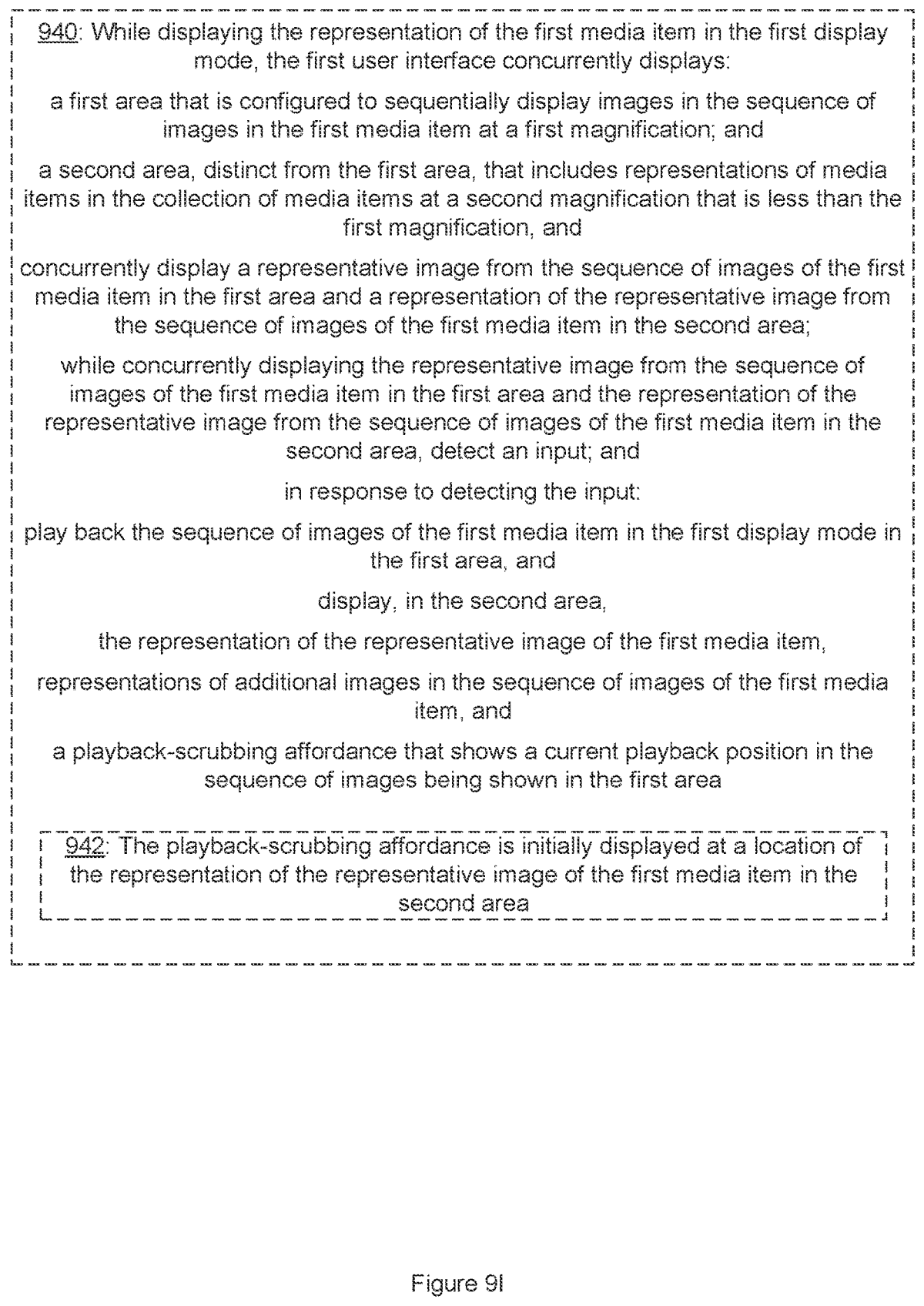

940: While displaying the representation of the first media item in the first display mode, the first user interface concurrently displays:

a first area that is configured to sequentially display images in the sequence of images in the first media item at a first magnification; and a second area, distinct from the first area, that includes representations of media items in the collection of media items at a second magnification that is less than the first magnification, and concurrently display a representative image from the sequence of images of the first media item in the first area and a representation of the representative image from the sequence of images of the first media item in the second area;

while concurrently displaying the representative image from the sequence of images of the first media item in the first area and the representation of the representative image from the sequence of images of the first media item in the second area, detect an input; and in response to detecting the input:

play back the sequence of images of the first media item in the first display mode in the first area, and display, in the second area, the representation of the representative image of the first media item, representations of additional images in the sequence of images of the first media item, and a playback-scrubbing affordance that shows a current playback position in the sequence of images being shown in the first area 942: The playback-scrubbing affordance is initially displayed at a location of the representation of the representative image of the first media item in the second area

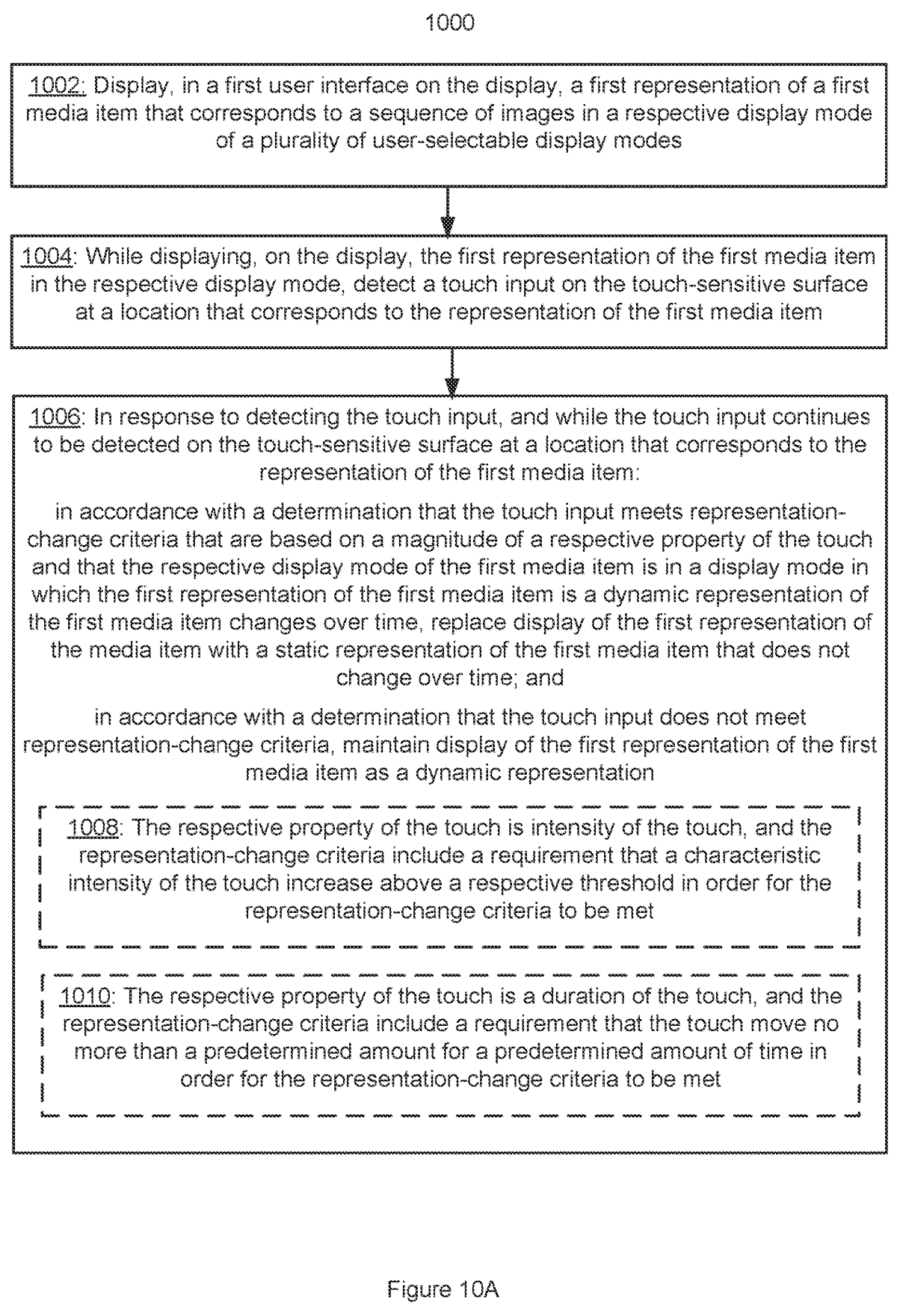

1002: Display, in a first user interface on the display, a first representation of a first media item that corresponds to a sequence of images in a respective display mode of a plurality of user-selectable display modes 1004: While displaying, on the display, the first representation of the first media item in the respective display mode, detect a touch input on the touch-sensitive surface at a location that corresponds to the representation of the first media item 1006: In response to detecting the touch input, and while the touch input continues to be detected on the touch-sensitive surface at a location that corresponds to the representation of the first media item:

in accordance with a determination that the touch input meets representation-change criteria that are based on a magnitude of a respective property of the touch and that the respective display mode of the first media item is in a display mode in which the first representation of the first media item is a dynamic representation of the first media item changes over time, replace display of the first representation of the media item with a static representation of the first media item that does not change over time; and in accordance with a determination that the touch input does not meet representation-change criteria, maintain display of the first representation of the first media item as a dynamic representation 1008: The respective property of the touch is intensity of the touch, and the representation-change criteria include a requirement that a characteristic intensity of the touch increase above a respective threshold in order for the representation-change criteria to be met 1010: The respective property of the touch is a duration of the touch, and the representation-change criteria include a requirement that the touch move no more than a predetermined amount for a predetermined amount of time in order for the representation-change criteria to be met

Figure 10A

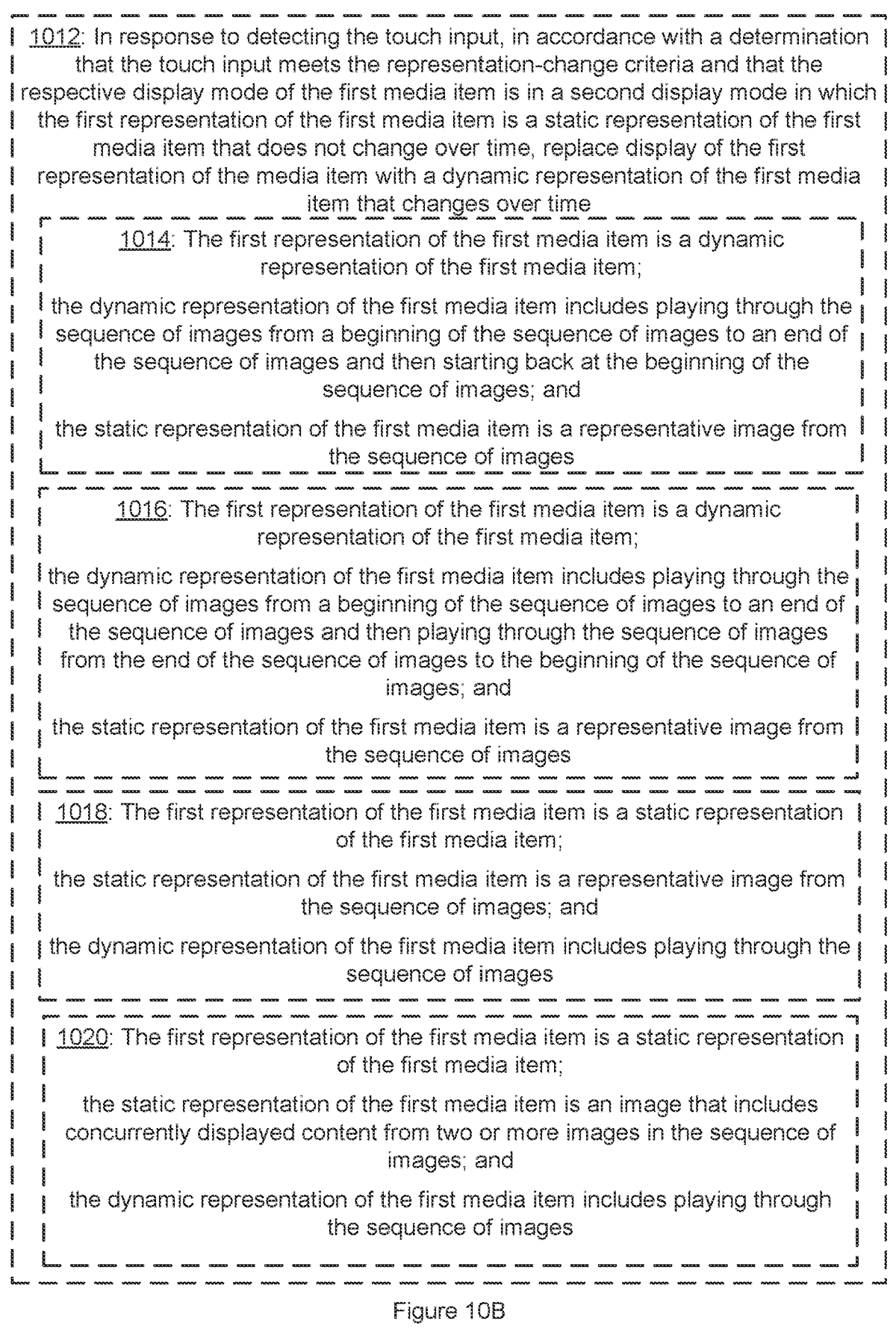

1012: In response to detecting the touch input, in accordance with a determination that the touch input meets the representation-change criteria and that the respective display mode of the first media item is in a second display mode in which the first representation of the first media item is a static representation of the first media item that does not change over time, replace display of the first representation of the media item with a dynamic representation of the first media item that changes over time 1014: The first representation of the first media item is a dynamic representation of the first media item;

the dynamic representation of the first media item includes playing through the sequence of images from a beginning of the sequence of images to an end of the sequence of images and then starting back at the beginning of the sequence of images; and the static representation of the first media item is a representative image from the sequence of images 1016: The first representation of the first media item is a dynamic representation of the first media item;

the dynamic representation of the first media item includes playing through the sequence of images from a beginning of the sequence of images to an end of the sequence of images and then playing through the sequence of images from the end of the sequence of images to the beginning of the sequence of images; and the static representation of the first media item is a representative image from the sequence of images 1018: The first representation of the first media item is a static representation of the first media item;

the static representation of the first media item is a representative image from the sequence of images; and the dynamic representation of the first media item includes playing through the sequence of images 1020: The first representation of the first media item is a static representation of the first media item;

the static representation of the first media item is an image that includes concurrently displayed content from two or more images in the sequence of images; and the dynamic representation of the first media item includes playing through the sequence of images

Figure 10B

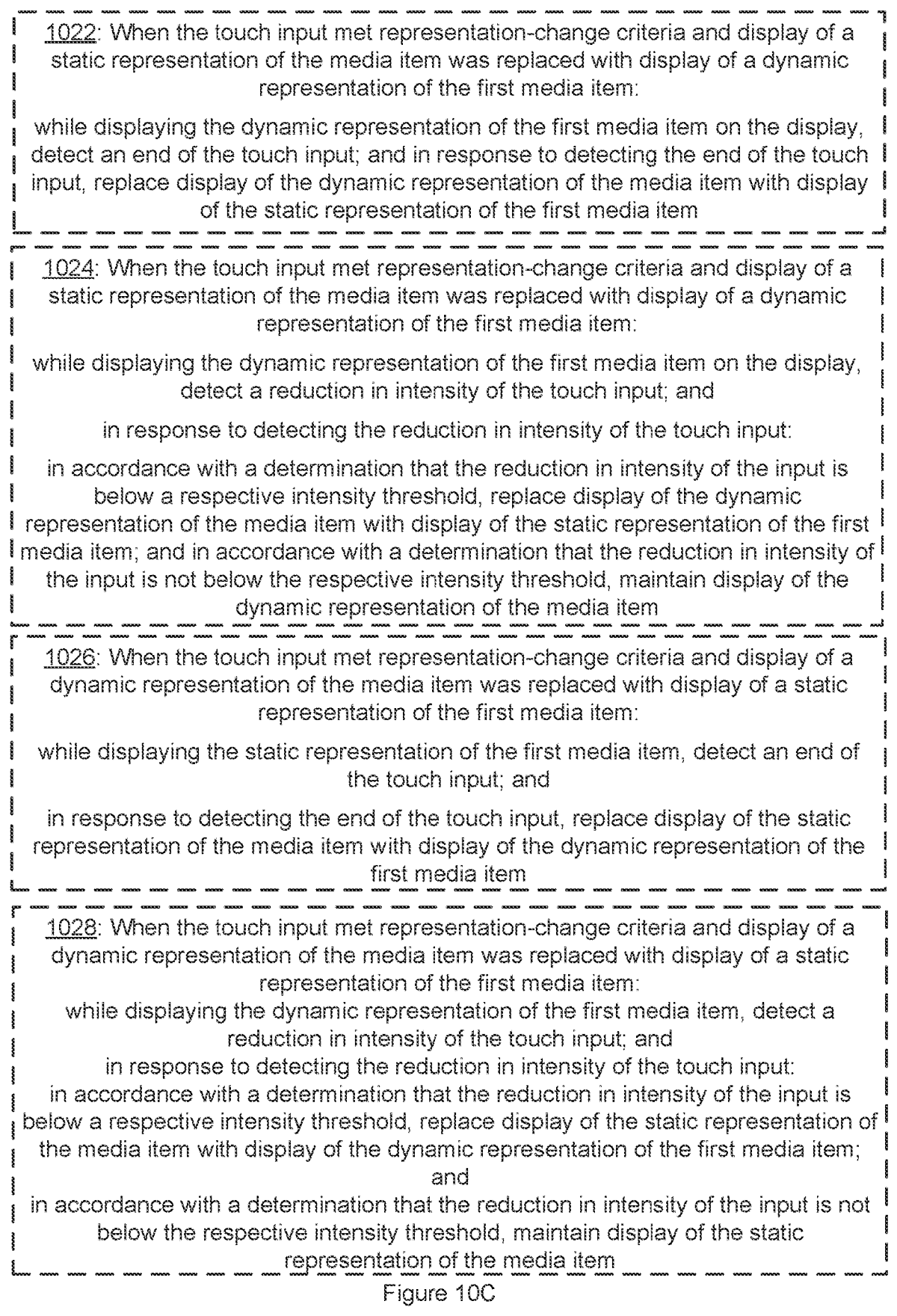

1022: When the touch input met representation-change criteria and display of a static representation of the media item was replaced with display of a dynamic representation of the first media item:

while displaying the dynamic representation of the first media item on the display, detect an end of the touch input; and in response to detecting the end of the touch input, replace display of the dynamic representation of the media item with display of the static representation of the first media item 1024: When the touch input met representation-change criteria and display of a static representation of the media item was replaced with display of a dynamic representation of the first media item:

while displaying the dynamic representation of the first media item on the display, detect a reduction in intensity of the touch input; and in response to detecting the reduction in intensity of the touch input:

in accordance with a determination that the reduction in intensity of the input is below a respective intensity threshold, replace display of the dynamic representation of the media item with display of the static representation of the first media item; and in accordance with a determination that the reduction in intensity of the input is not below the respective intensity threshold, maintain display of the dynamic representation of the media item 1026: When the touch input met representation-change criteria and display of a dynamic representation of the media item was replaced with display of a static representation of the first media item:

while displaying the static representation of the first media item, detect an end of the touch input; and in response to detecting the end of the touch input, replace display of the static representation of the media item with display of the dynamic representation of the first media item 1028: When the touch input met representation-change criteria and display of a dynamic representation of the media item was replaced with display of a static representation of the first media item:

while displaying the dynamic representation of the first media item, detect a reduction in intensity of the touch input; and in response to detecting the reduction in intensity of the touch input:

in accordance with a determination that the reduction in intensity of the input is below a respective intensity threshold, replace display of the static representation of the media item with display of the dynamic representation of the first media item; and in accordance with a determination that the reduction in intensity of the input is not below the respective intensity threshold, maintain display of the static representation of the media item

Figure 10C

DEVICES, METHODS, AND GRAPHICAL USER INTERFACES FOR NAVIGATING, DISPLAYING, AND EDITING MEDIA ITEMS WITH MULTIPLE DISPLAY MODES

RELATED APPLICATIONS

This application is a continuation of U.S. patent application Ser. No. 16/953,281, filed Nov. 19, 2020, which is a continuation of U.S. patent application Ser. No. 15/845,589, filed Dec. 18, 2017, now U.S. Pat. No. 10,877,628, which claims priority to U.S. Provisional Application Ser. No. 62/507,214, filed May 16, 2017, each of which is incorporated by reference herein in its entirety.

TECHNICAL FIELD

This relates generally to electronic devices with touch-sensitive surfaces, including but not limited to electronic devices with touch-sensitive surfaces that navigate, display, and/or edit media items with multiple user-selectable display modes.

BACKGROUND

The use of electronic devices for capturing, viewing, editing, and sharing digital content has increased significantly in recent years. Users frequently create media items (e.g., images and/or videos, such as Live Photos from Apple Inc. of Cupertino, California) with their portable electronic devices (e.g., smart phones, tablets, and dedicated digital cameras); view and edit their media items in image management applications (e.g., Photos from Apple Inc. of Cupertino, California) and/or digital content management applications (e.g., iTunes from Apple Inc. of Cupertino, California); and share their digital content with others through instant messages, email, social media applications, and other communication applications.

Some media items may be displayed in a plurality of different display modes. It may be difficult for a user to navigate, display, and edit such media items because multiple display modes create multiple options for displaying and editing a given media item.

SUMMARY

Accordingly, there is a need for electronic devices with faster, more efficient methods and interfaces for navigating, displaying, and editing media items with multiple display modes. Such methods and interfaces optionally complement or replace conventional methods for navigating, displaying, and editing media items with multiple display modes. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a touch-sensitive surface. The method includes: displaying, in a first user interface on the display, one or more images from a media item that corresponds to a sequence of images in a respective display mode, wherein the respective display mode is one of a plurality of user-selectable display modes for the media item that corresponds to the sequence of images; while displaying the one or more images from the media item in the respective display mode, detecting a first input; in response to detecting the first input, displaying an editing user interface for the respective display mode on the display, wherein: the editing user interface for the respective display mode is configured to change which images are included in the media item when the media item is displayed in the respective display mode; and the editing user interface for the respective display mode concurrently displays: a first area that is configured to display images in the sequence of images; a second area, distinct from the first area, that includes representations of images in the sequence of images, a user-adjustable begin-trim affordance that indicates a first boundary for playback through the sequence of images, and a user-adjustable end-trim affordance that indicates a second boundary for playback through the sequence of images; while displaying the editing user interface for the respective display mode: adjusting the media item in accordance with one or more editing inputs; and detecting an input to exit the editing user interface for the respective display mode; exiting the editing user interface for the respective display mode; and displaying the edited media item in the respective display mode in the first user interface.

In accordance with some embodiments, a method is performed at an electronic device with a display and a touch-sensitive surface. The method includes: displaying, in a first user interface on the display, one or more images from a media item that corresponds to a sequence of images in a first display mode, wherein, the first display mode is one of a plurality of user-selectable display modes for the media item that corresponds to the sequence of images; while displaying the one or more images from the media item in the first display mode, detecting a first input; in response to detecting the first input, displaying a display-mode selection user interface on the display, wherein: the display-mode selection user interface concurrently displays a plurality of representations of the media item, including a second representation of the media item that corresponds to a second display mode that is different from the first display mode; while displaying the display-mode selection user interface on the display, detecting an input on the second representation in the plurality of representations of the media item;

and, in response to detecting the input on the second representation in the plurality of representations of the media item, selecting a second display mode in the plurality of user-selectable display modes for the media item that corresponds to the second representation in the plurality of representations of the media item.

In accordance with some embodiments, a method is performed at an electronic device with a display and a touch-sensitive surface. The method includes: displaying, in a first user interface on the display, a representation of a media item that corresponds to a sequence of images, the media item including a representative image from the sequence of images in a first display mode; while displaying the representation of the media item that corresponds to the sequence of images in the first display mode, detecting a first input; in response to detecting the first input, displaying an editing user interface for the media item in the first display mode on the display, wherein the editing user interface concurrently displays: a first area that is configured to sequentially display images in the sequence of images at a first magnification; and a second area, distinct from the first area, that includes representations of images in the sequence of images at a second magnification that is less than the first magnification, a user-adjustable representative-image-selection affordance that is configured to select a new representative image in the sequence of images via a position of the representative-image-selection affordance in the second area, a plurality of range-trim affordances including: a user-adjustable begin-trim affordance that indicates a first boundary for playback through the sequence of images, and a user-adjustable end-trim affordance that indicates a second boundary for playback through the sequence of images; while displaying the editing user interface, detecting a second input directed to the representative-image-selection affordance; and, while detecting the second input directed to the representative-image-selection affordance: moving the representative-image-selection affordance in the second area in accordance with the second input; displaying a visually emphasized representation of an image in the second area that corresponds to a current position of the representative-image-selection affordance in the second area; and displaying, in the first area, an image from the sequence of images that corresponds to the current position of the representative-image-selection affordance in the second area.

In accordance with some embodiments, a method is performed at an electronic device with a display and a touch-sensitive surface. The method includes: displaying, in a first user interface on the display, a representation of a first media item that corresponds to a sequence of images in a first display mode of a plurality of user-selectable display modes, wherein: the first media item is part of a collection of media items; the collection of media items is arranged in an order based on predetermined criteria; one or more prior media items precede the first media item in the order; and one or more subsequent media items follow the first media item in the order; while displaying the representation of the first media item, detecting a touch input that includes movement in a respective direction on the touch-sensitive surface; in response to detecting the touch input: in accordance with a determination that the movement is movement in a first direction and that a subsequent media item that corresponds to a second sequence of images is designated as being displayed in the first display mode, displaying the subsequent media item in the first display mode, including displaying content from a plurality of images in the second sequence of images in a manner determined based on the first display mode; and in accordance with a determination that the movement is movement in the first direction and that the subsequent media item is designated as being displayed in a second display mode that is different from the first display mode, displaying the subsequent media item in the second display mode, including displaying content from a plurality of images in the second sequence of images in a manner determined based on the second display mode.

In accordance with some embodiments, a method is performed at an electronic device with a display and a touch-sensitive surface. The method includes: displaying, in a first user interface on the display, a first representation of a first media item that corresponds to a sequence of images in a respective display mode of a plurality of user-selectable display modes; while displaying, on the display, the first representation of the first media item in the respective display mode, detecting a touch input on the touch-sensitive surface at a location that corresponds to the representation of the first media item; and in response to detecting the touch input, and while the touch input continues to be detected on the touch-sensitive surface at a location that corresponds to the representation of the first media item: in accordance with a determination that the touch input meets representation-change criteria that are based on a magnitude of a respective property of the touch and that the respective display mode of the first media item is in a display mode in which the first representation of the first media item is a dynamic representation of the first media item changes over time, replacing display of the first representation of the media item with a static representation of the first media item that does not change over time; and in accordance with a determination that the touch input does not meet representation-change criteria, maintaining display of the first representation of the first media item as a dynamic representation.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, and optionally one or more tactile output generators, are provided with improved methods and interfaces for navigating, displaying, and editing media items with multiple display modes, thereby increasing the effectiveness, efficiency, and user satisfaction with such devices. Such methods and interfaces may complement or replace conventional methods for navigating, displaying, and editing media items with multiple display modes.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIGS. 6A-6F are flow diagrams of a method for editing a media item that has multiple display modes in accordance with some embodiments.

FIGS. 7A-7D are flow diagrams of a method for navigating to and selecting a display mode for a media item that has multiple display modes in accordance with some embodiments.

FIGS. 8A-8F are flow diagrams of a method for changing a representative image for a media item that corresponds to a sequence of images in accordance with some embodiments.

FIGS. 9A-9I are flow diagrams of a method for navigating through a collection of media items, where the media items have multiple user-selectable display modes, in accordance with some embodiments.

FIGS. 10A-10C are flow diagrams of a method for showing the correspondence between a dynamic representation of a media item and a static representation of the media item, where the media item has a plurality of user-selectable display modes, in accordance with some embodiments.

DESCRIPTION OF EMBODIMENTS

Figure 1A:
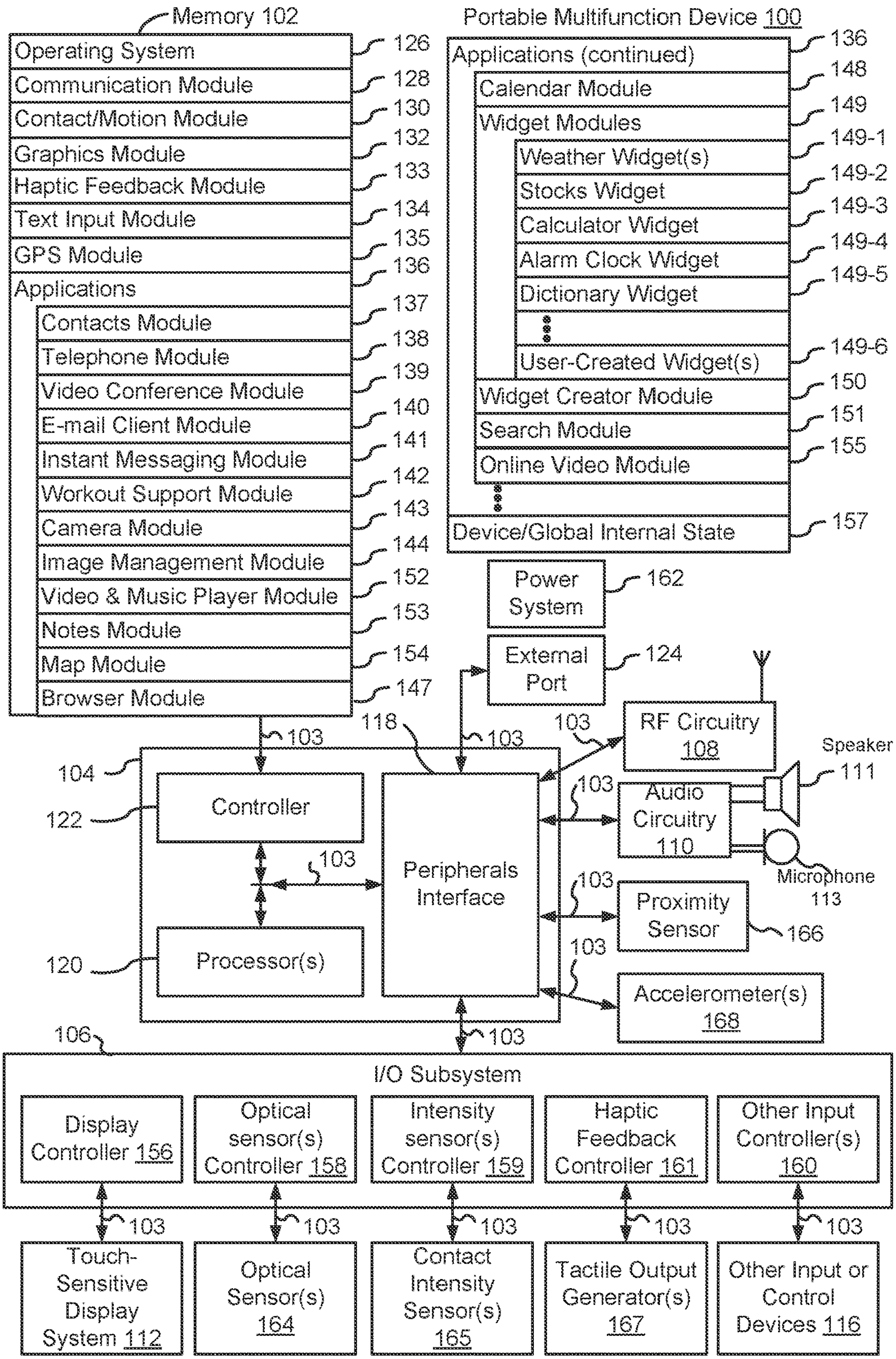
FIG. 1A is a block diagram illustrating a portable multifunction device with a touch-sensitive display in accordance with some embodiments.

A number of different approaches for navigating, displaying, and/or editing media items with multiple user-selectable display modes are described herein. Using one or more of these approaches (optionally in conjunction with each other) reduces the number, extent, and/or nature of the inputs from a user and provides a more efficient human-machine interface. This enables users to interact with media items with multiple display modes faster and more efficiently. For battery-operated devices, these improvements conserve power and increase the time between battery charges. Some of the approaches are described herein include:

- editing a media item that has multiple display modes;
- navigating to and selecting a display mode for a media item that has multiple display modes;
- changing a representative image for a media item that corresponds to a sequence of images;
- navigating through a collection of media items, where the media items have multiple user-selectable display modes; and
- showing the correspondence between a dynamic representation of a media item and a static representation of the media item, where the media item has a plurality of user-selectable display modes.

Below, FIGS. 1A-1B, 2, and 3 provide a description of example devices. FIGS. 4A-4B and 5A-5DW illustrate example user interfaces for navigating, displaying, and editing media items with multiple display modes. FIGS. 6A-6F illustrate a flow diagram of a method for editing a media item that has multiple display modes in accordance with some embodiments. FIGS. 7A-7D illustrate a flow diagram of a method for navigating to and selecting a display mode for a media item that has multiple display modes. FIGS. 8A-8F illustrate a flow diagram of a method for changing a representative image for a media item that corresponds to a sequence of images. FIGS. 9A-9I illustrate a flow diagram of a method for navigating through a collection of media items, where the media items have multiple user-selectable display modes. FIGS. 10A-10C illustrate a flow diagram of a method for showing the correspondence between a dynamic representation of a media item and a static representation of the media item, where the media item has a plurality of user-selectable display modes. The user interfaces in FIGS. 5A-5DW are used to illustrate the processes in FIGS. 6A-6F, 7A-7D, 8A-8F, 9A-9I, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" is physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
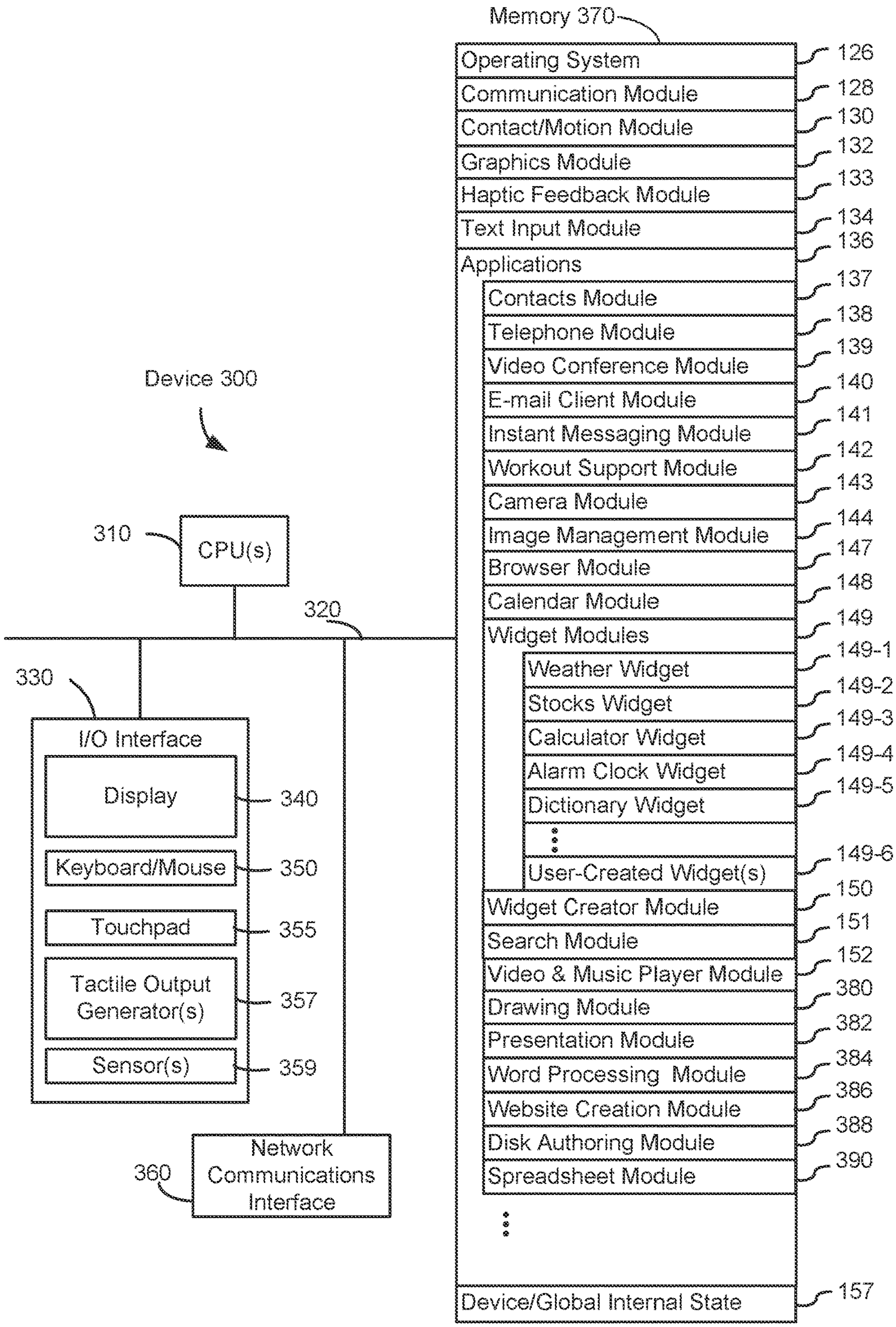
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" is both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions)

need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1.

For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
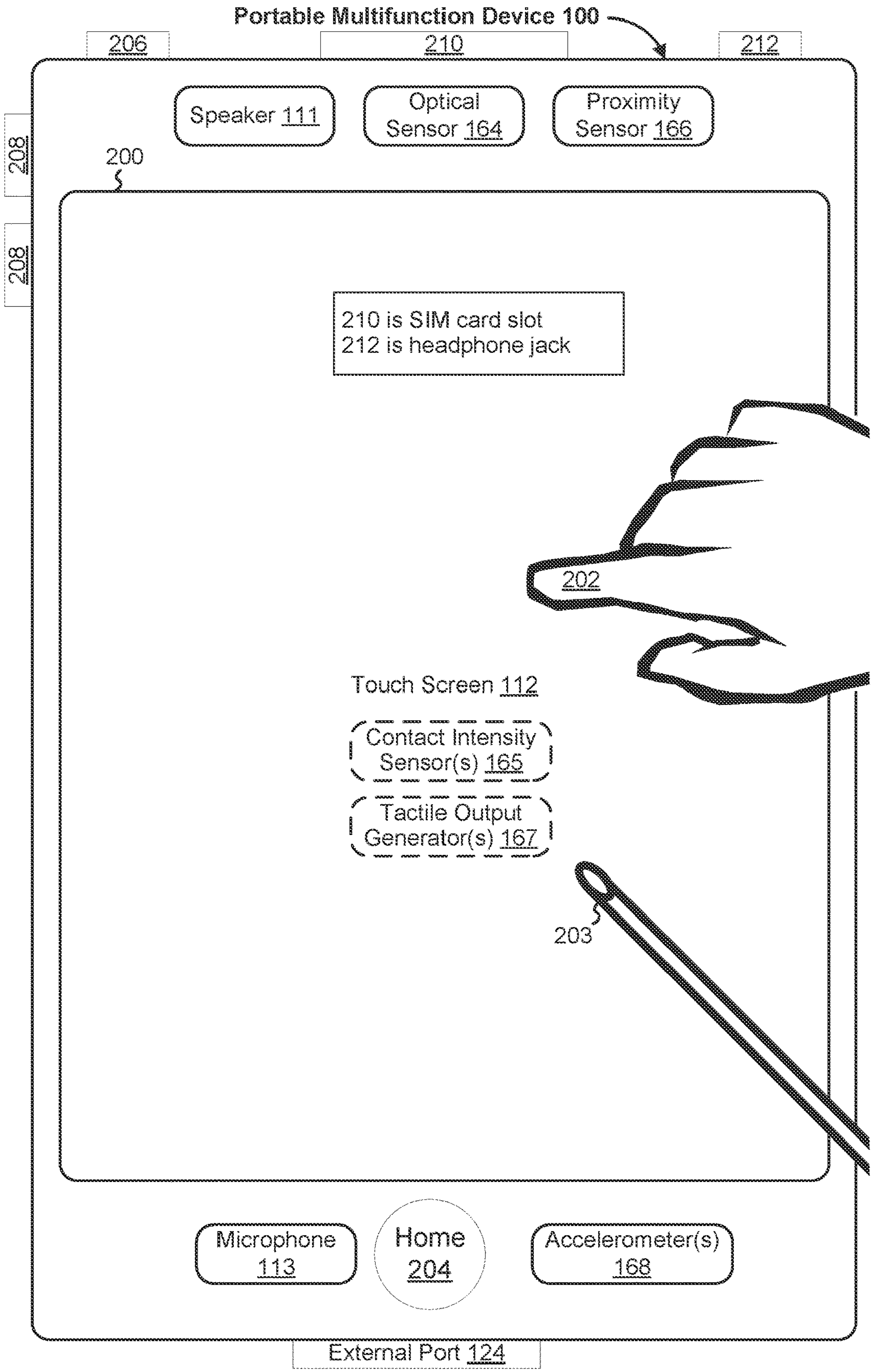
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
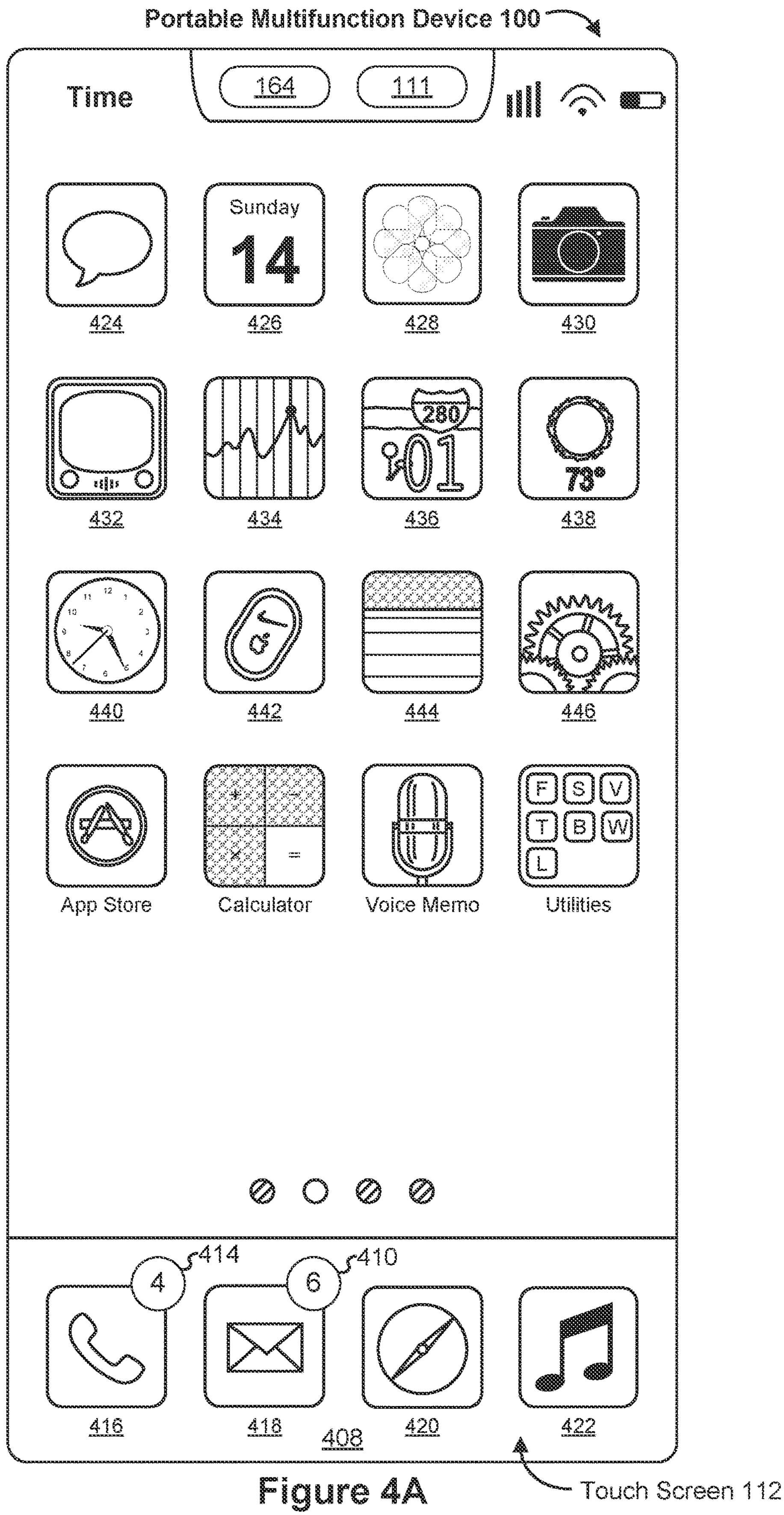
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
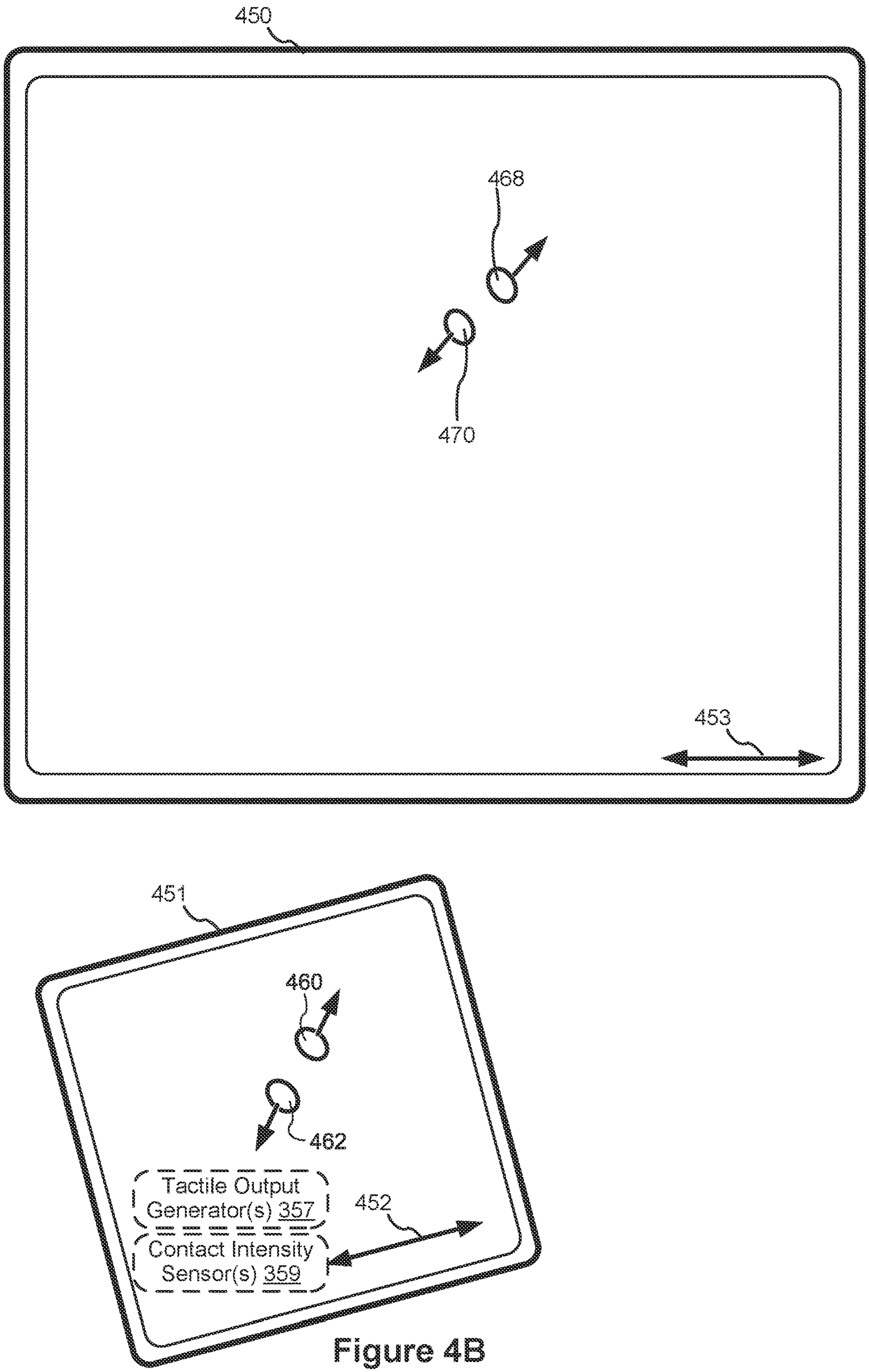
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams (e.g., 5148) that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
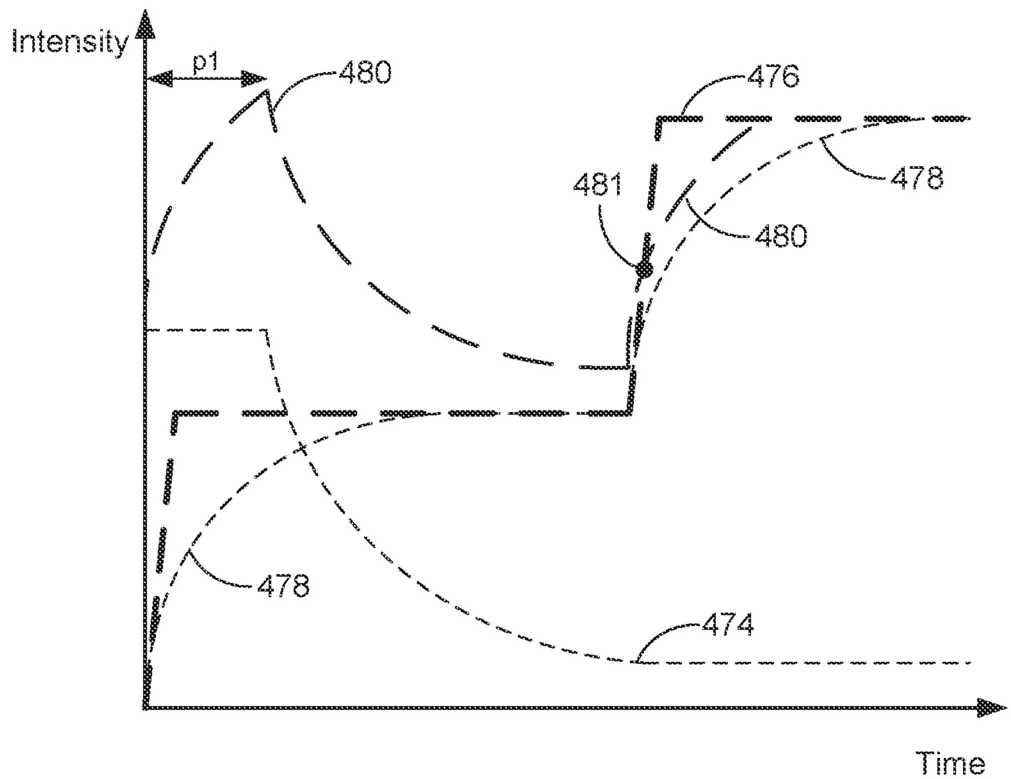
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
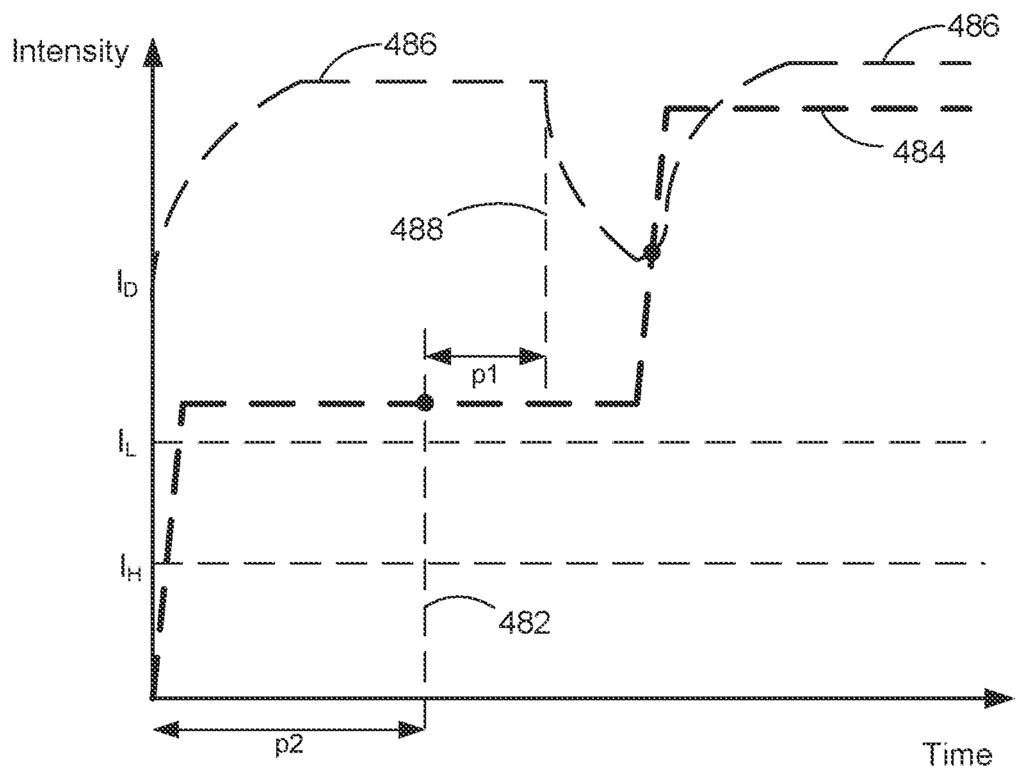

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
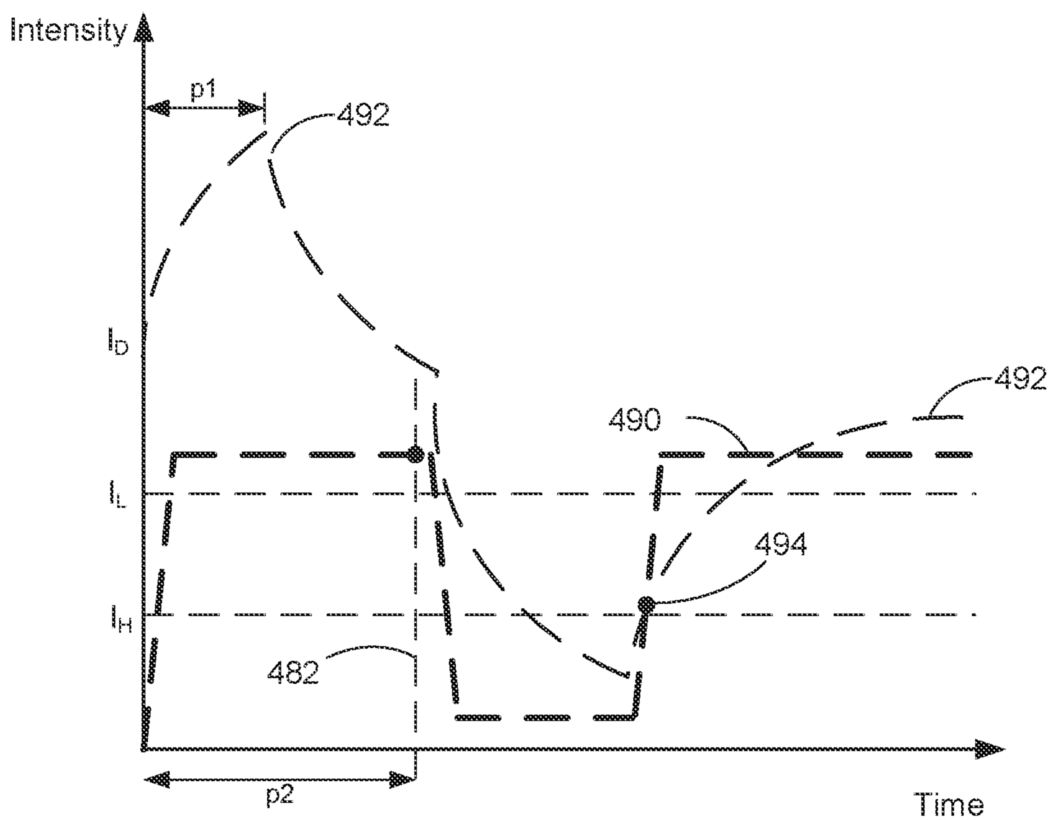

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5DW illustrate example user interfaces for navigating, displaying, and editing media items with multiple display modes in accordance with some embodiments. The user interfaces in these figures are used to illustrate the processes described below, including the processes in FIGS. 6A-6F, 7A-7D, 8A-8F, 9A-9I, and 10A-10C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
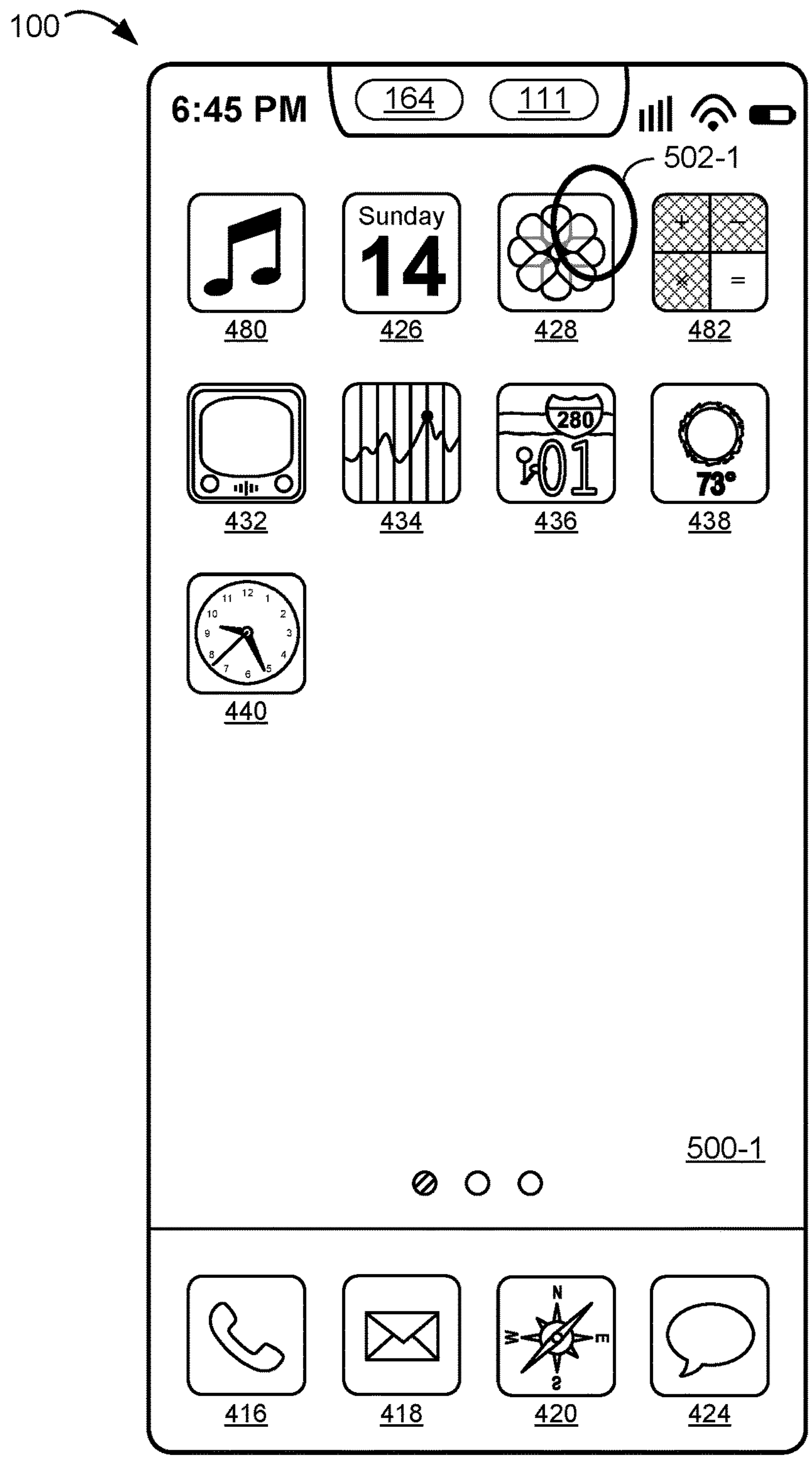
FIGS. 5A-5DW illustrate example user interfaces for navigating, displaying, and editing media items with multiple display modes in accordance with some embodiments.
Figure 5B:
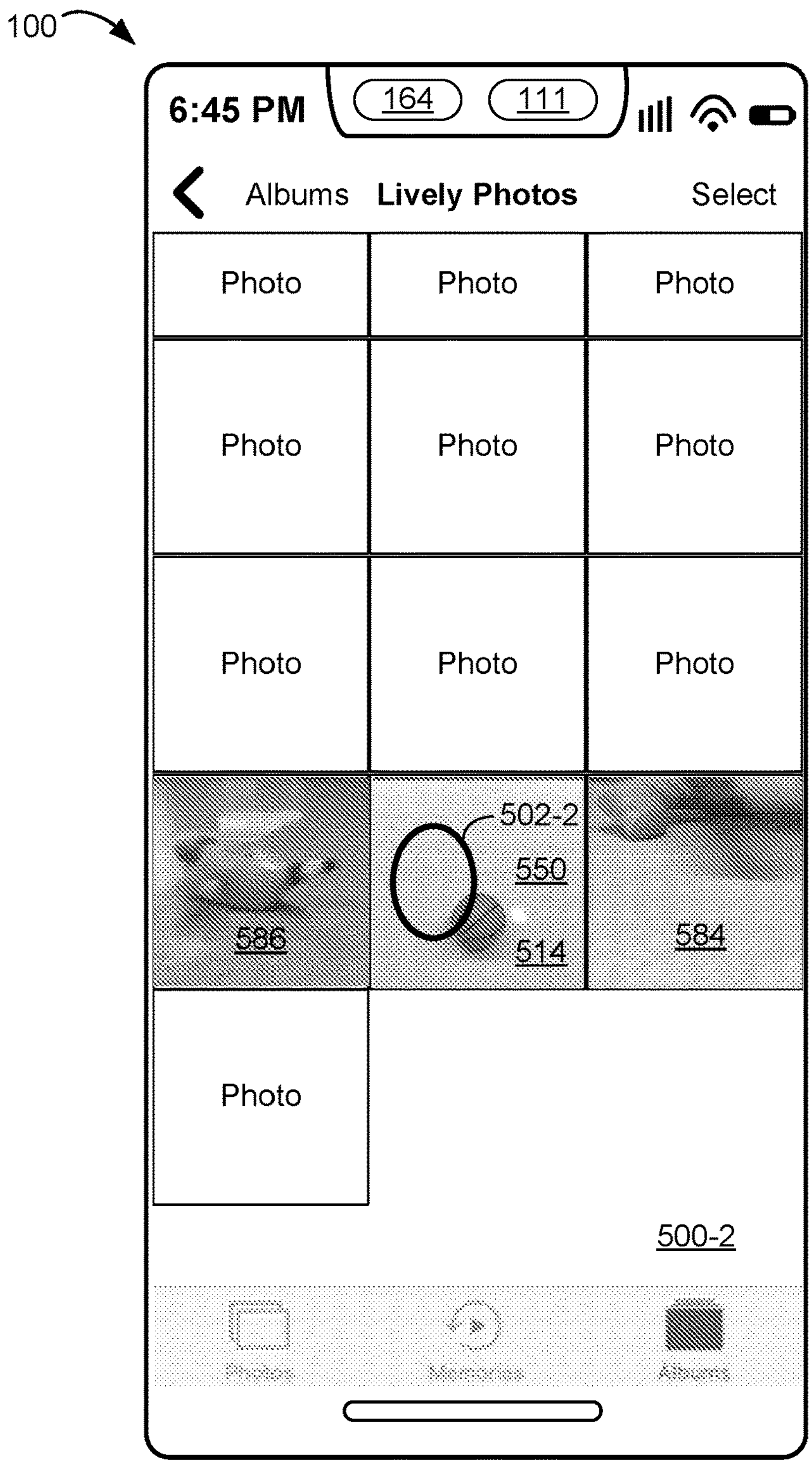
Figure 5C:
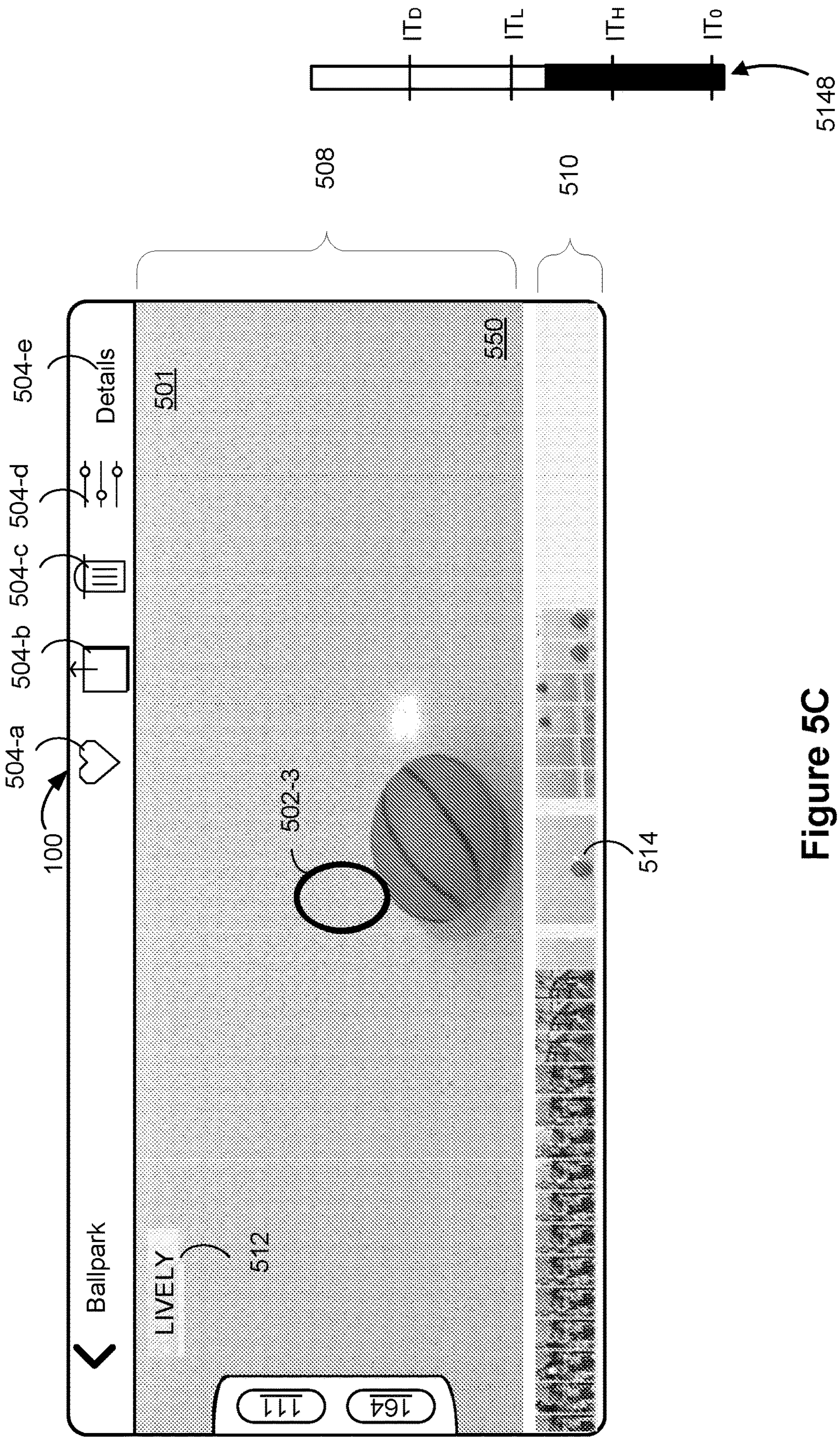
Figure 5D:
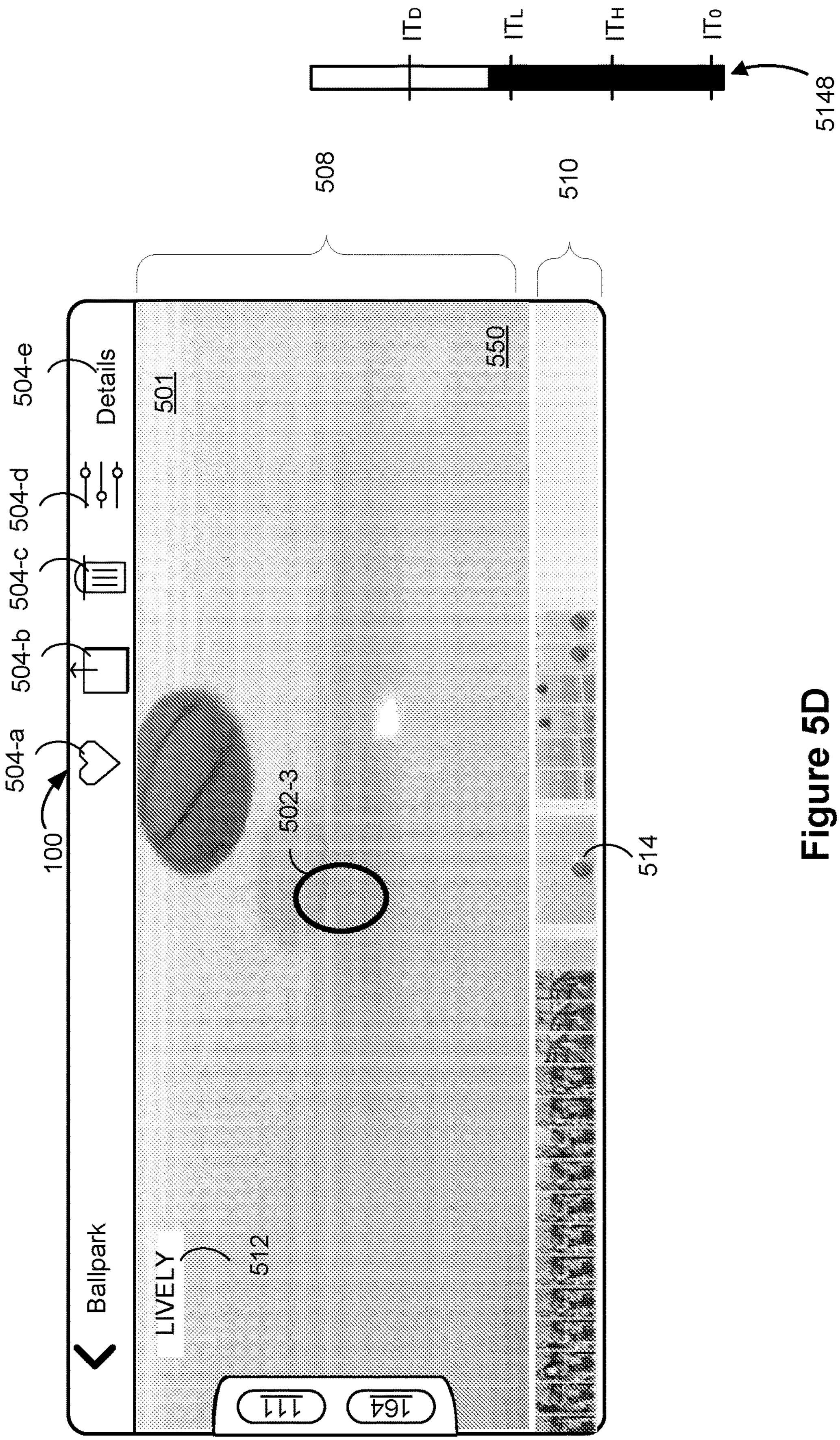
Figure 5E:
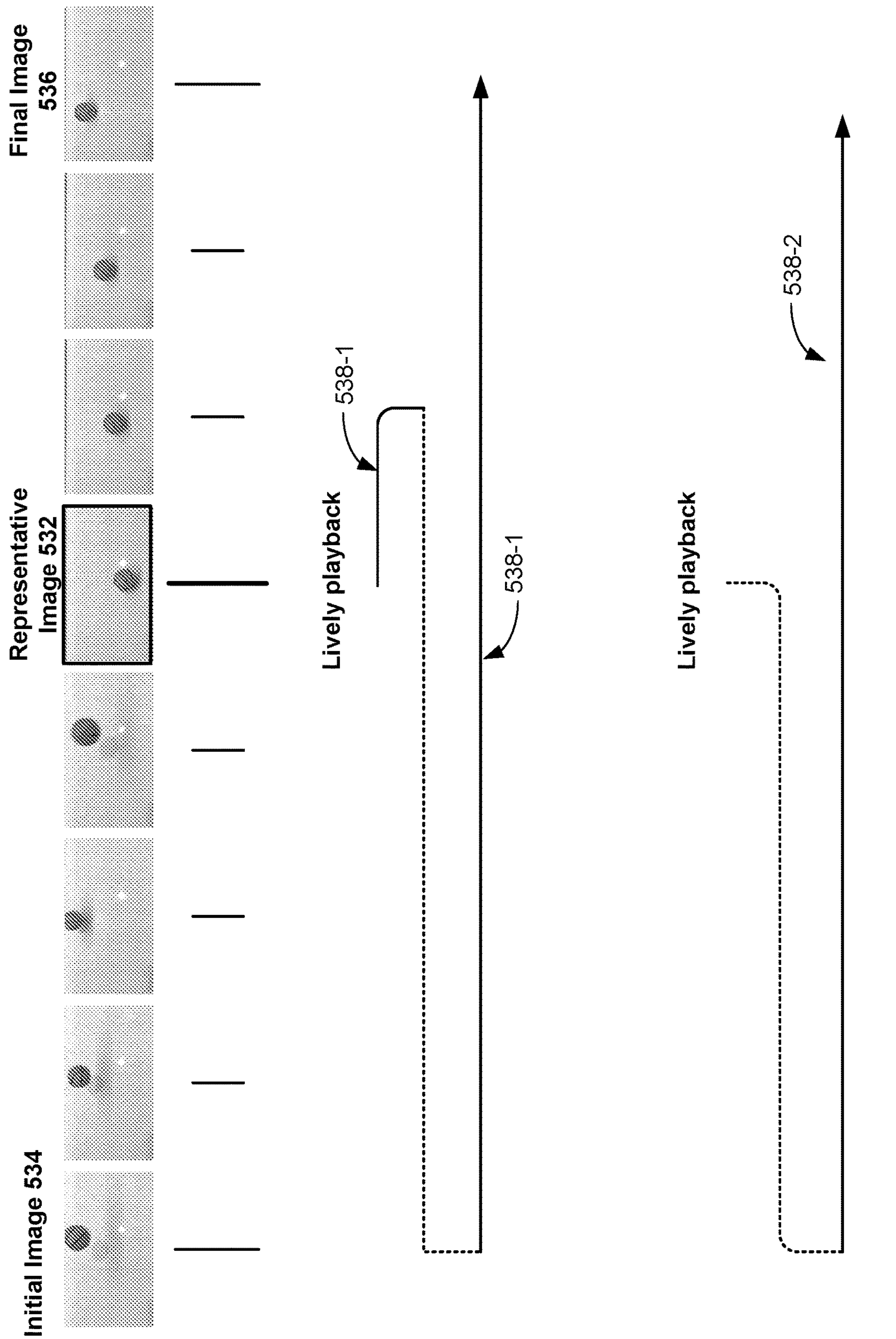
Figure 5F:
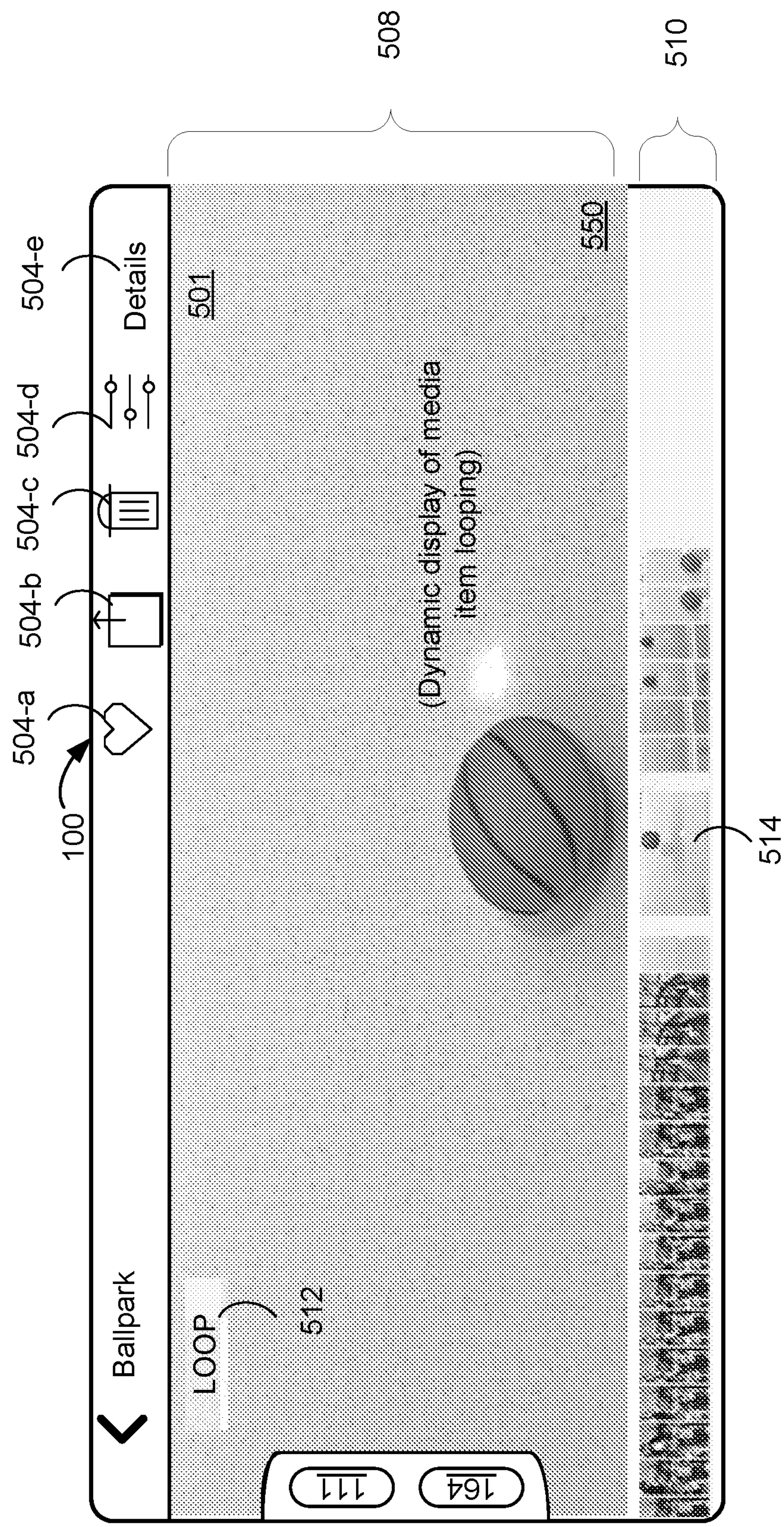
Figure 5G:
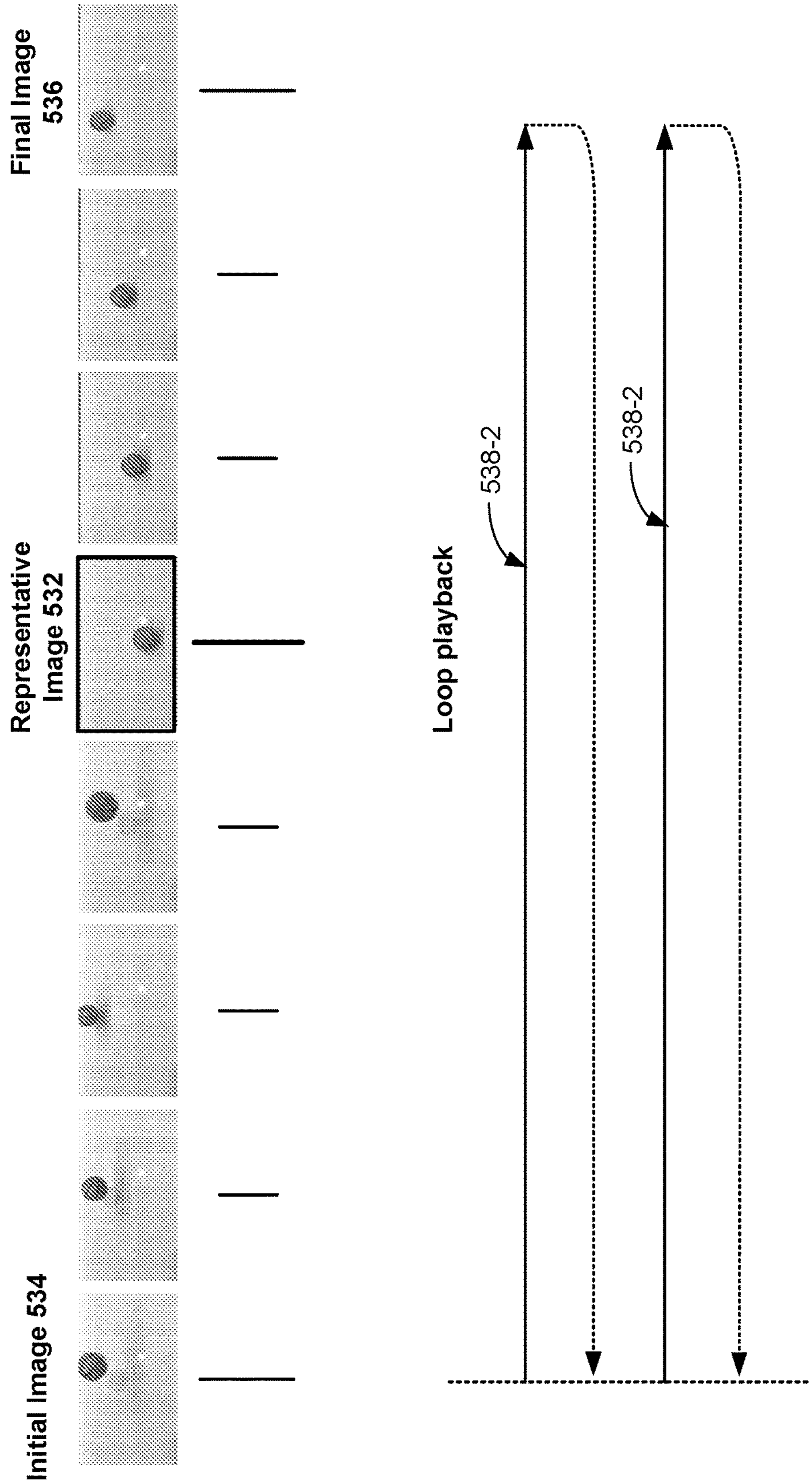
Figure 5H:
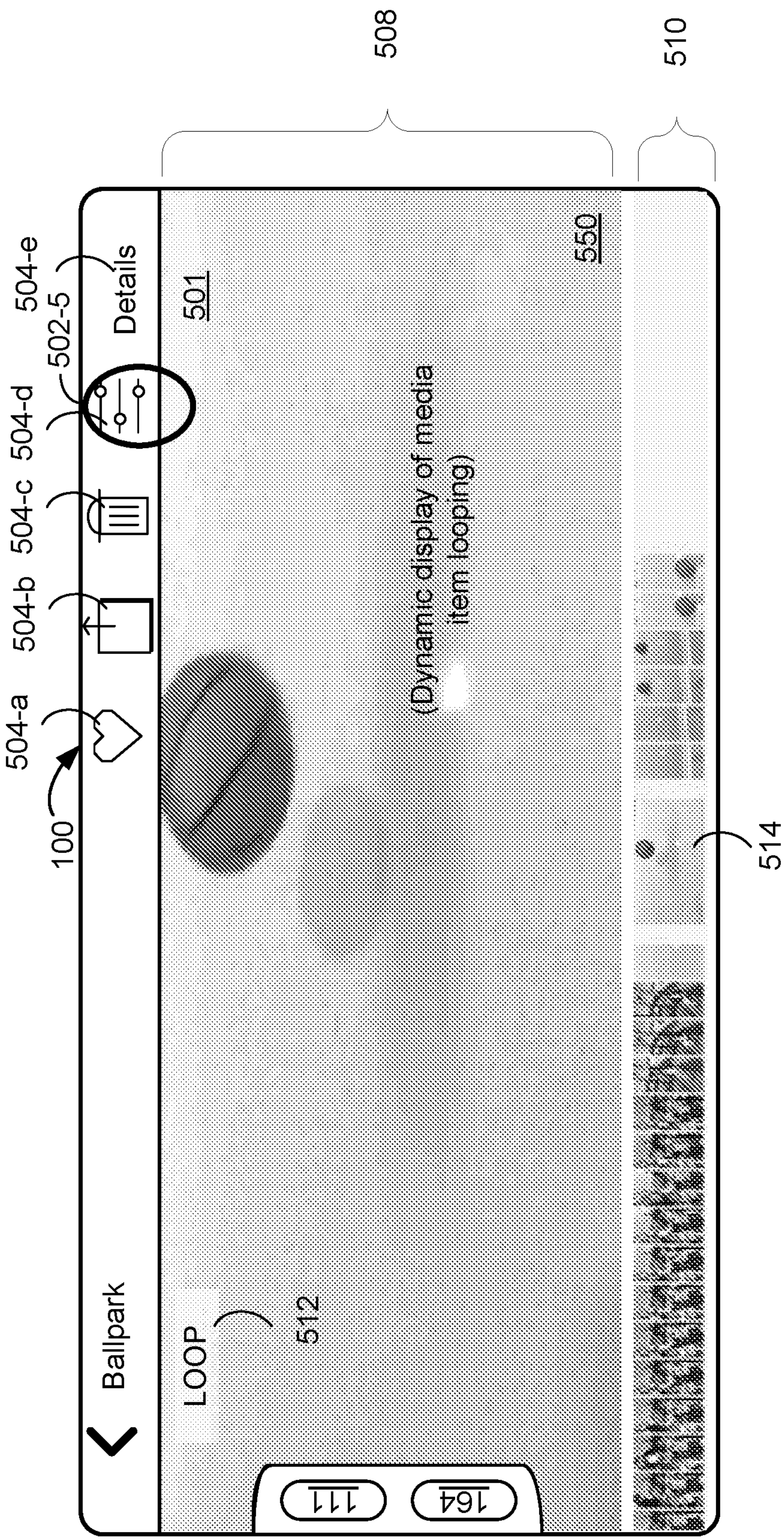
Figure 5I:
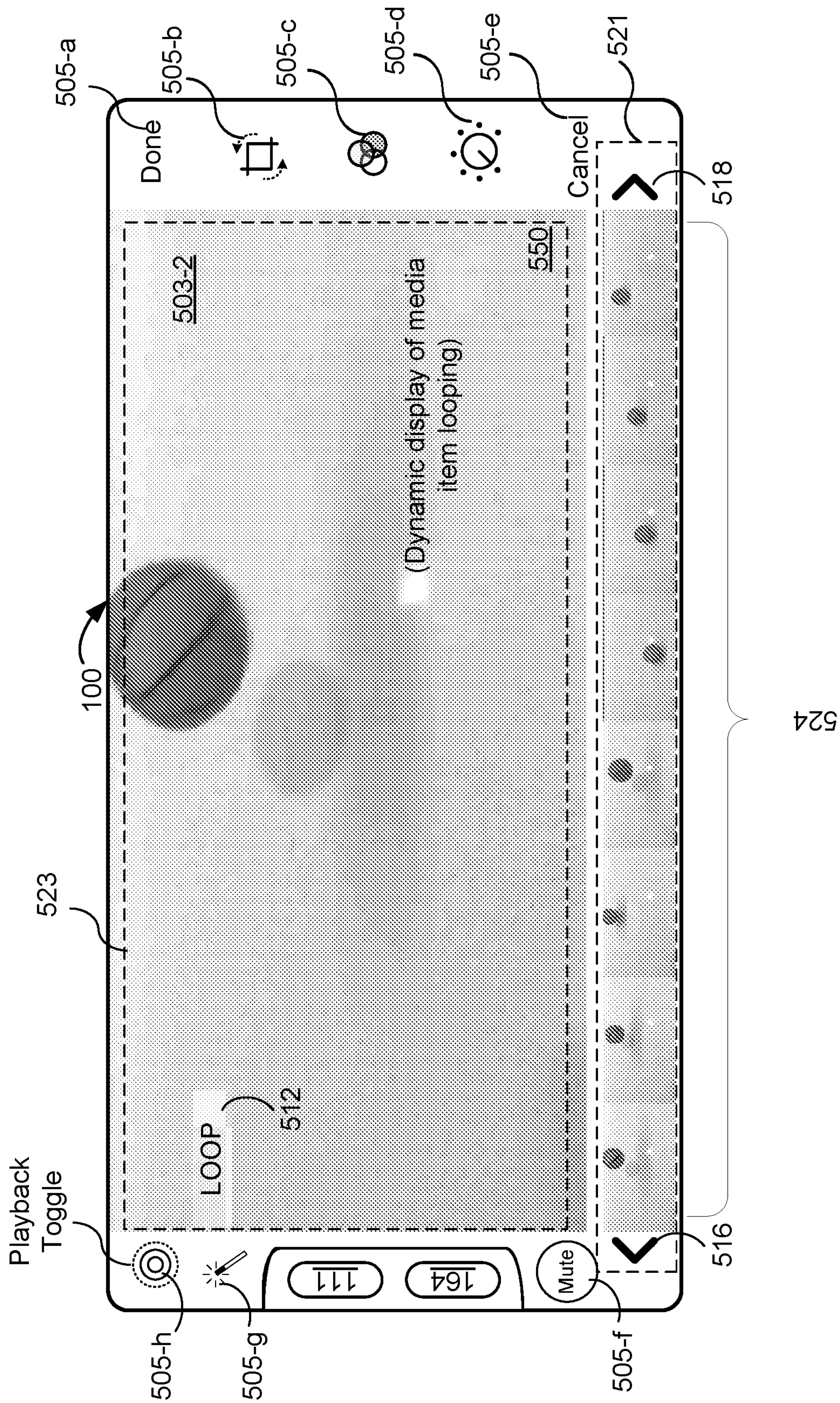
Figure 5J:
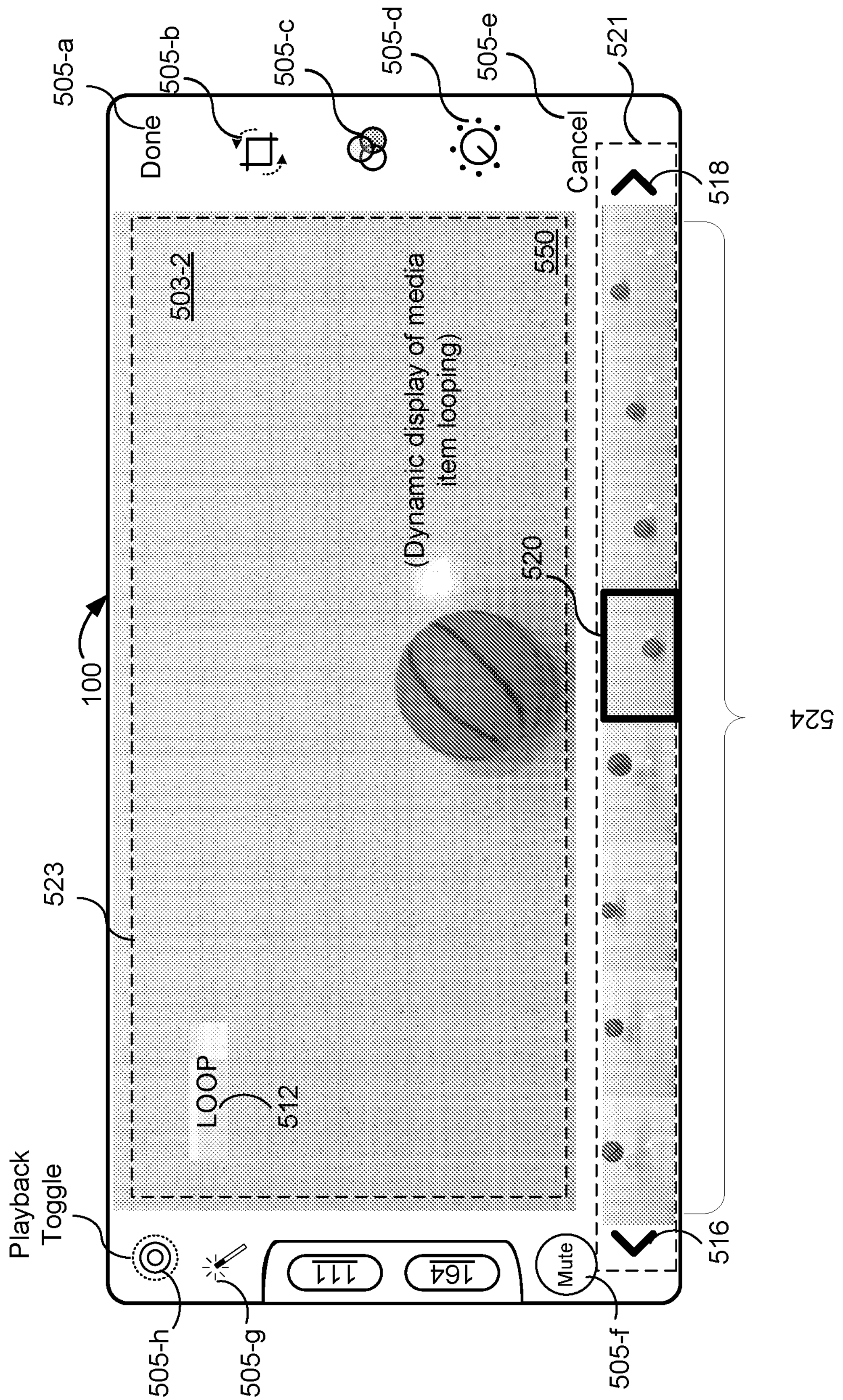
Figure 5K:
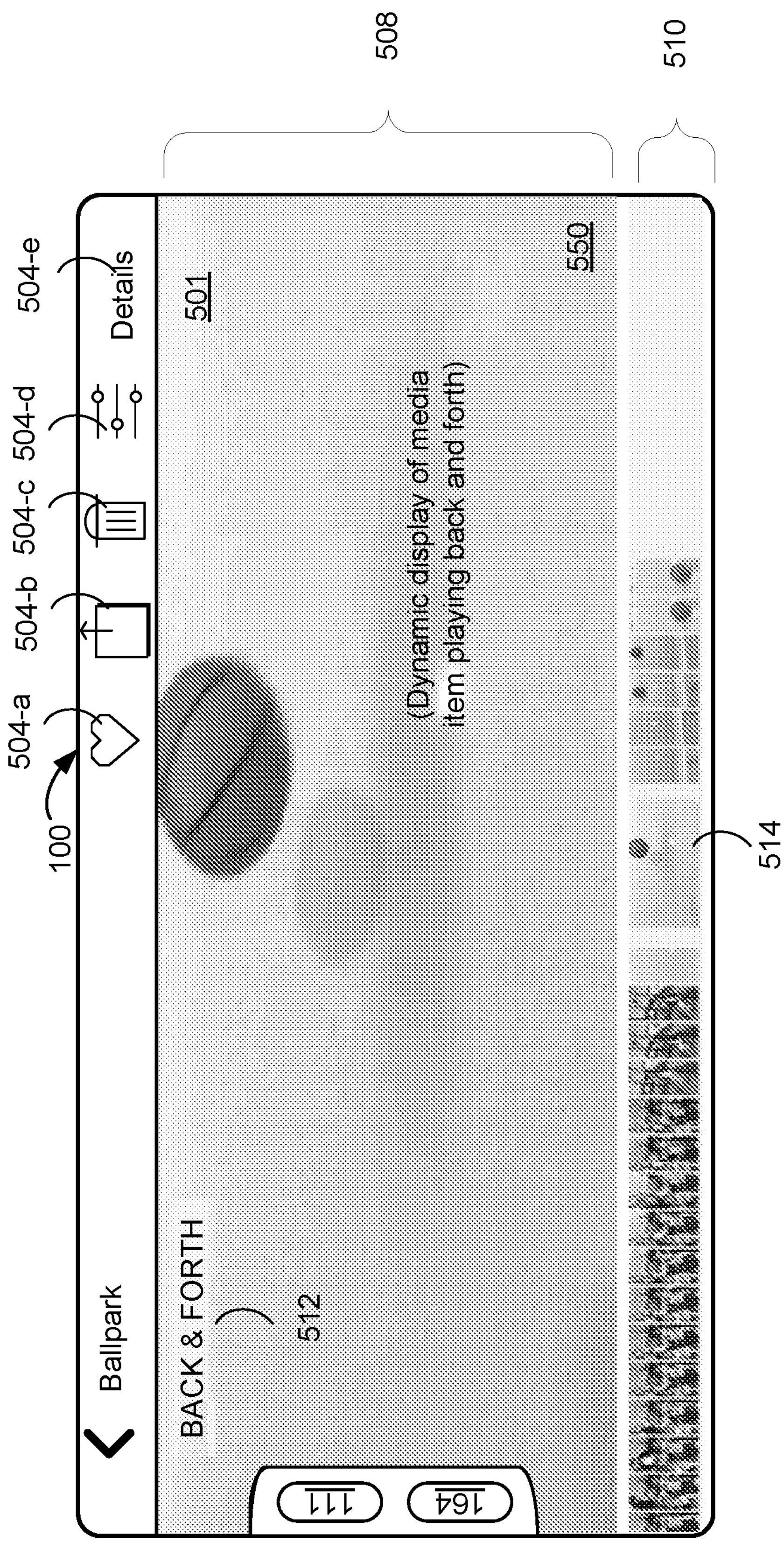
Figure 5L:
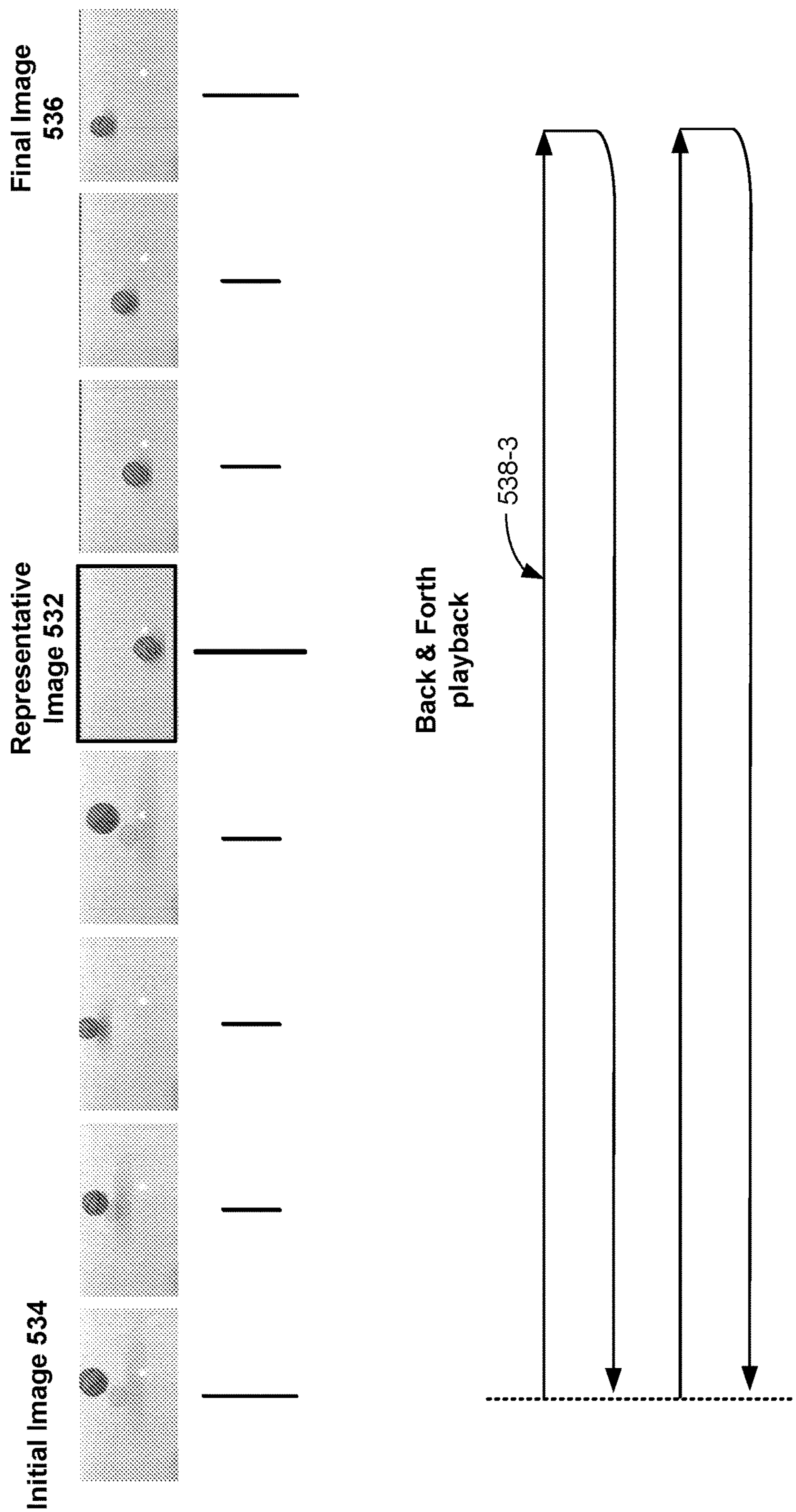
Figure 5M:
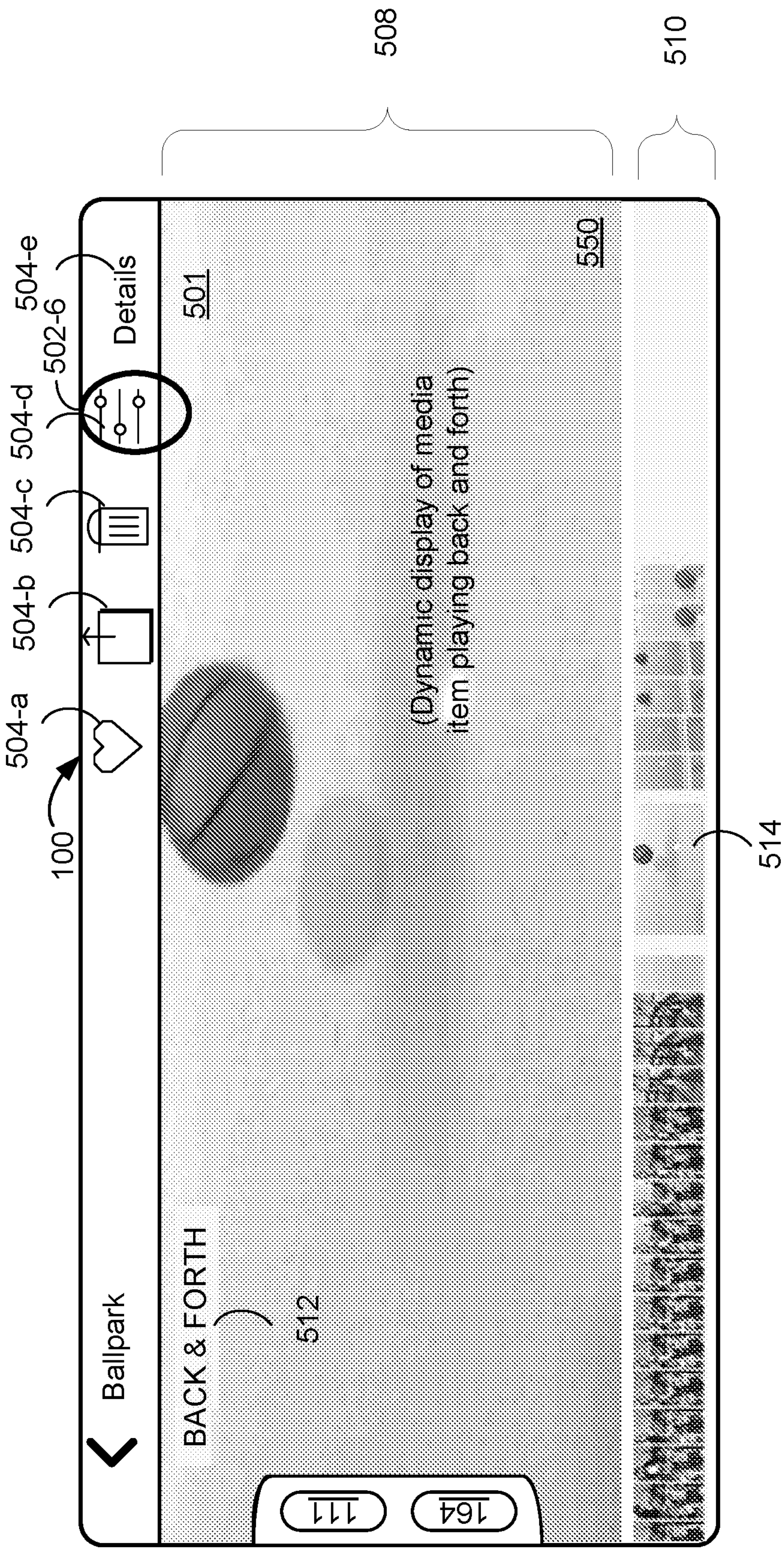
Figure 5N:
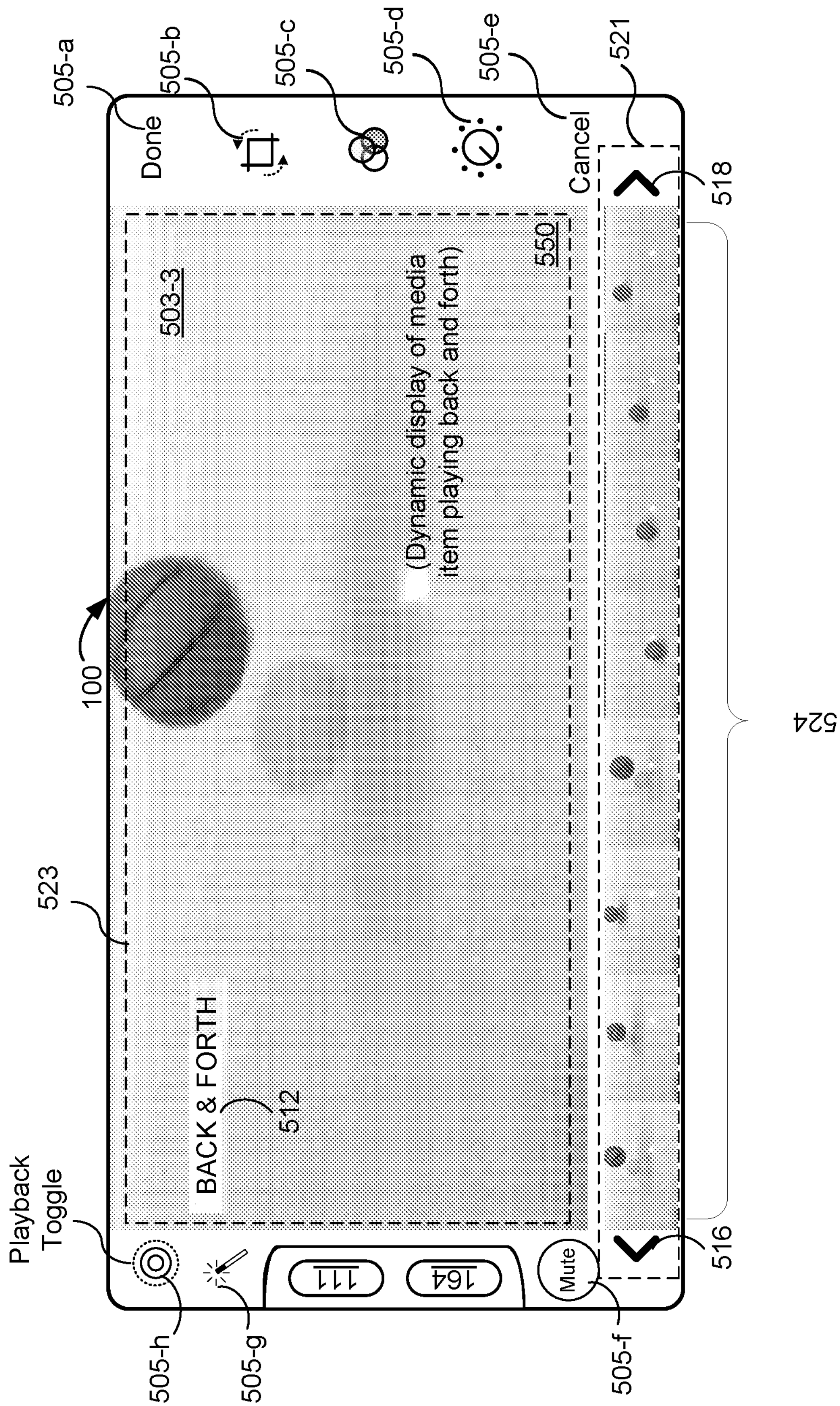
Figure 5O:
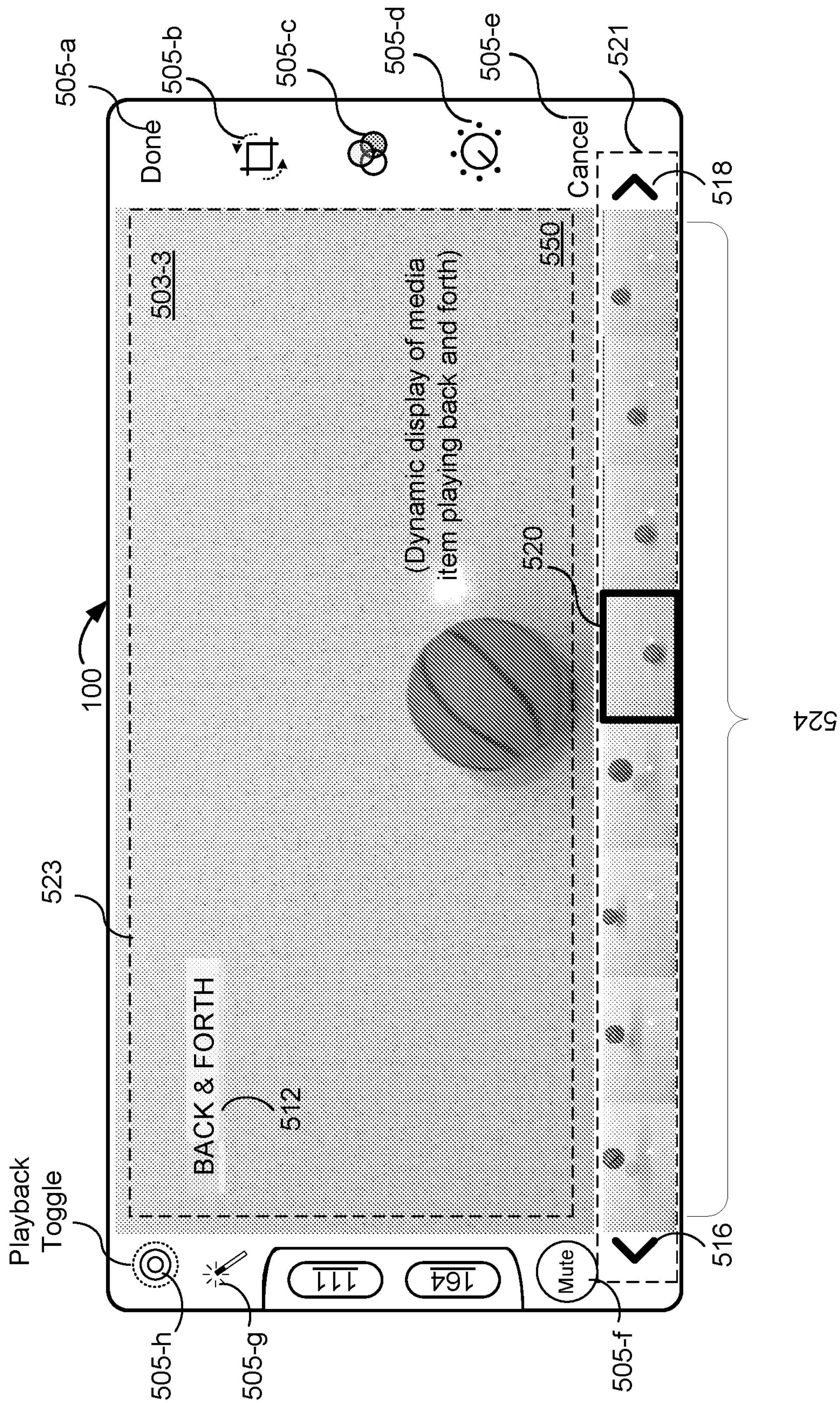
Figure 5P:
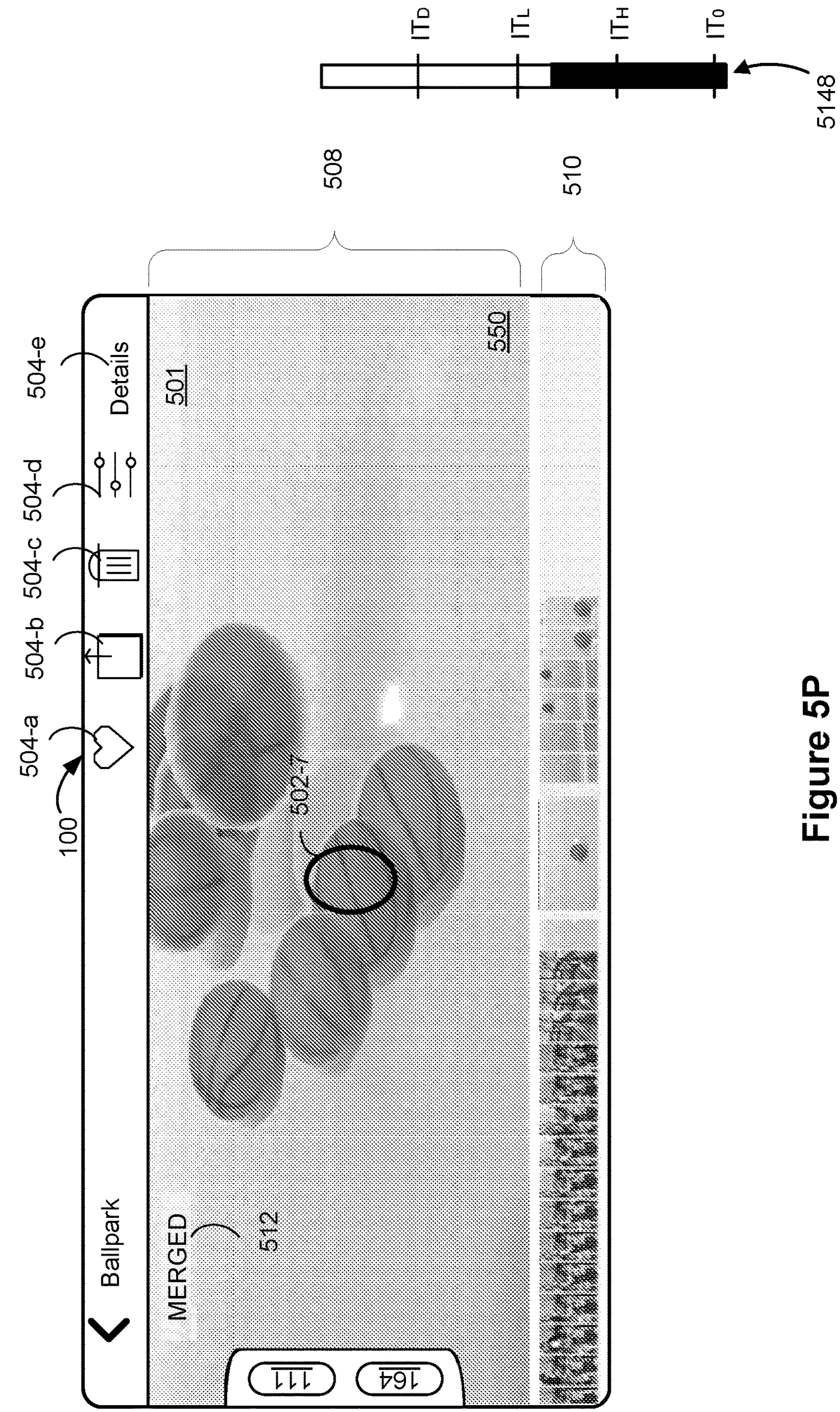
Figure 5Q:
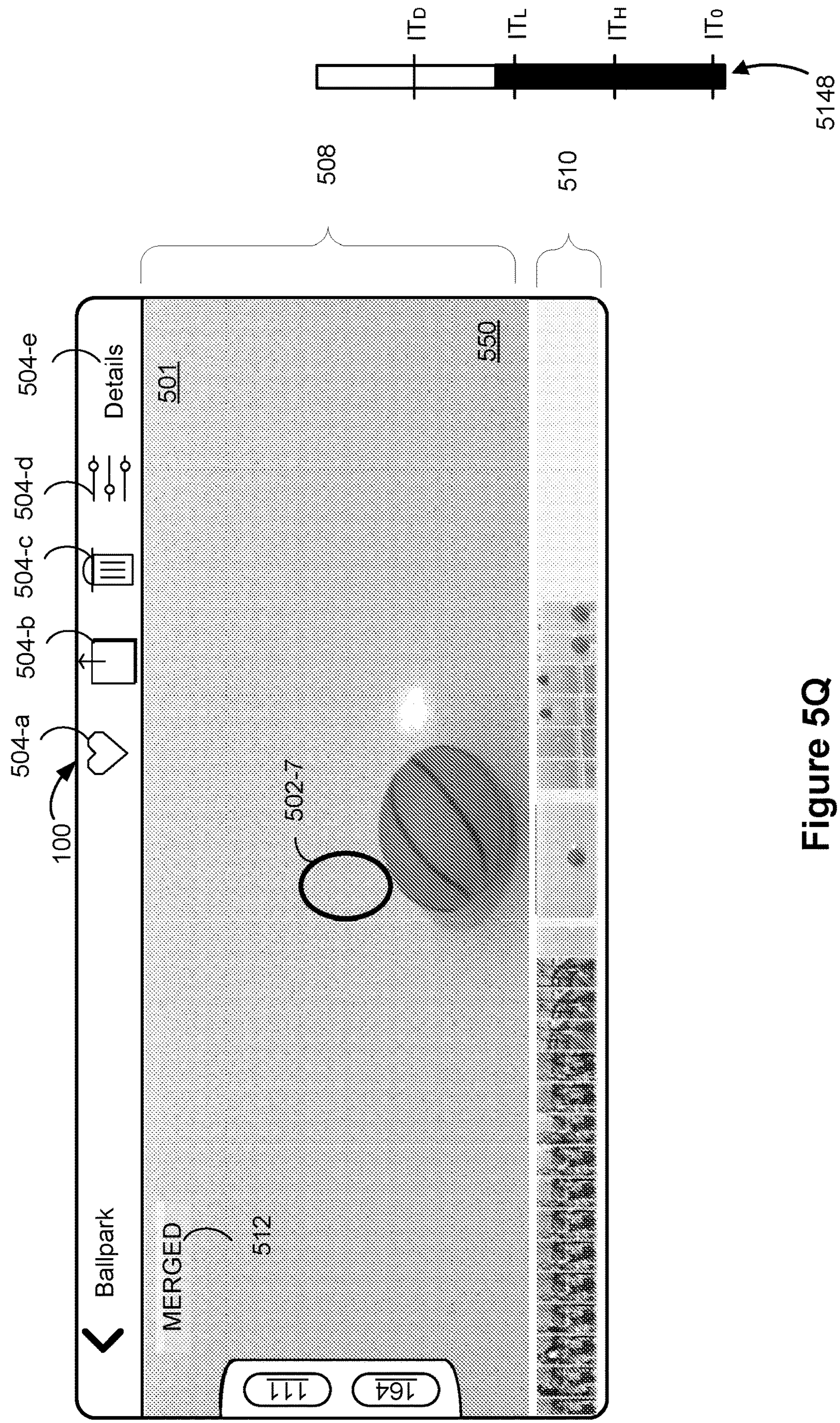
Figure 5R:
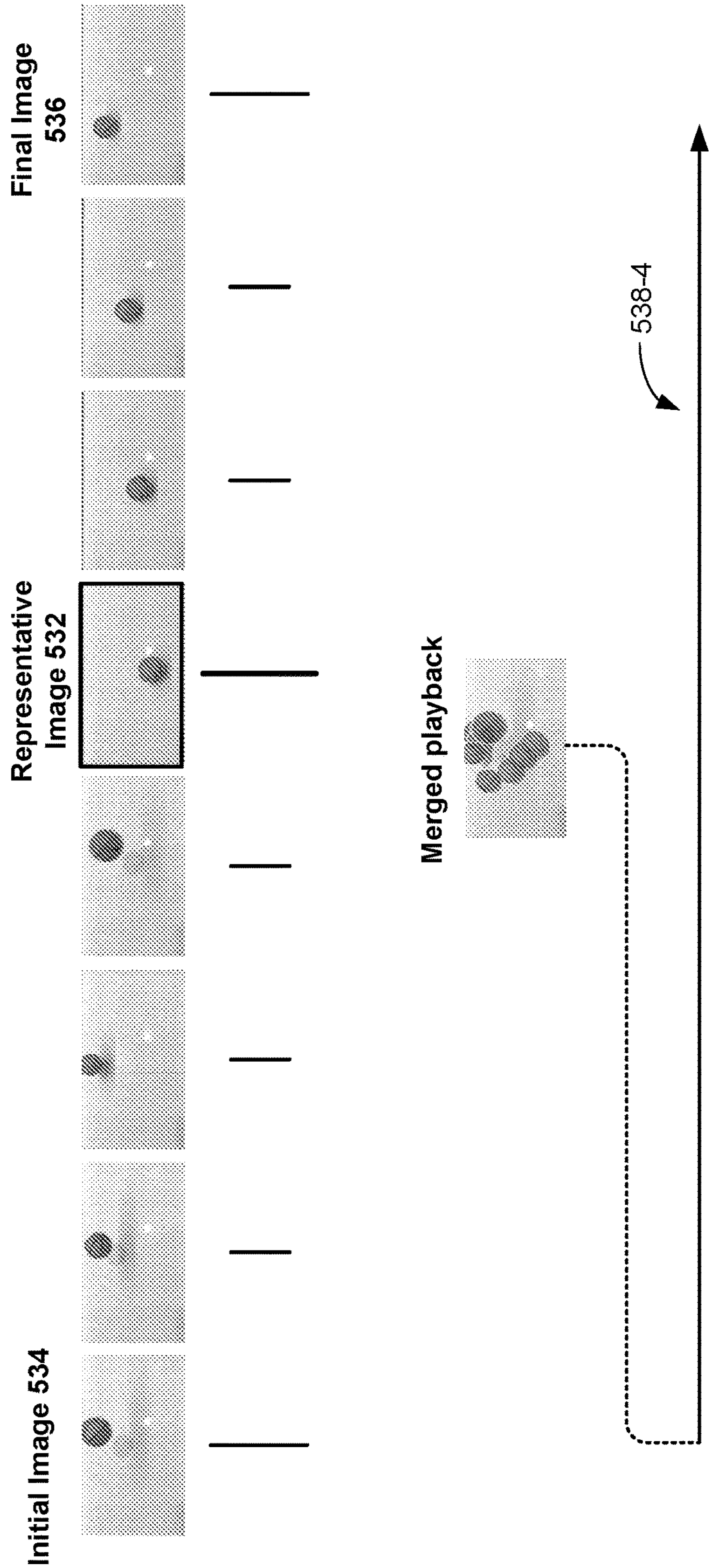
Figure 5S:
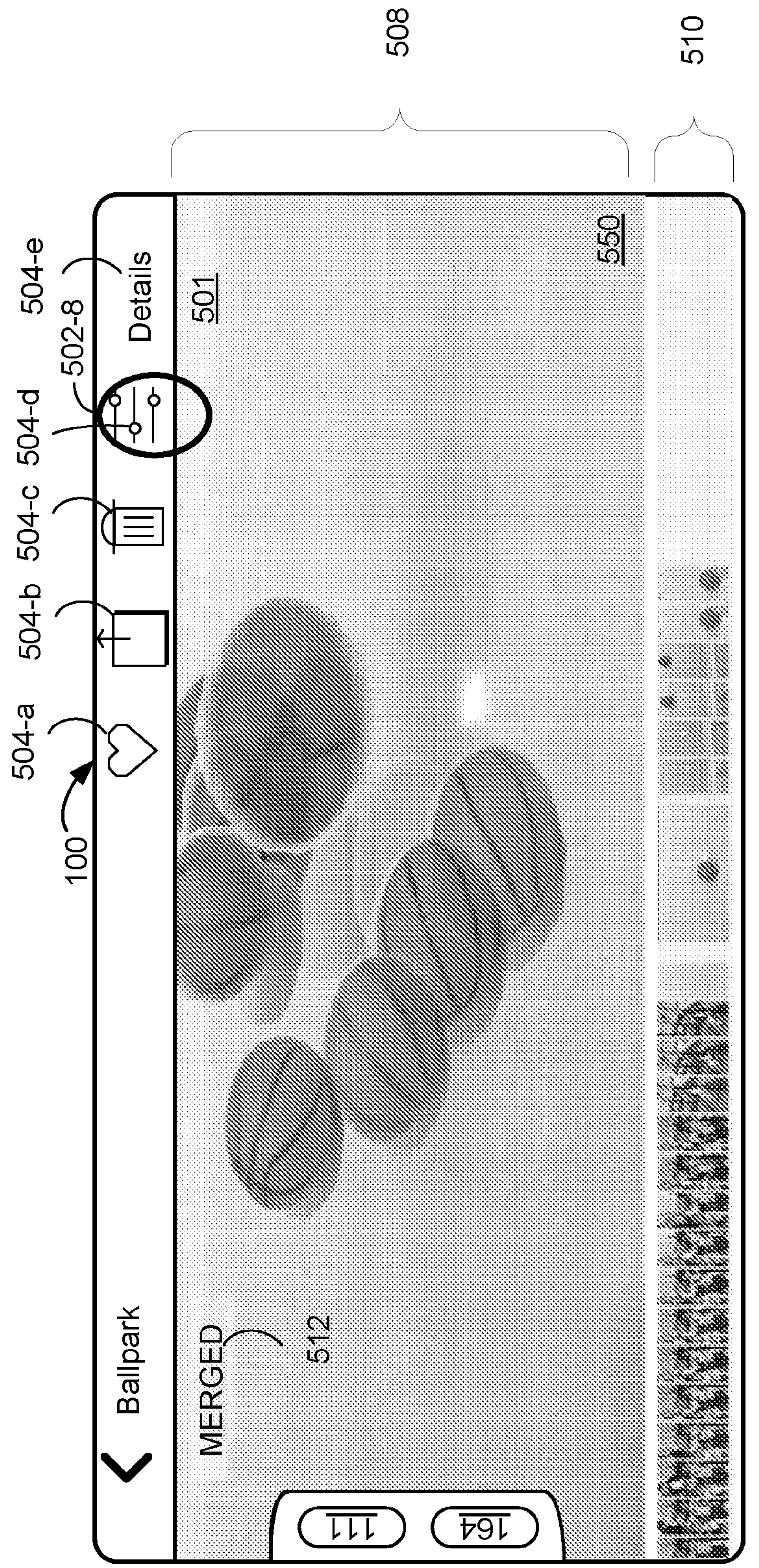
Figure 5T:
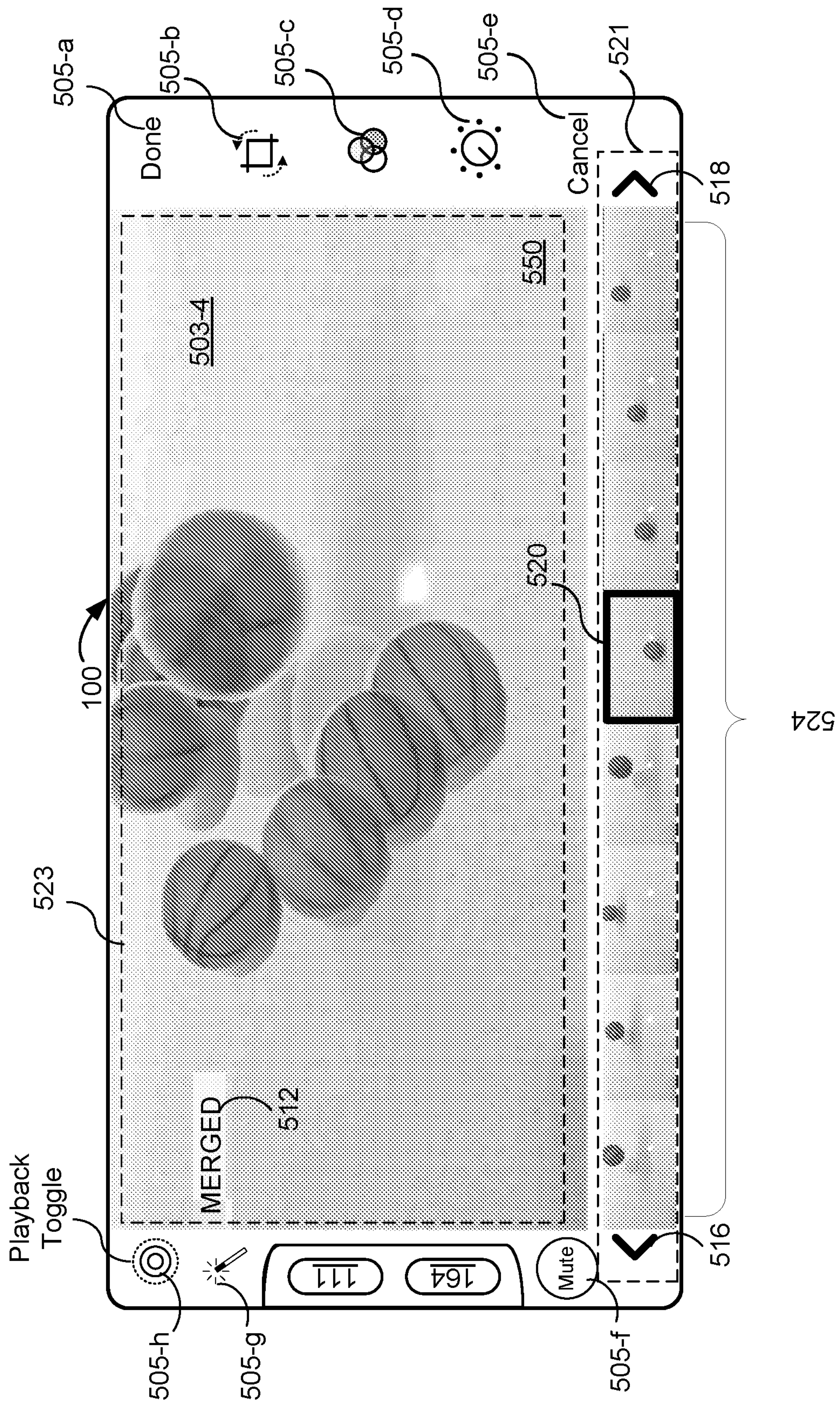
Figure 5U:
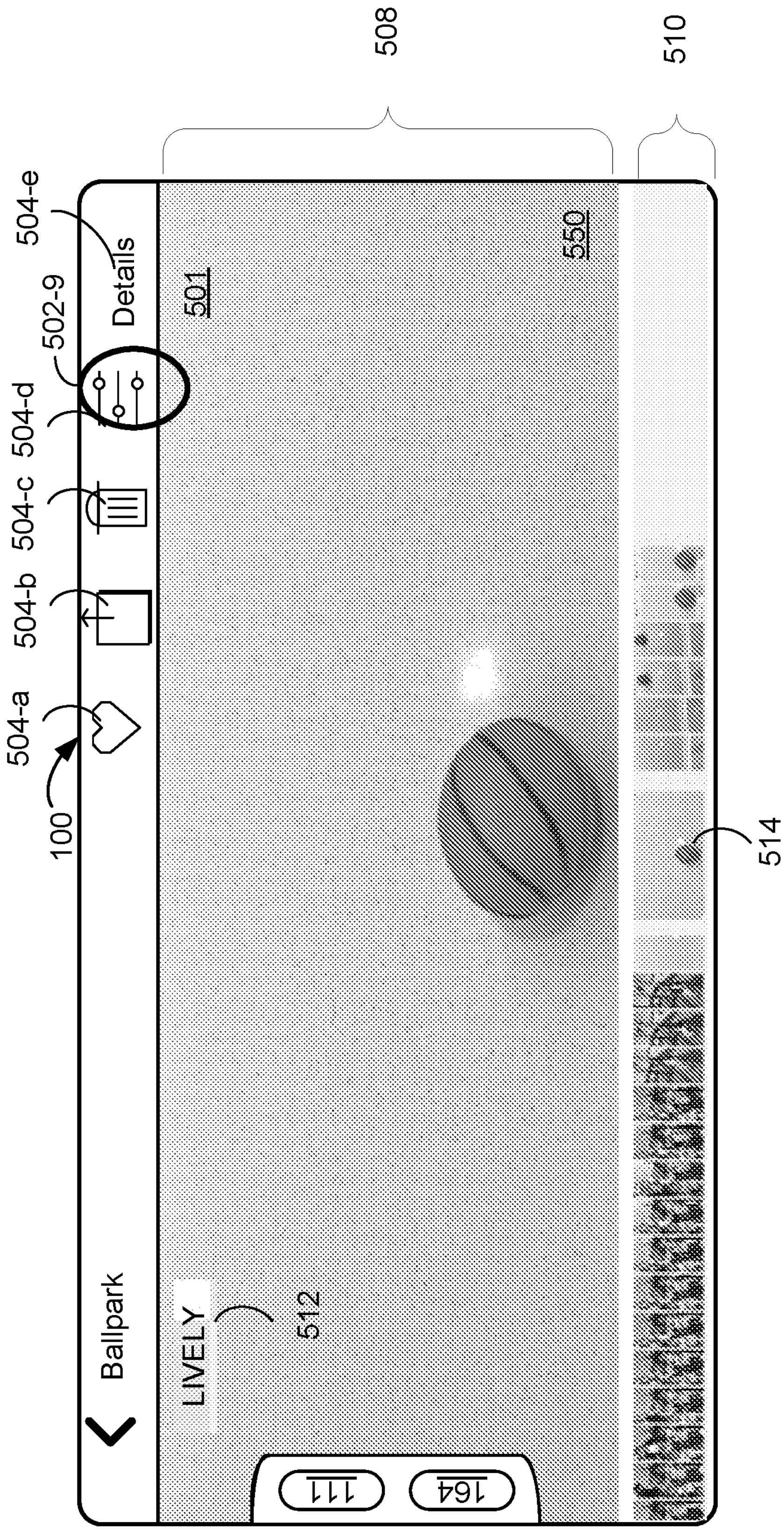

FIGS. 5A-5U illustrate example user interfaces for media playback and editing, in accordance with some embodiments. In FIG. 5A, the device 100 displays a home user interface 500-1. The home user interface 500-1 displays different applications selectable by a user. In response to detecting a tap 502-1 at image application 428, the device 100 opens the image application 428. In the image application 428, the displays user interfaces for navigating, displaying, and editing media items. The media user interface 500-2 in FIG. 5B displays thumbnail images in a grid pattern for easy selection by a user. In some embodiments, each thumbnail image is a representative image that is associated with a sequence of images in a media item, starting with an initial image and ending with a final image that can be "played" in response to detecting certain user actions. In response to detecting a tap 502-2 at media item 550, the device 100 displays a media item display user interface 501, as shown in FIG. 5C. The media item display user interface 501 includes controls, such as: favorite item control 504-*a*, share media item control 504-*b*, delete media item control 504-*c*, edit media item control 504-*d*, and media item details control 504-*e*. The media item display user interface 501 includes display area 508. Display area 508 displays a representative image of the media item 550, and indicates that the user interface is in a "lively" display mode media item 550 via the display mode indicator 512. The media item display user interface 501 also includes a media item collection area 510. Media item collection area 510 displays a representation (e.g., a thumbnail) of a representative image 514 of the media item 550, in addition to displaying other thumbnail representation of media items stored on the device 100. In response to detecting a press by contact 502-3 that exceeds a light press intensity threshold $IT_L$, in display area 508, as shown in FIGS. 5C-5D, the device 100 plays back the media item 550, e.g., according to either of sequences 538-1 and 538-2, starting with the representative image 532, and eventually proceeding to the initial image 534, before finally ending at the final image 536, as shown in FIG. 5E. The representative image 532 is then redisplayed. The representative image 532 represents media item 550 in the photo application (e.g., in a library or other collection). The representative image is typically displayed in a number of user interfaces in the photo application, such as: in a first area of a media item display user interface 501 (e.g., FIG. 5C), in a second area of the media item display user interface 501 as a representation 514 (e.g., a thumbnail) (e.g., FIG. 5C); in a first area 523 of an editing user interface 503 (e.g., FIG. 5V), in a second area 521 of an editing user interface 503 as a representation (e.g., a thumbnail); and in an array of images as a representation 514 (e.g., a thumbnail) (FIG. 5B).

FIG. 5F is similar to FIG. 5C, except the media item 550 is in a "loop" display mode. Without user input, the device 100 repeatedly loops the media item 550, e.g., according to the sequence 538-2 shown in FIG. 5G. In FIG. 5H, the device 100 displays the media item display user interface 501 in "loop" mode. While in the "loop" display mode, in response to detecting a tap gesture 502-5 at edit control 504-*d*, the device 100 displays a media item edit user interface 503, as shown in FIG. 5I, specifically media item edit user interface 503-2 for the "loop" mode. The media item edit user interface 503 includes a media edit display area 523 and an image sequence area 524. In "loop" mode, the media edit display area 523 displays the sequence of images associated with media item 550 in a loop sequence, as described in FIG. 5G. The sequence of images in media item 550 can be trimmed using the begin-trim affordance 516 and/or the end-trim affordance 518. The media item edit user interface 503 also includes edit controls, such as: a done control 505-*a*, a crop control 505-*b*, a color control 505-*c*, a timer control 505-*d*, a mute control 505-*f*, a wand control 505-*g* and a playback toggle control 505-*h*. In some embodiments, the media item edit user interface 503-2 for the "loop mode" forgoes displaying a representative image selection affordance, as shown in FIG. 5I. In other embodiments, the media item edit user interface 503-2 for the "loop" mode displays a representative image selection affordance 520, as shown in FIG. 5J.

FIG. 5K is similar to FIG. 5C, except the media item 550 is in a "back and forth" display mode. In this example, the device 100 plays back the media item 550 back and forth, e.g., according to the sequence 538-3 shown in FIG. 5L. In FIG. 5M, the device 100 displays the media item display user interface 501 in "back and forth" mode. While in the "back and forth" display mode, in response to detecting a tap gesture 502-6 at edit control 504-*d*, the device displays the media item edit user interface 503-3, as shown in FIG. 5N. FIG. 5N is similar to FIG. 5I except the media item 550 is in a "back and forth" edit mode. In some embodiments, the media item edit user interface 503-3 forgoes displaying a representative image selection affordance, as shown in FIG. 5N. In other embodiments, the media item edit user interface 503-3 displays a representative image selection affordance 520 as shown in FIG. 5O.

FIG. 5P is similar to FIG. 5C, except the media item 550 is in a "merged" display mode. In this example, the device 100 displays a merged image of the sequence of images associated with the media item, in display area 508. In response to detecting a press by contact 502-7 that exceeds a light press intensity threshold $IT_L$, in display area 508, as shown in FIGS. 5P-5Q), the device 100 plays back the media item 550, e.g., according to the sequence 538-4 shown in FIG. 5R. In FIG. 5S, the device 100 displays the media item display user interface 501 in "merged" mode. In response to detecting a tap gesture 502-8 at edit control 504-*d*, the device displays the media item edit user interface 503-4, as shown in FIG. 5T. FIG. 5T is similar to FIG. 5I except the media item 550 is in a "merged" edit mode. In this mode, the edit display area 523 shows a merged still image of the sequence of images associated with media item 550.

Figure 5V:
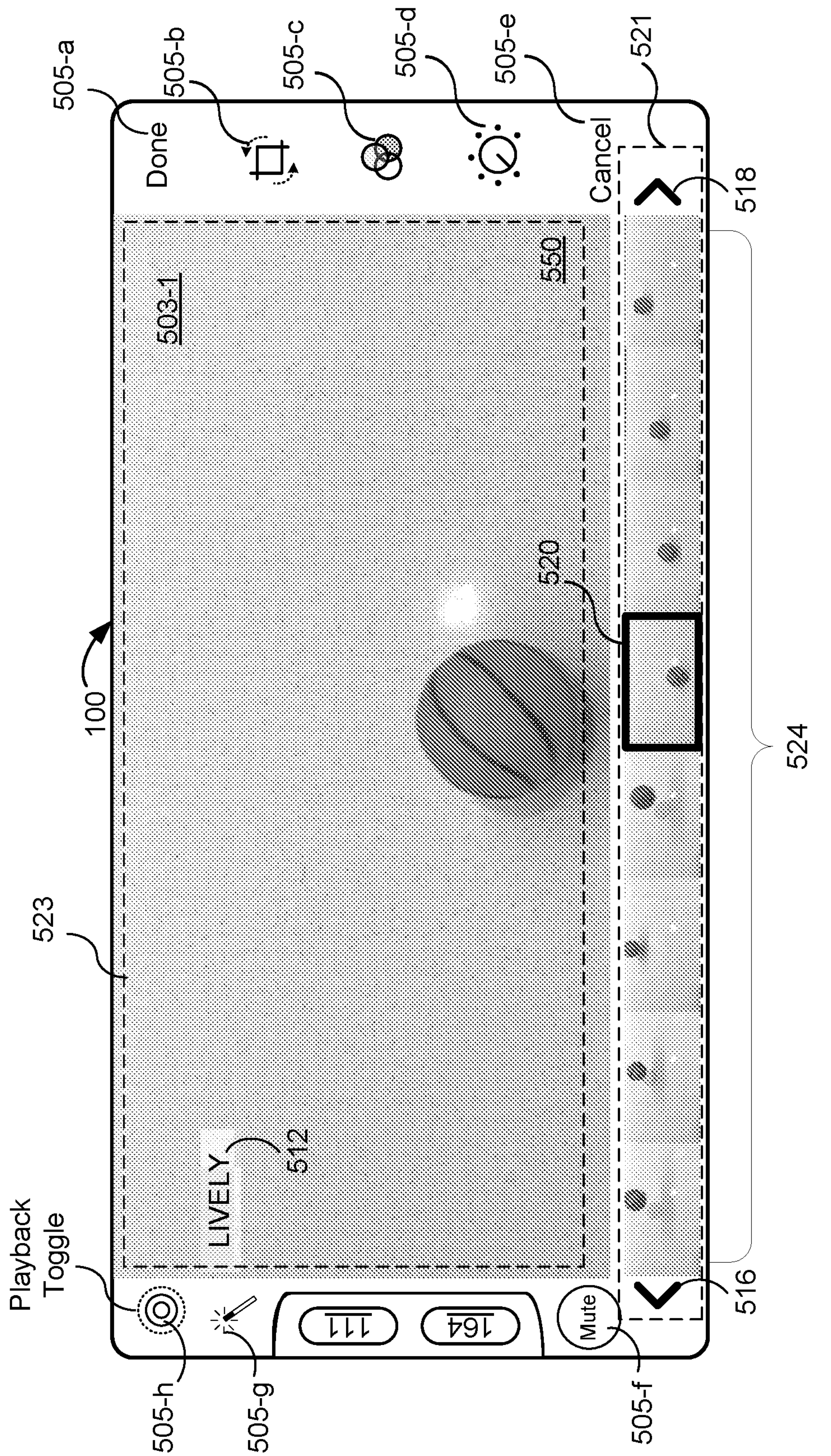
Figure 5W:
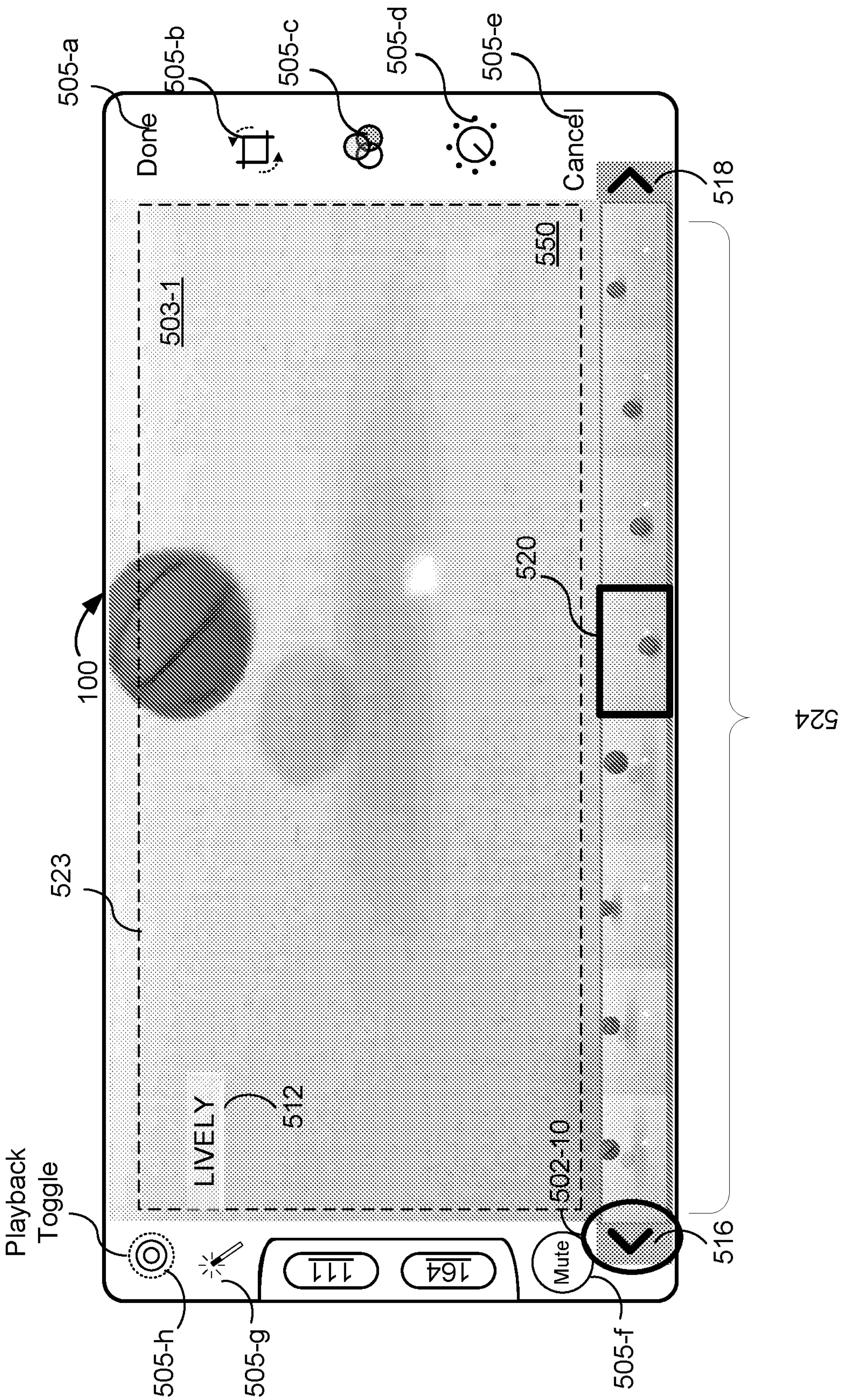
Figure 5X:
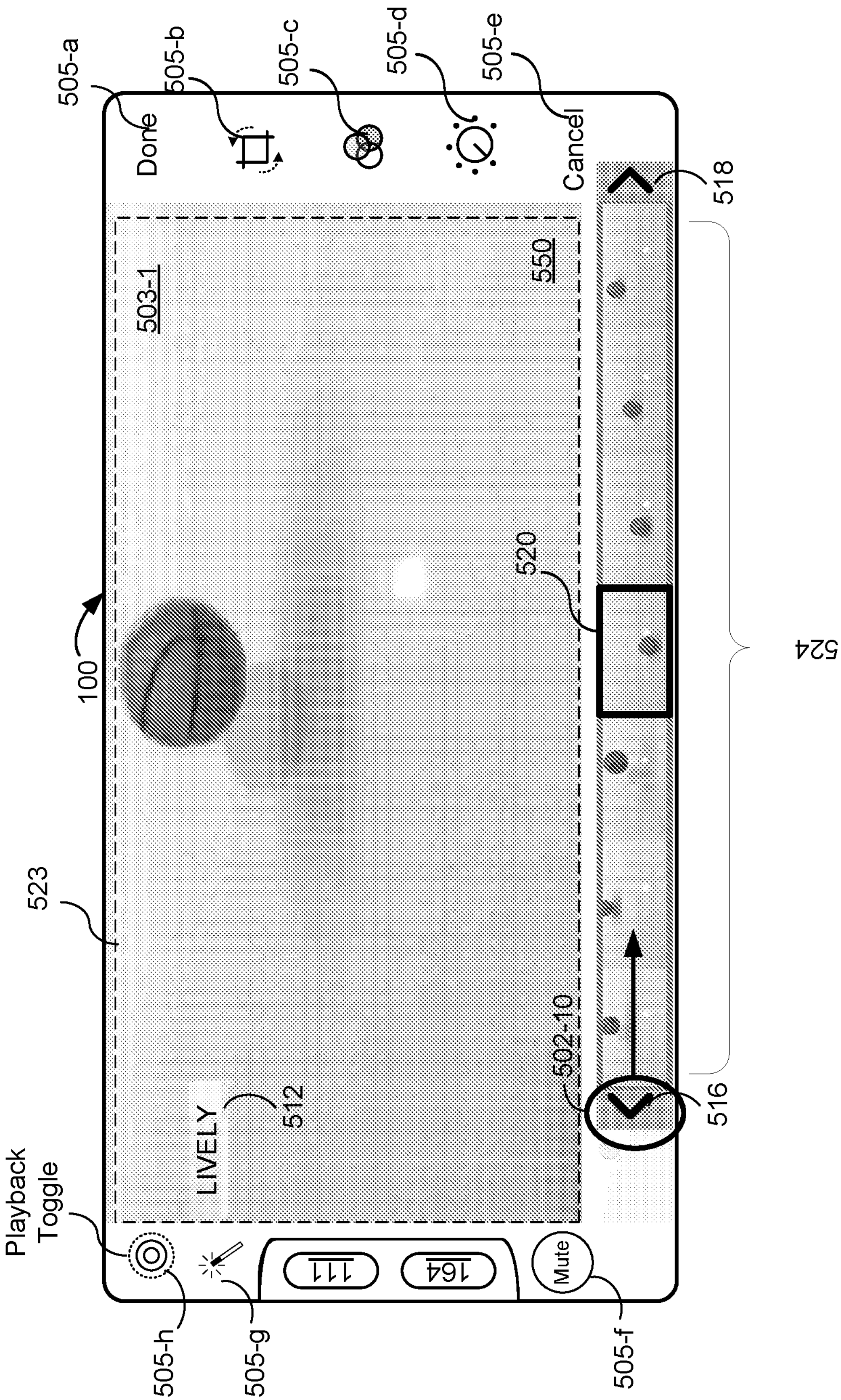
Figure 5Y:
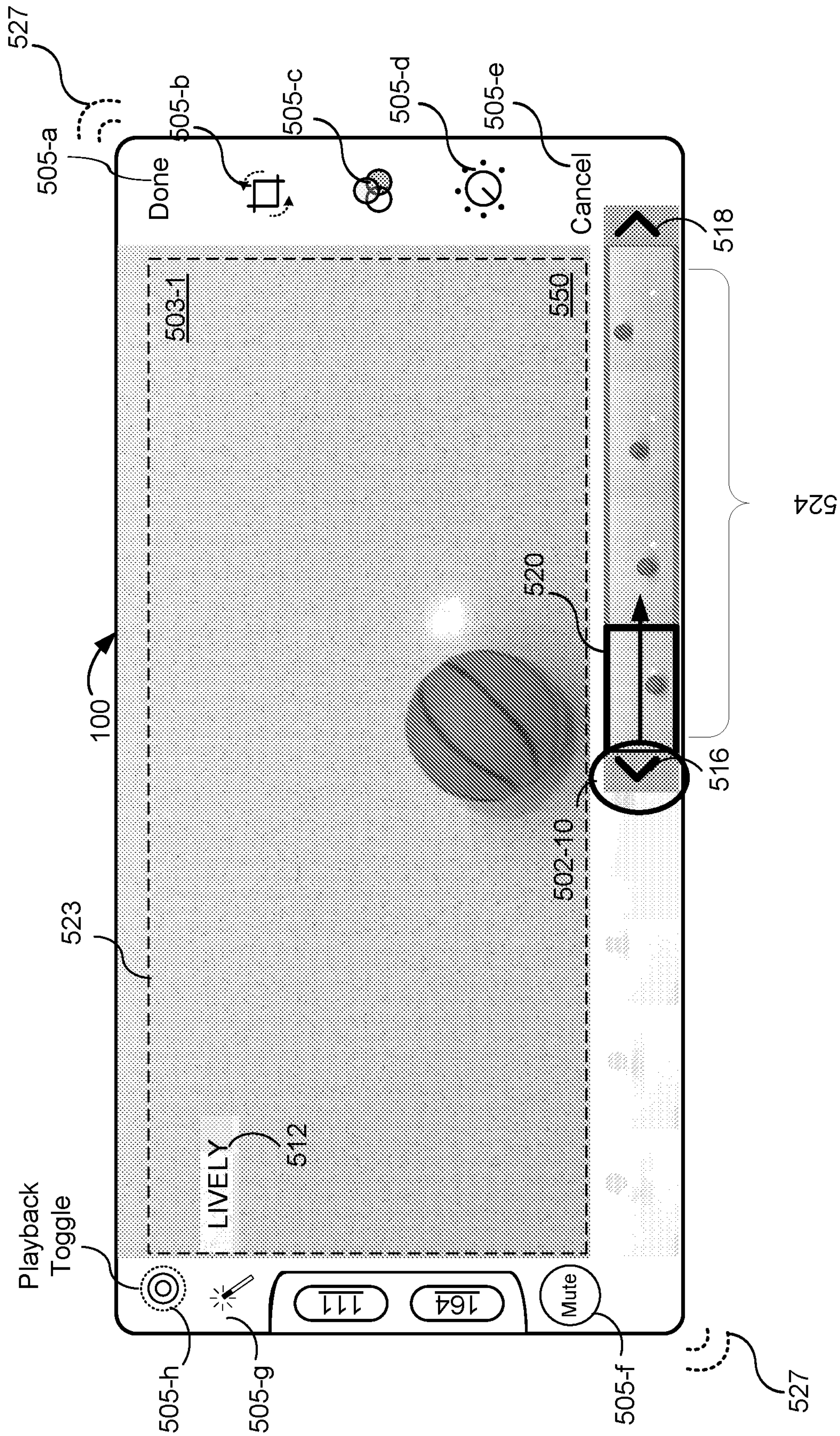
Figure 5Z:
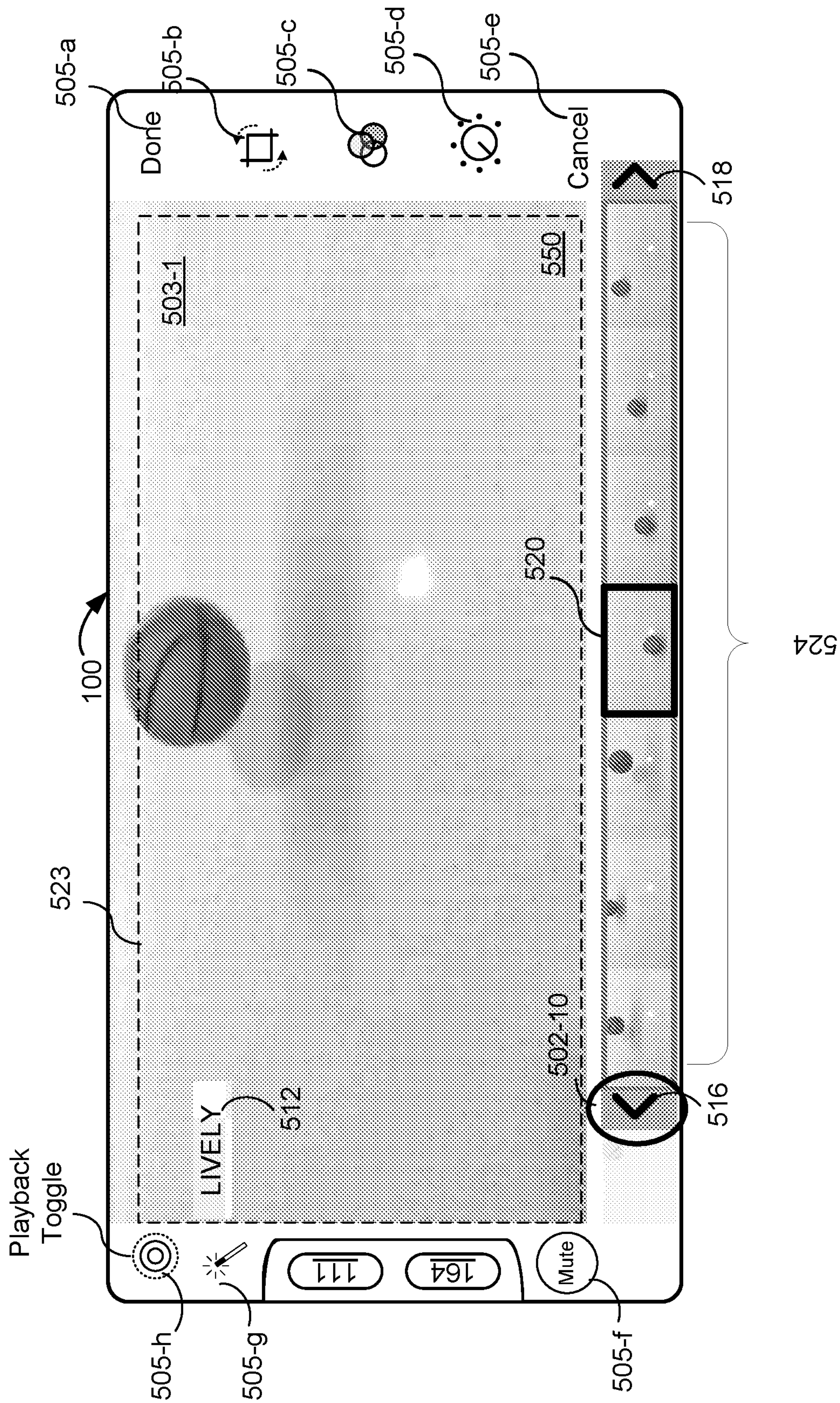
Figure 5A:
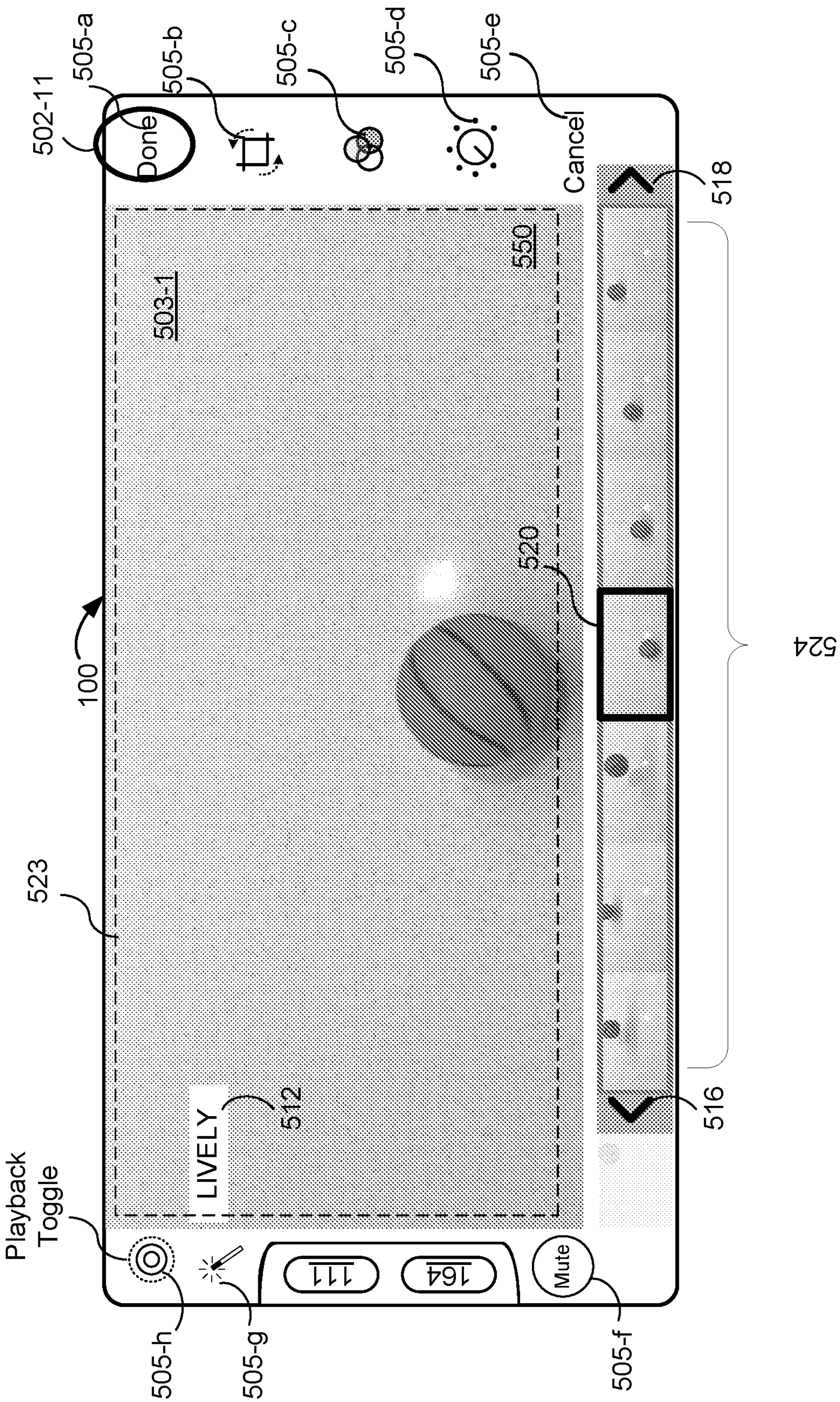
Figure 5A:
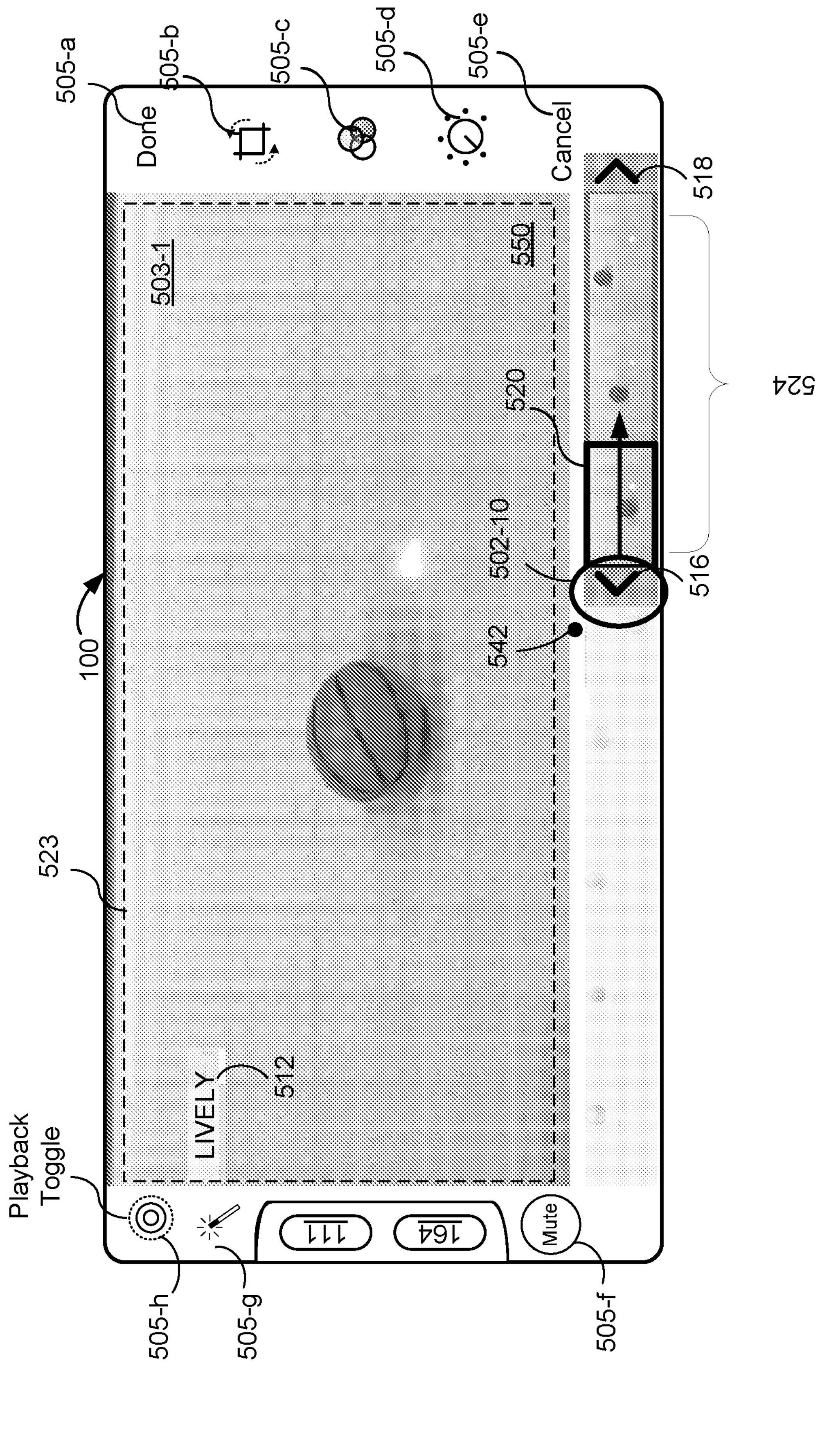
Figure 5A:
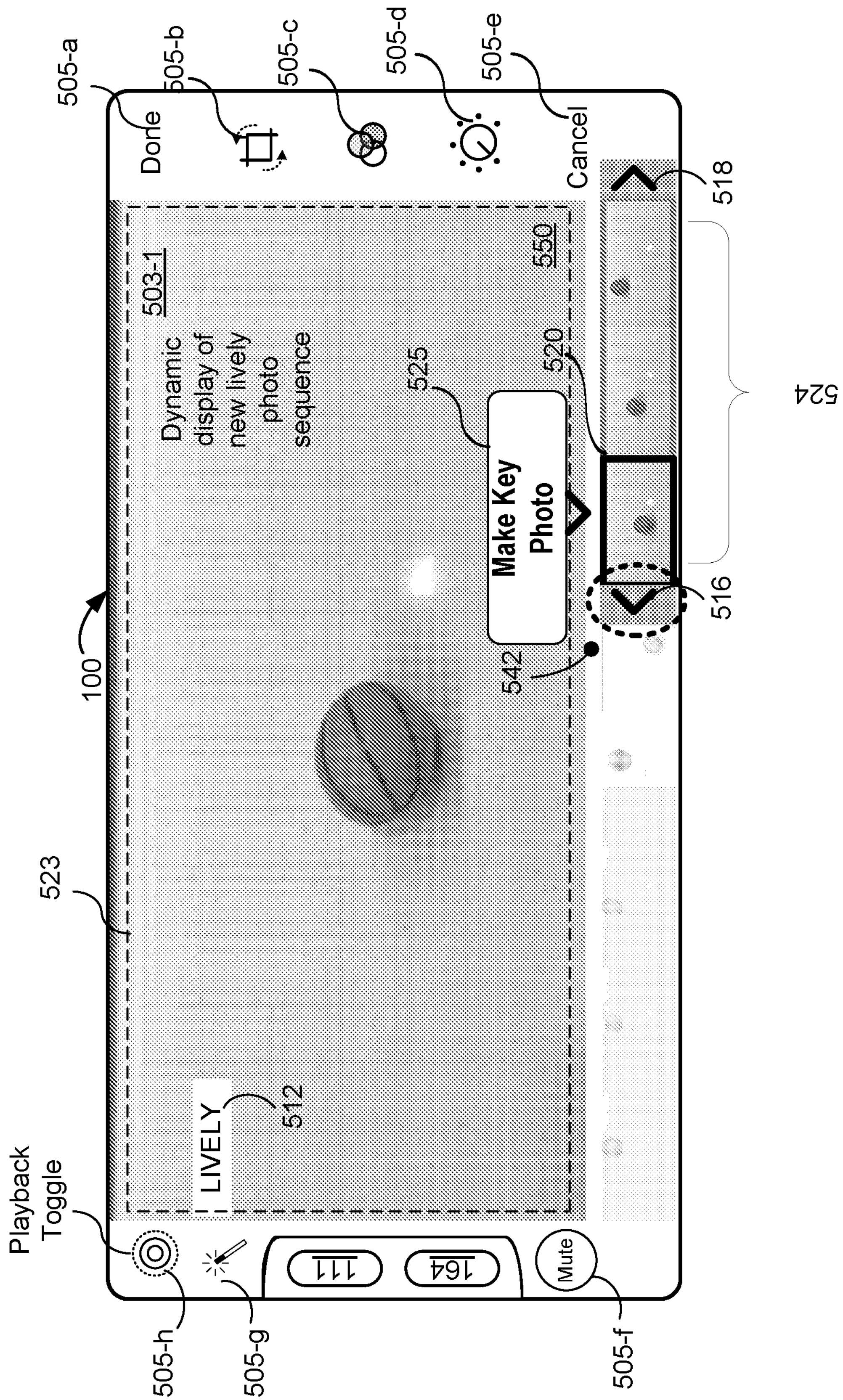
Figure 5A:
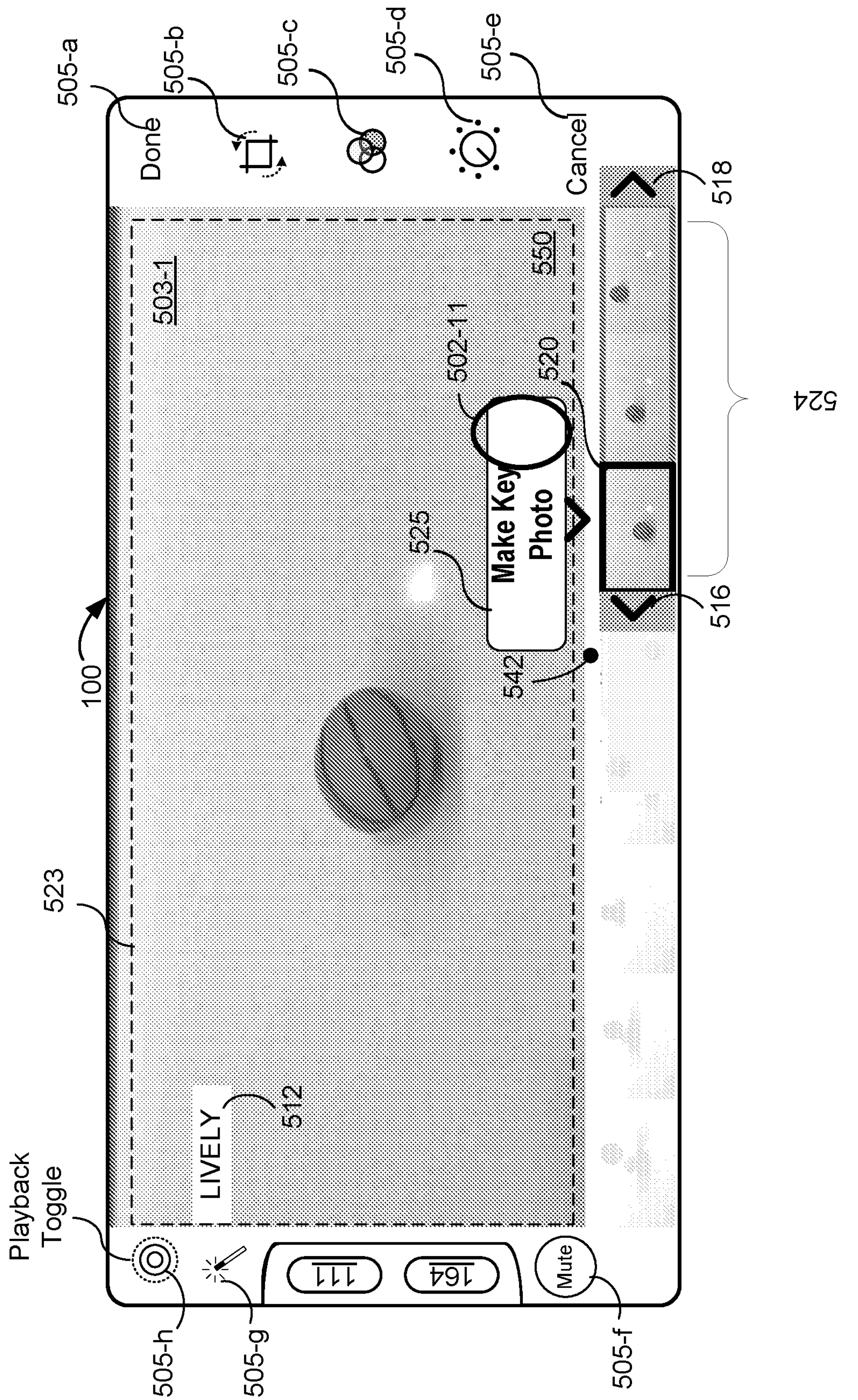
Figure 5A:
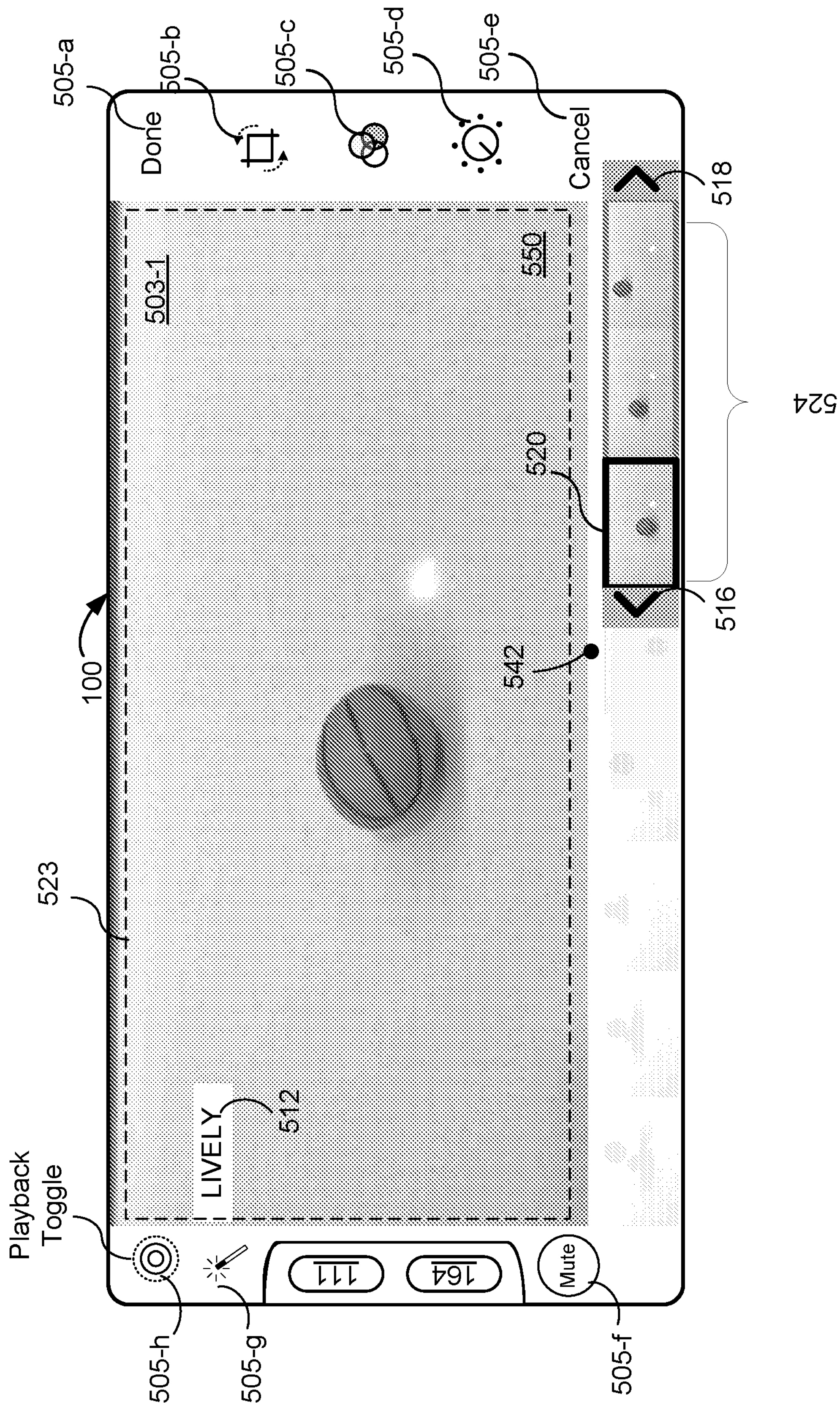
Figure 5A:
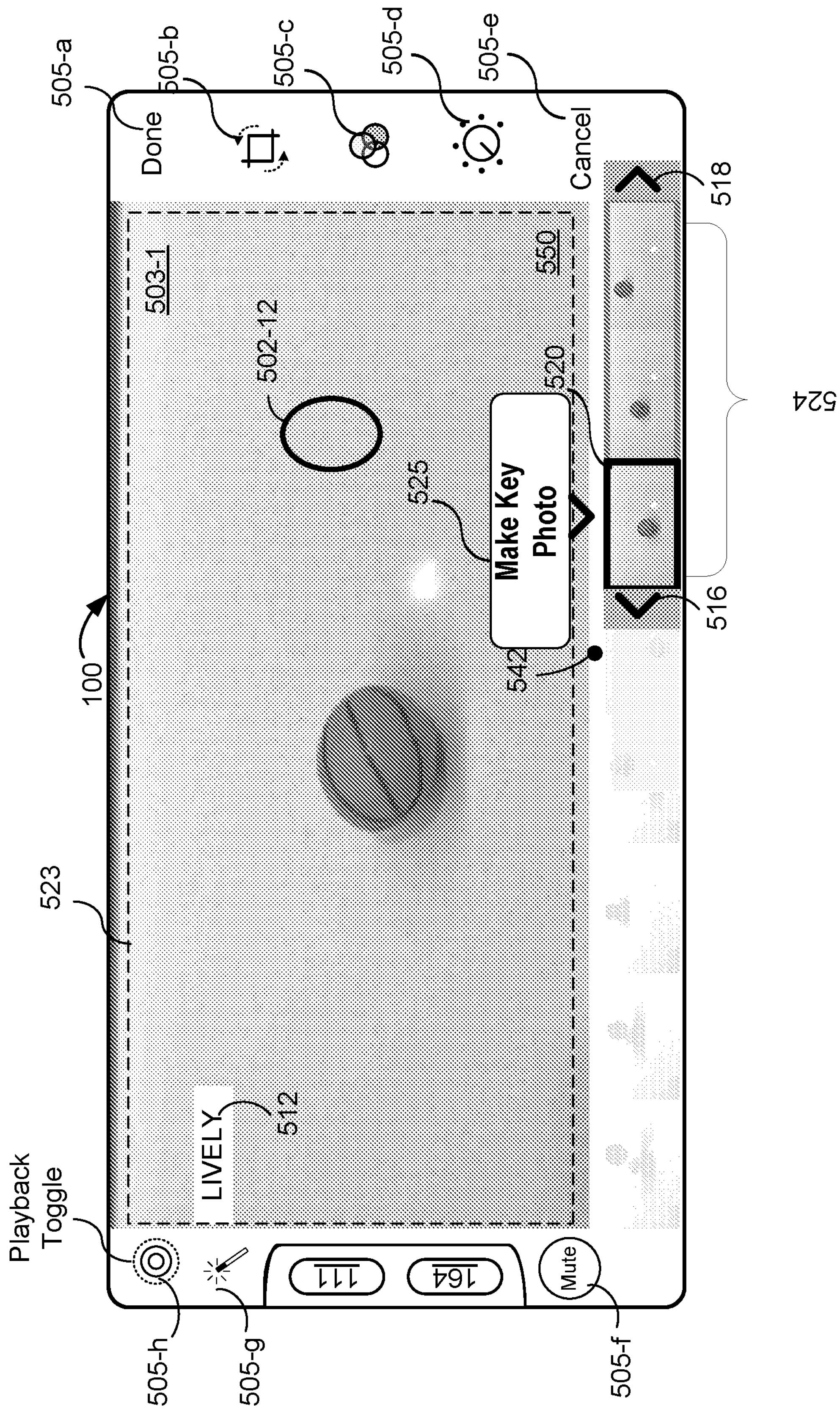
Figure 5A:
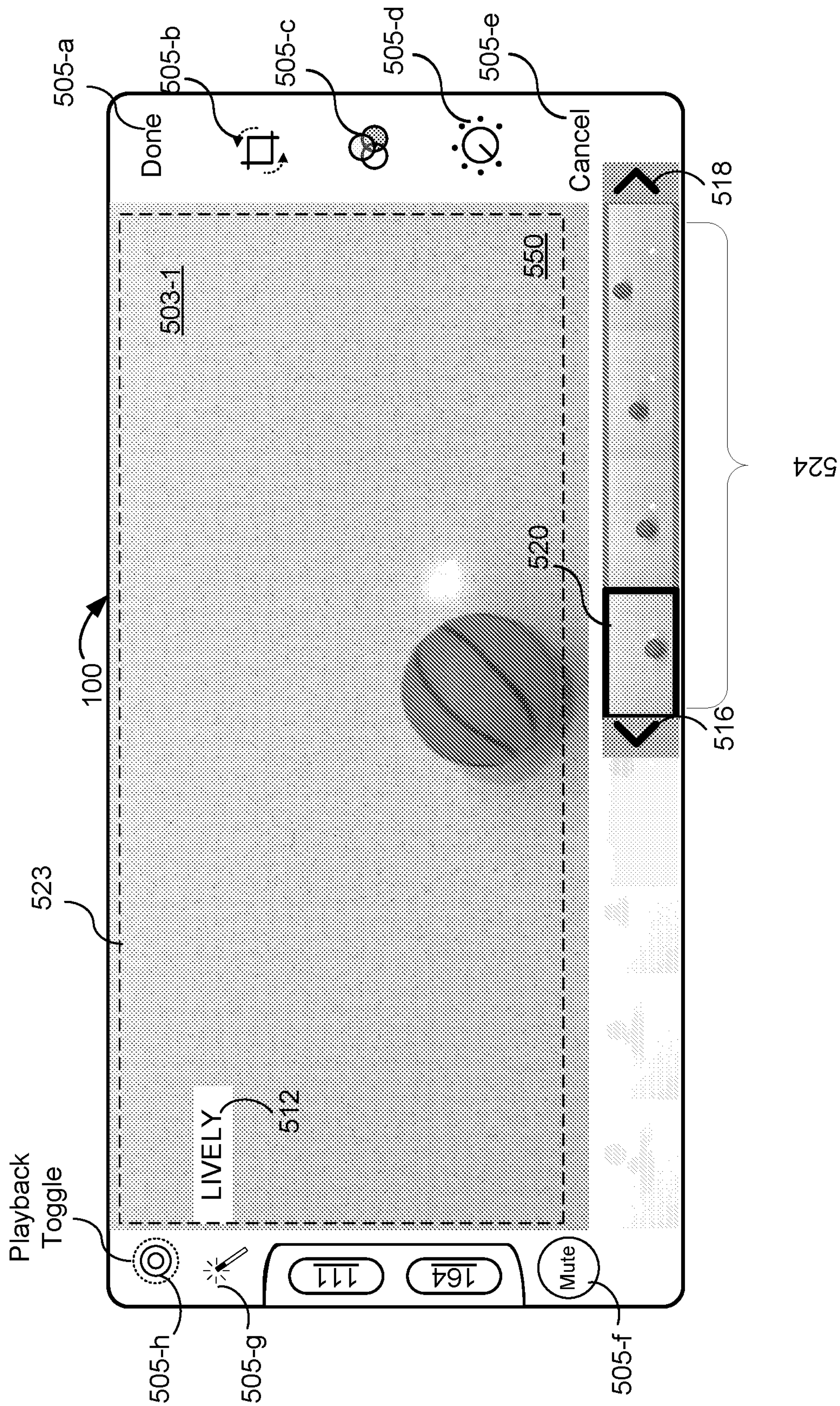
Figure 5A:
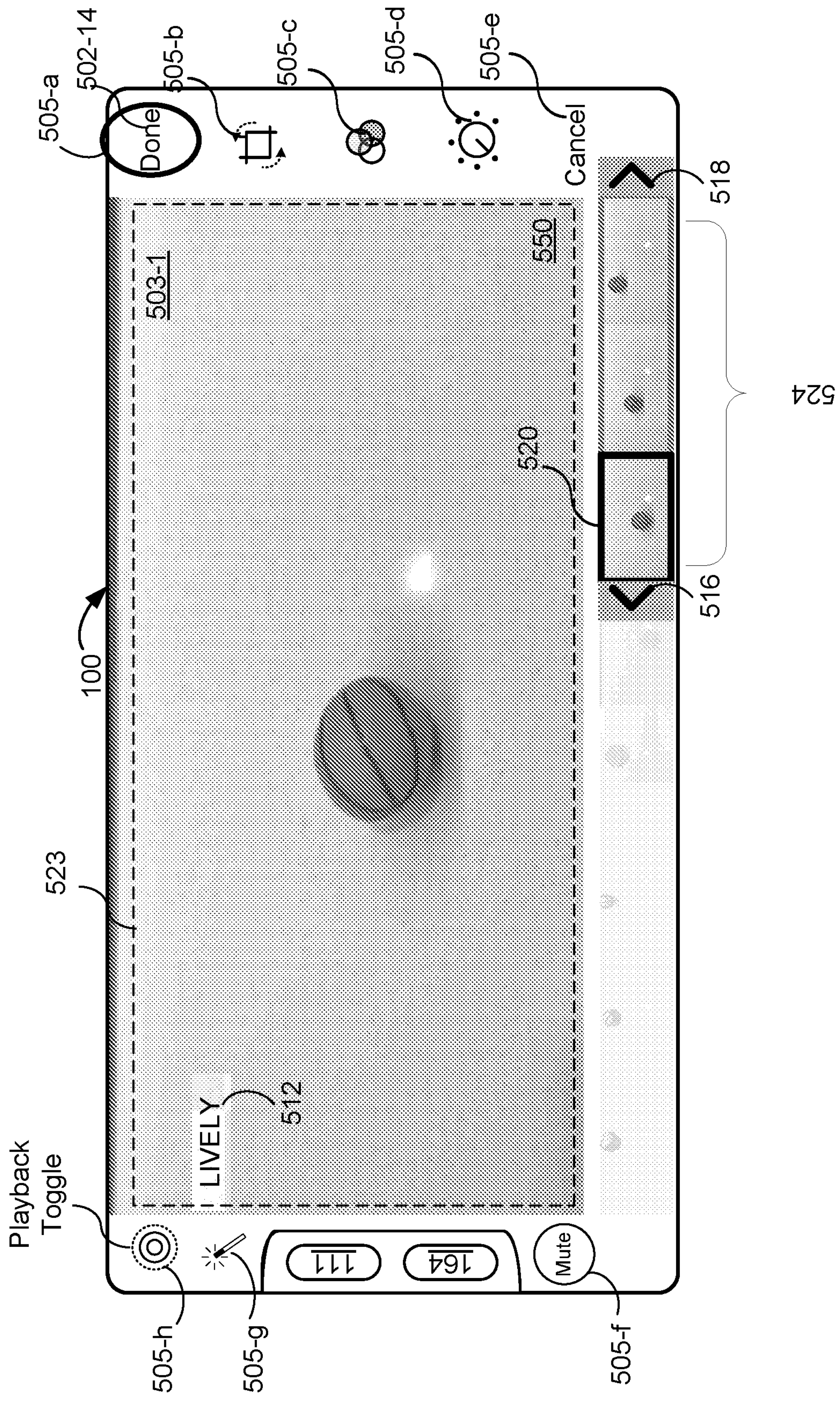
Figure 5A:
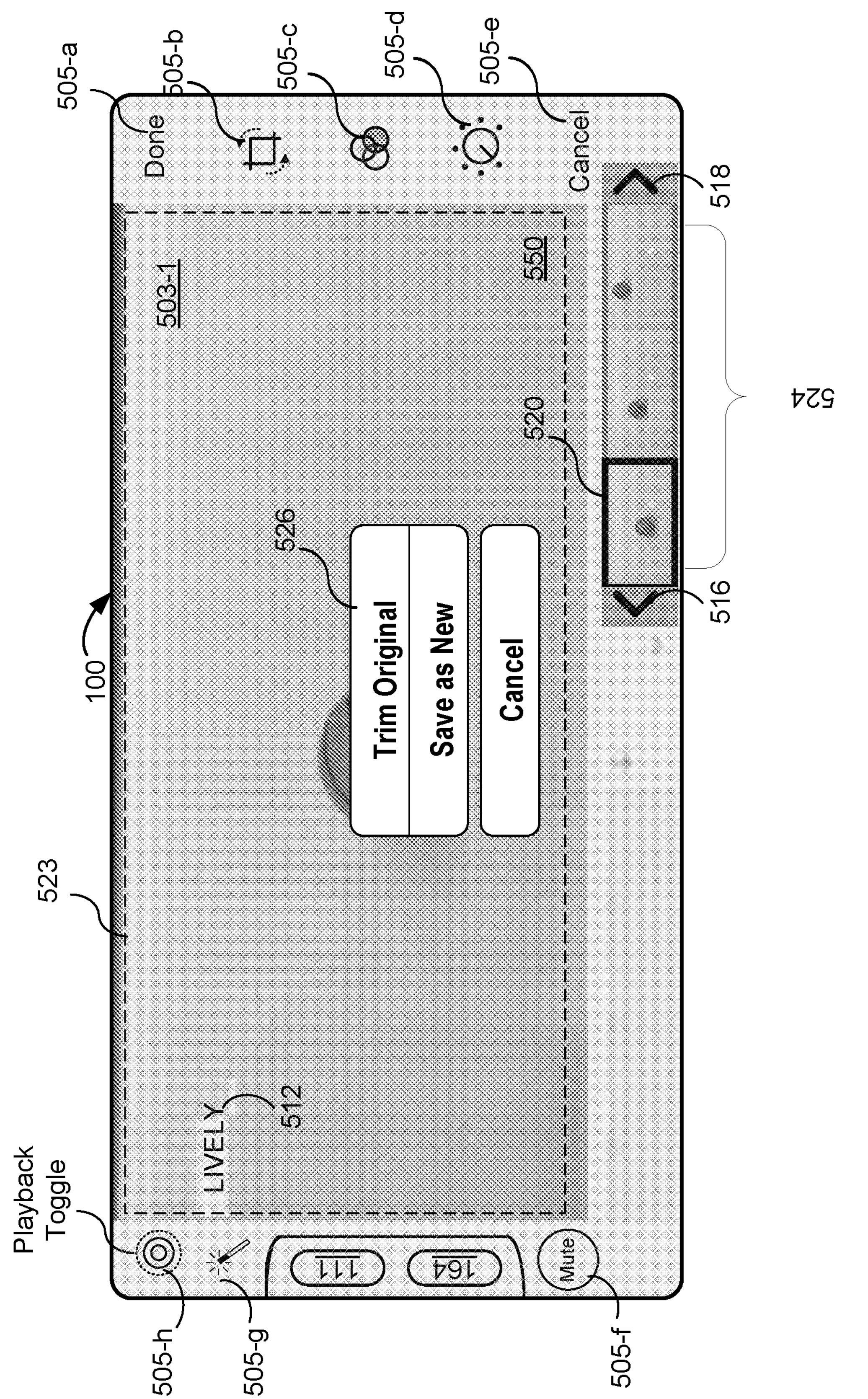
Figure 5A:
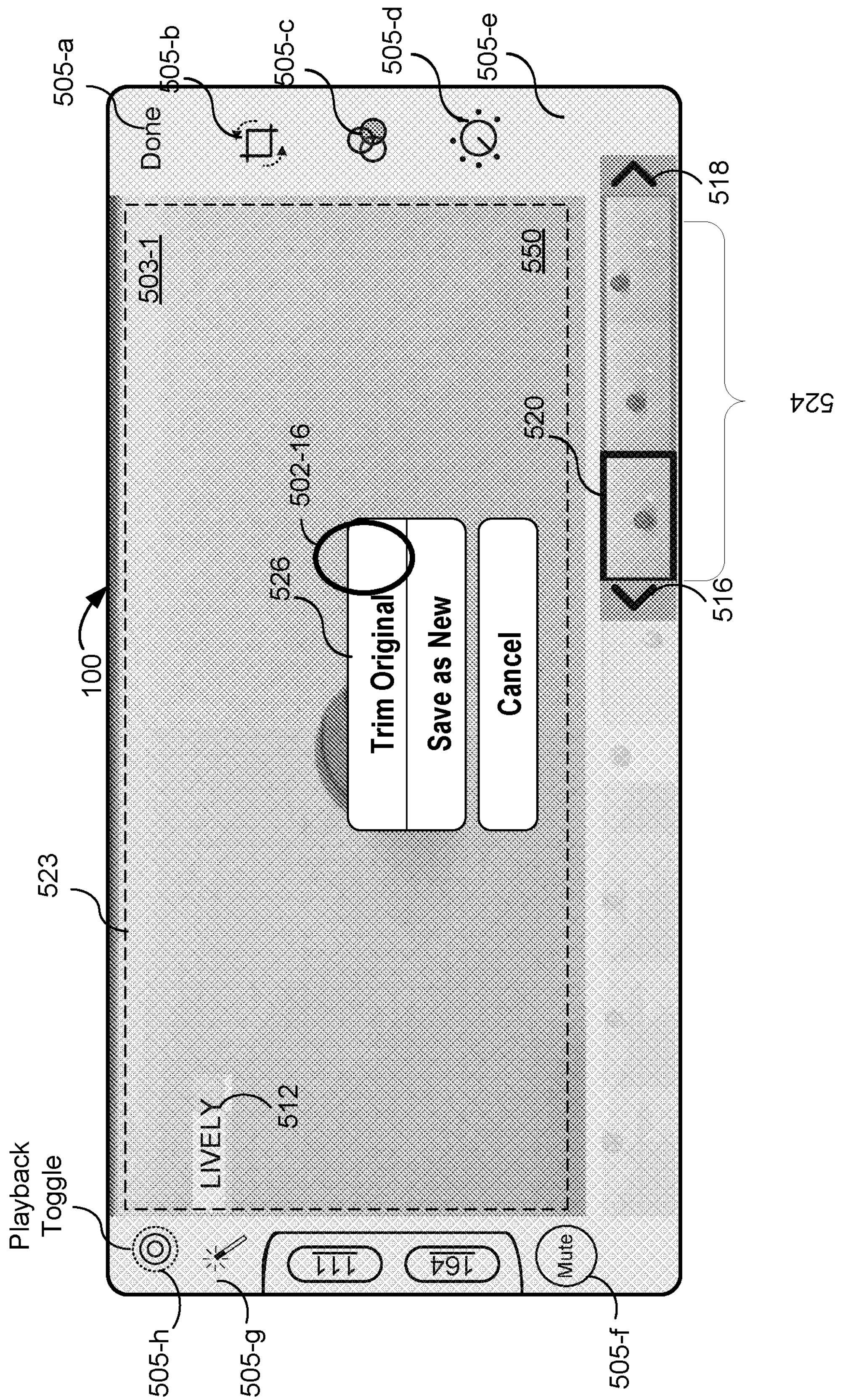
Figure 5A:
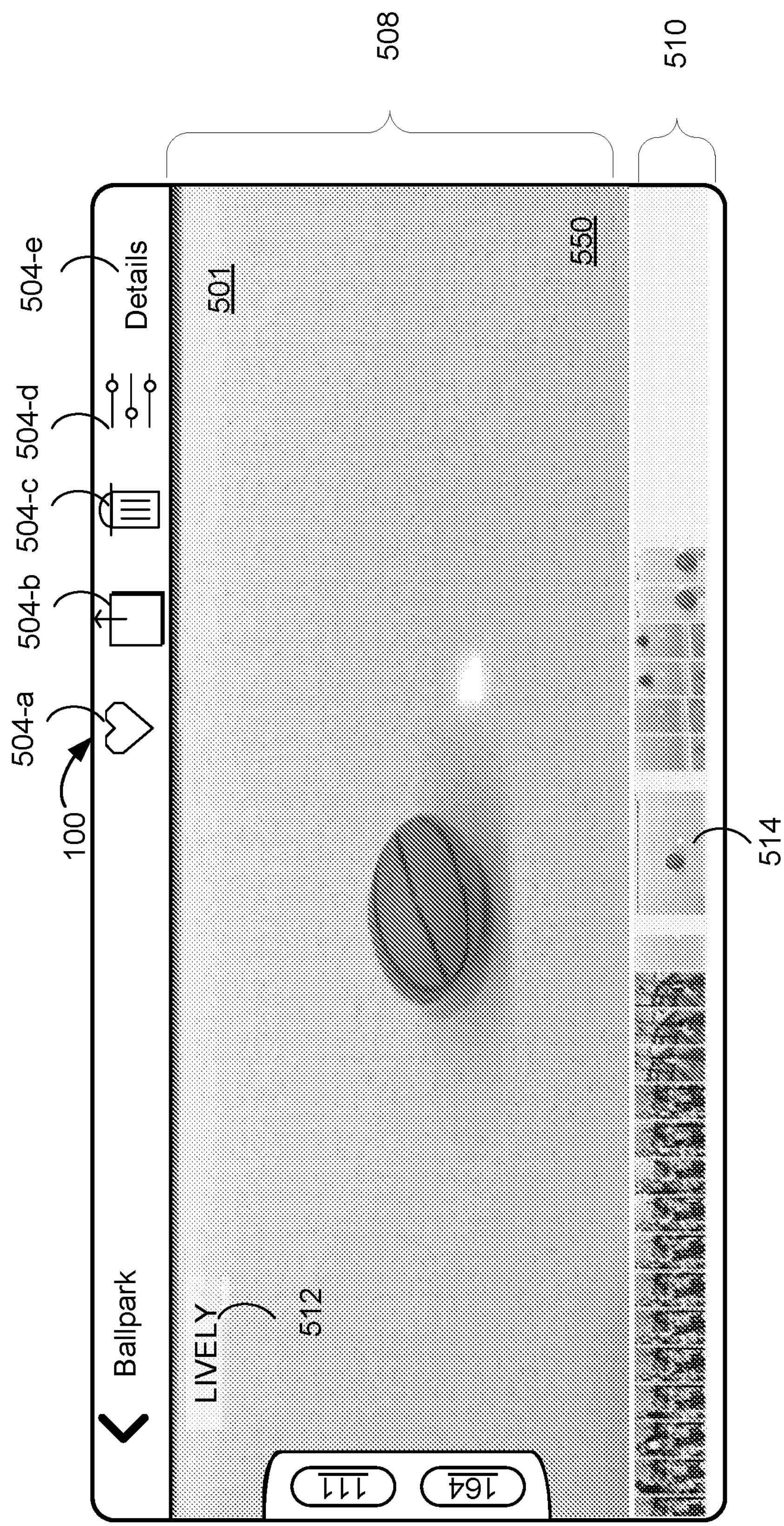
Figure 5A:
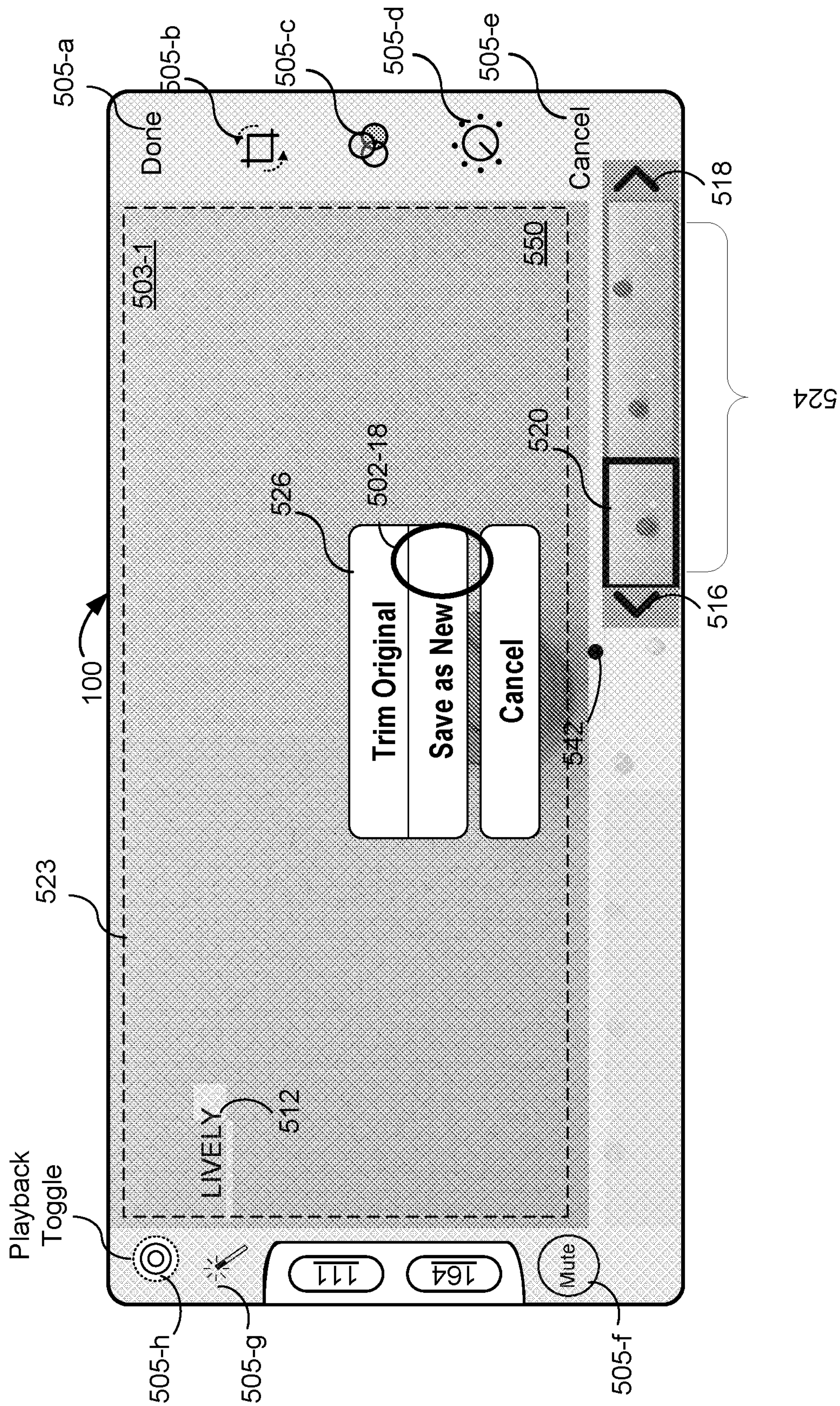
Figure 5A:
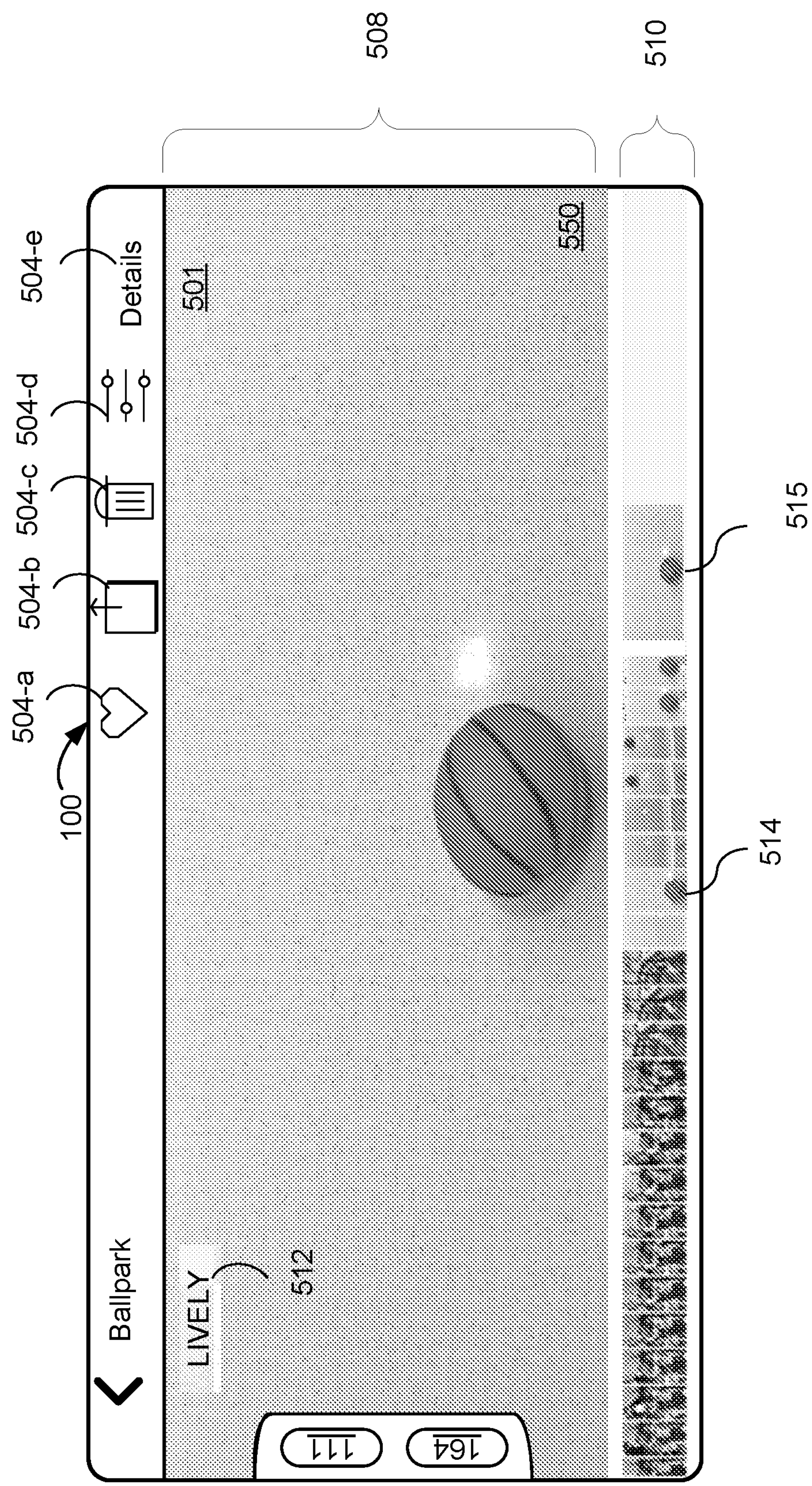
Figure 5A:
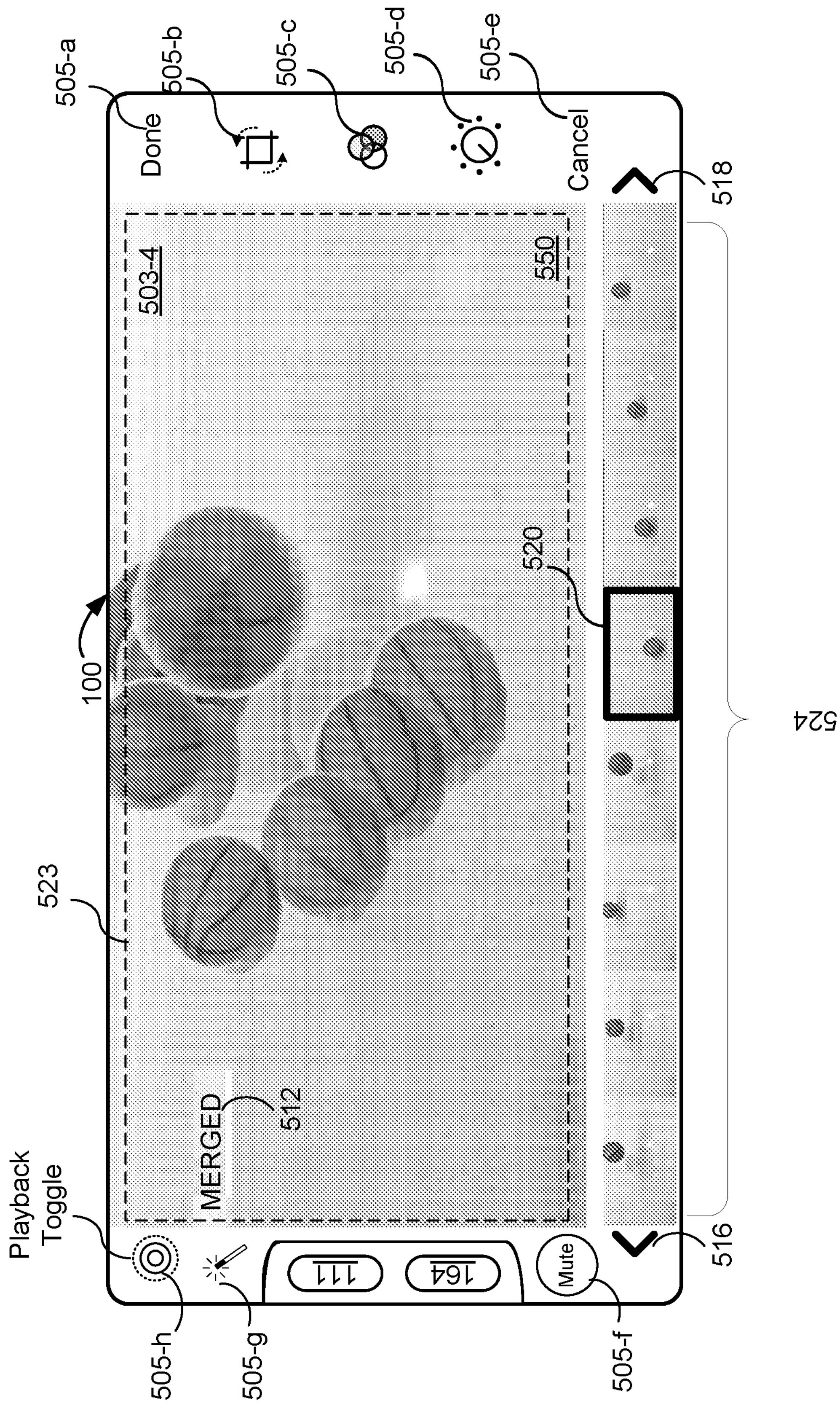
Figure 5A:
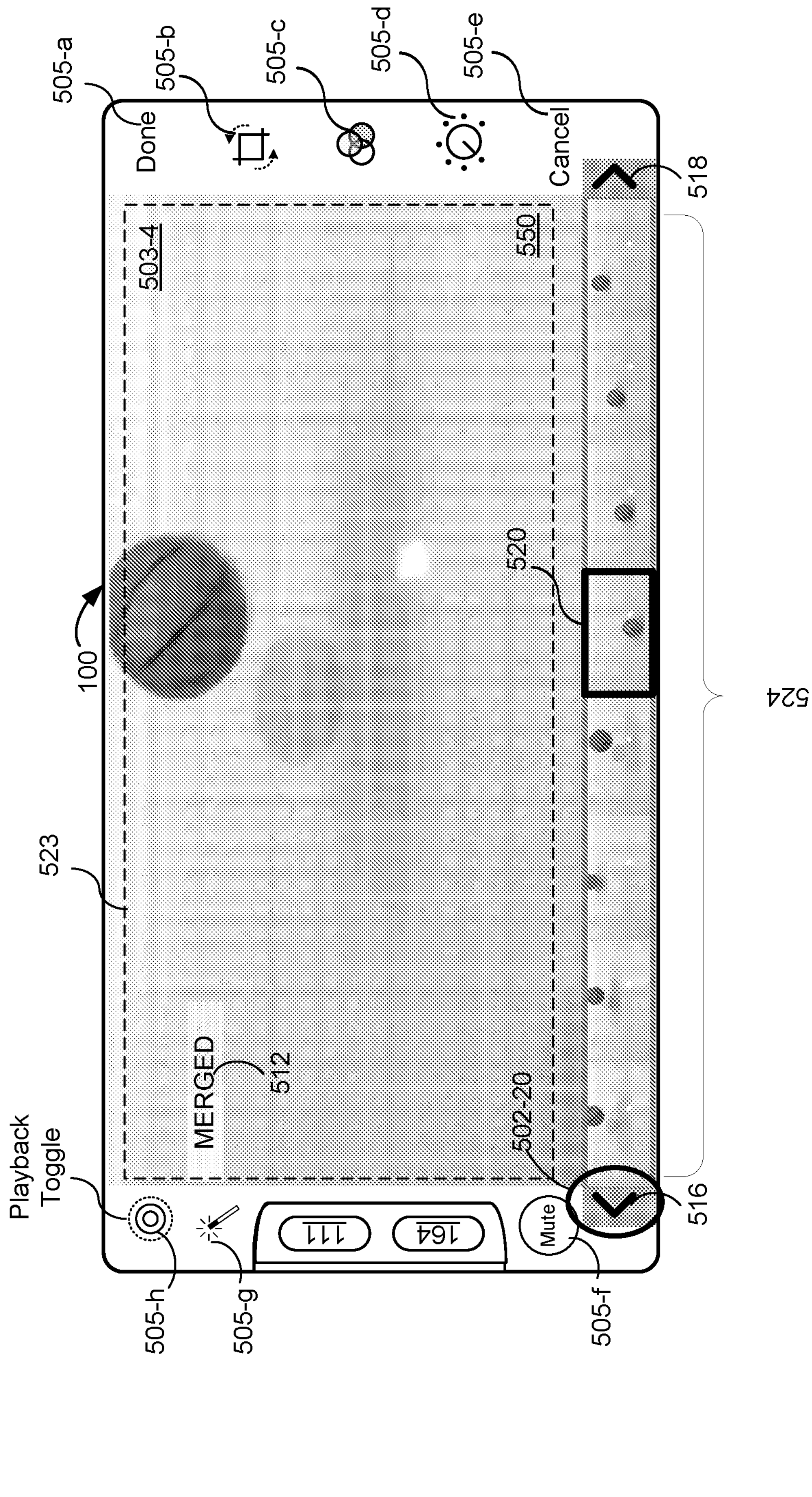
Figure 5A:
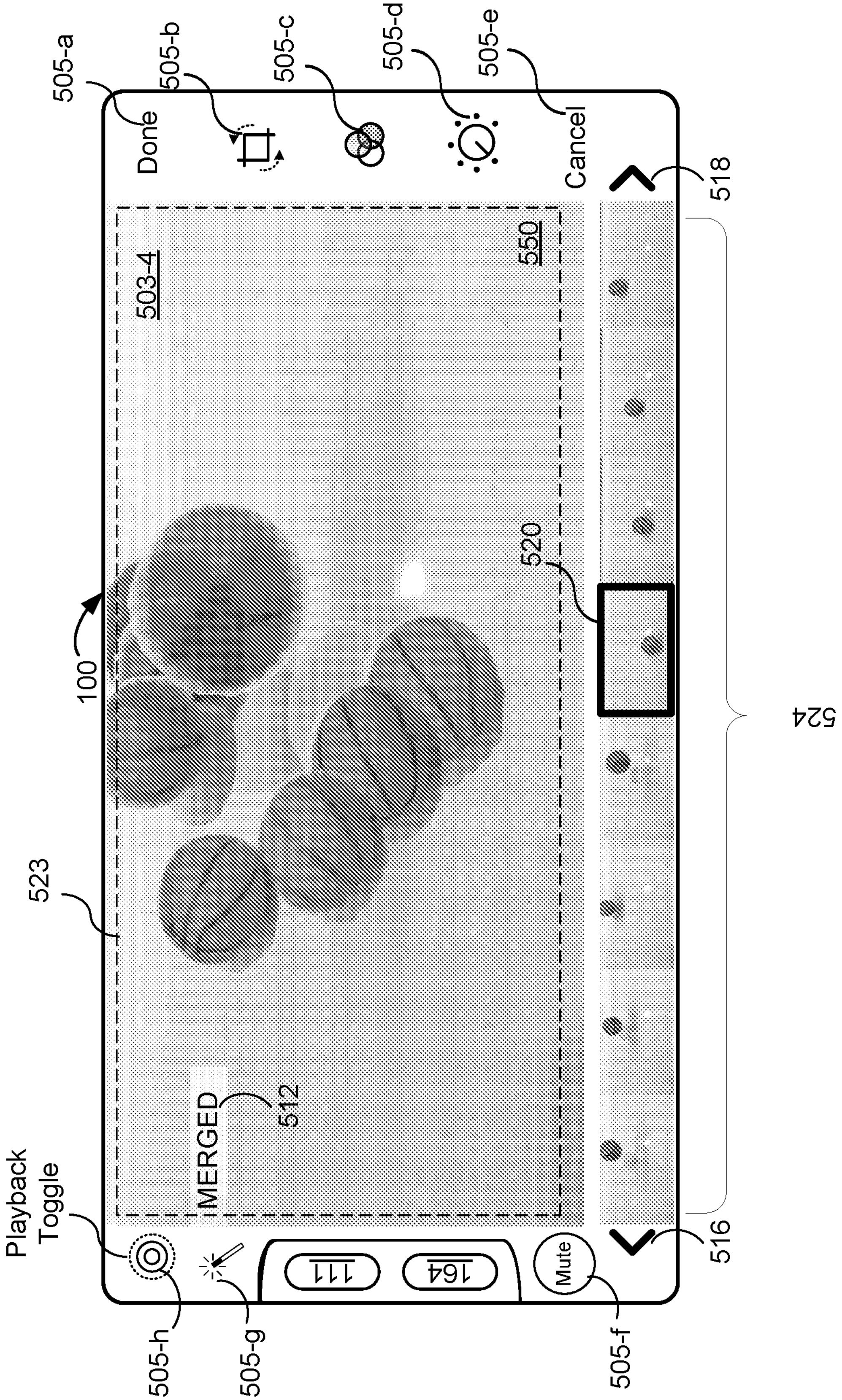
Figure 5A:
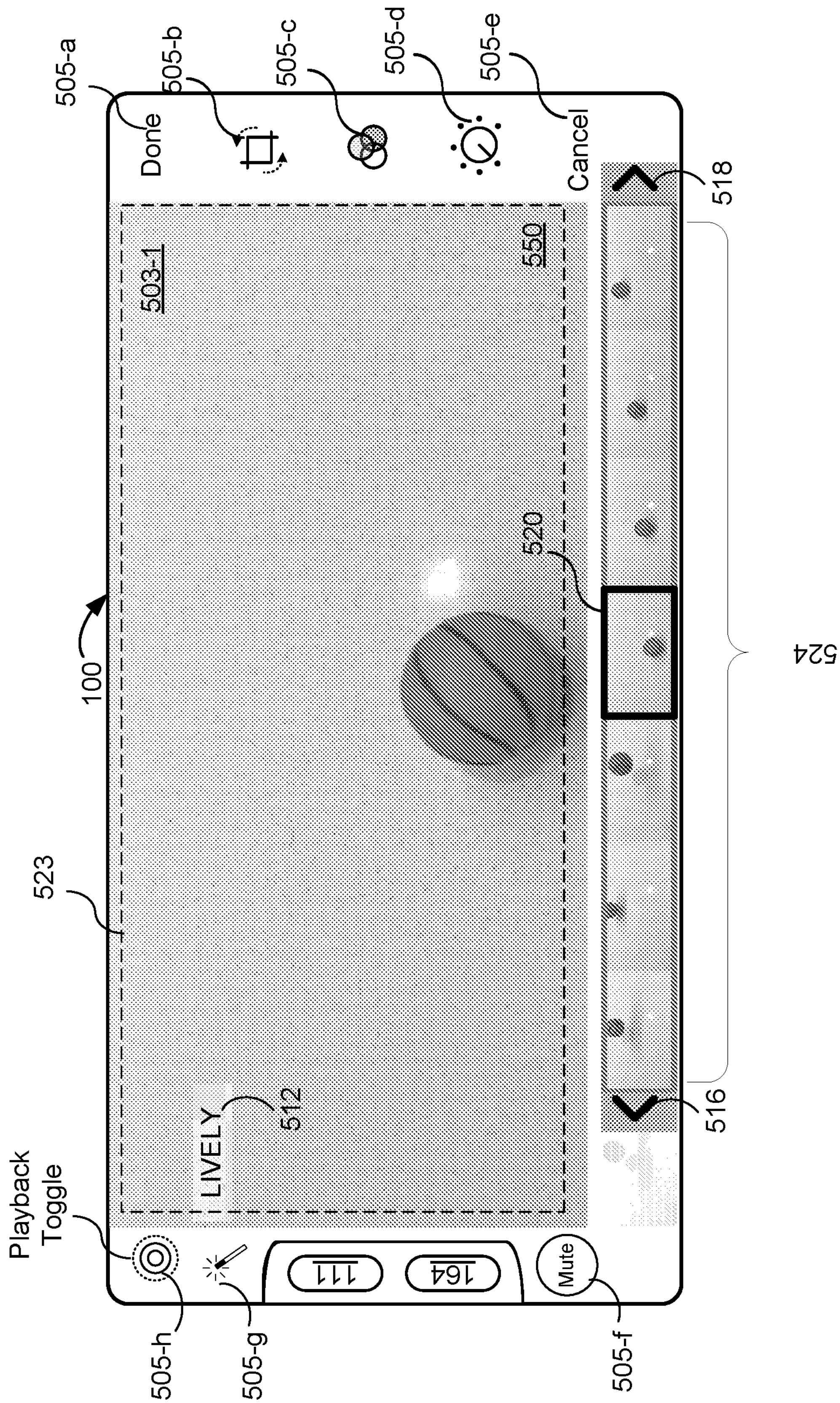
Figure 5A:
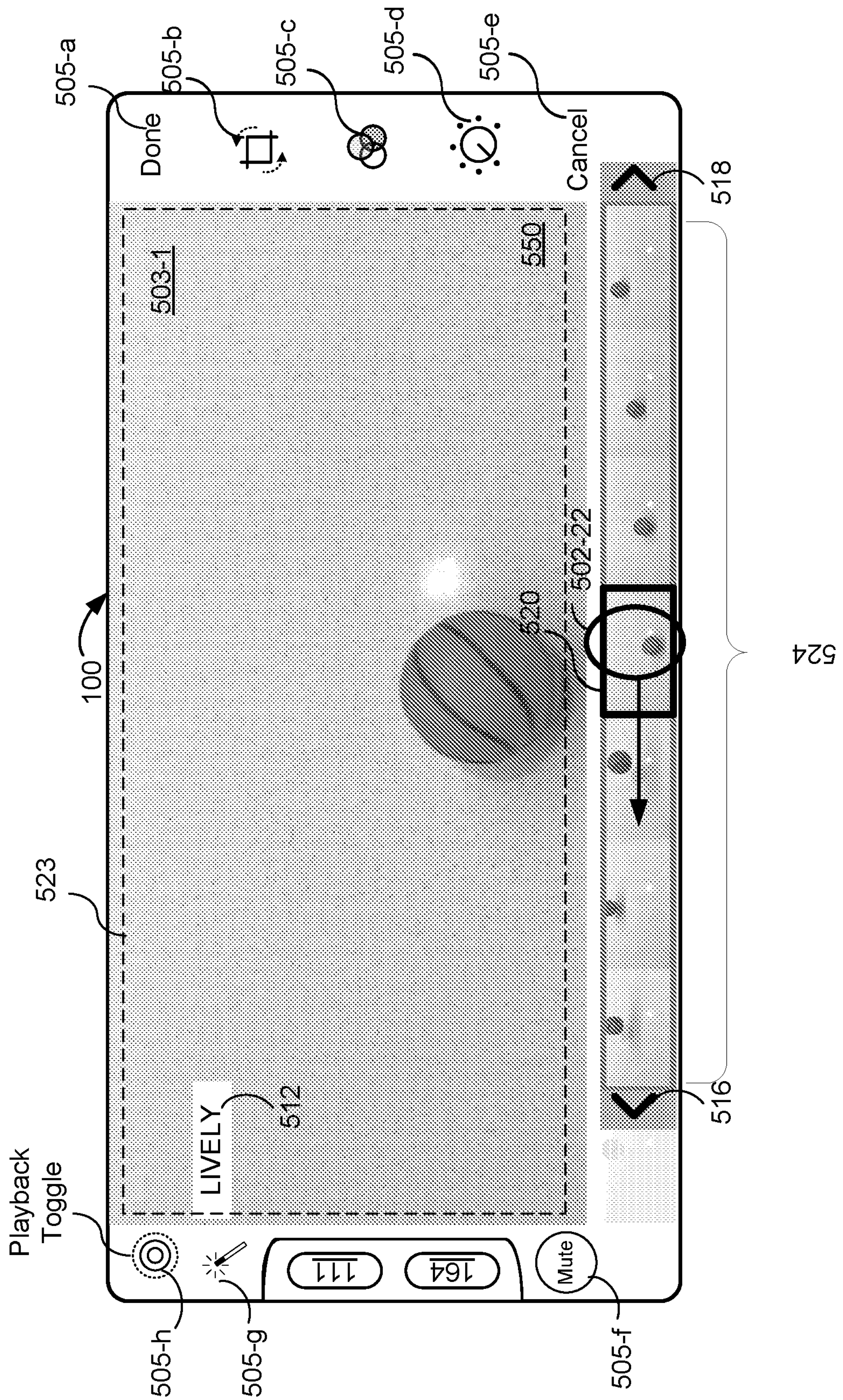
Figure 5A:
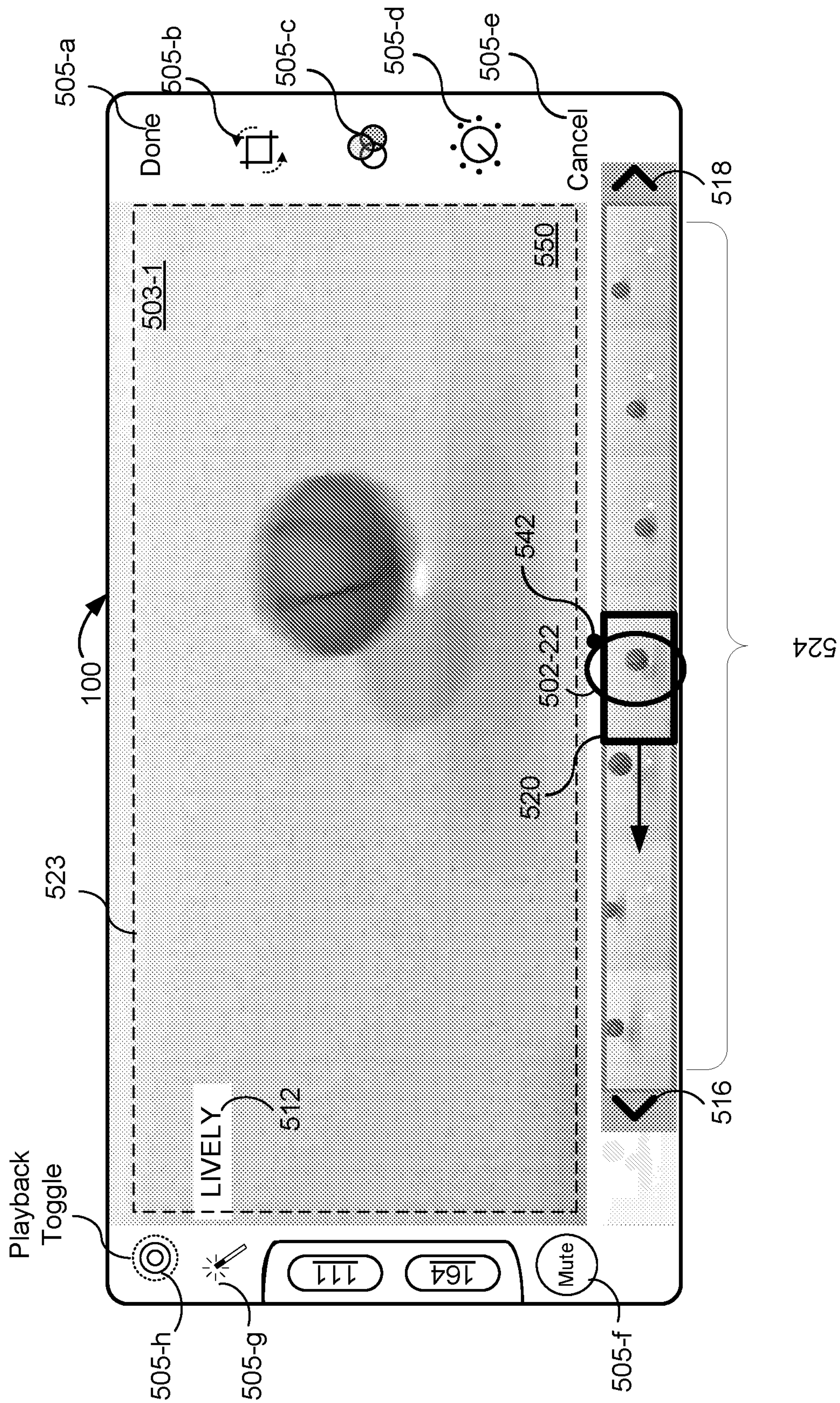
Figure 5A:
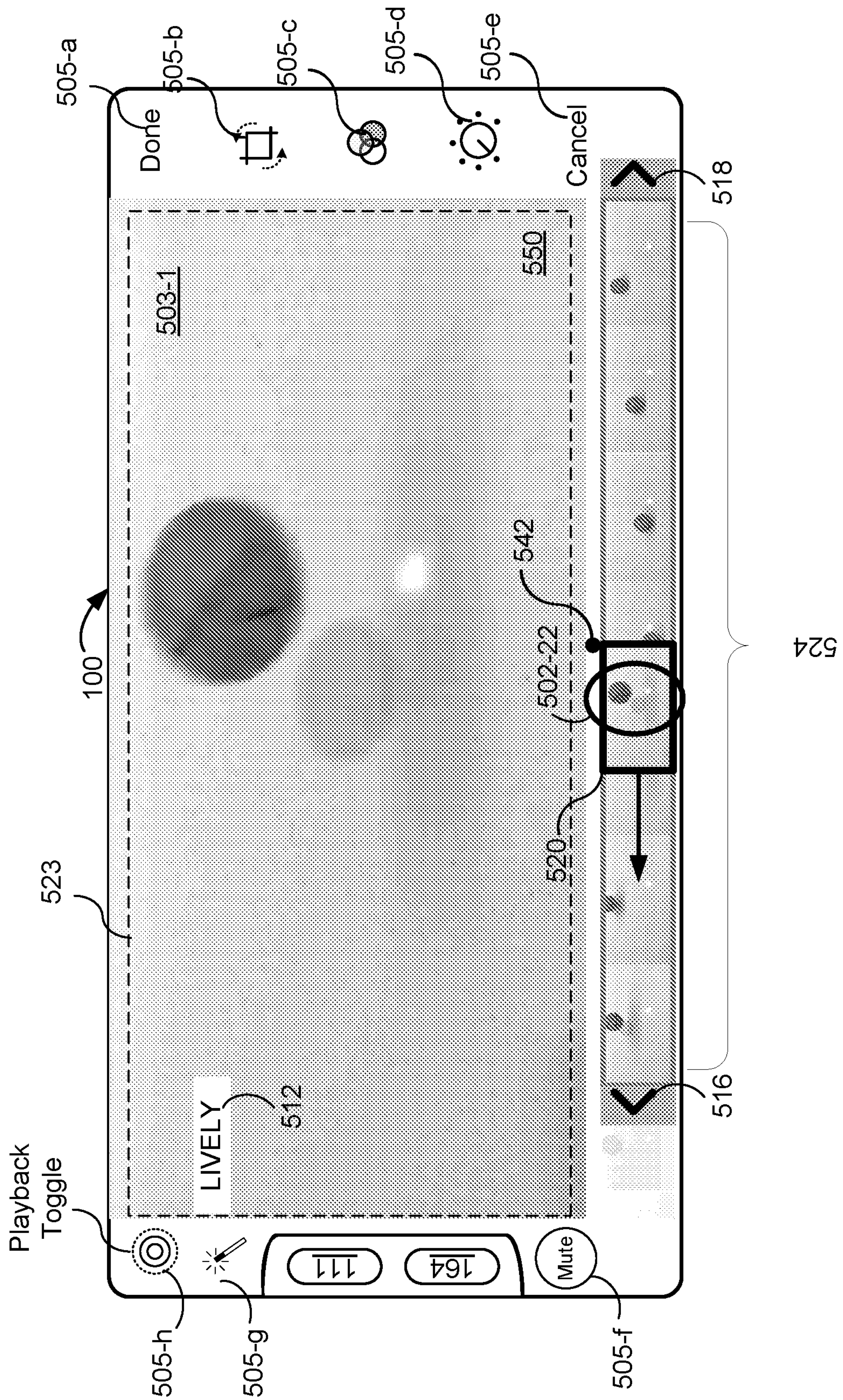
Figure 5A:
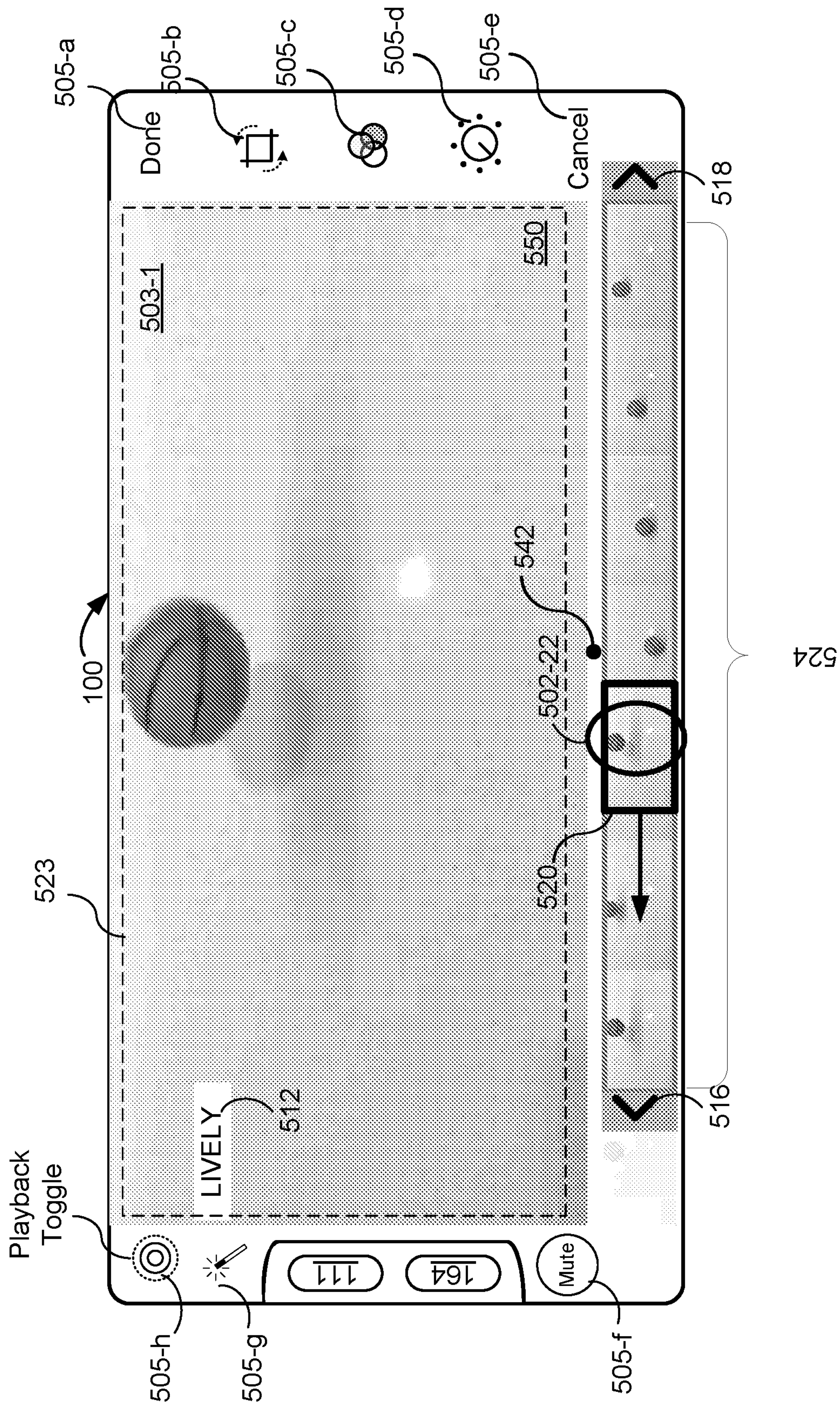
Figure 5A:
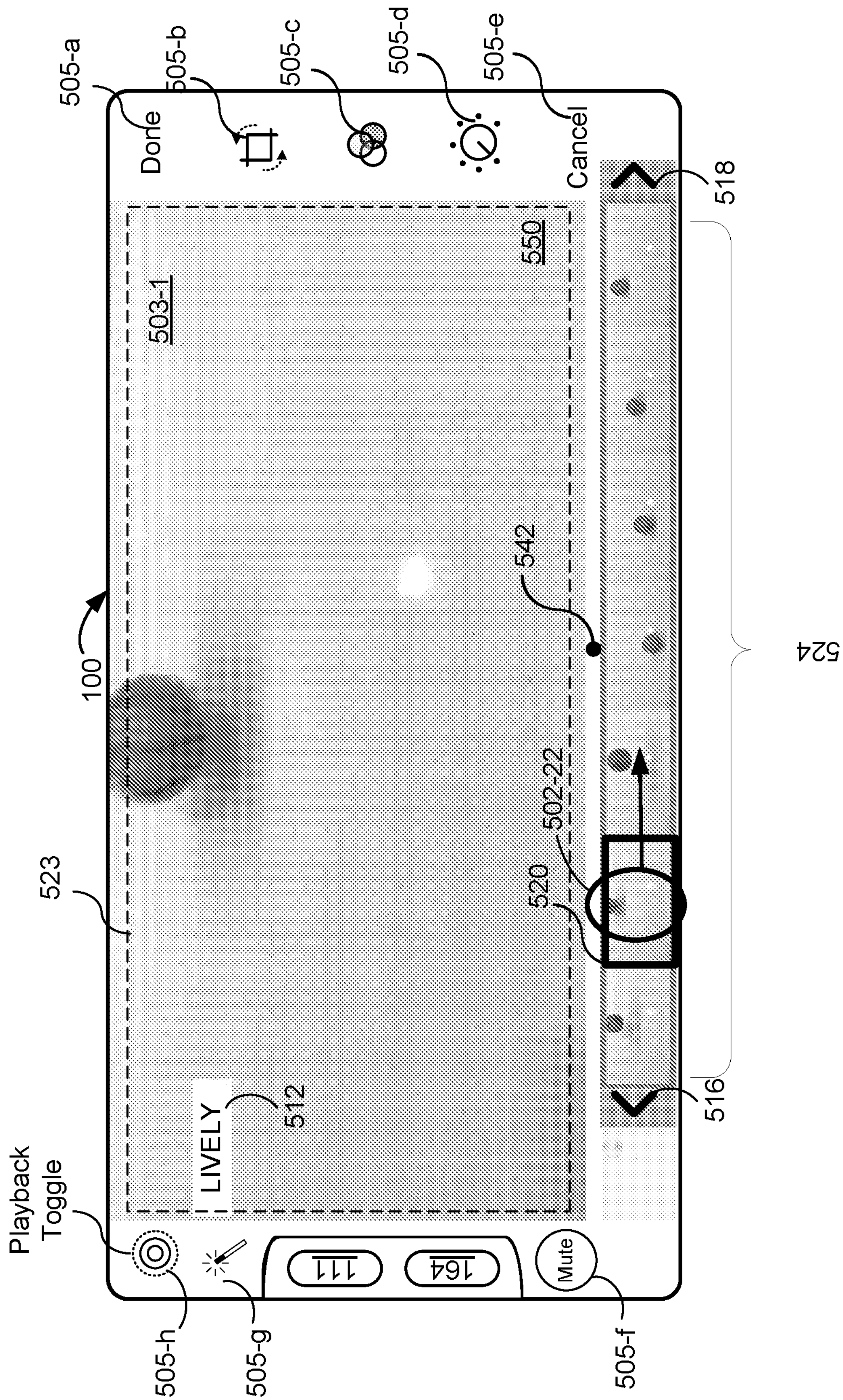
Figure 5A:
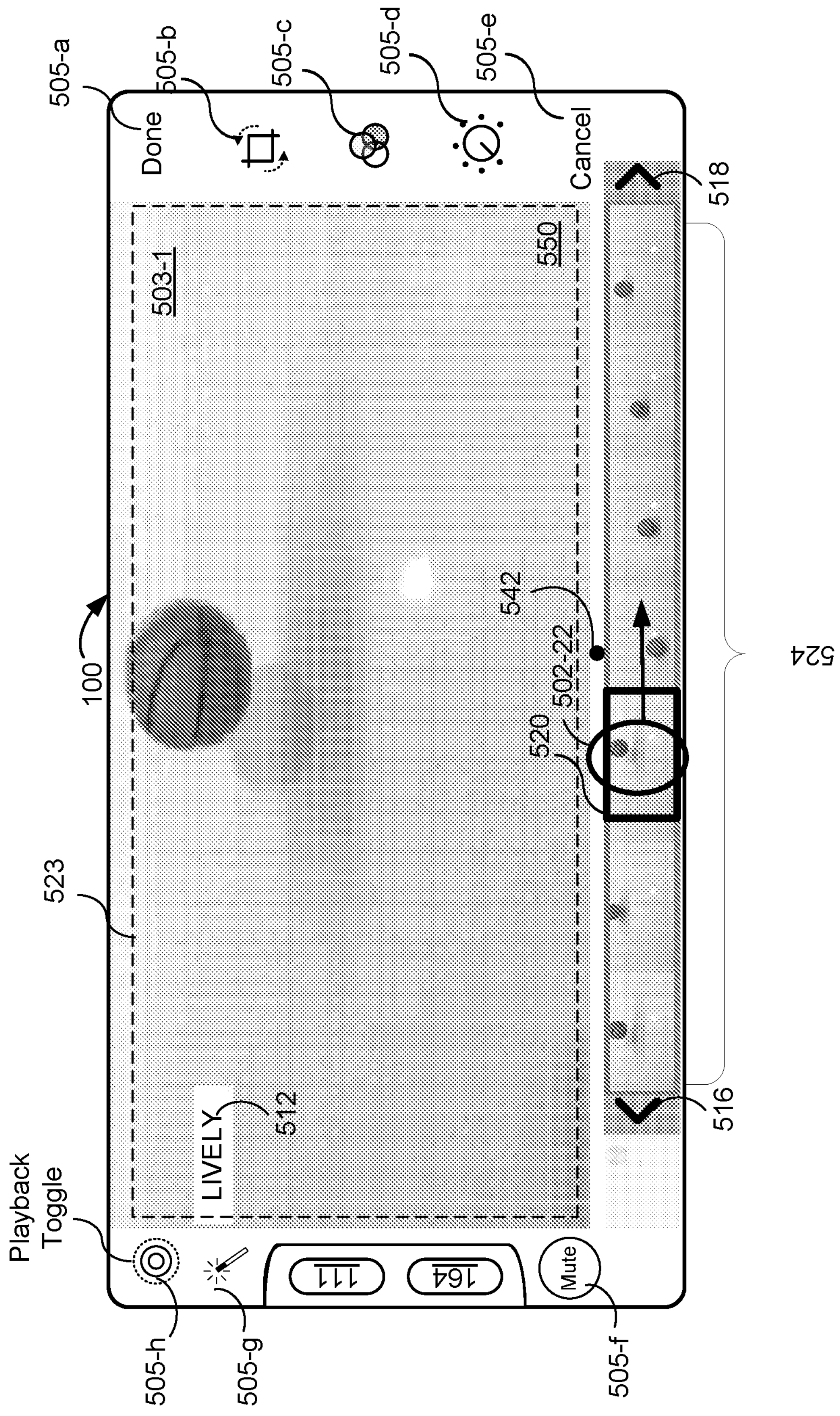
Figure 5A:
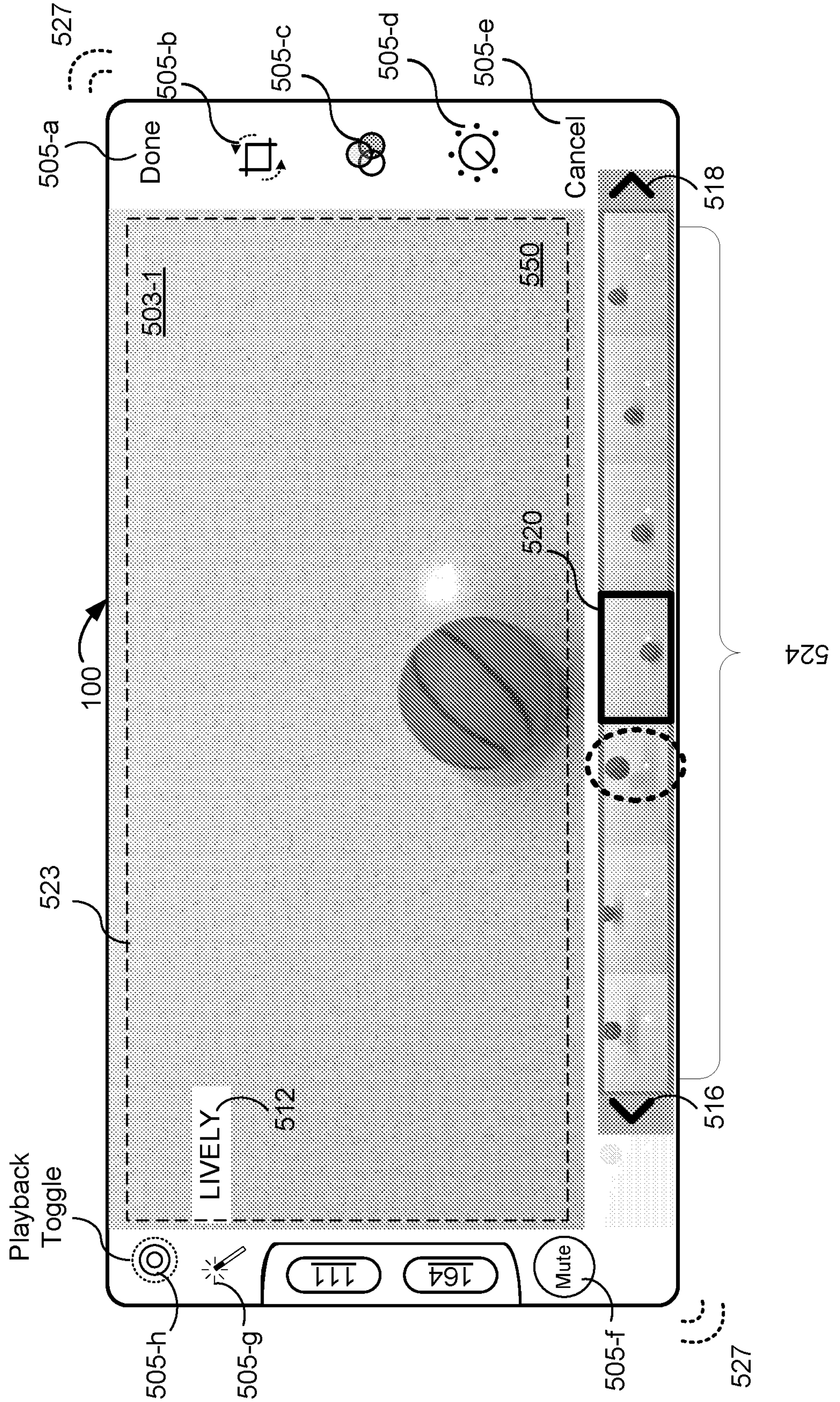
Figure 5A:
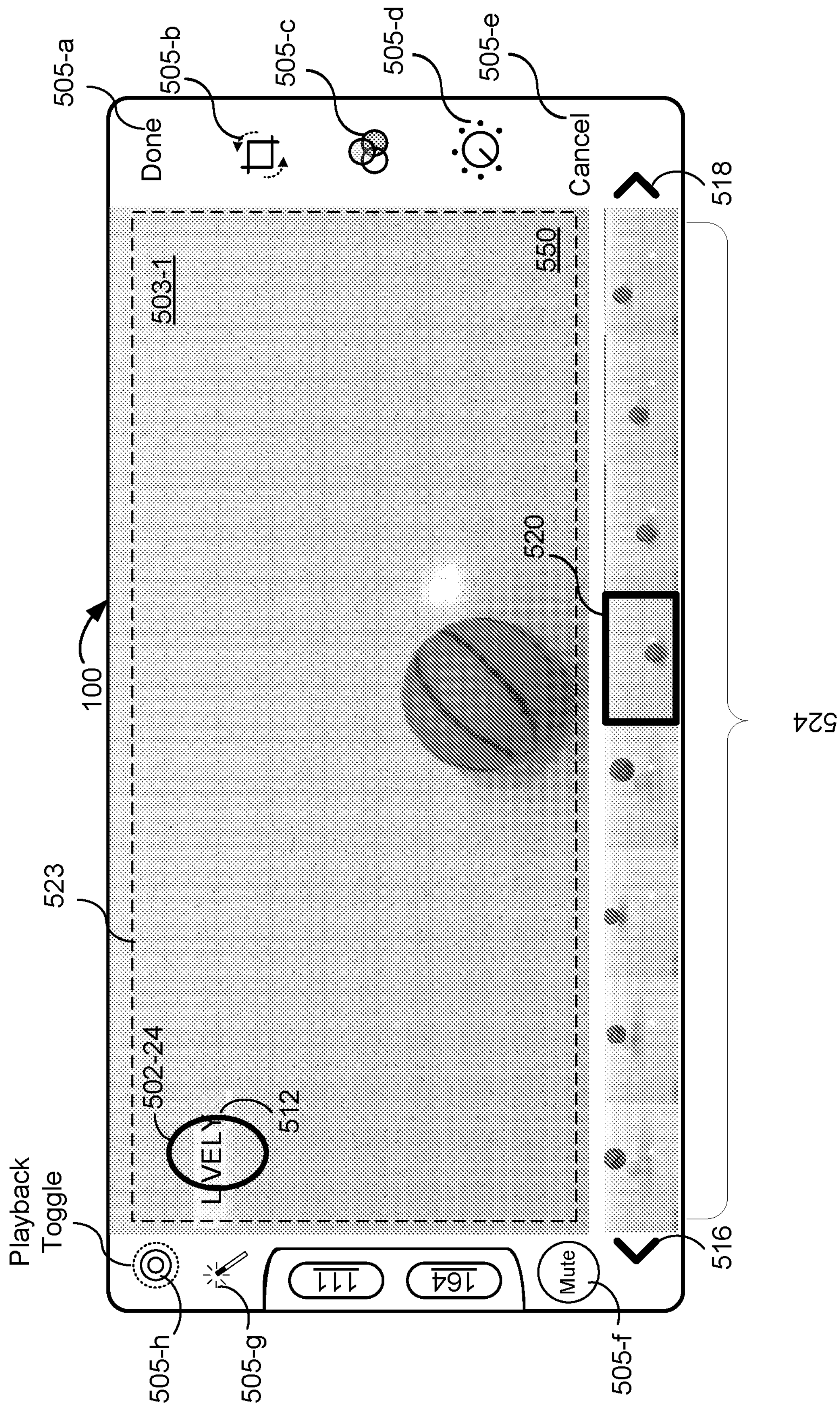
Figure 5A:
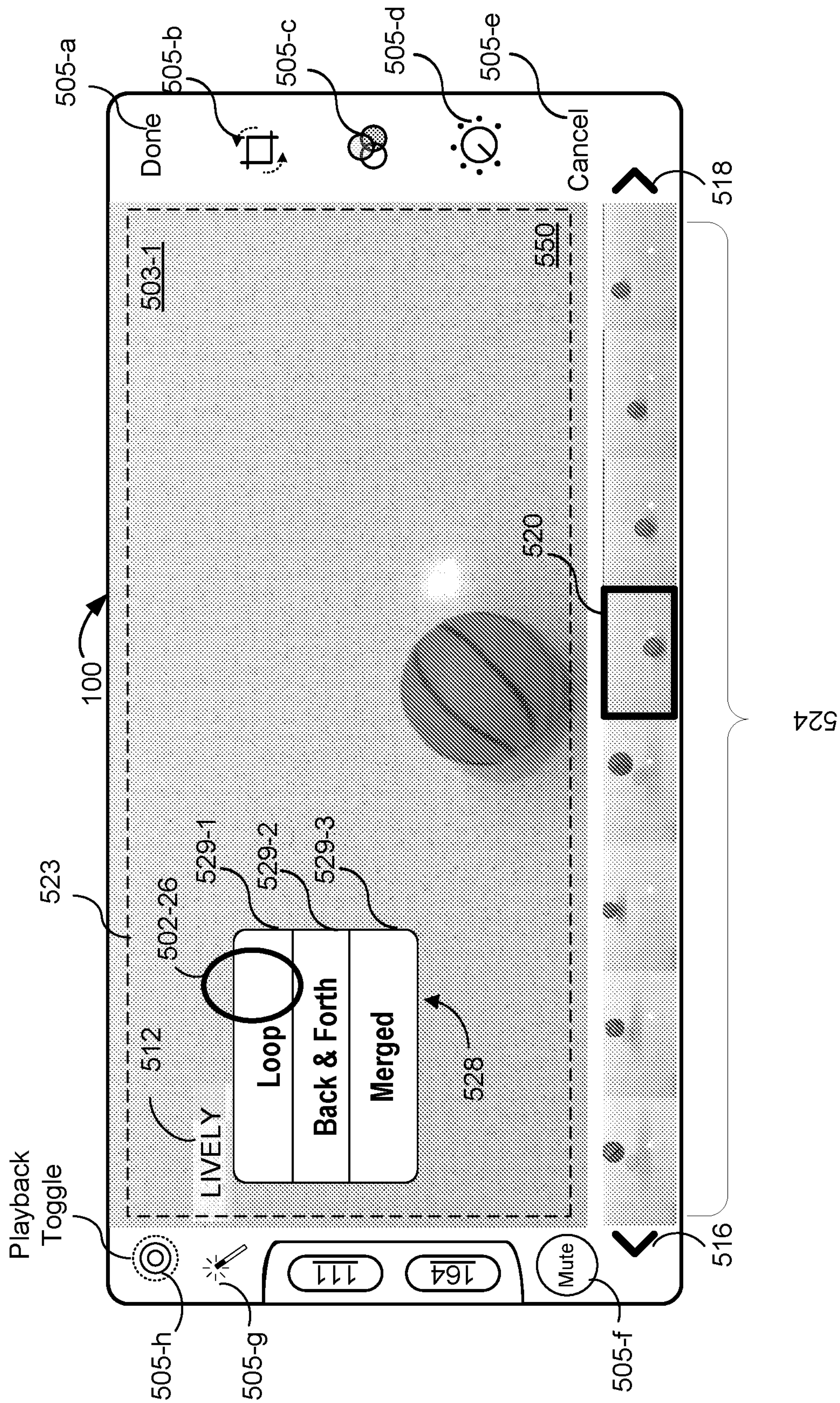
Figure 5B:
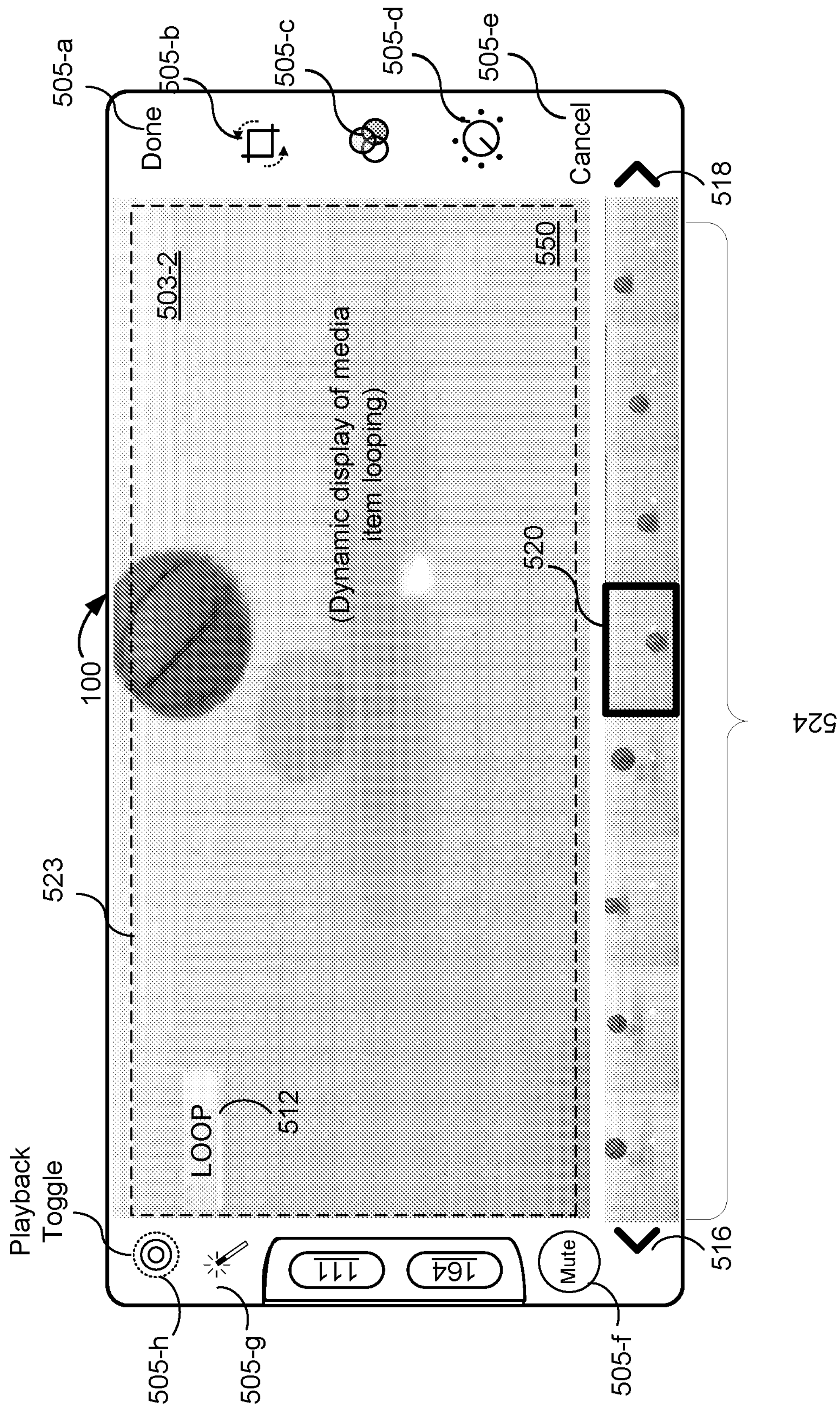
Figure 5B:
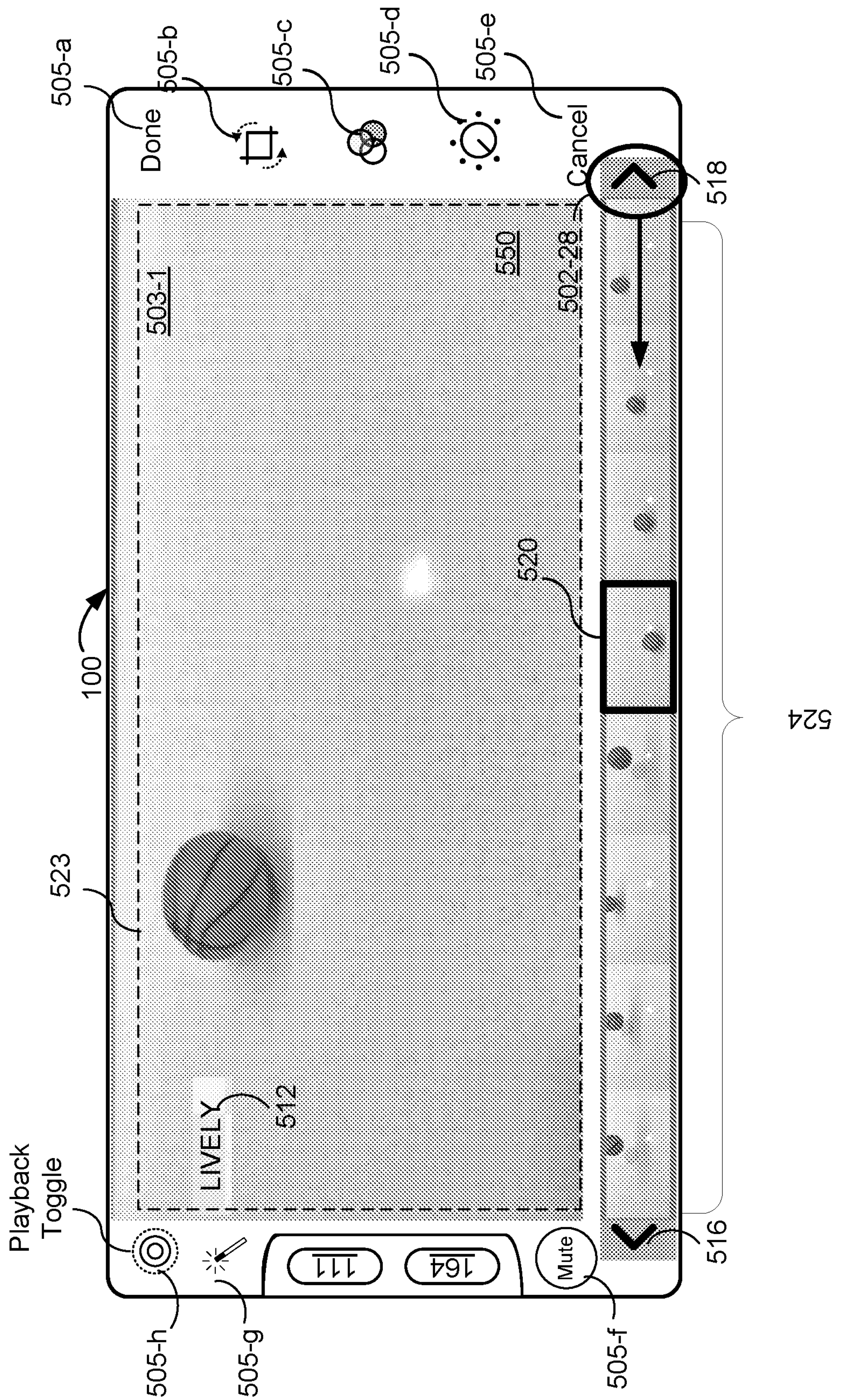
Figure 5B:
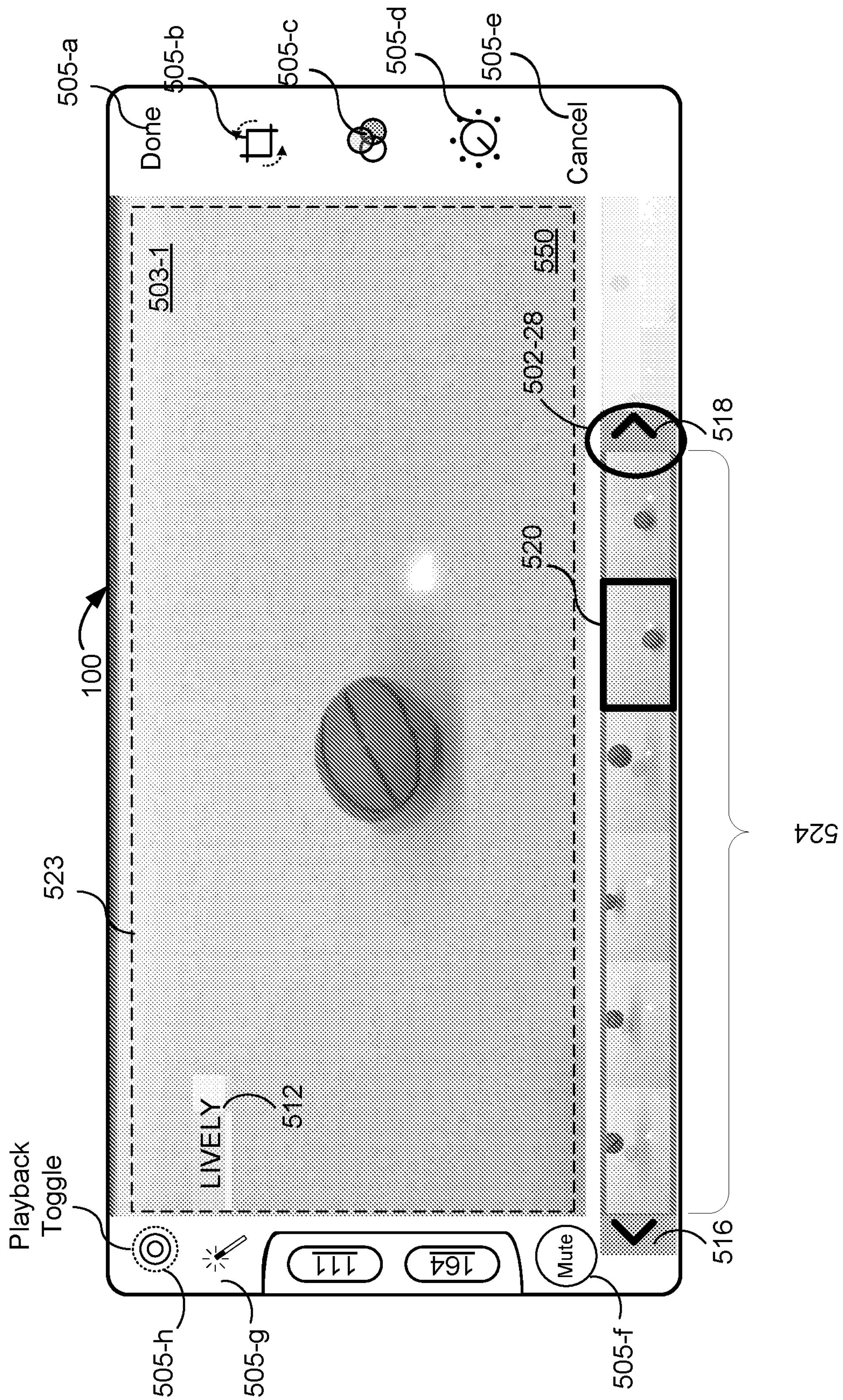
Figure 5B:
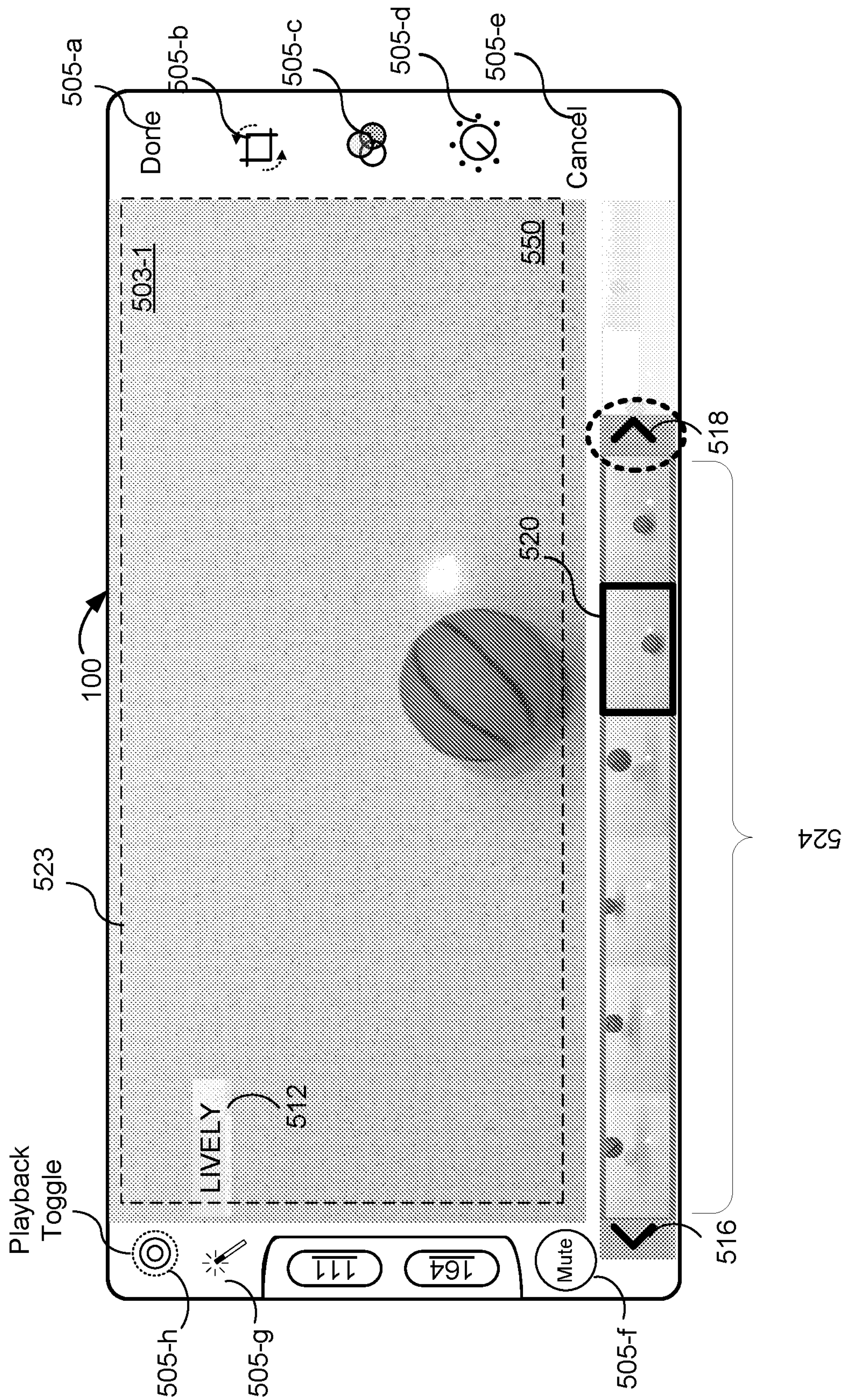
Figure 5B:
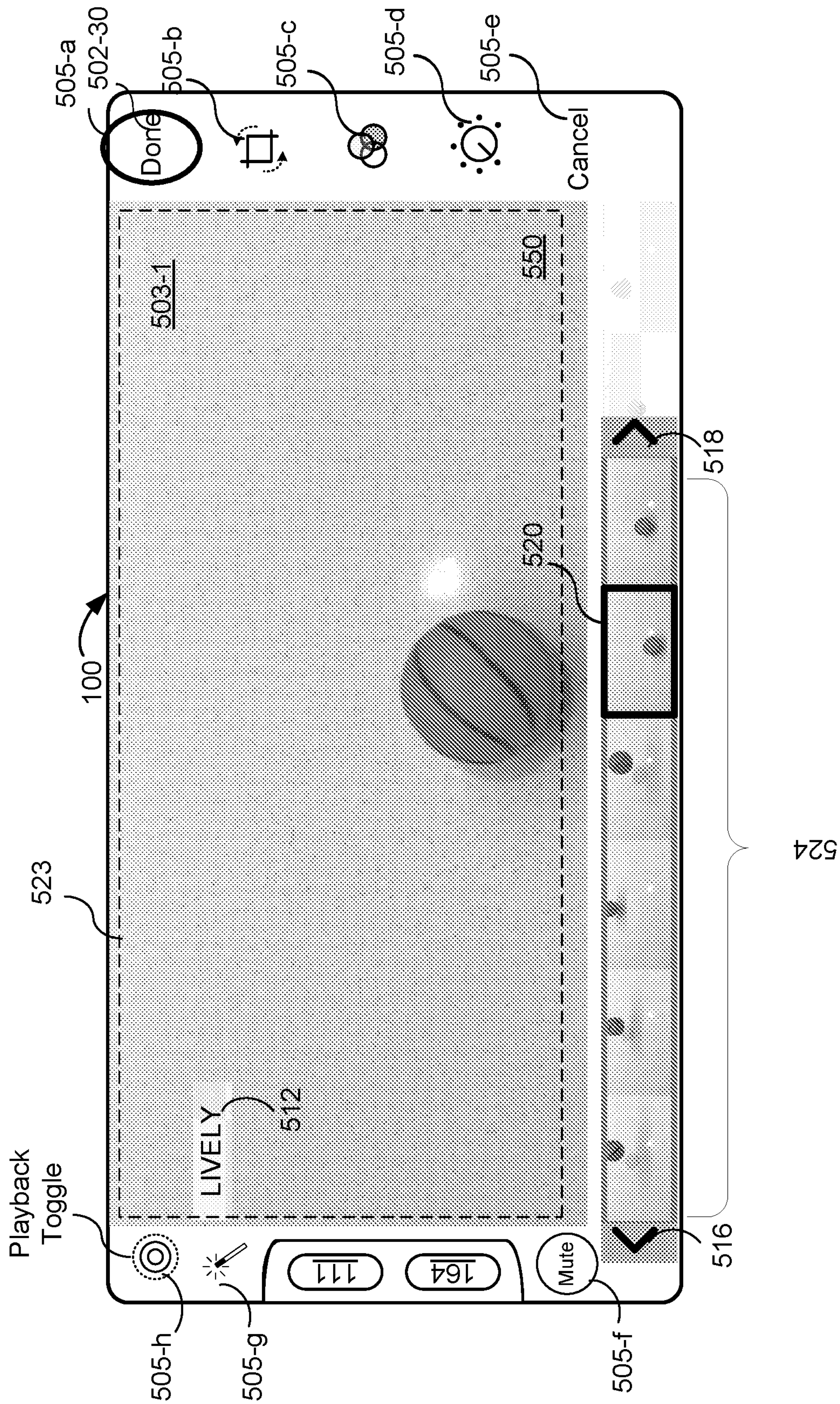
Figure 5B:
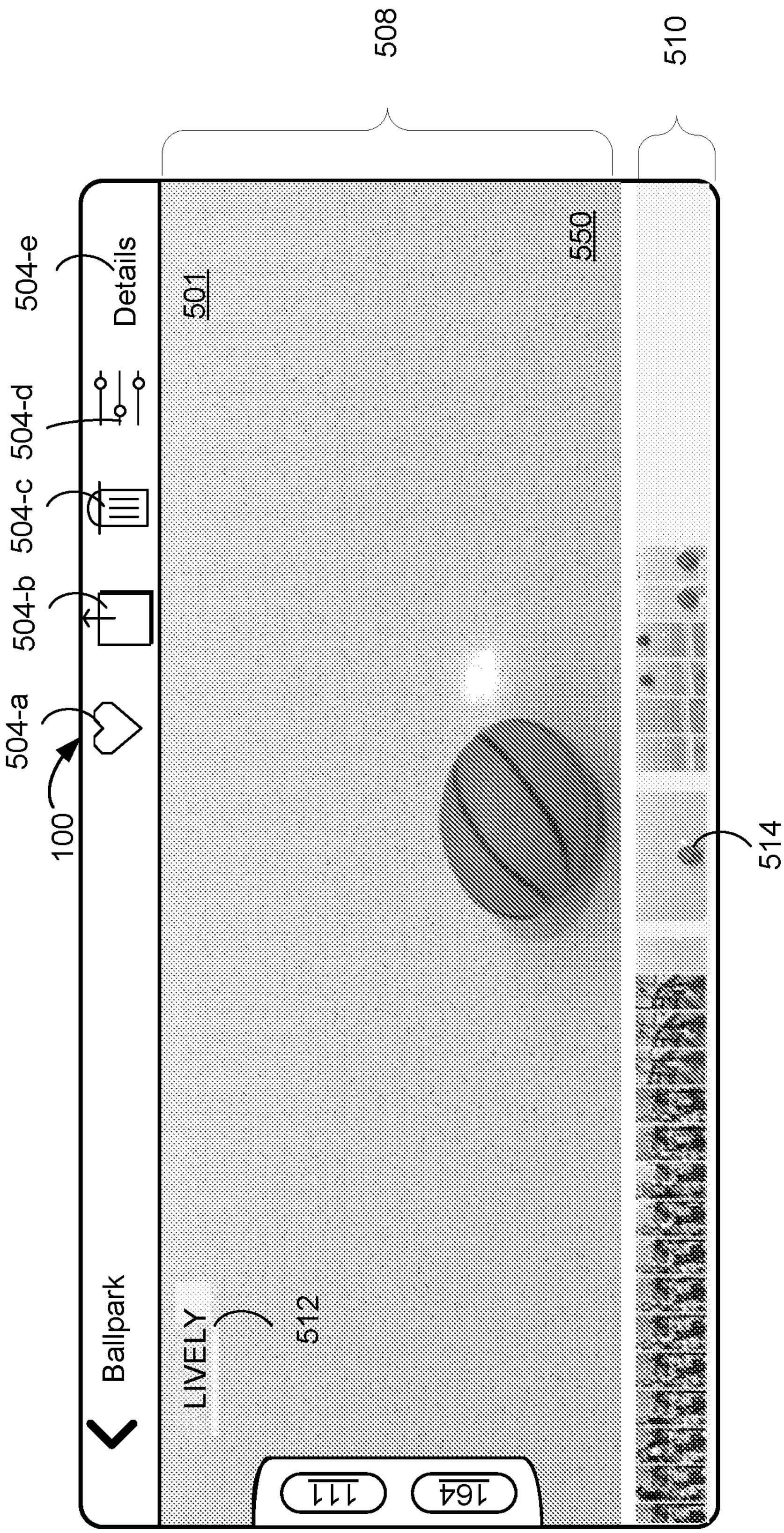
Figure 5B:
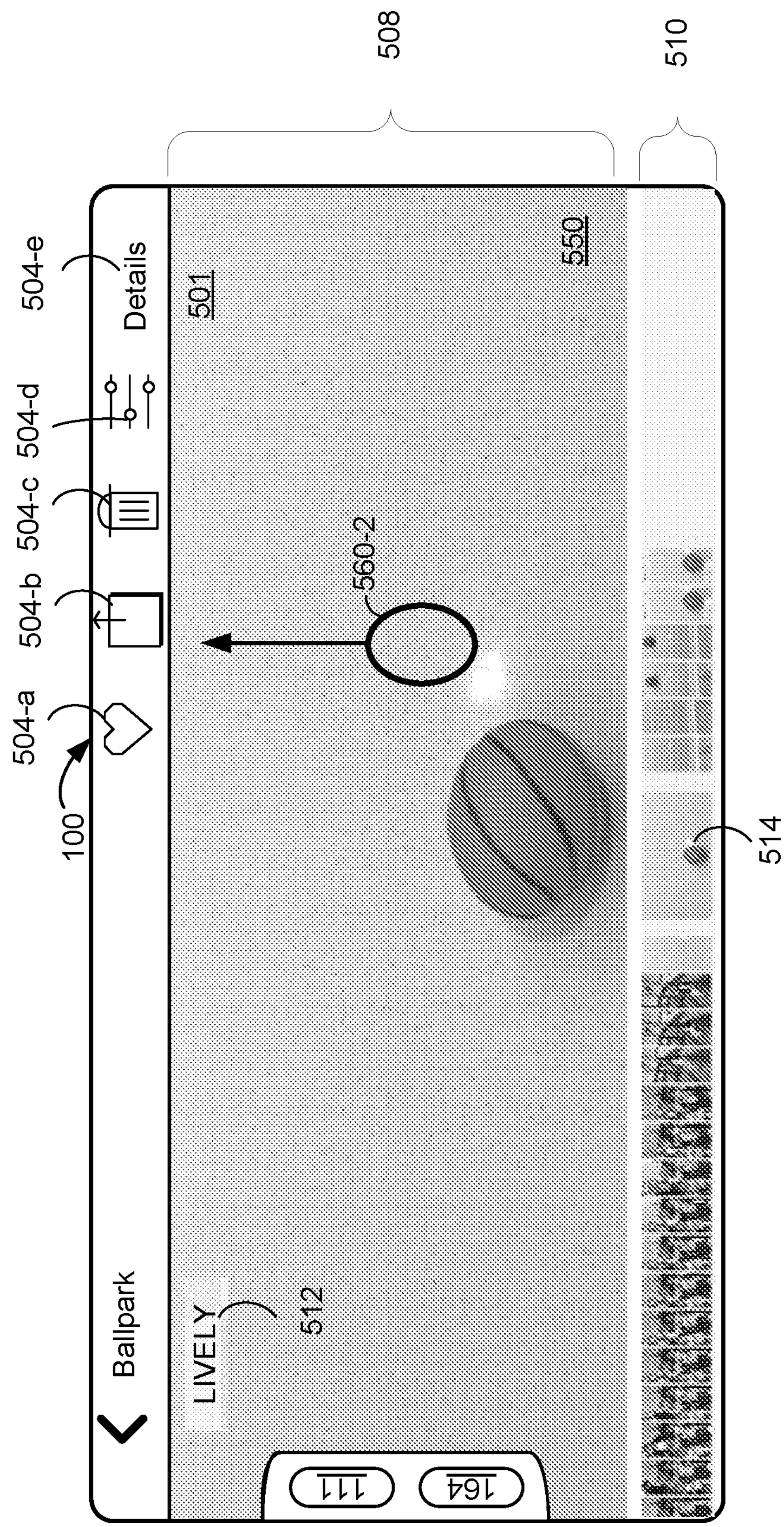
Figure 5B:
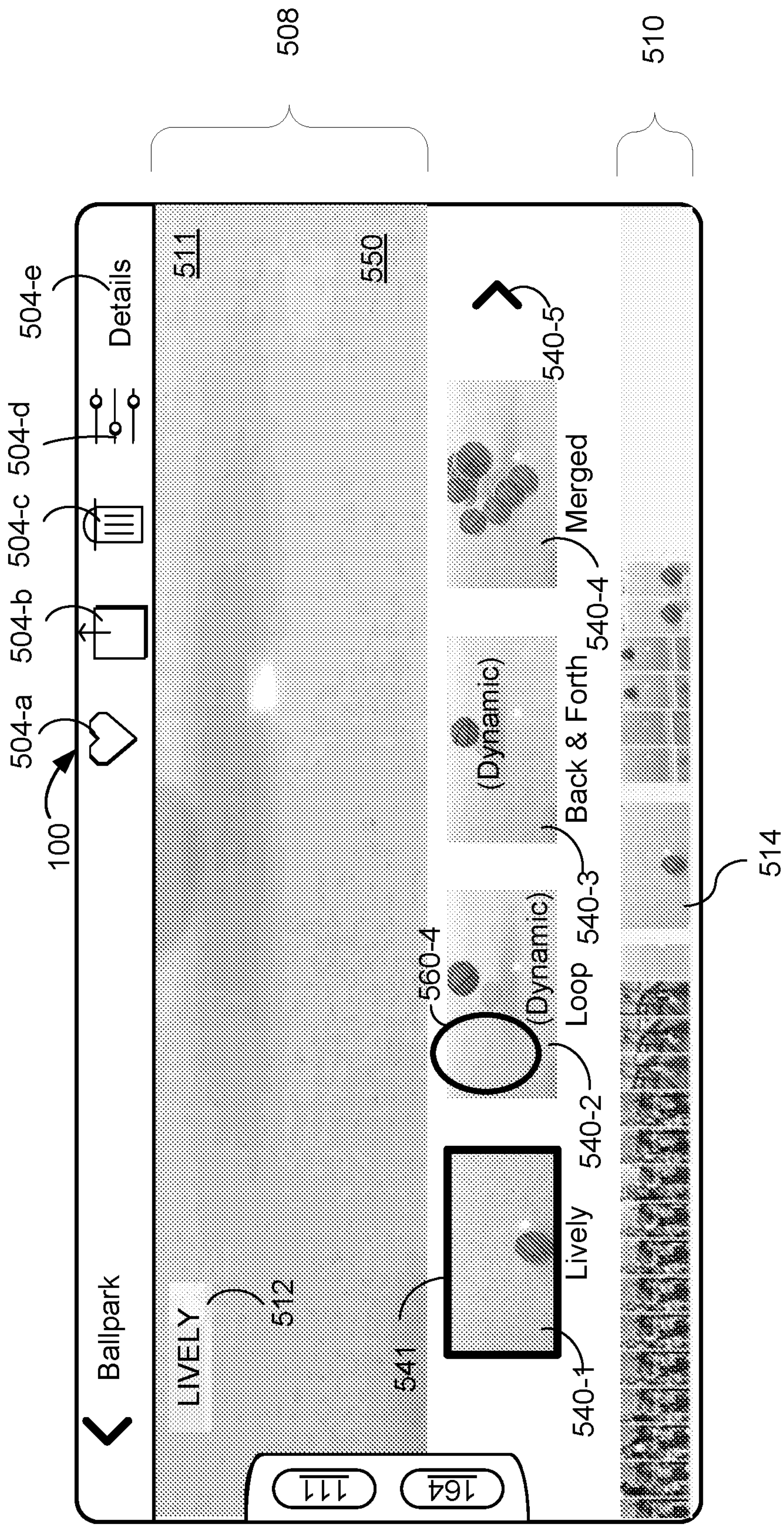
Figure 5B:
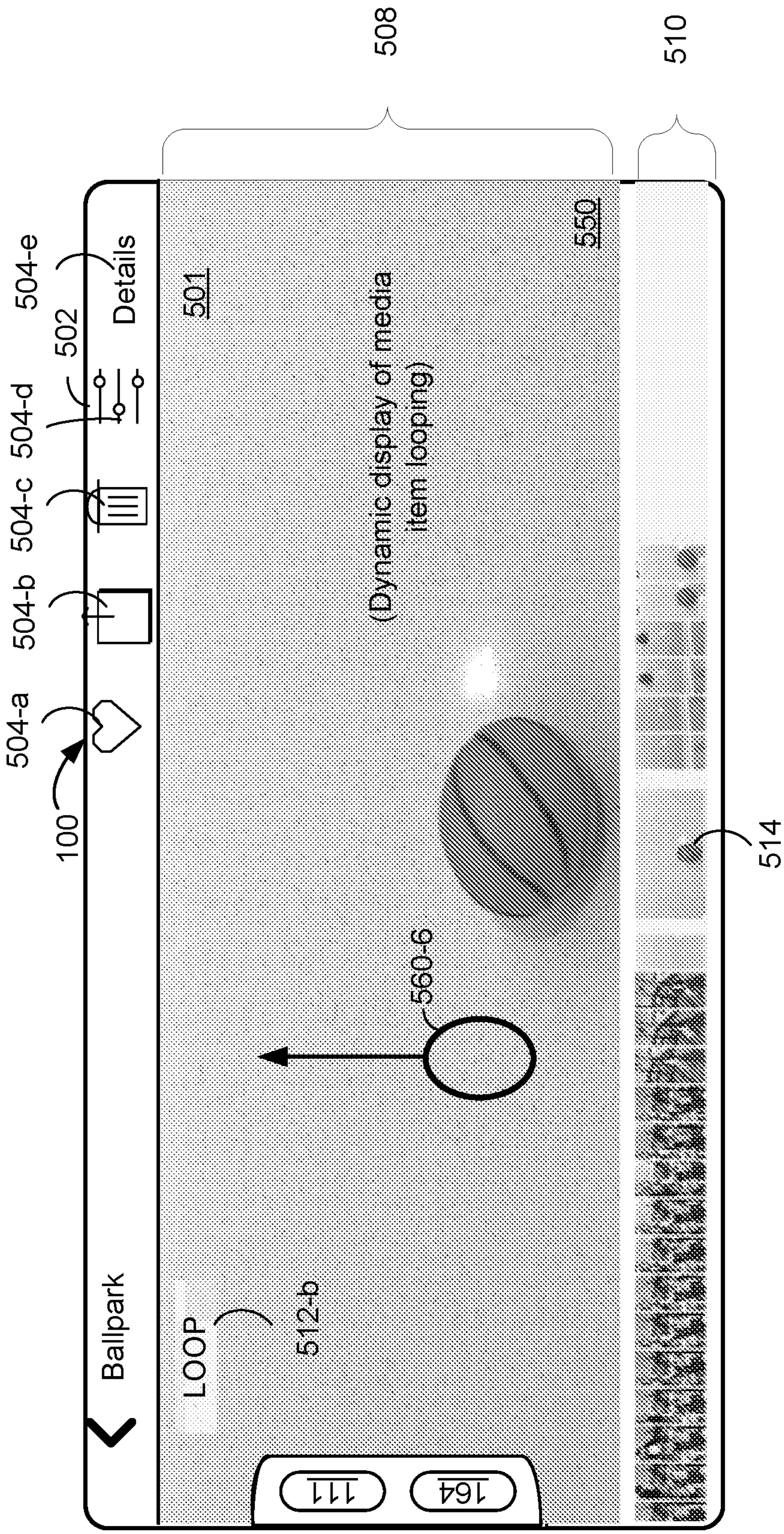
Figure 5B:
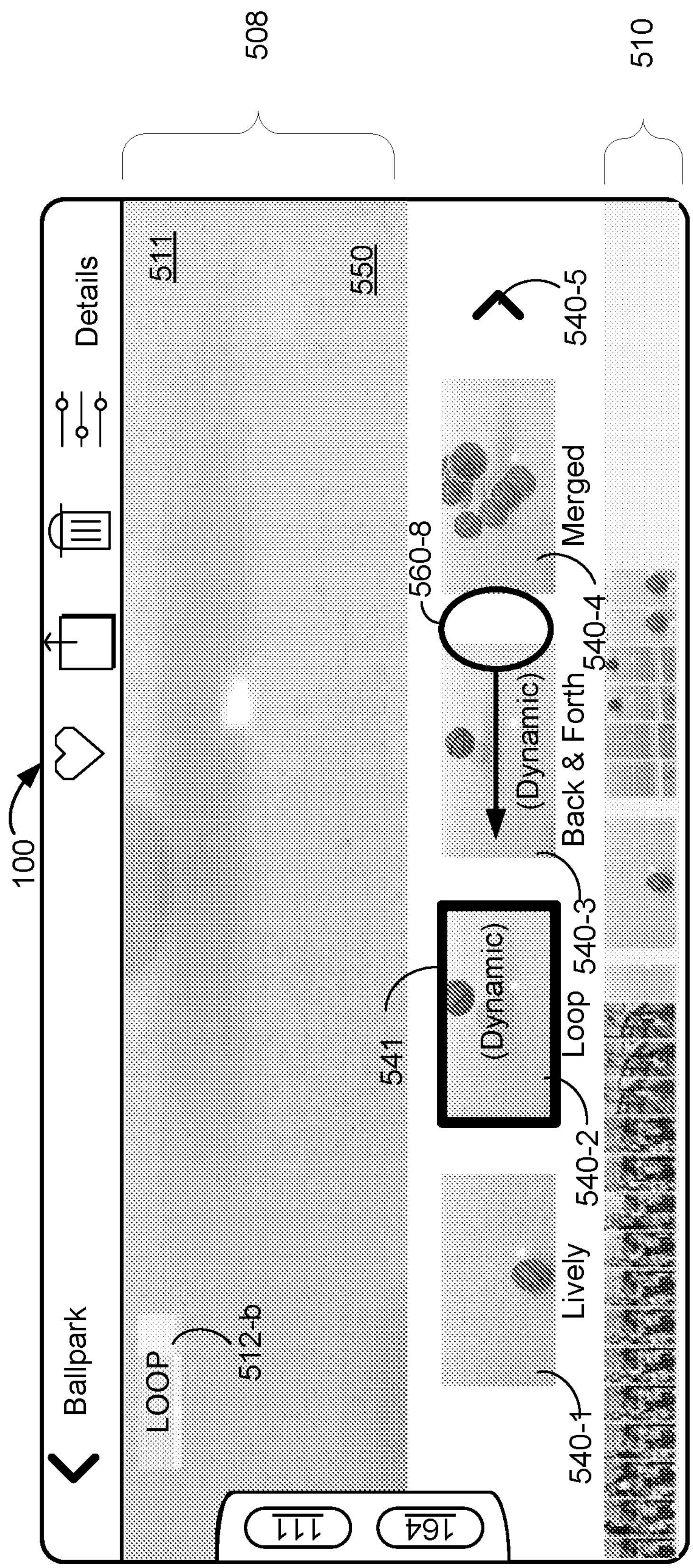
Figure 5B:
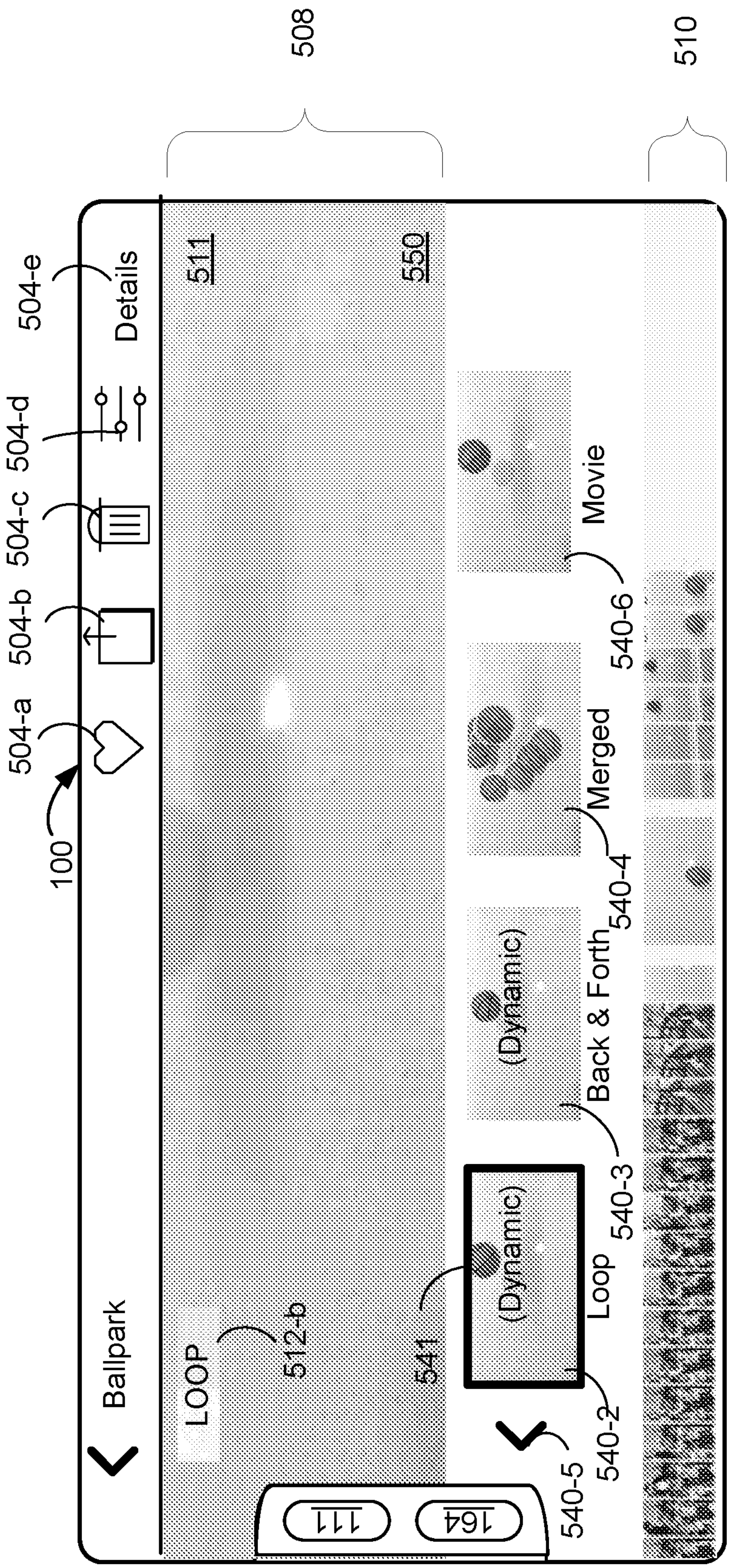
Figure 5B:
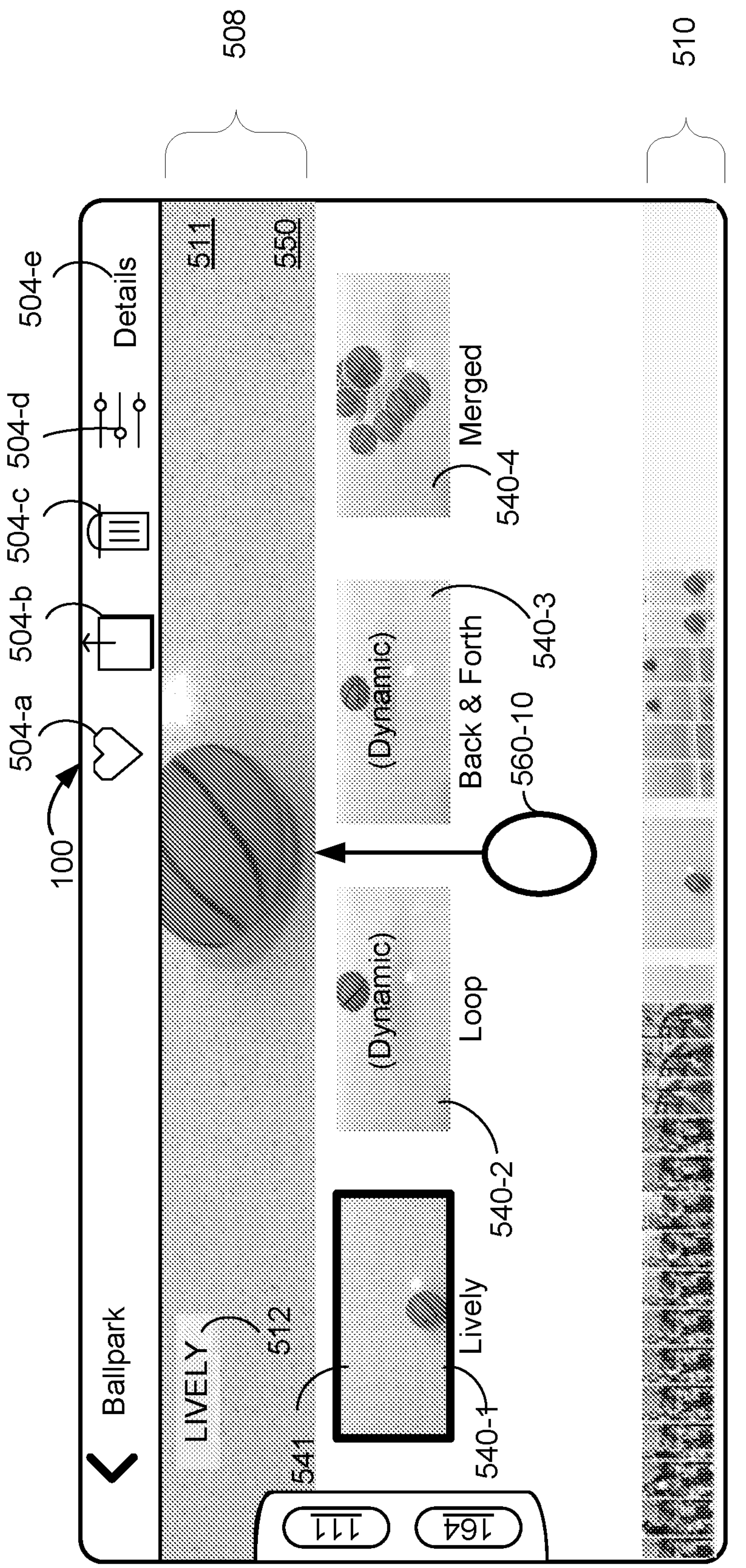
Figure 5B:
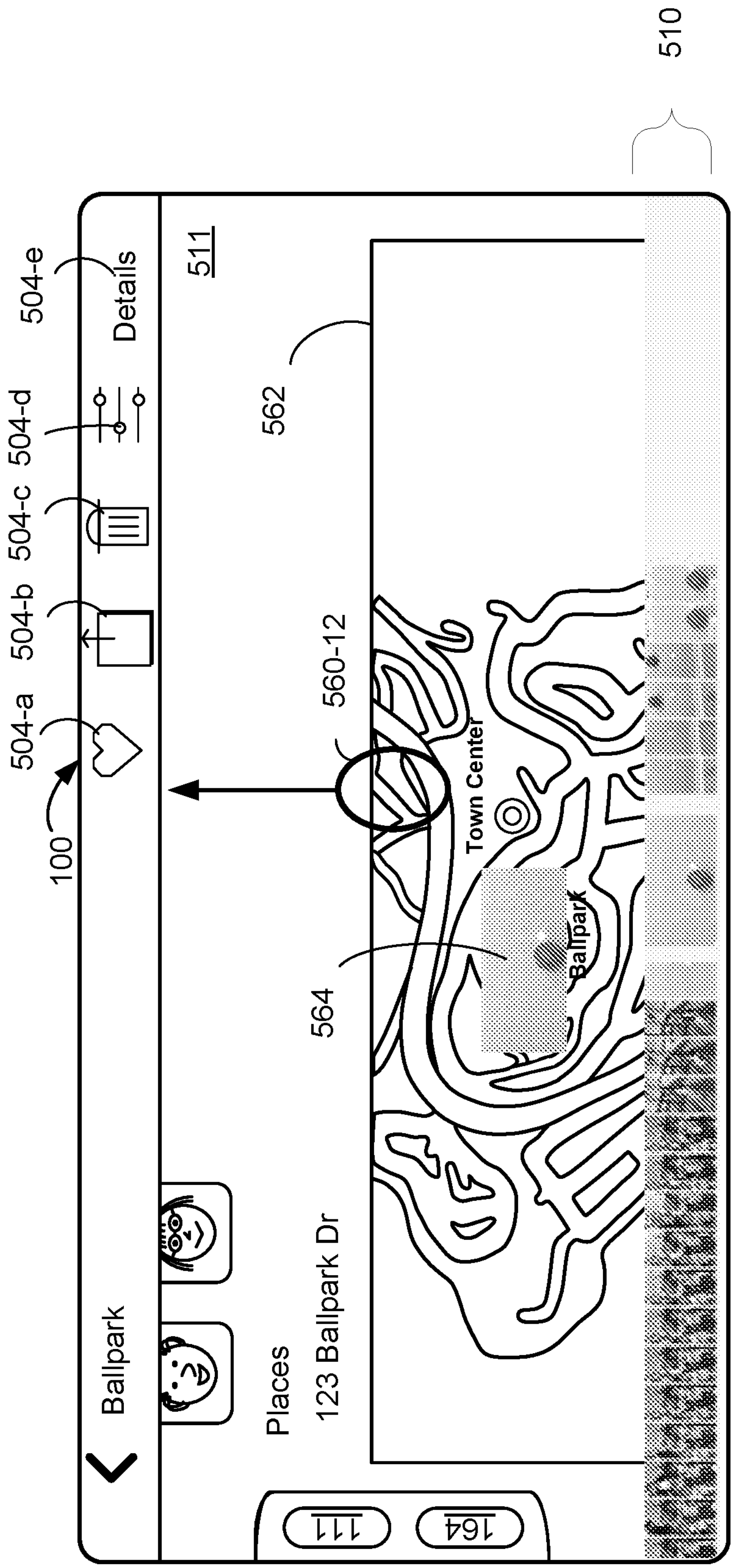
Figure 5B:
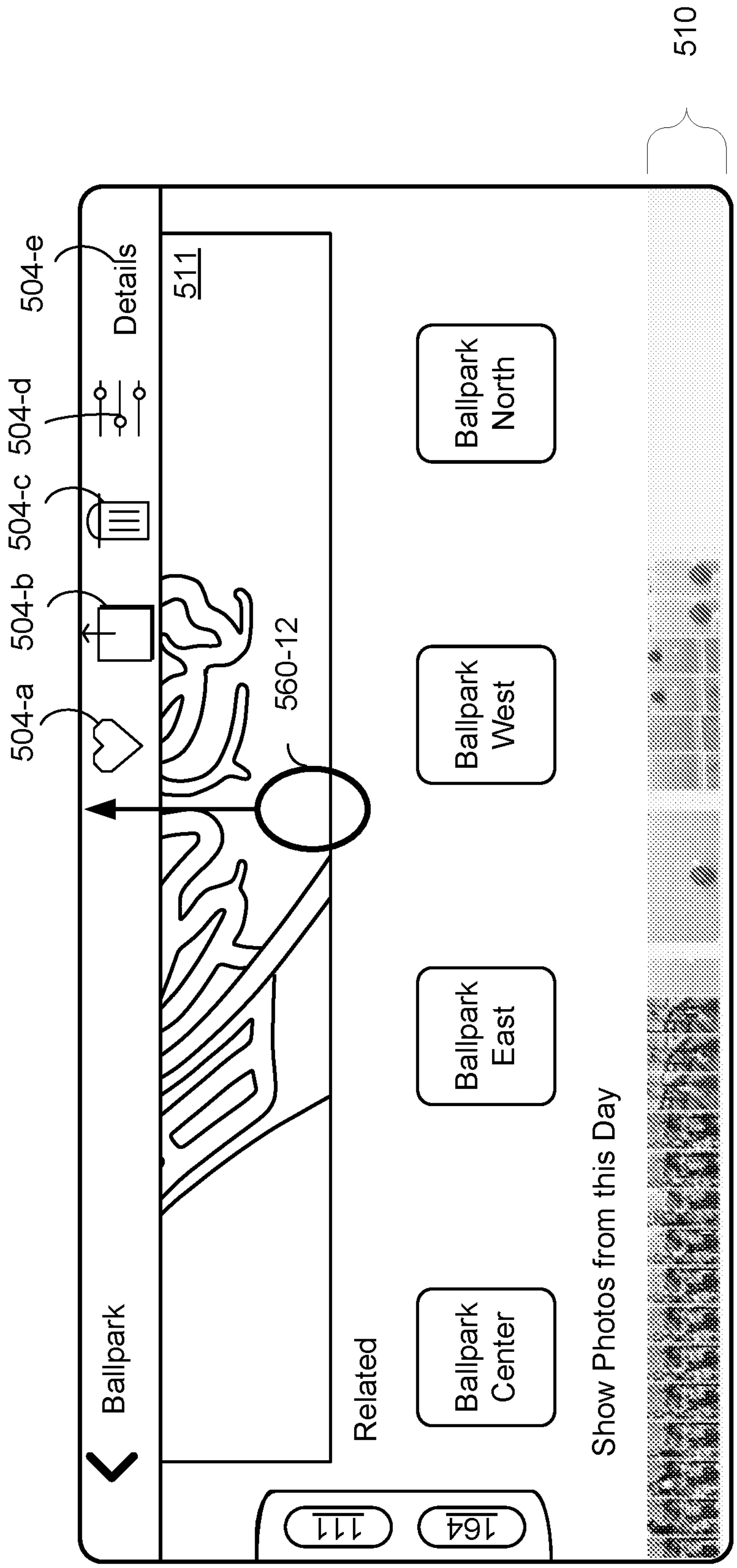
Figure 5B:
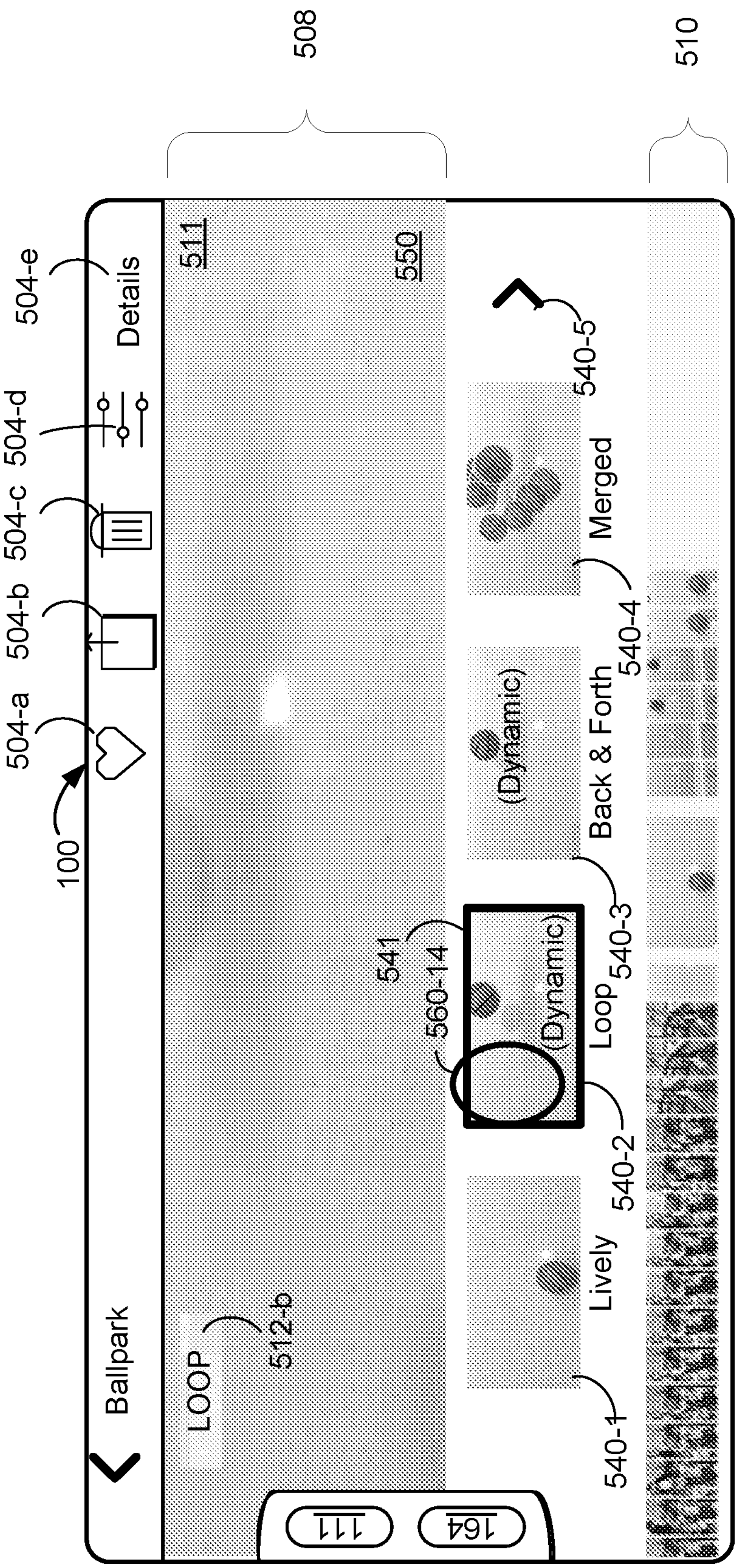
Figure 5B:
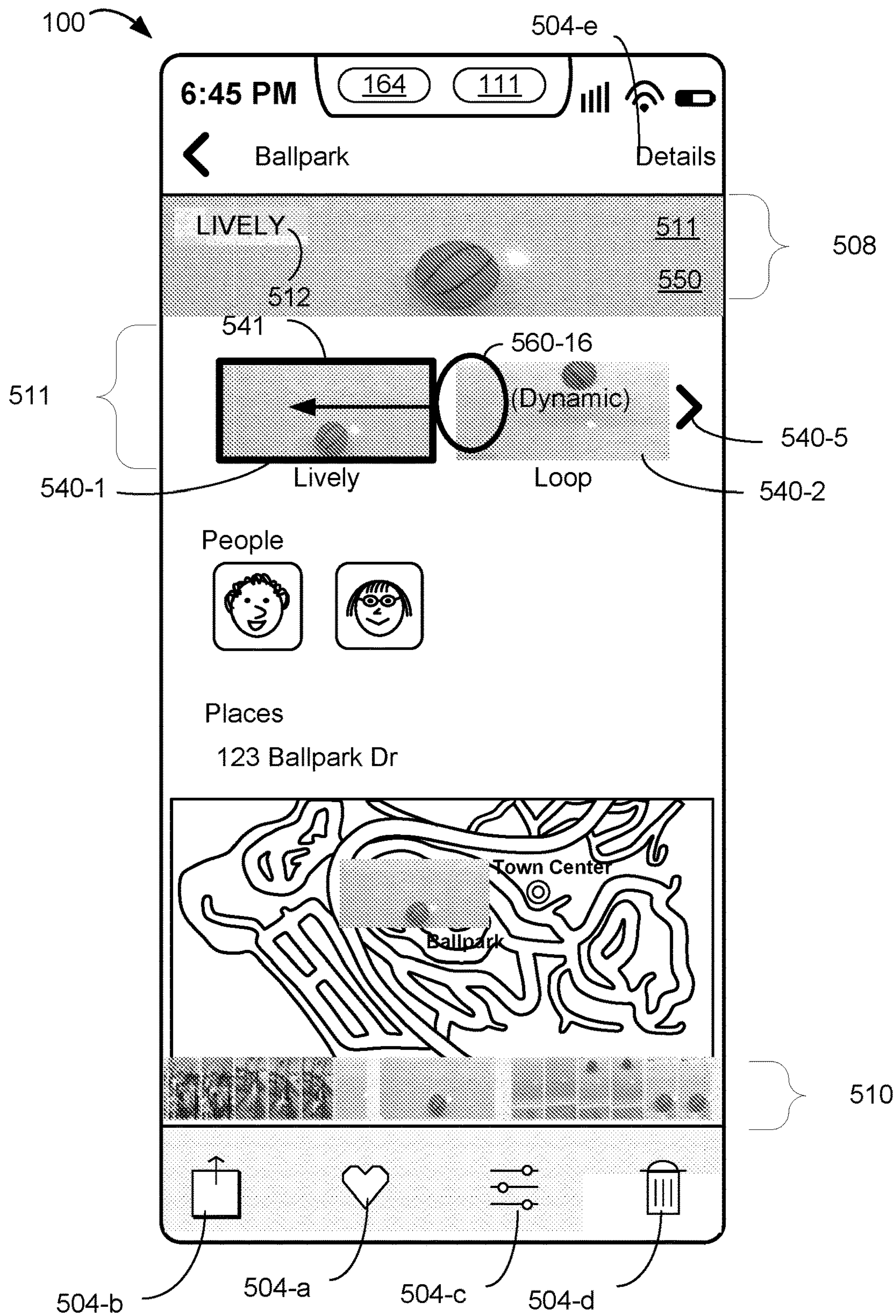
Figure 5B:
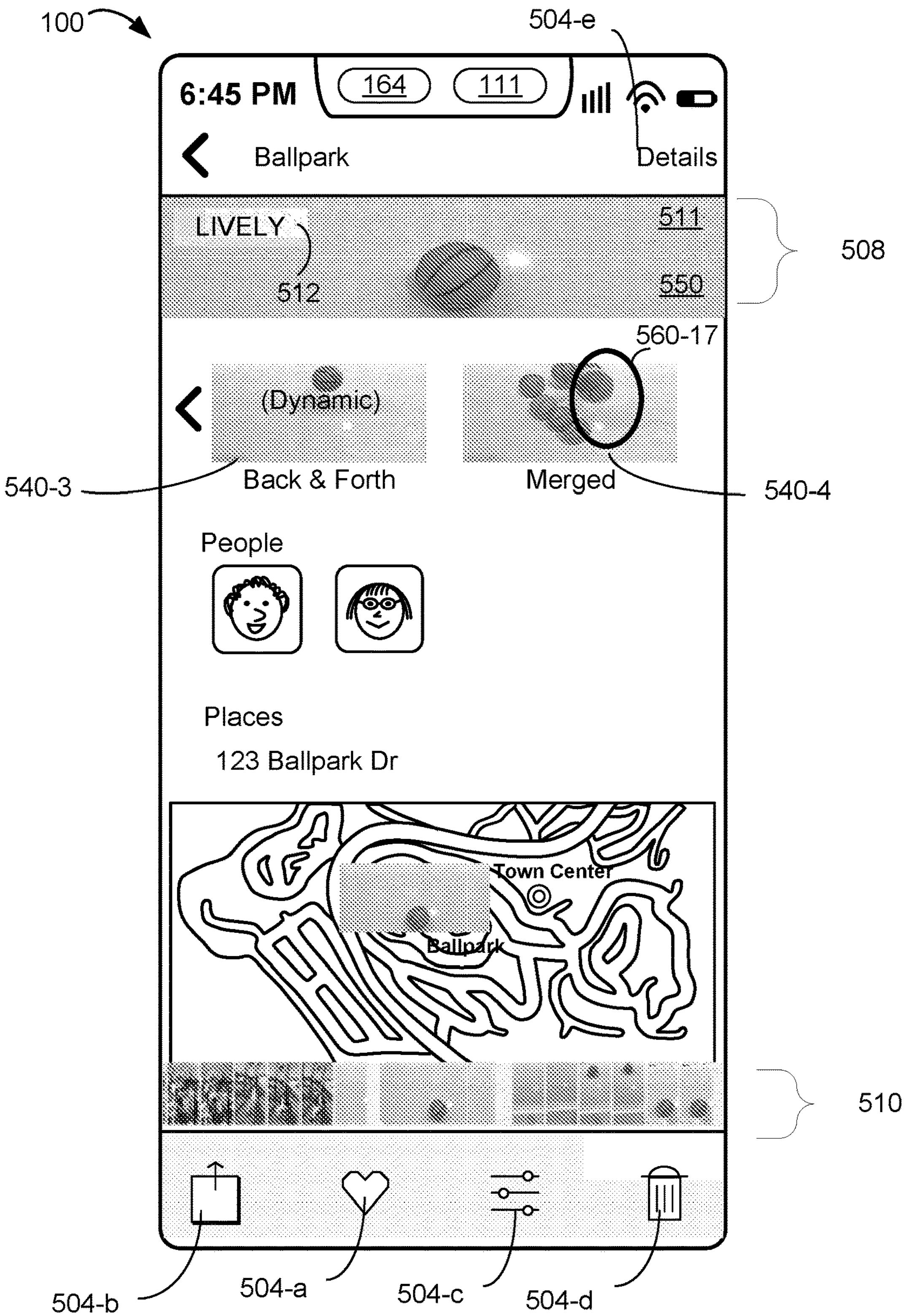
Figure 5B:
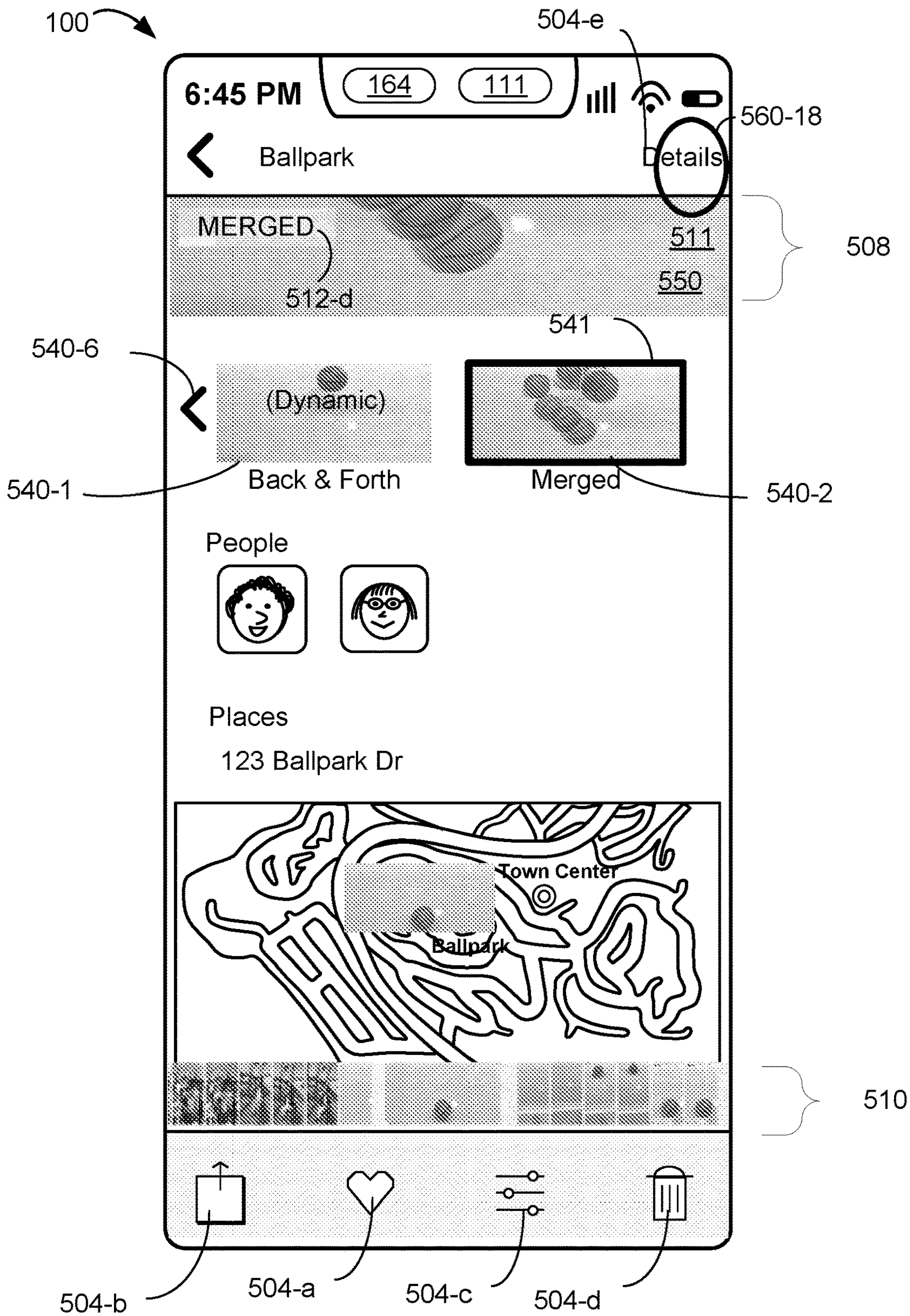
Figure 5B:
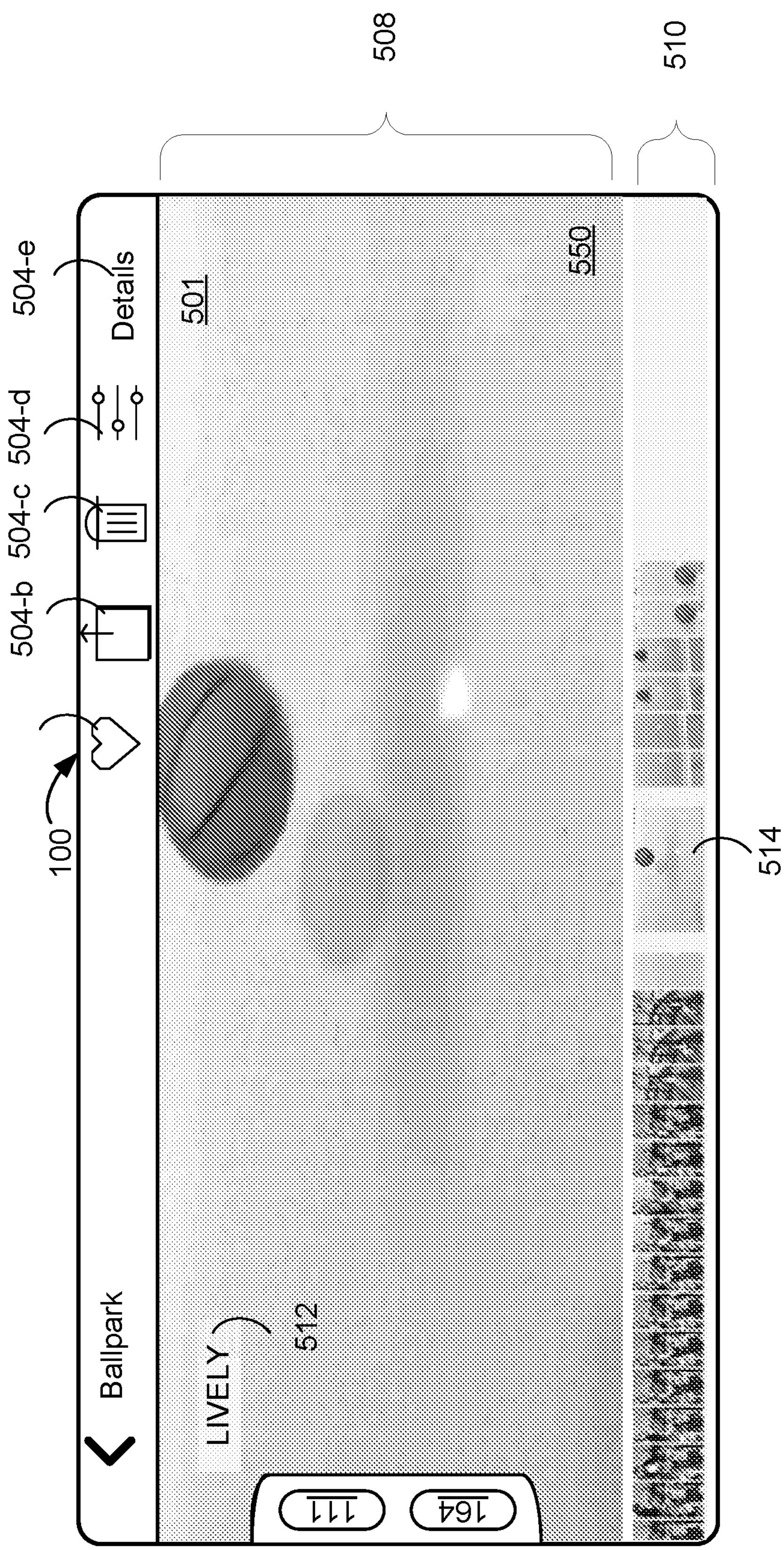
Figure 5B:
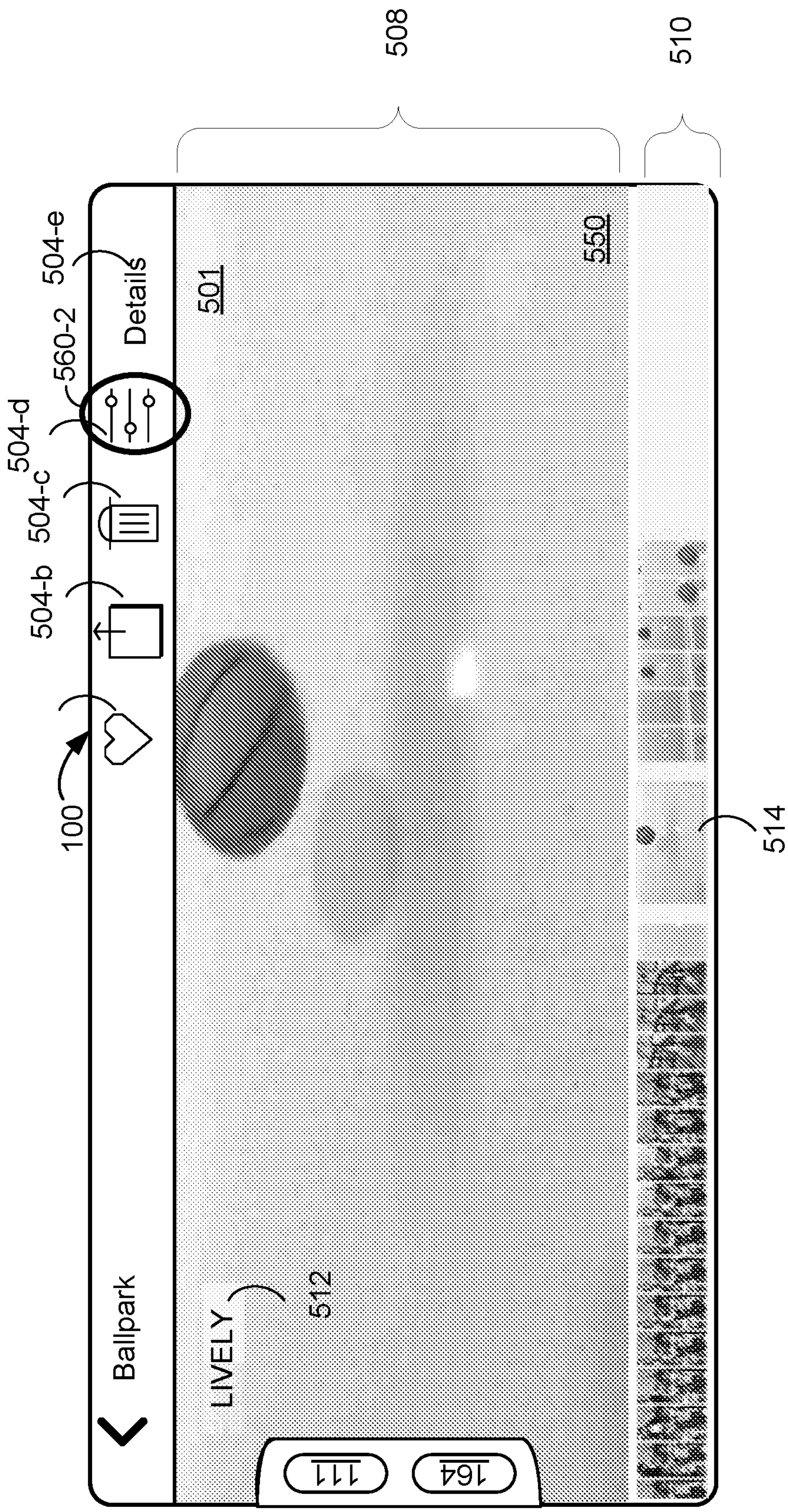
Figure 5B:
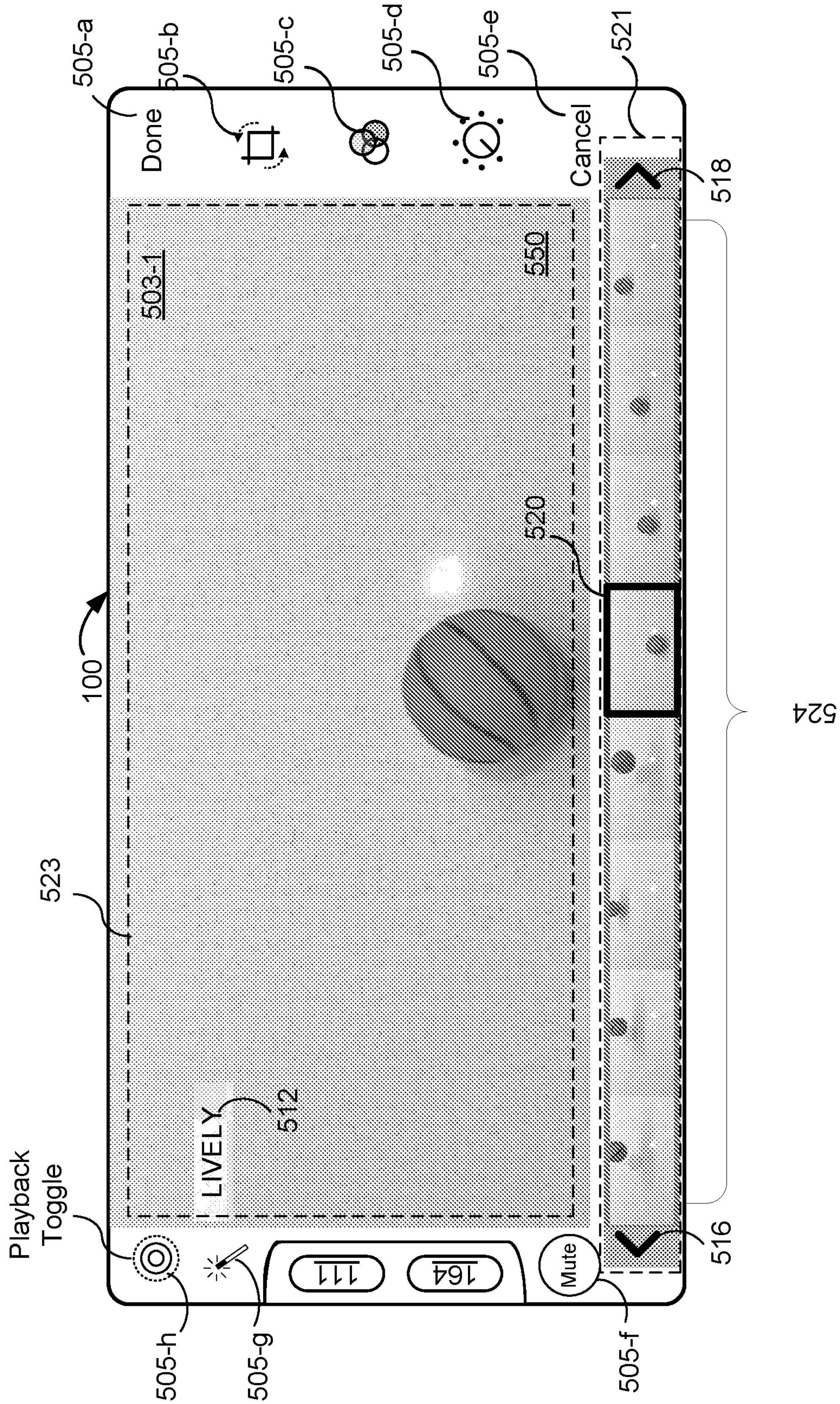
Figure 5B:
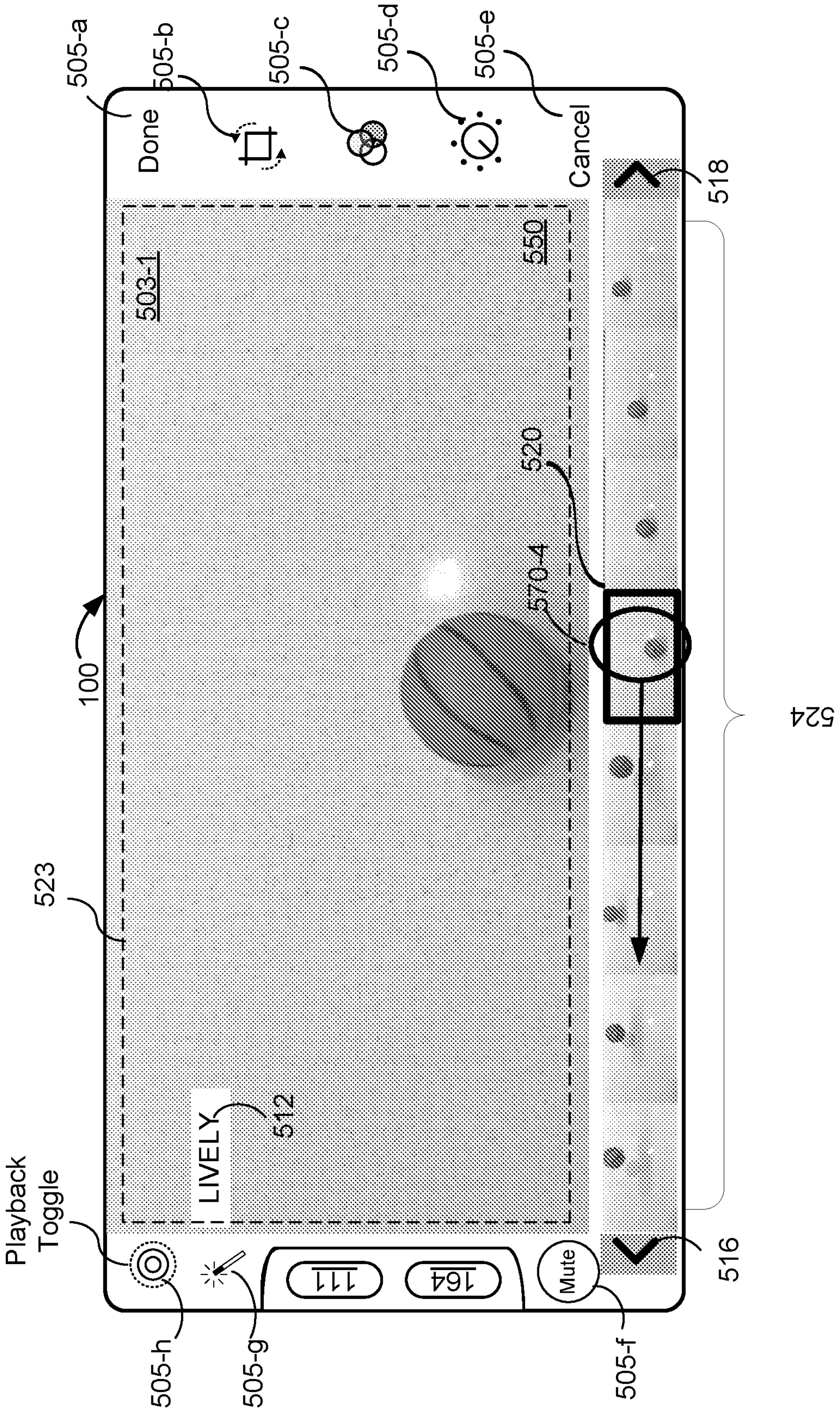
Figure 5B:
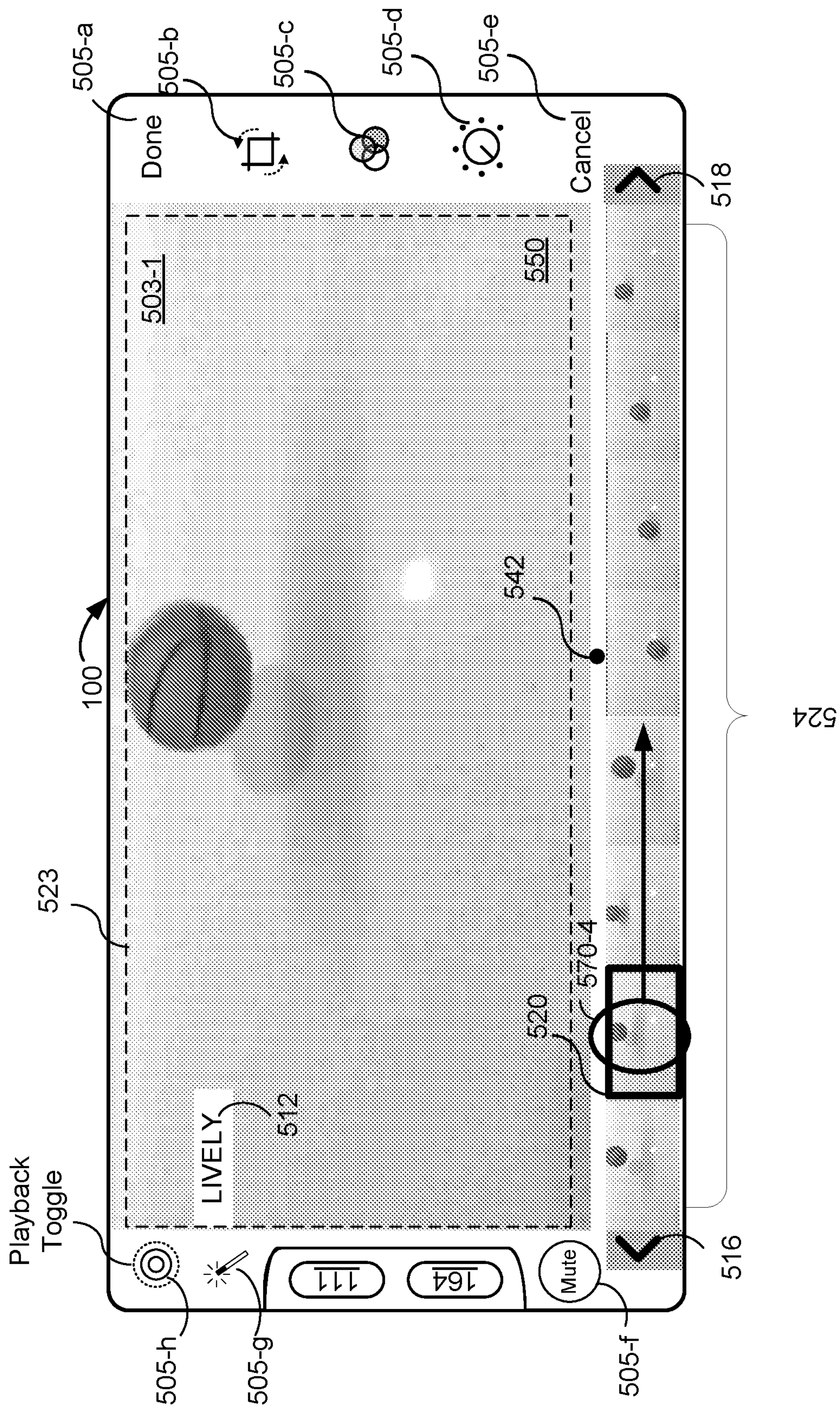
Figure 5B:
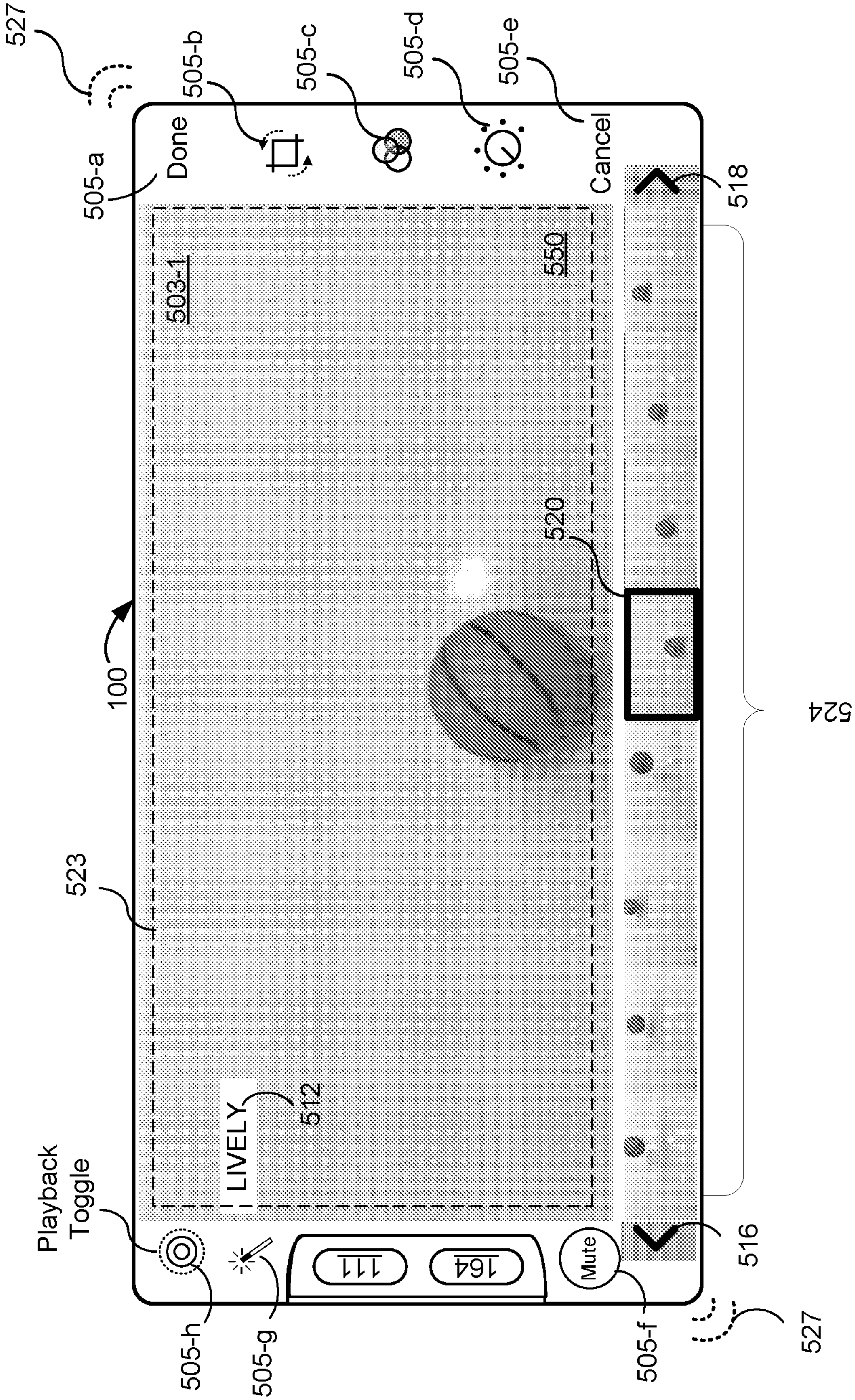
Figure 5B:
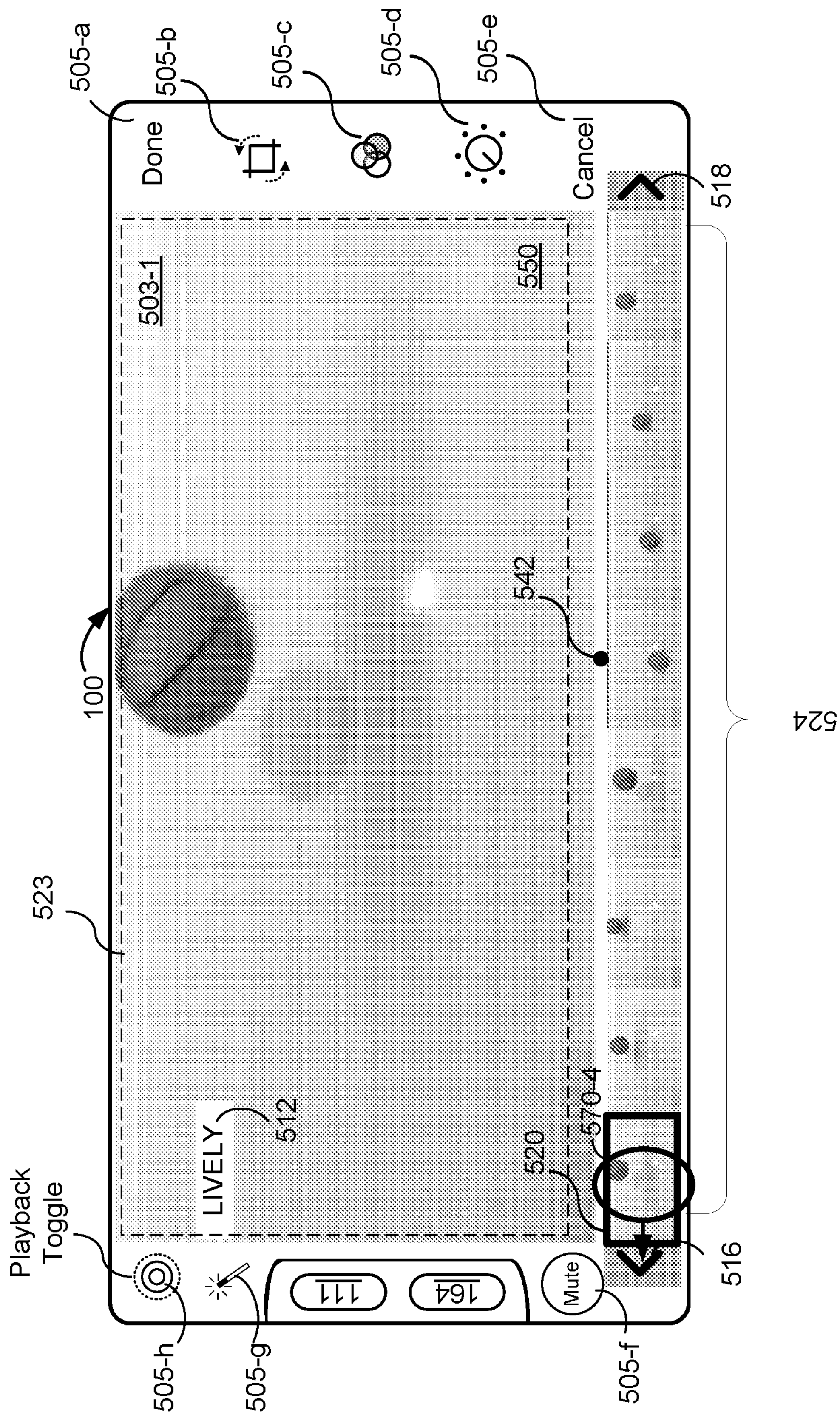
Figure 5B:
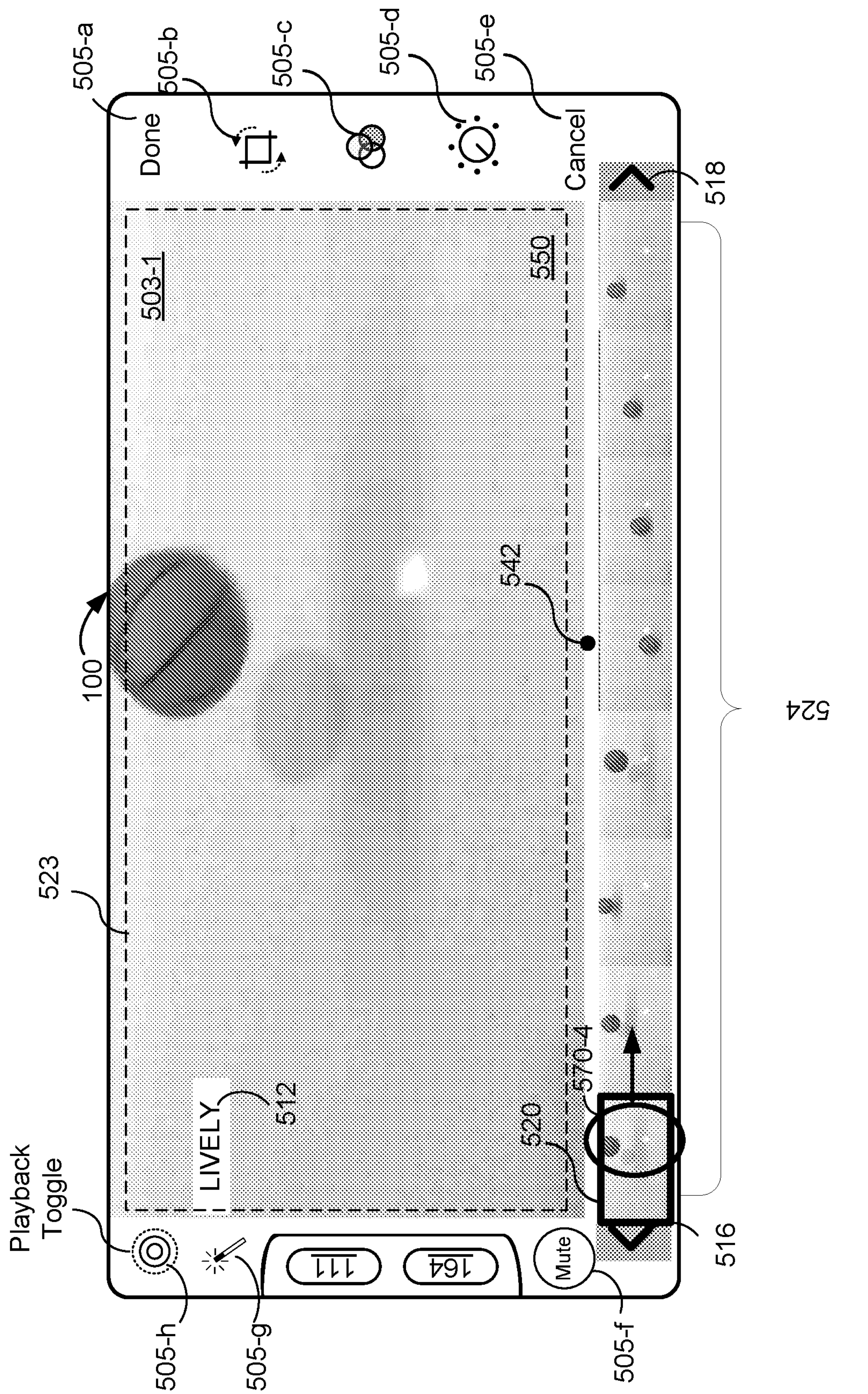
Figure 5C:
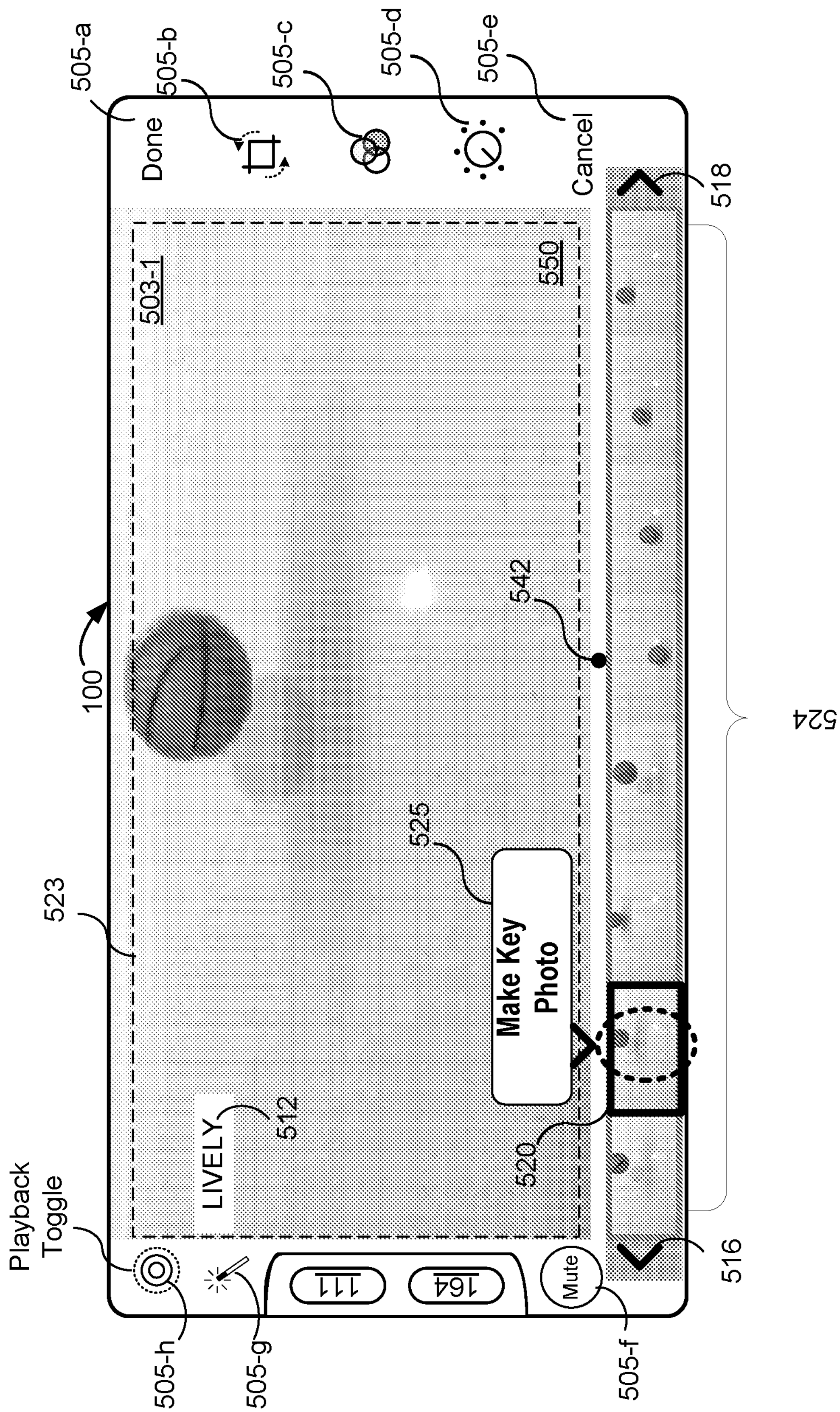
Figure 5C:
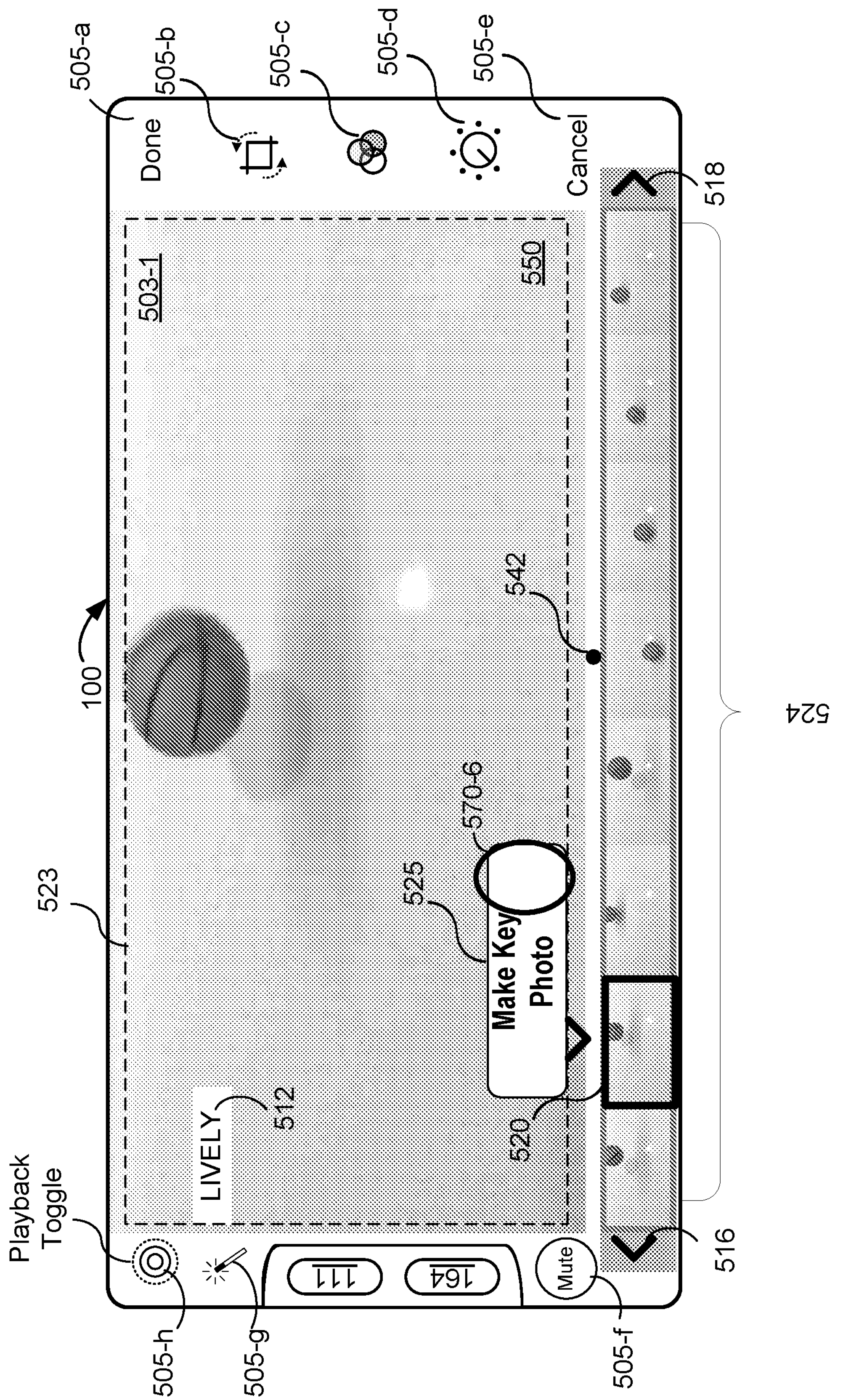
Figure 5C:
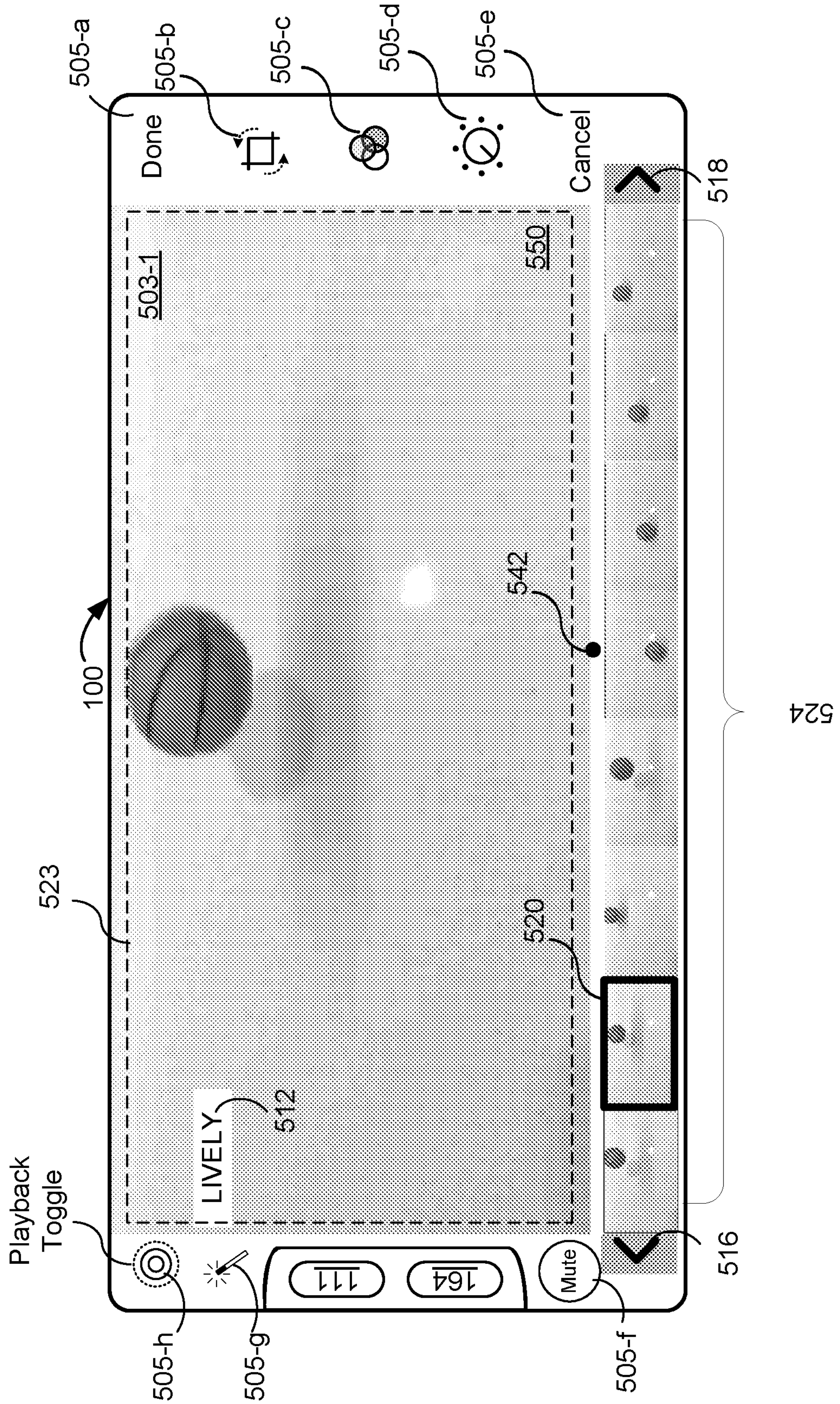
Figure 5C:
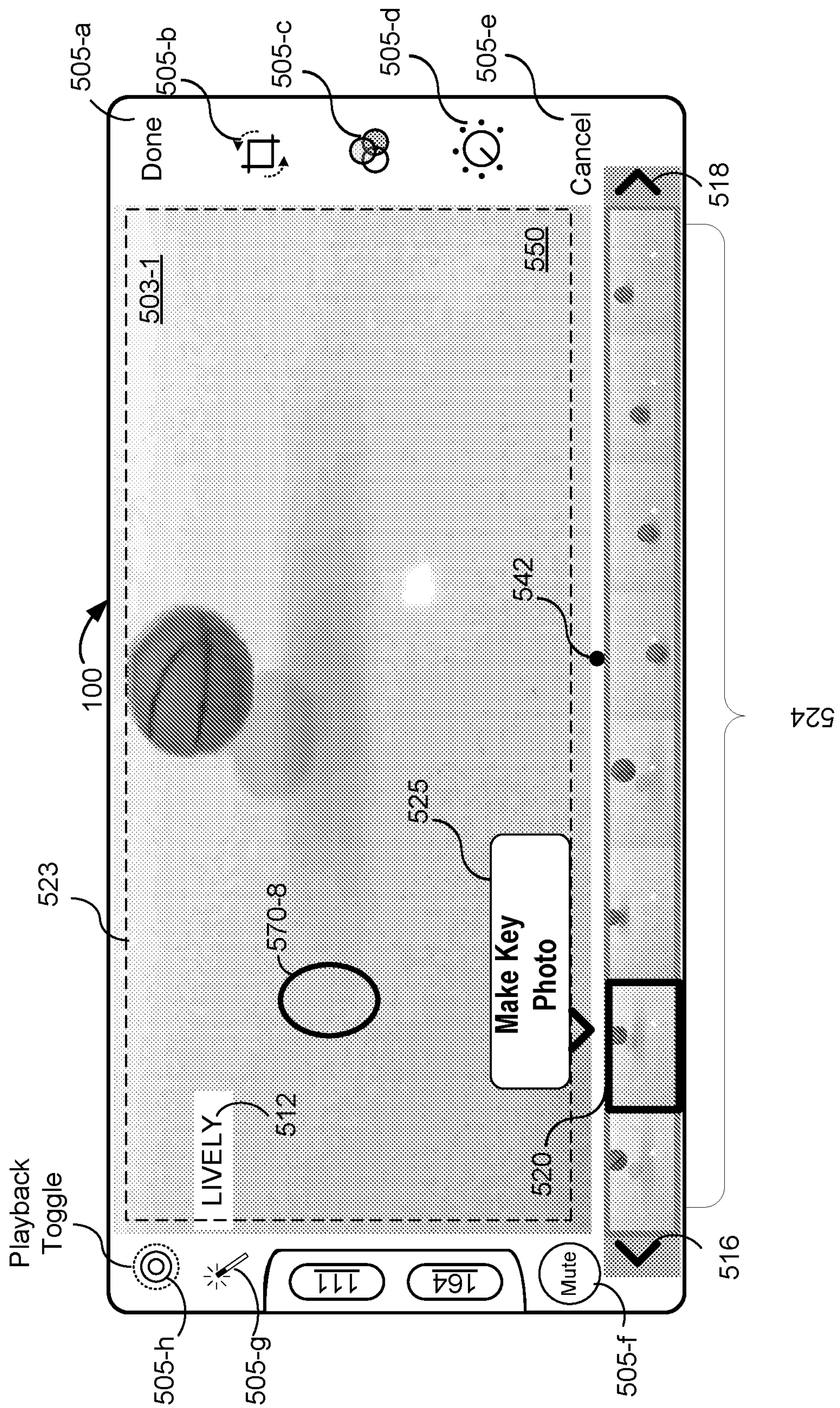
Figure 5C:
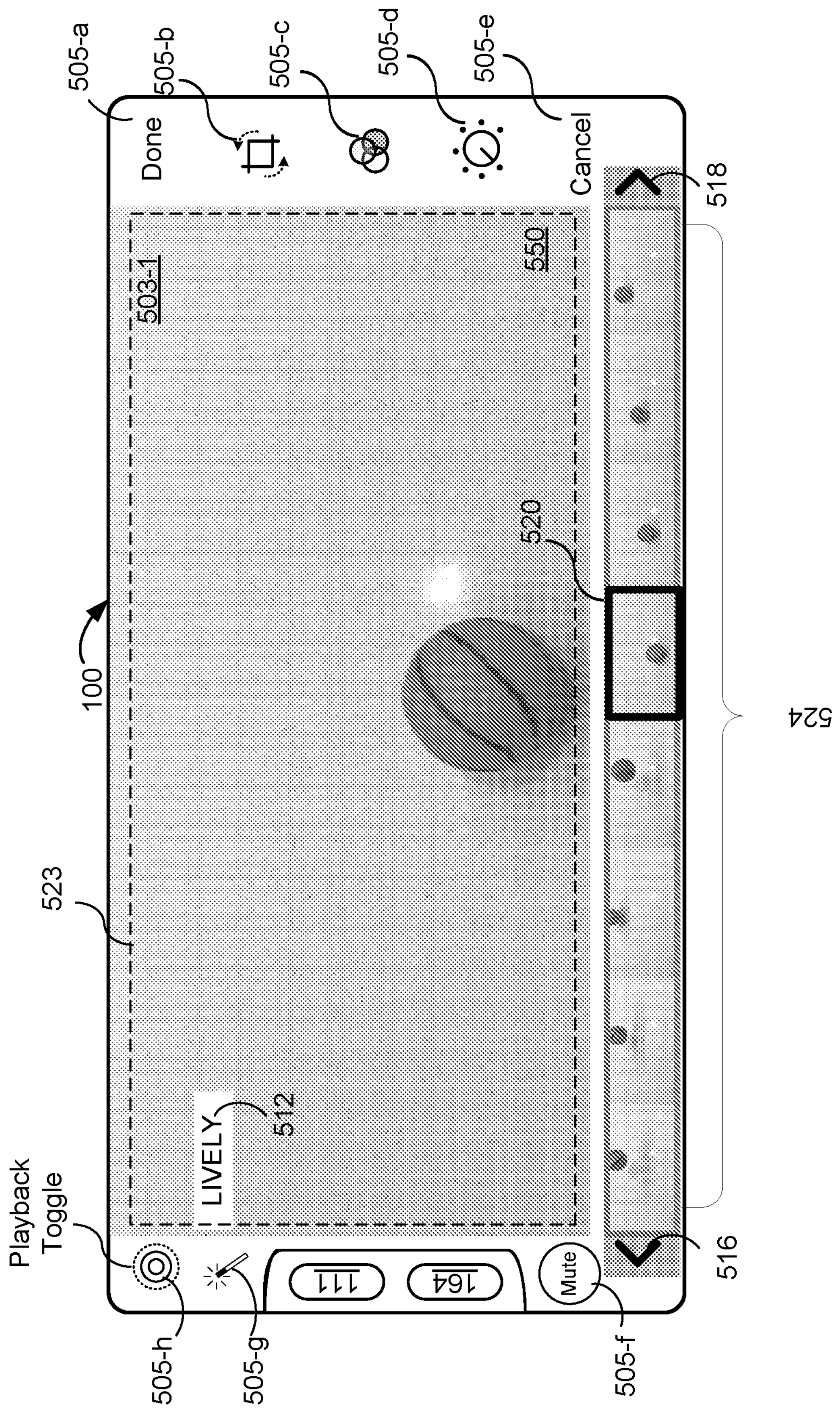
Figure 5C:
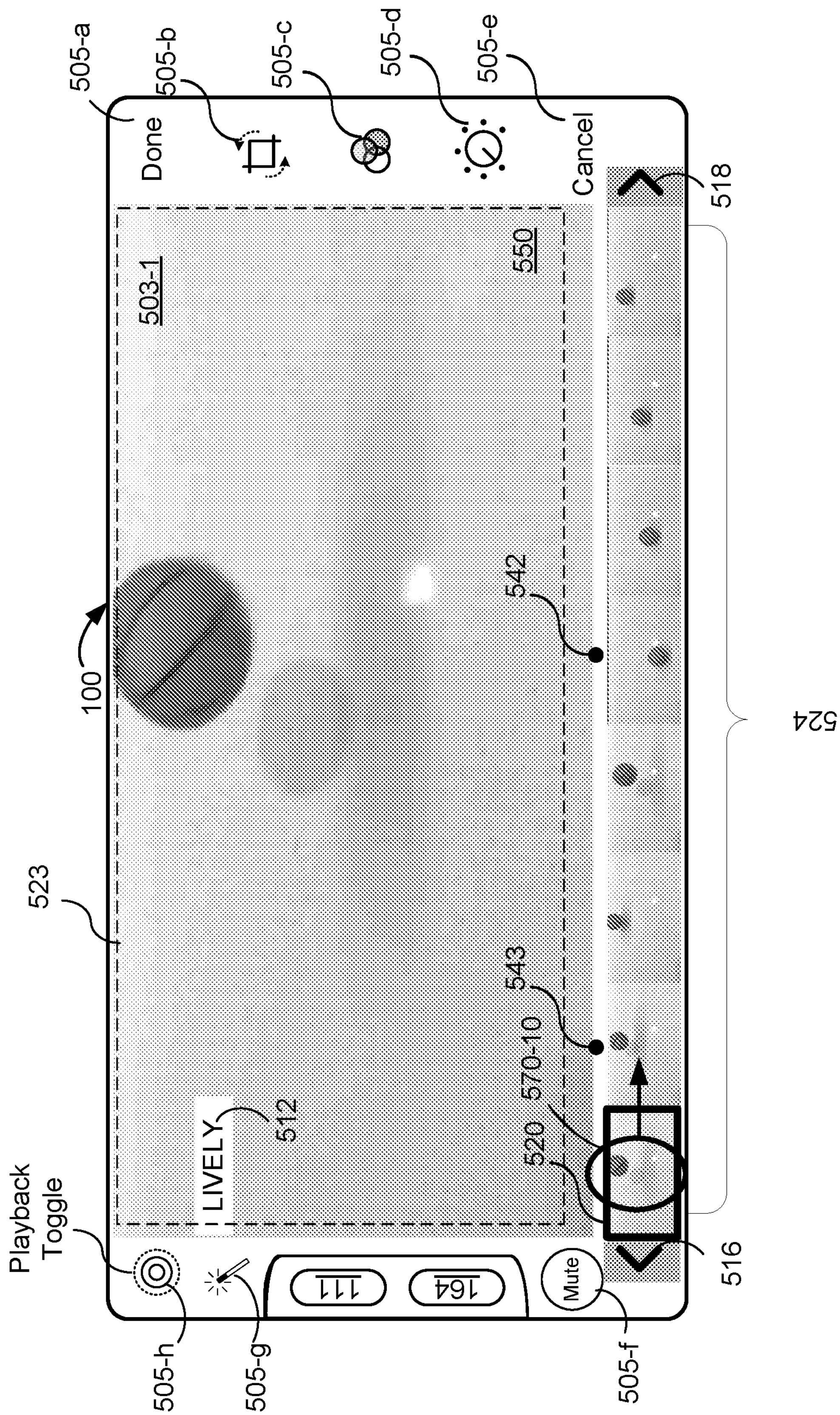
Figure 5C:
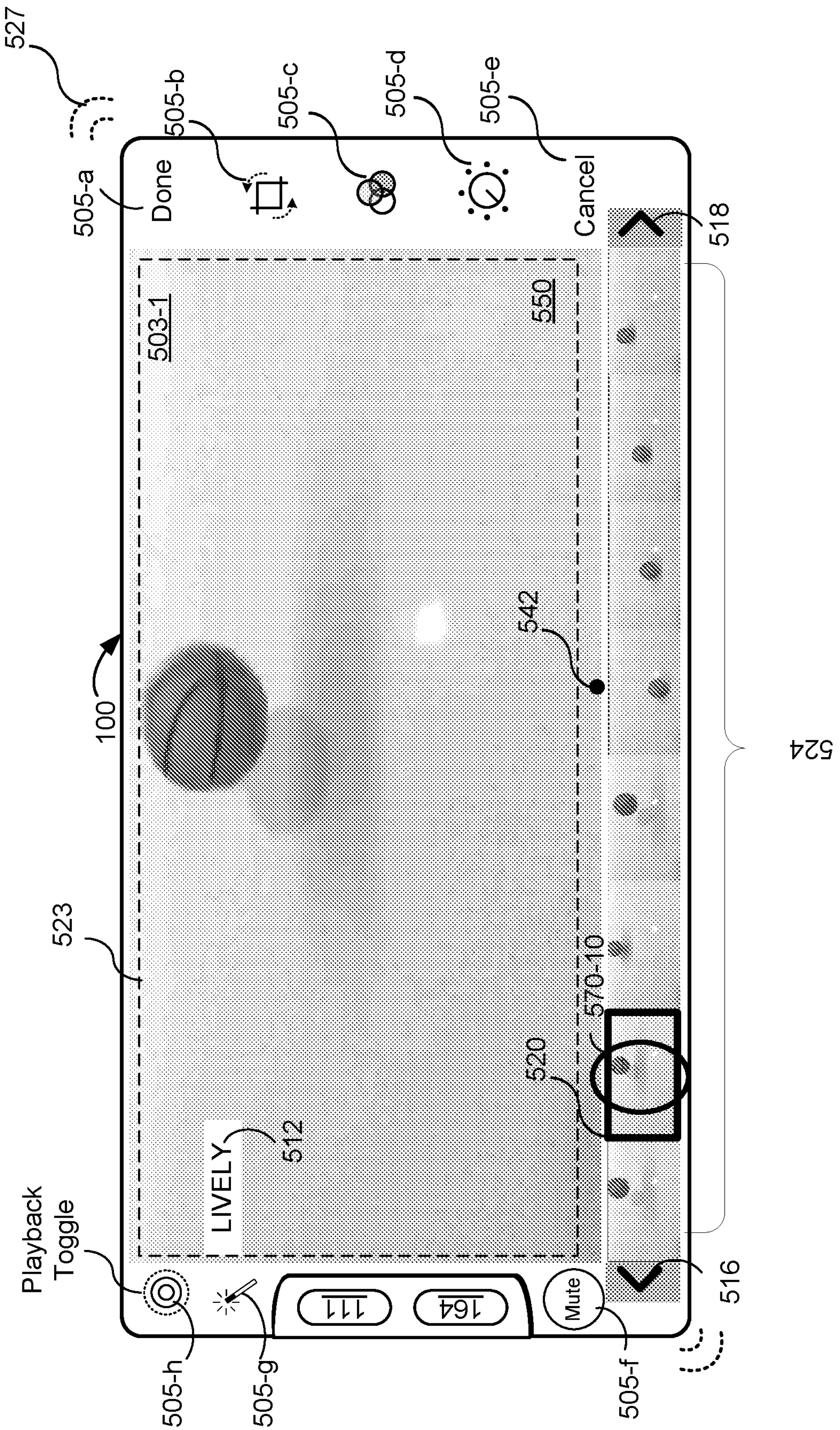
Figure 5C:
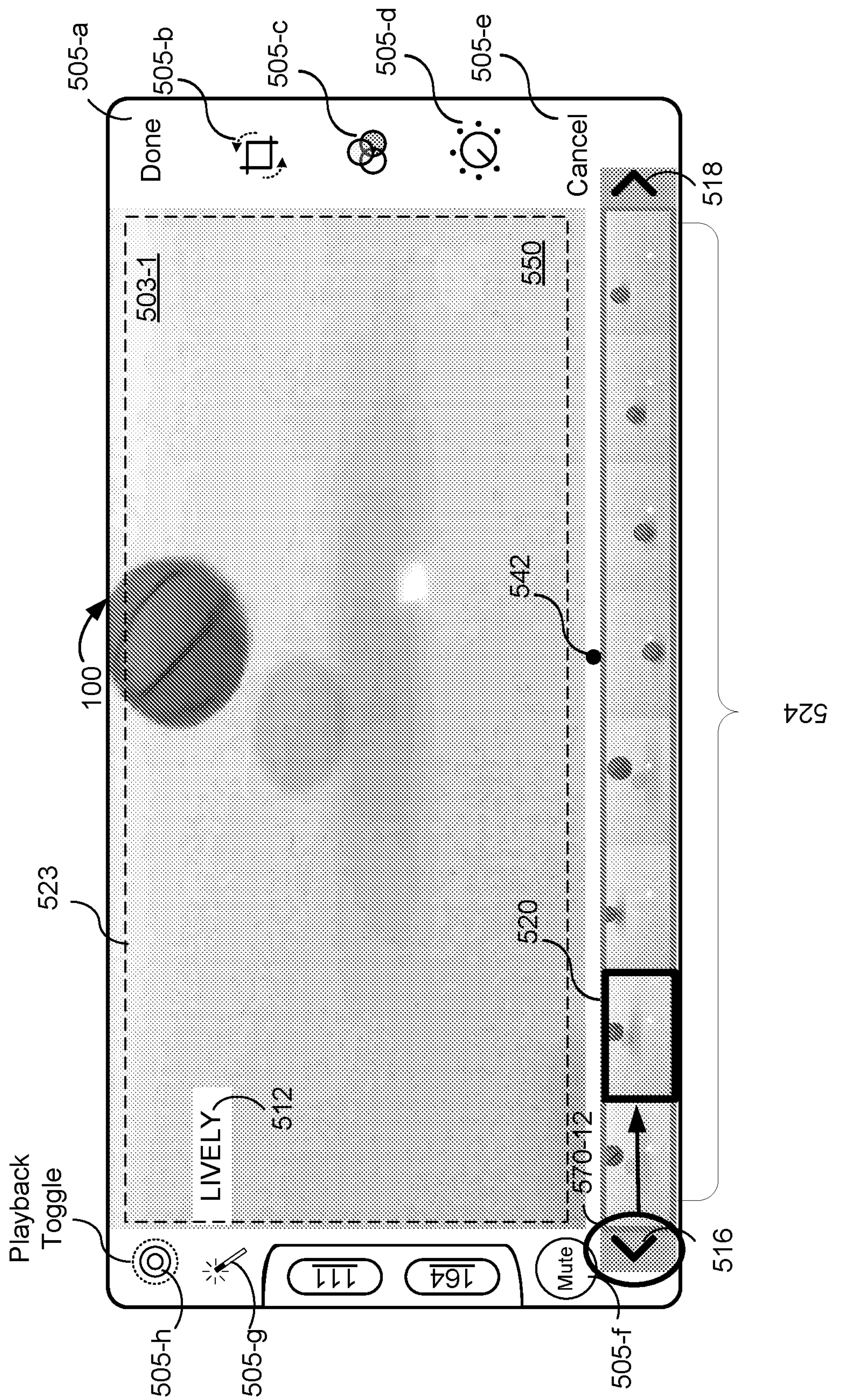
Figure 5C:
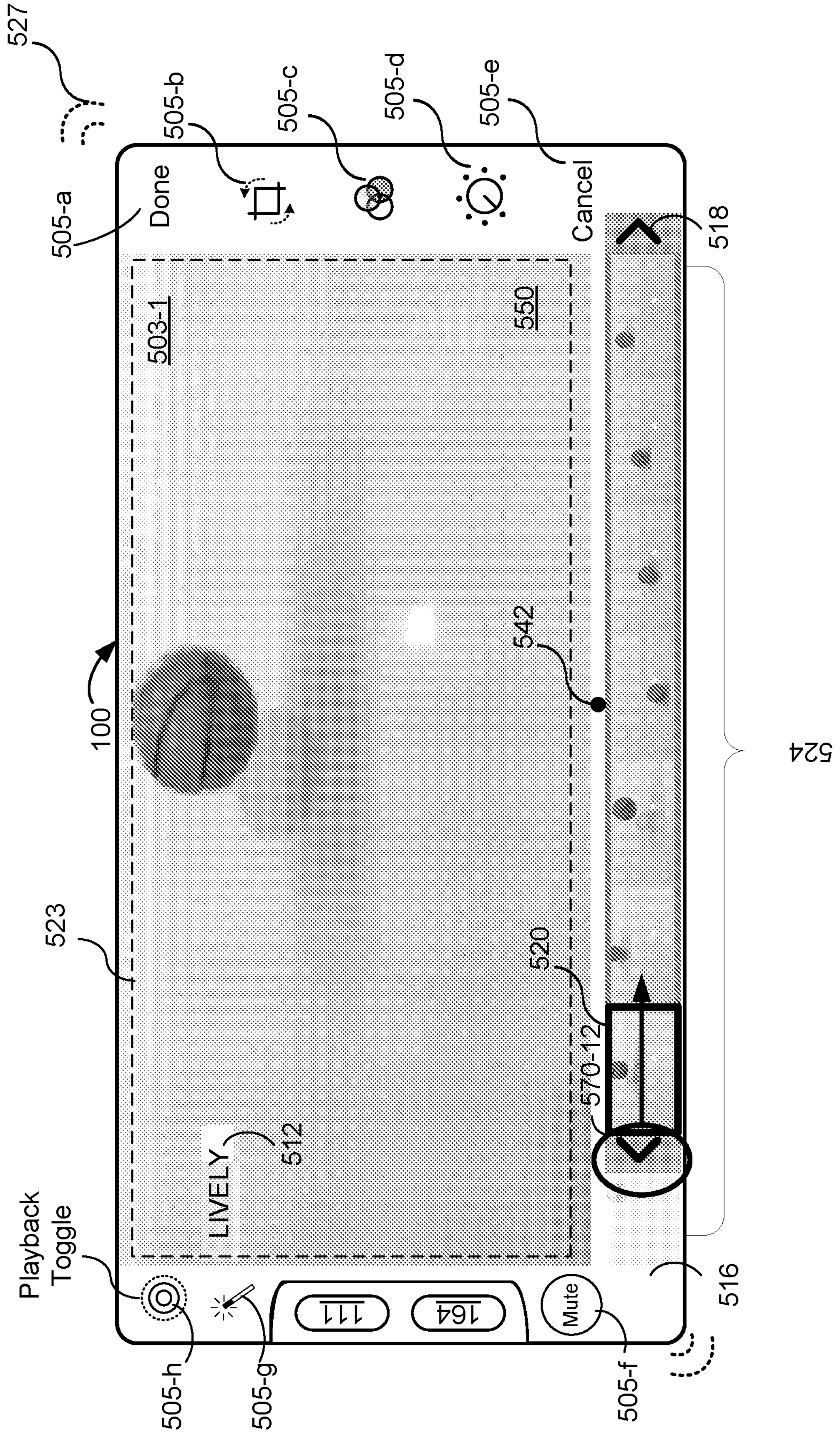
Figure 5C:
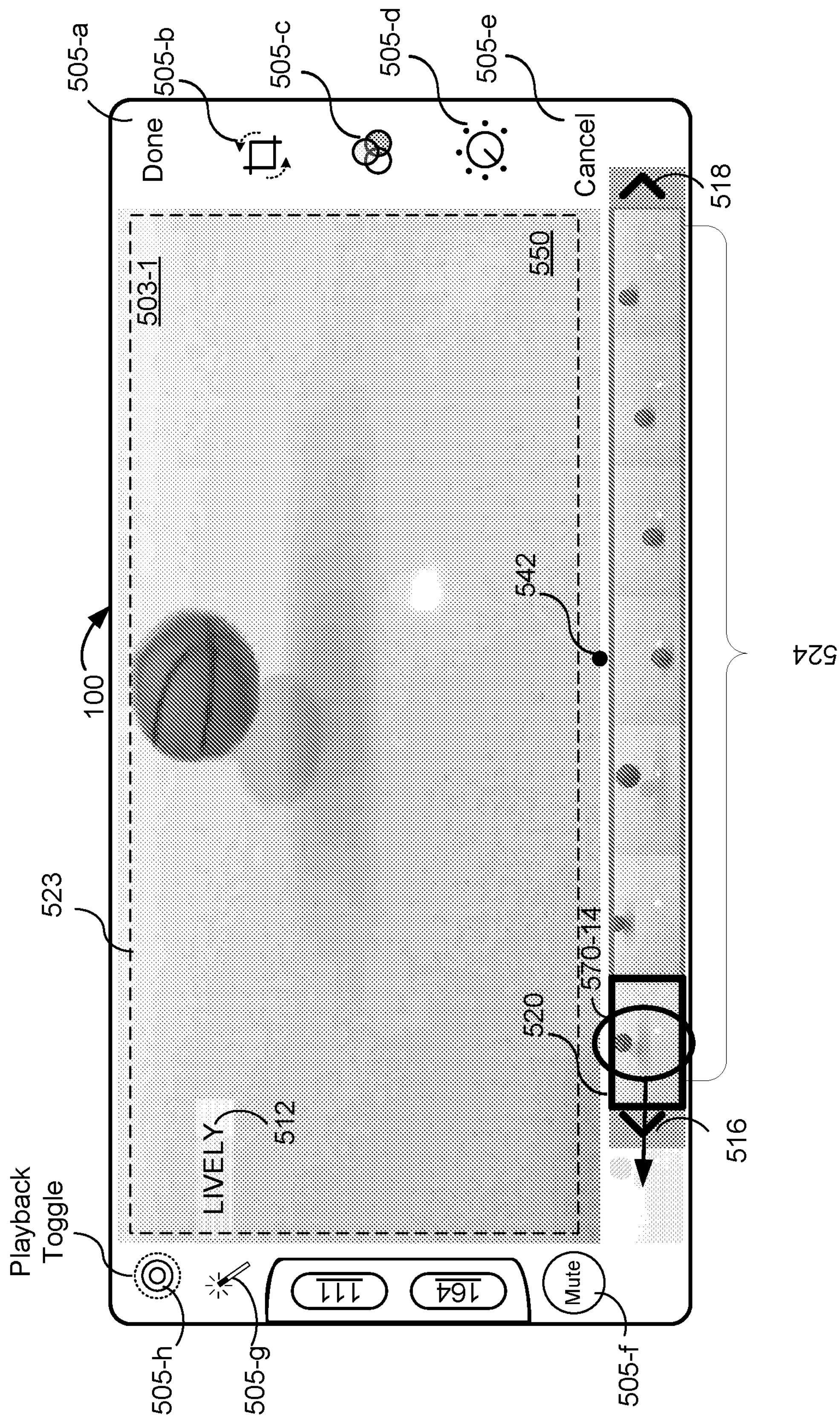
Figure 5C:
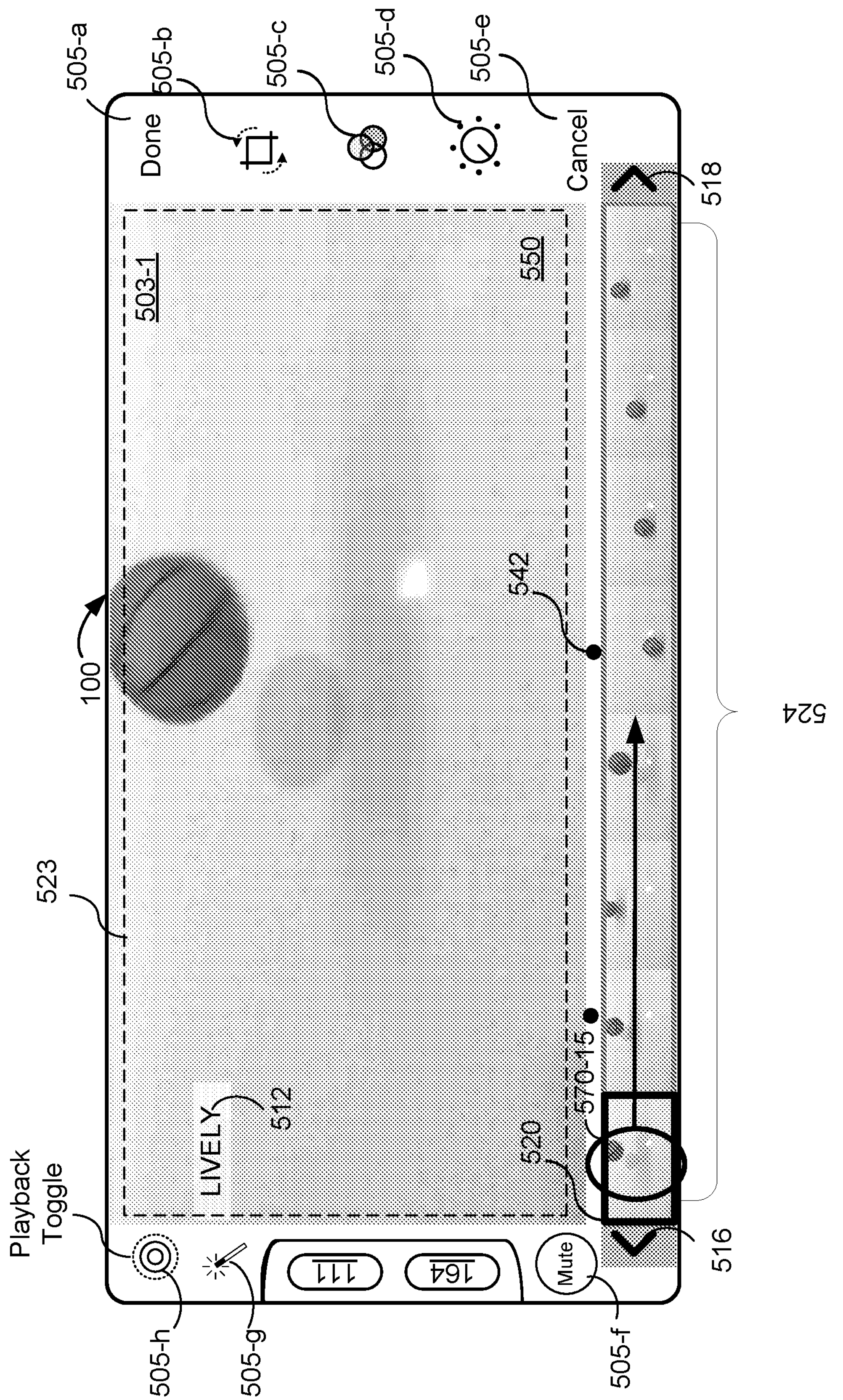
Figure 5C:
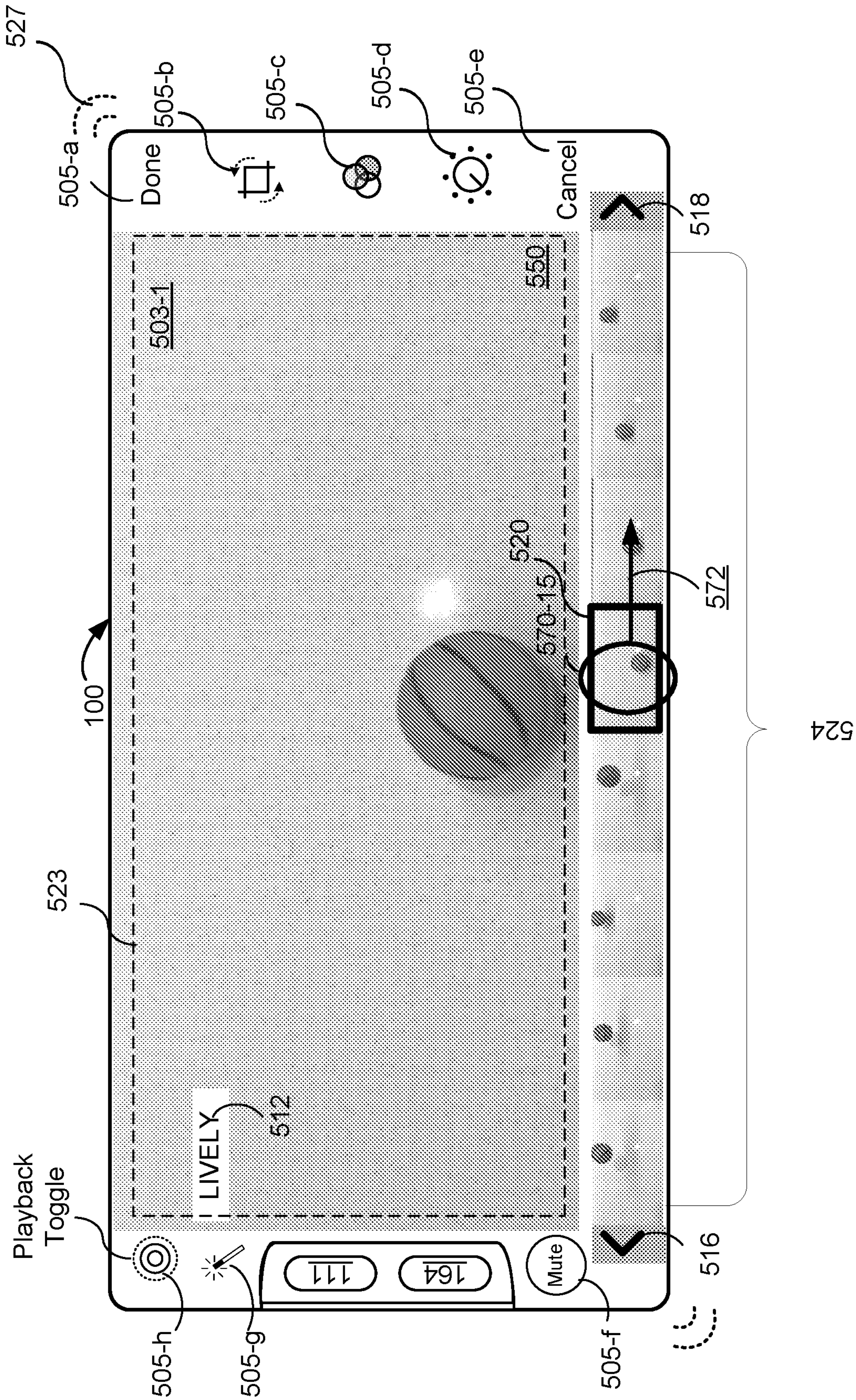
Figure 5C:
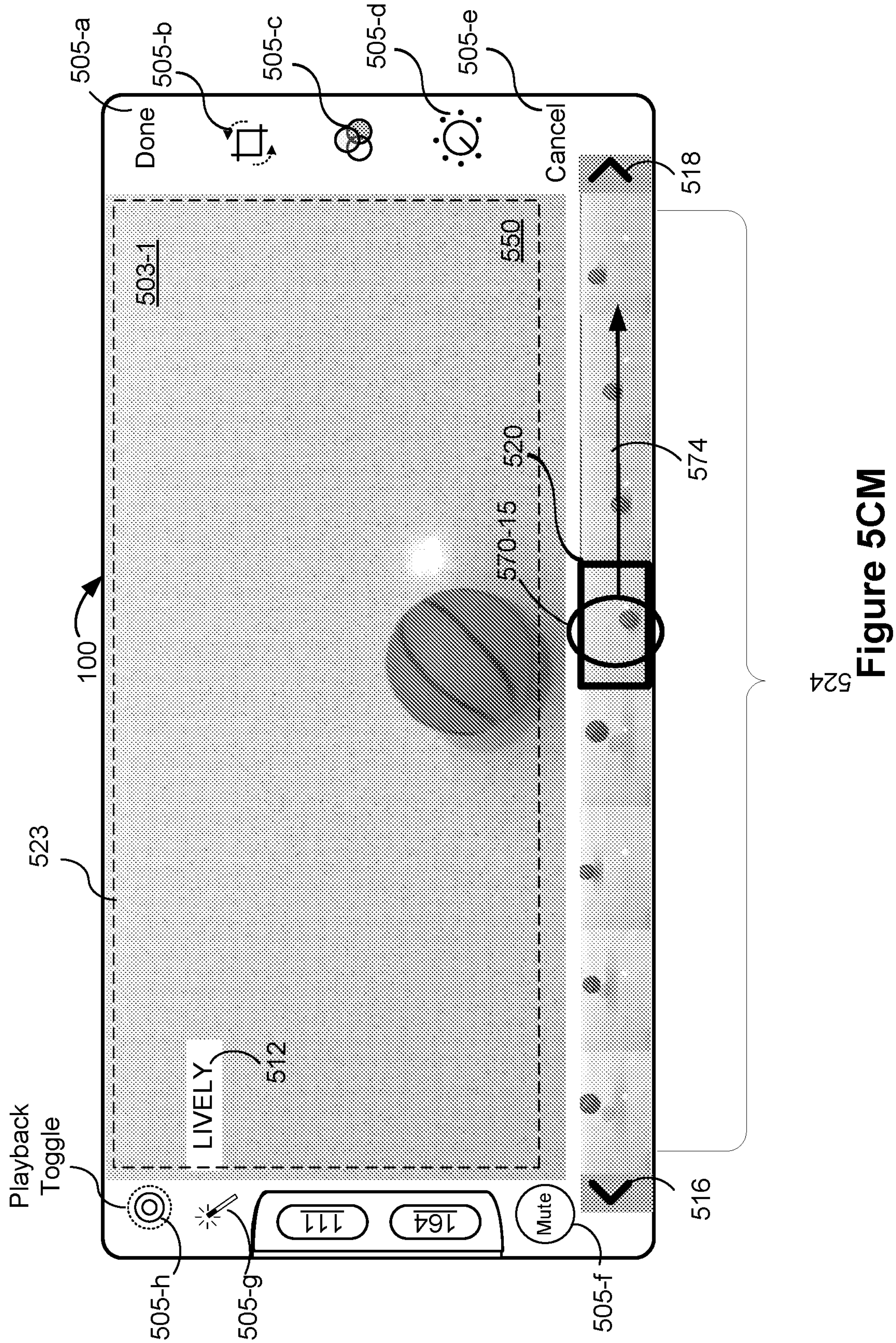
Figure 5C:
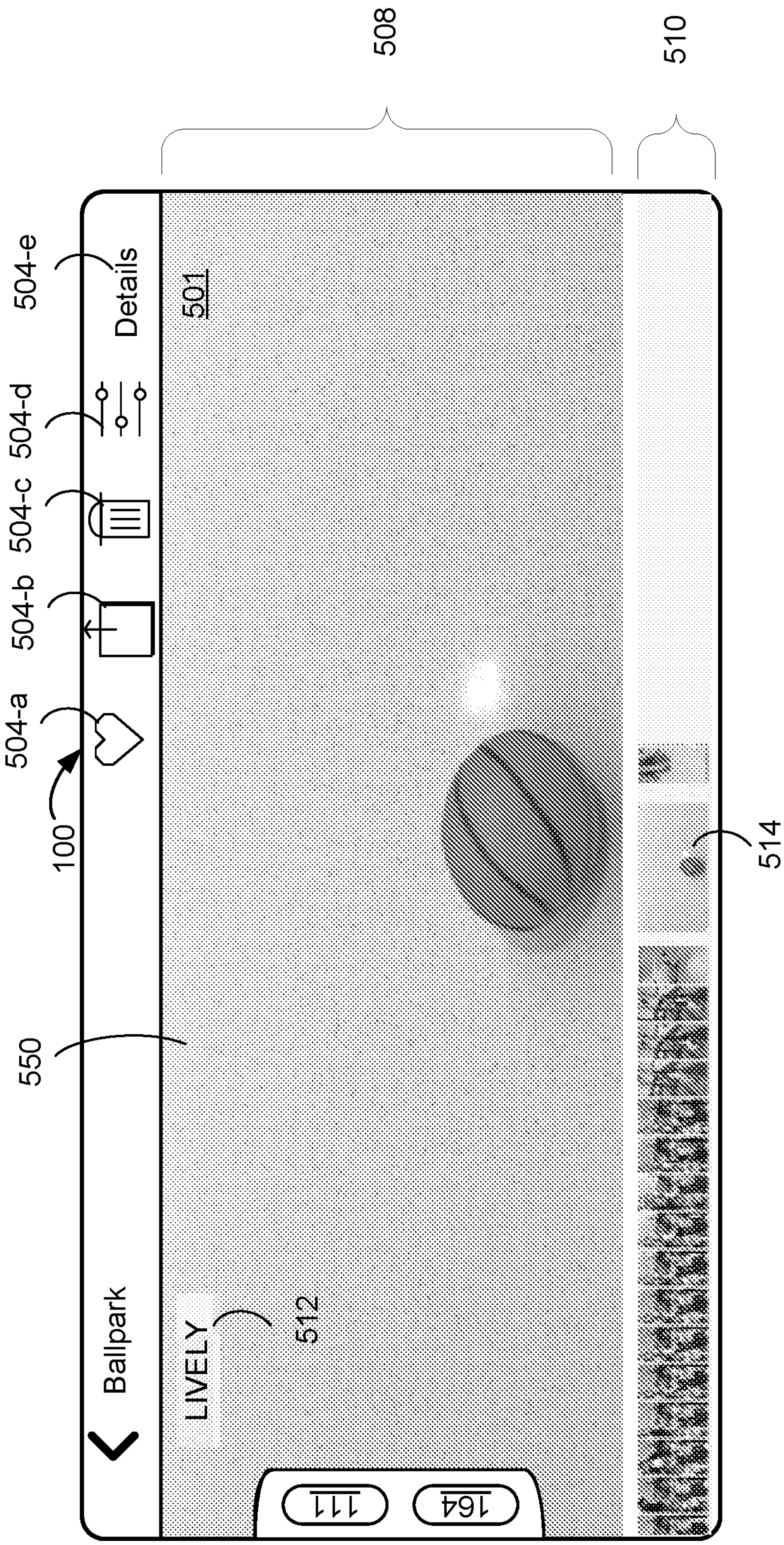
Figure 5C:
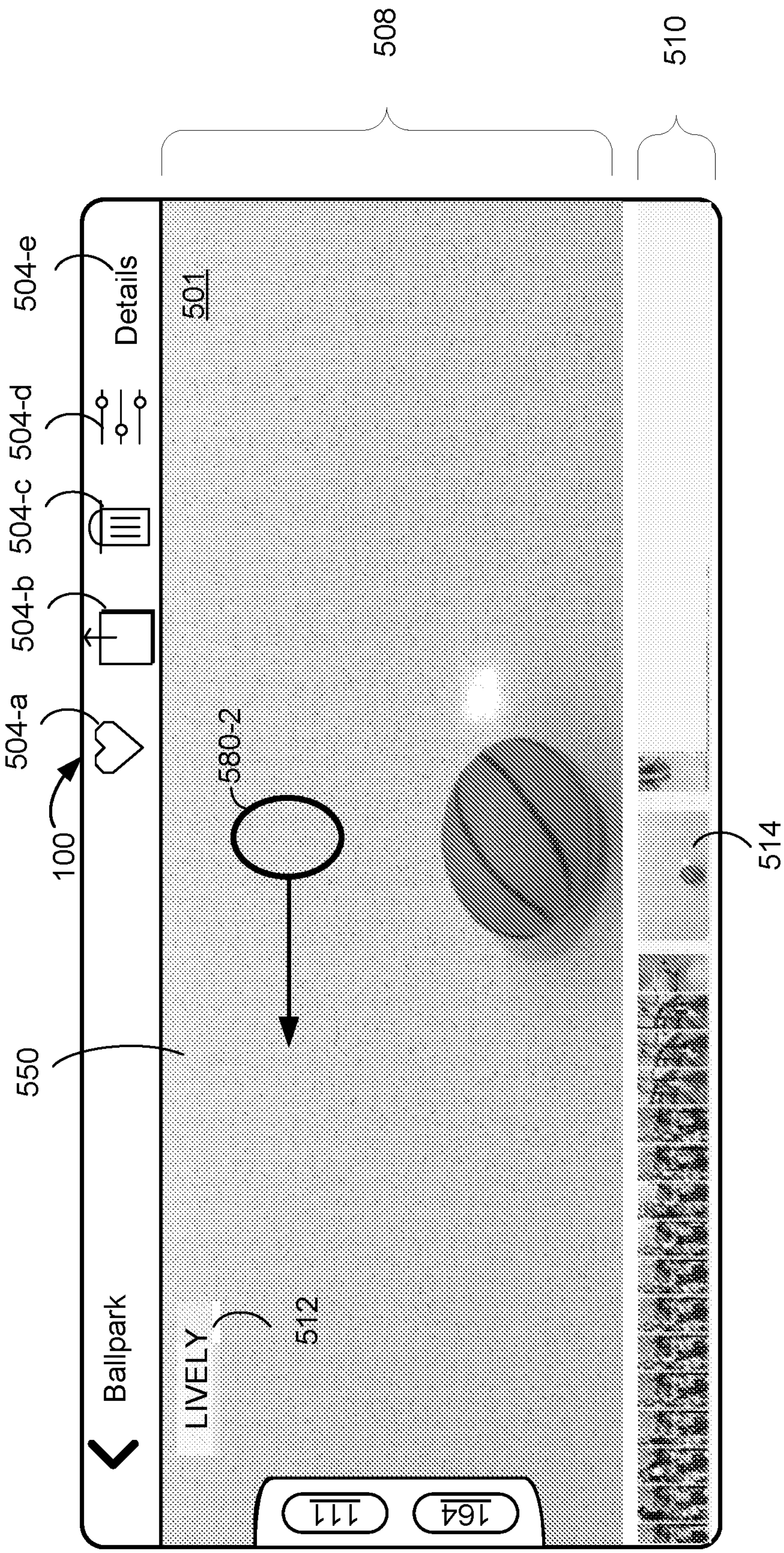
Figure 5C:
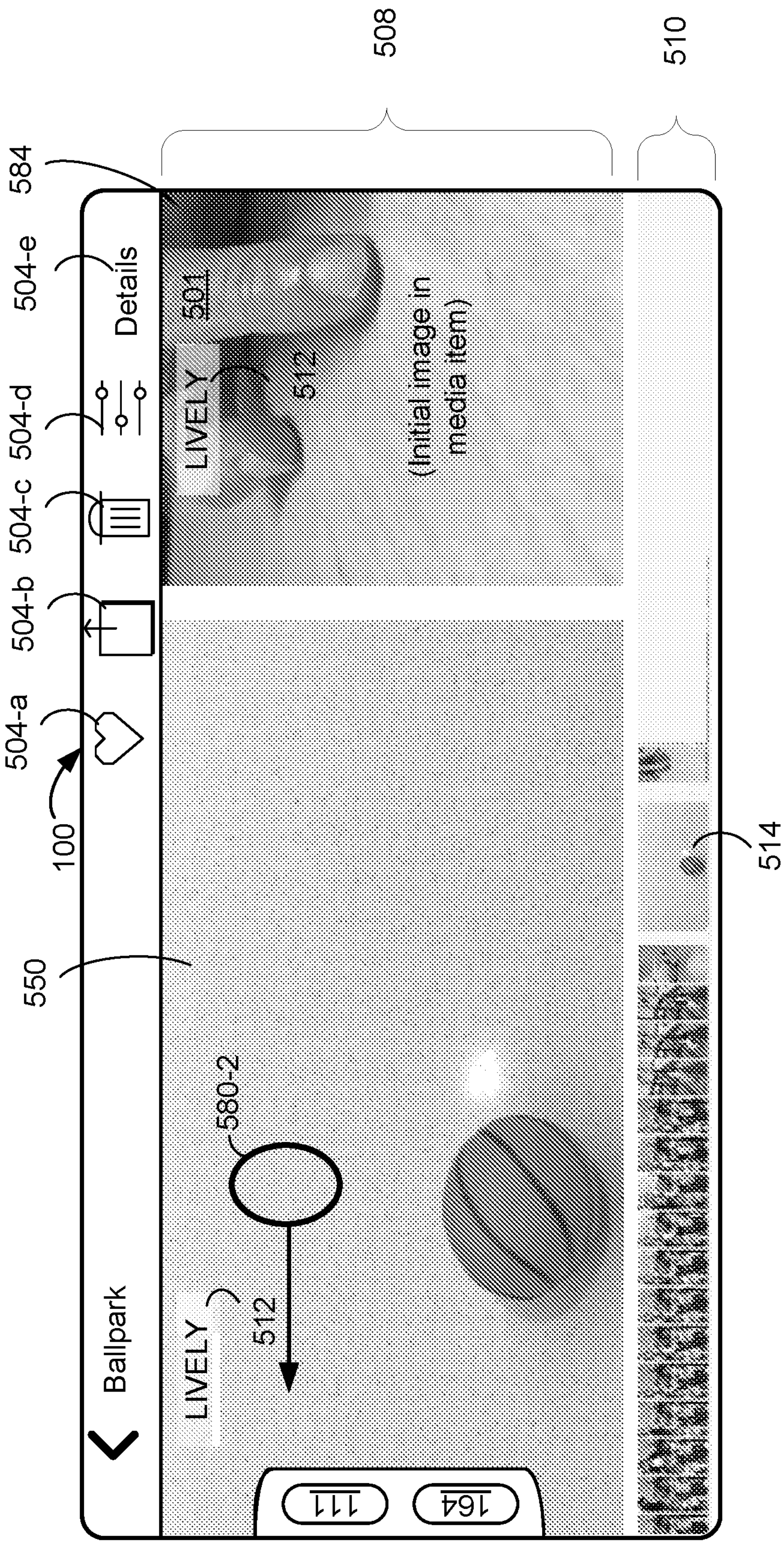
Figure 5C:
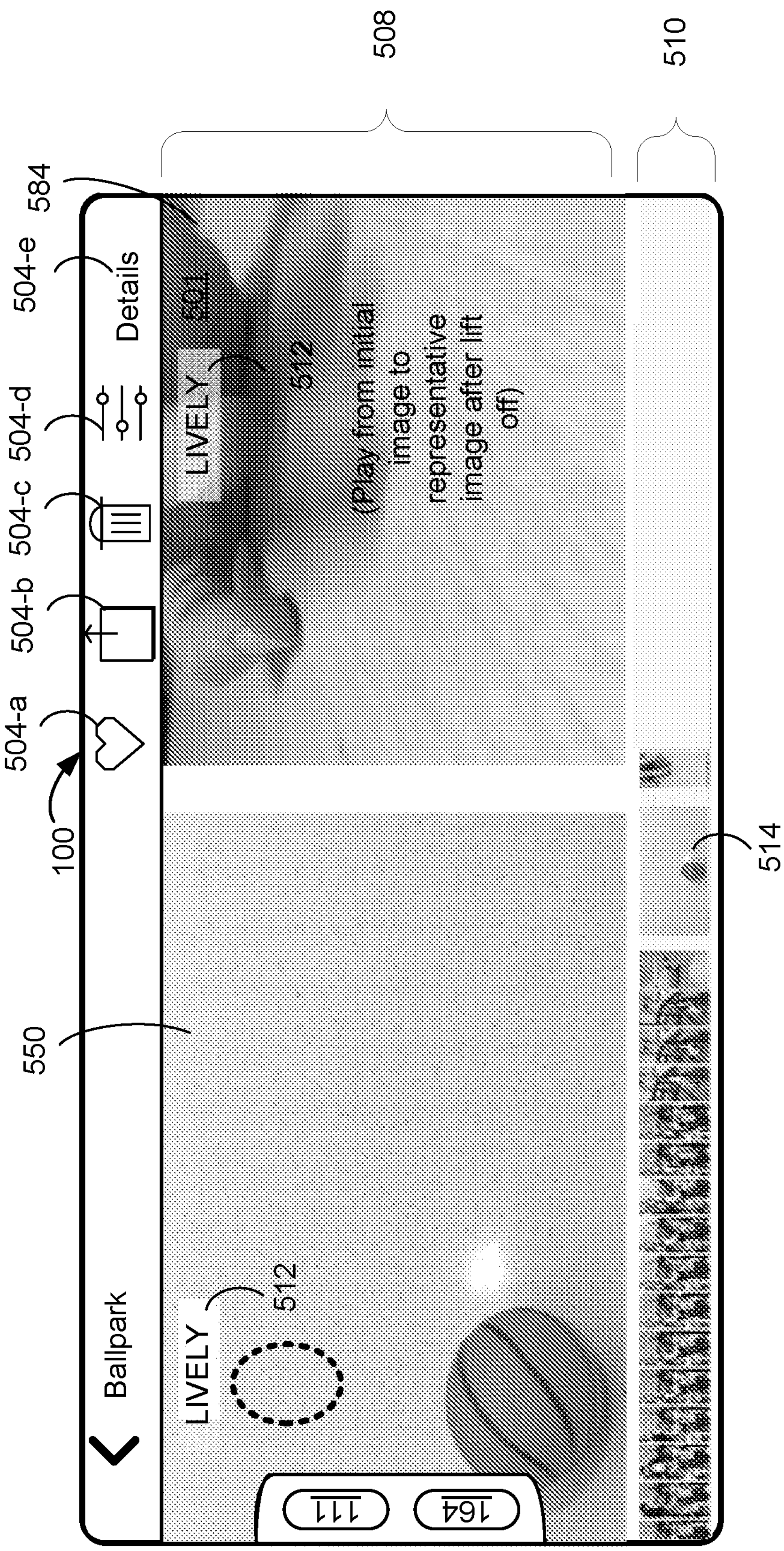
Figure 5C:
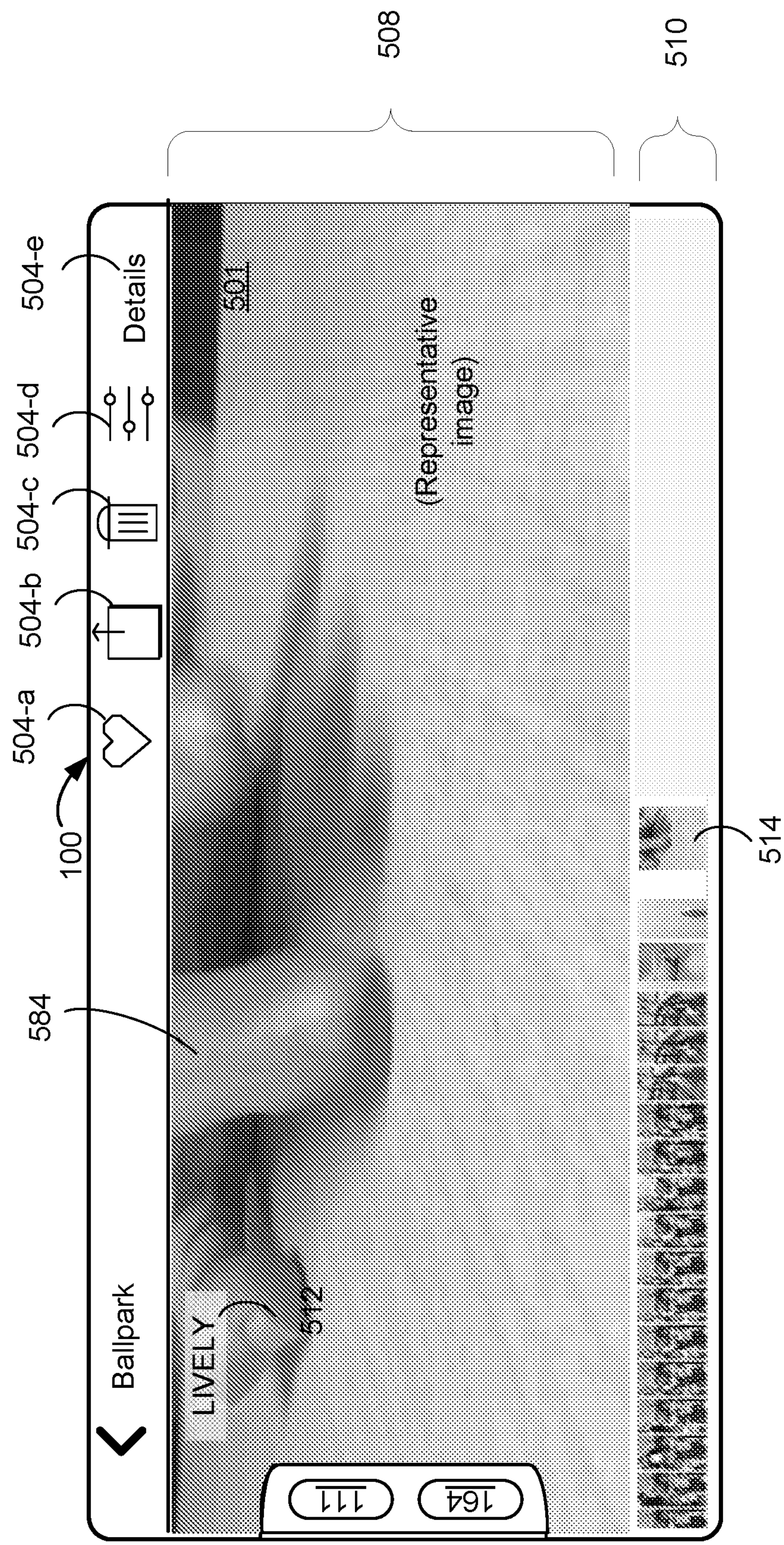
Figure 5C:
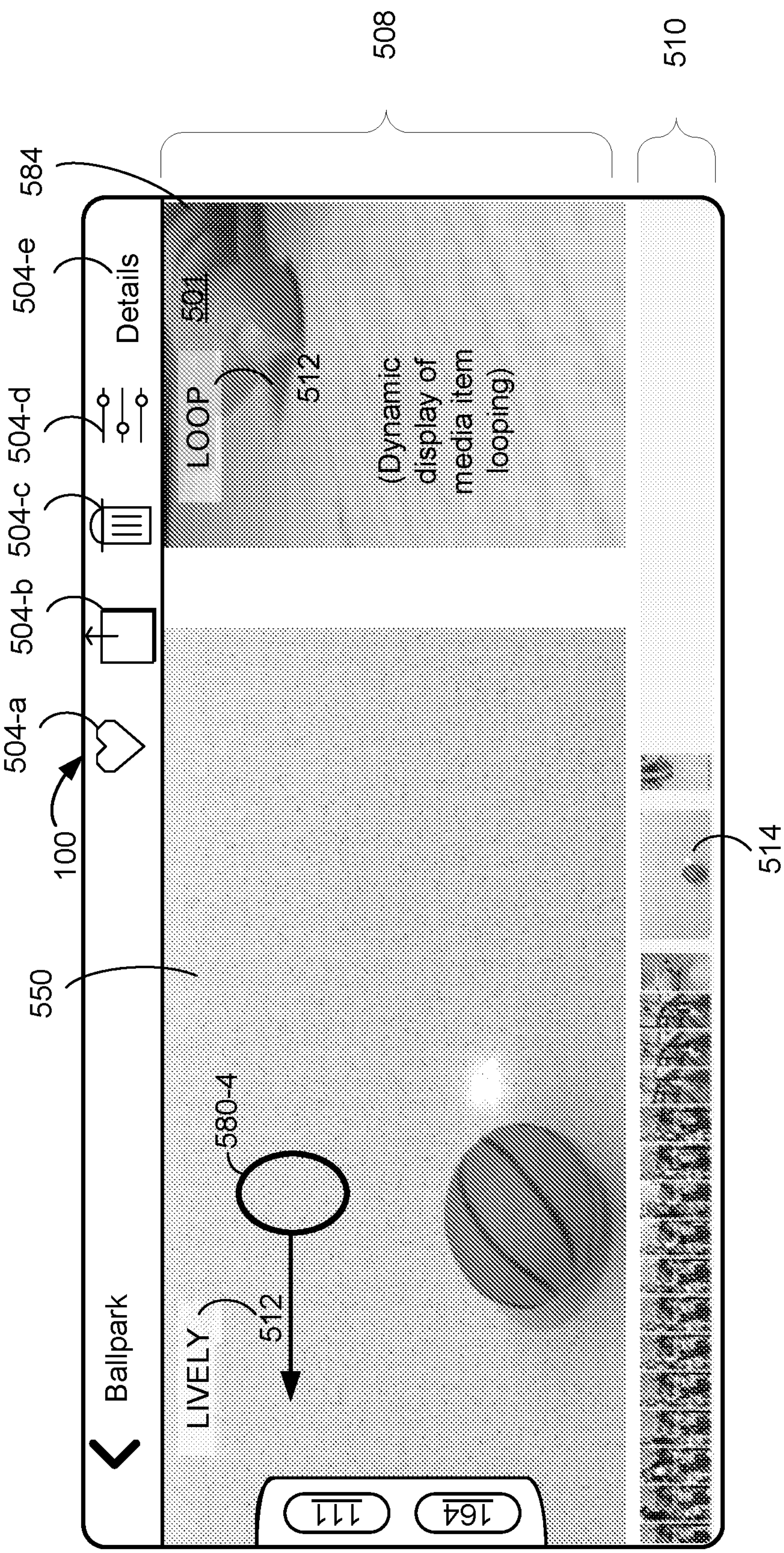
Figure 5C:
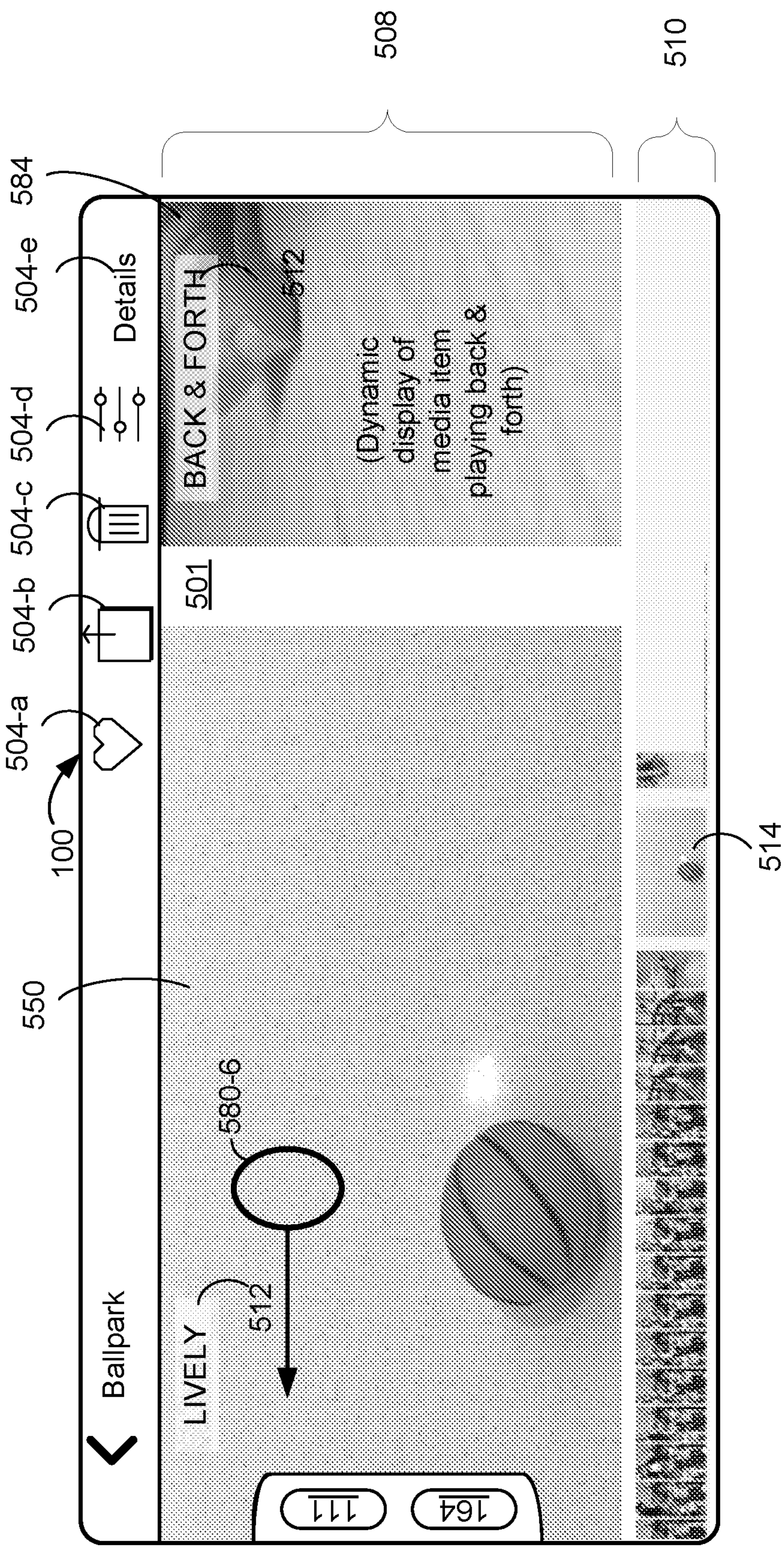
Figure 5C:
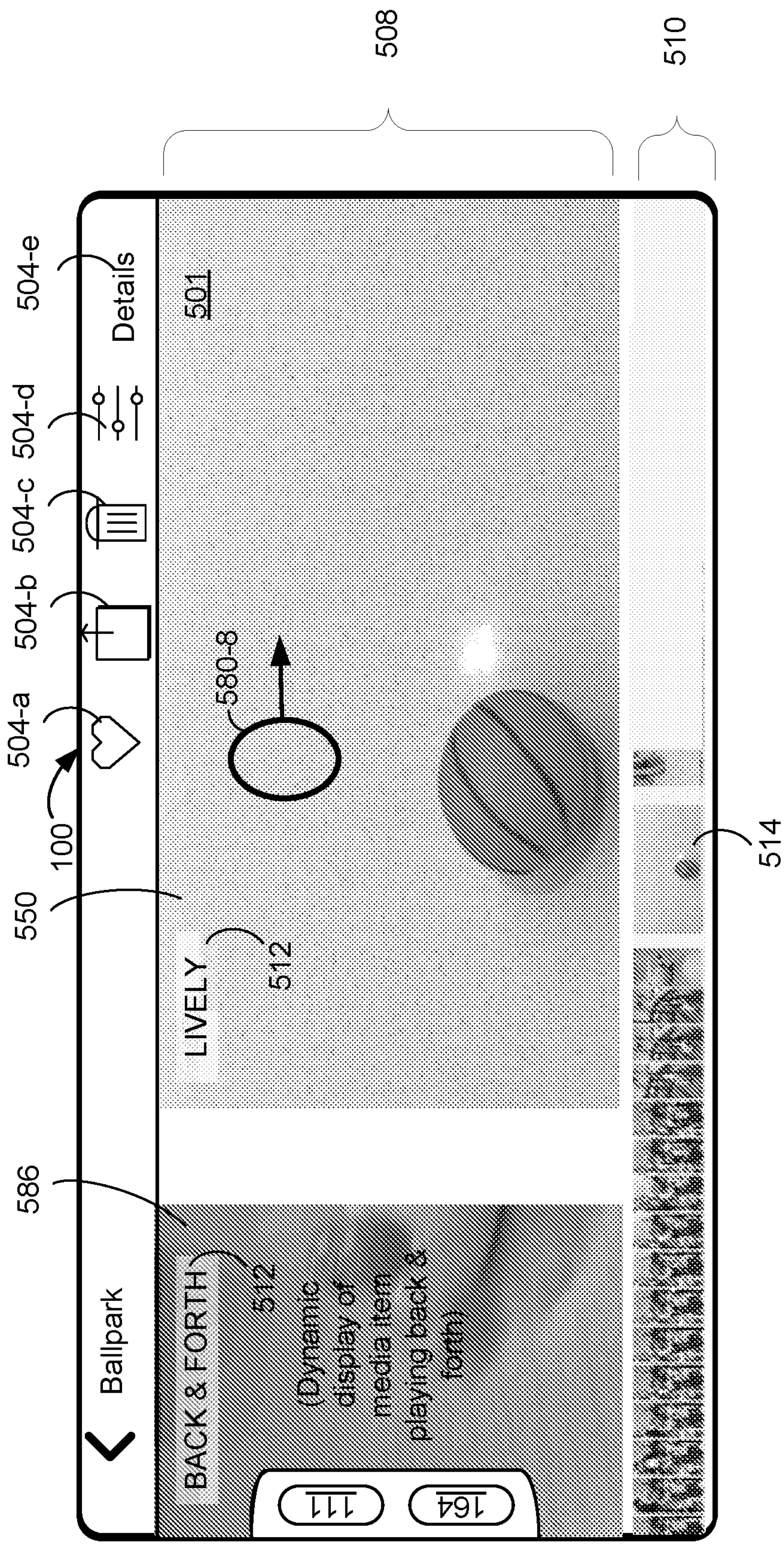
Figure 5C:
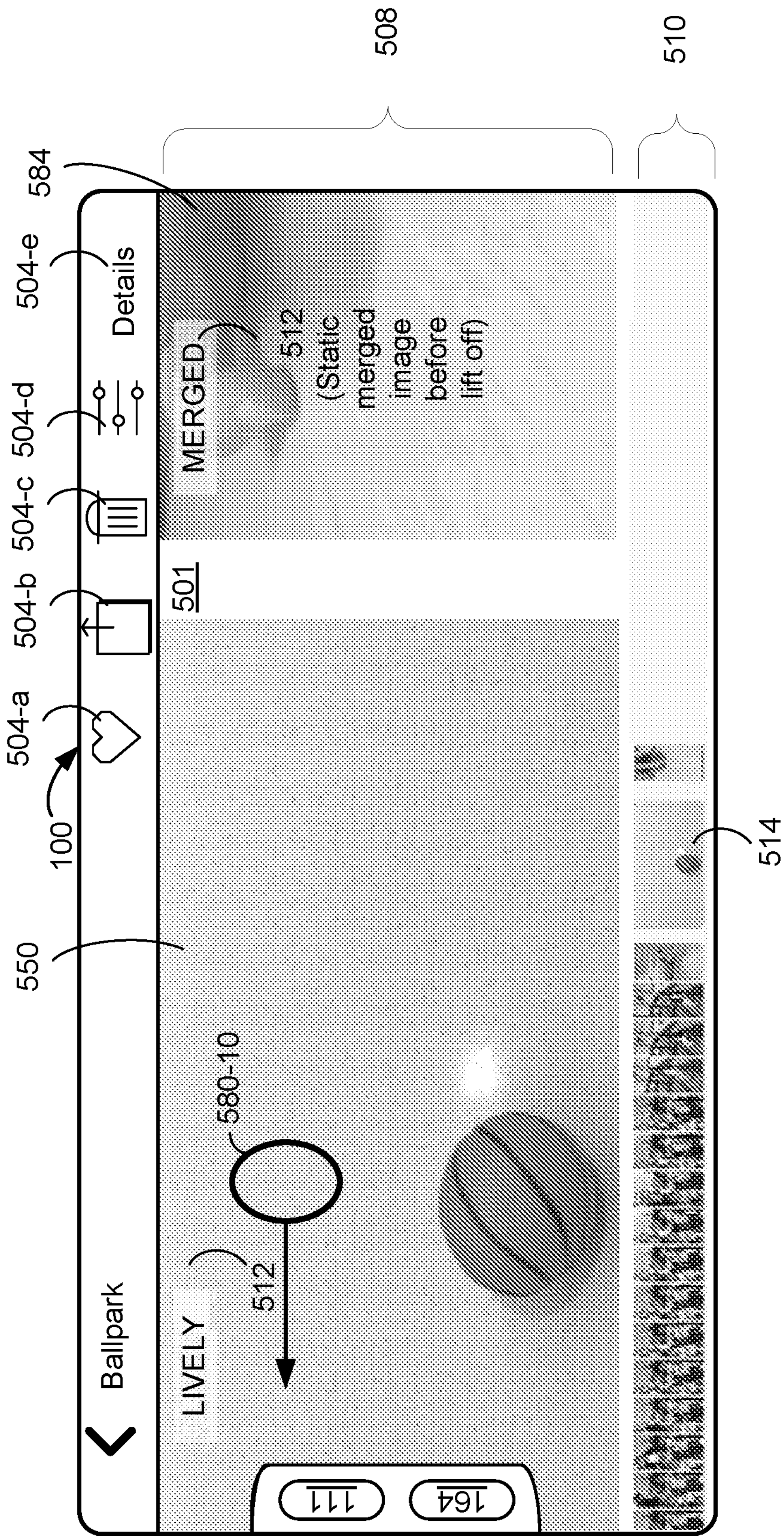
Figure 5C:
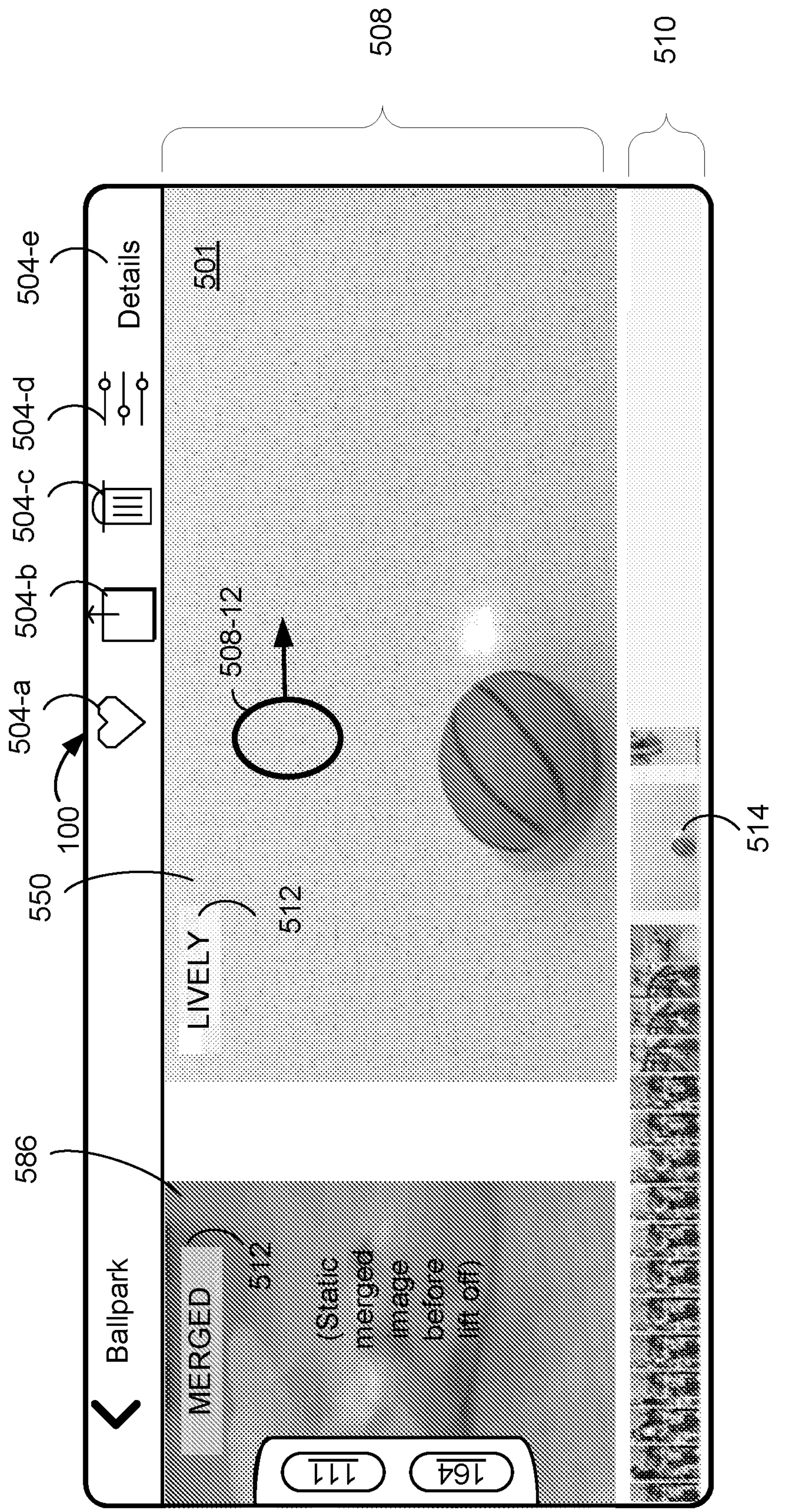
Figure 5C:
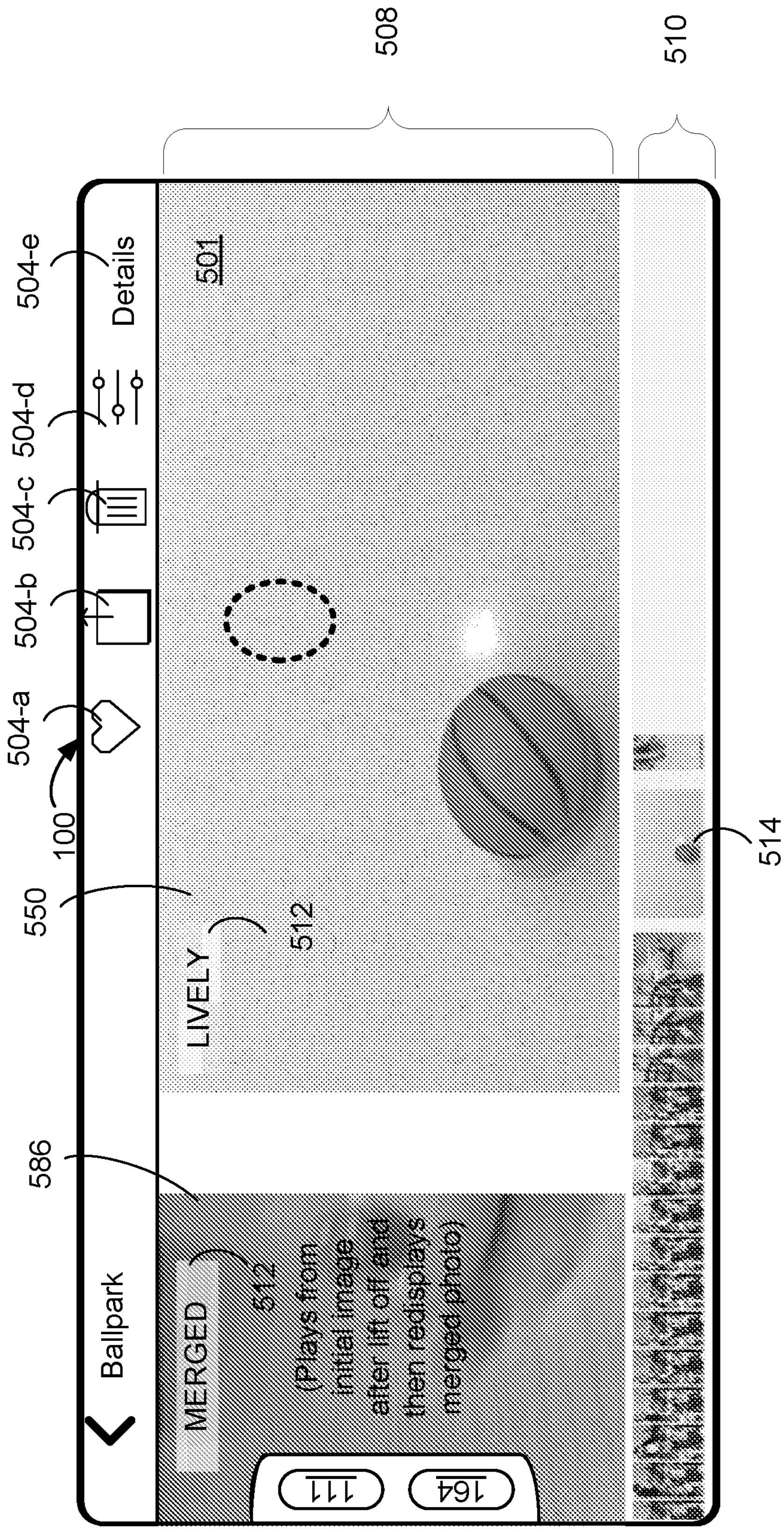
Figure 5C:
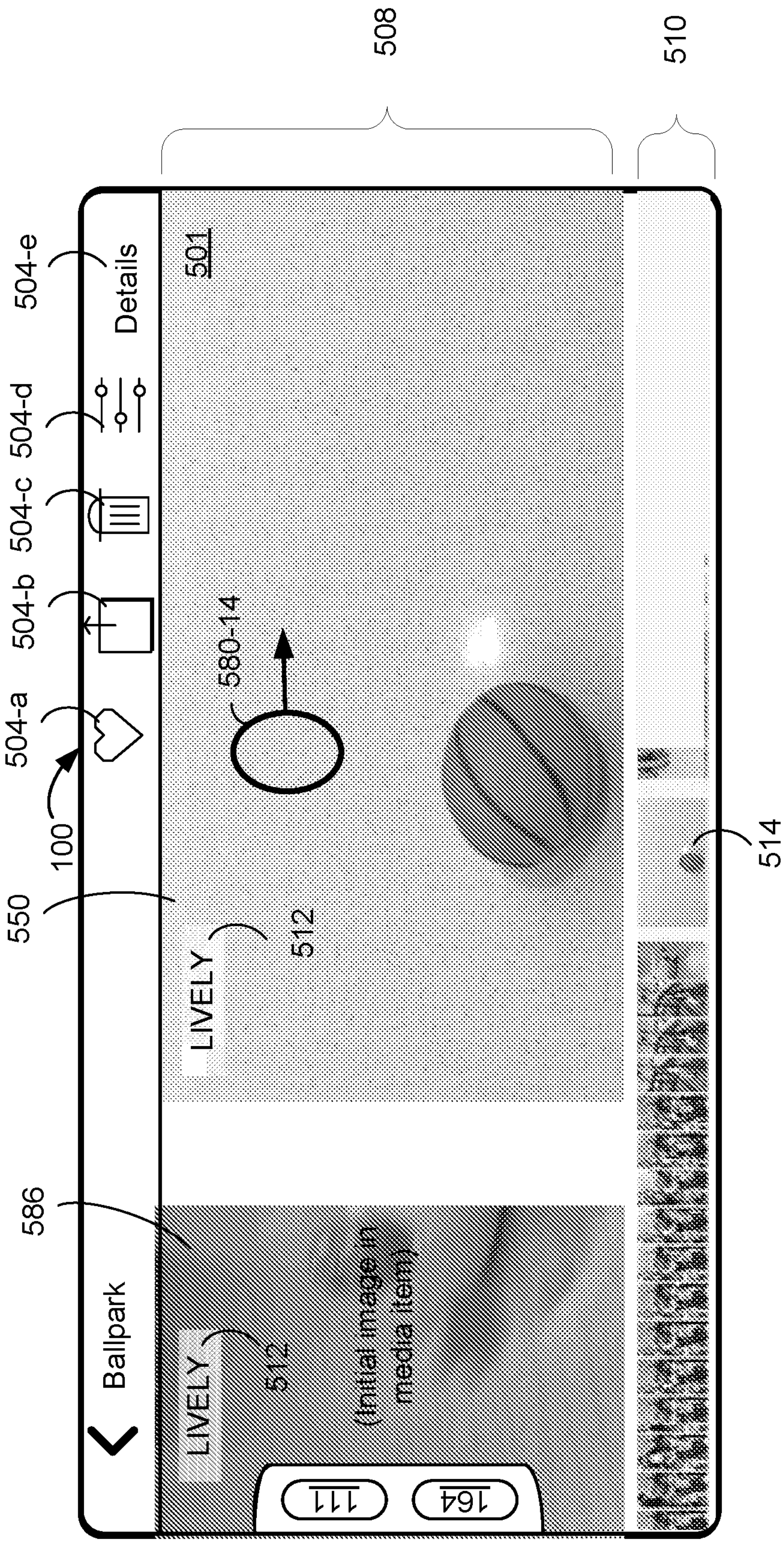
Figure 5C:
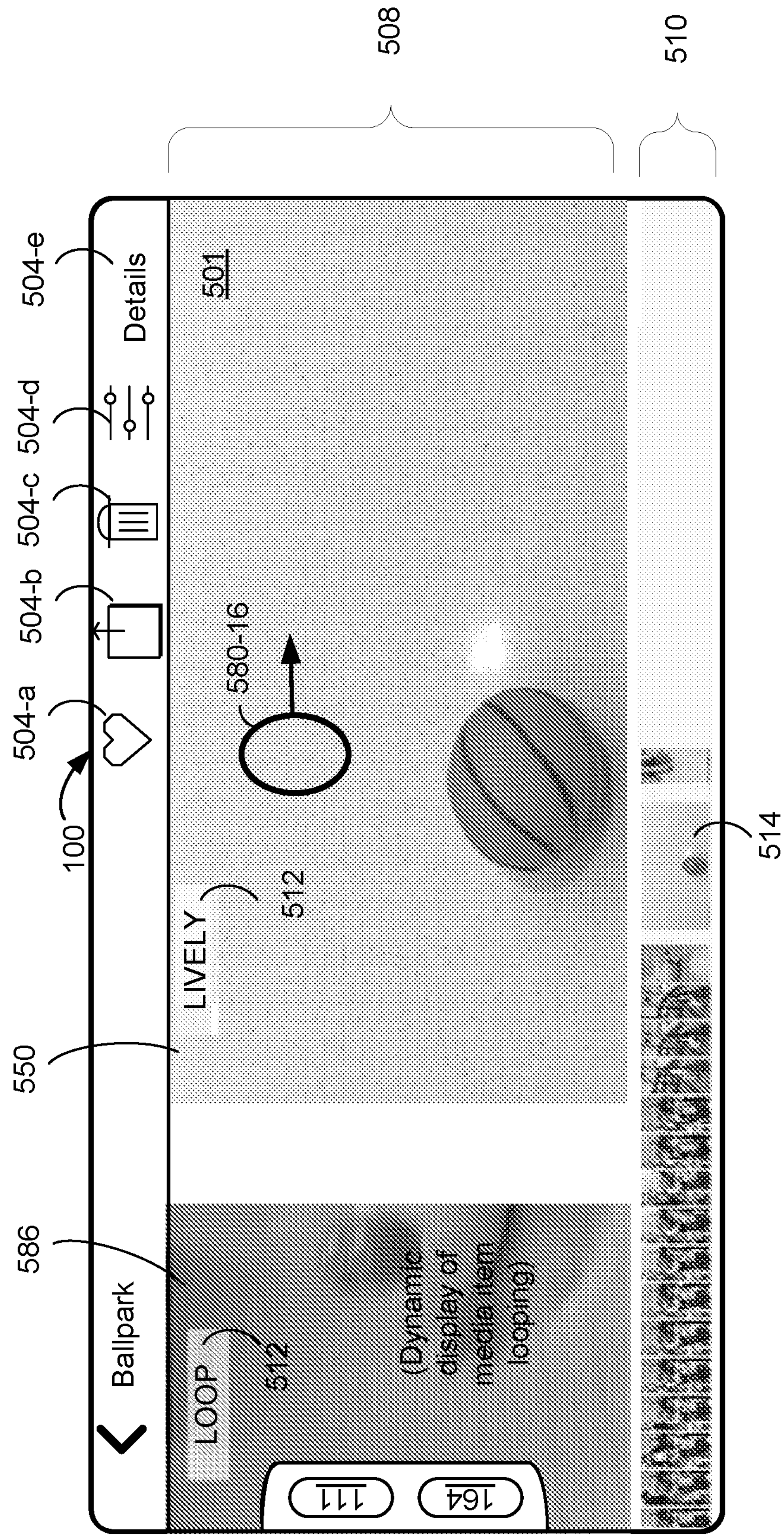
Figure 5D:
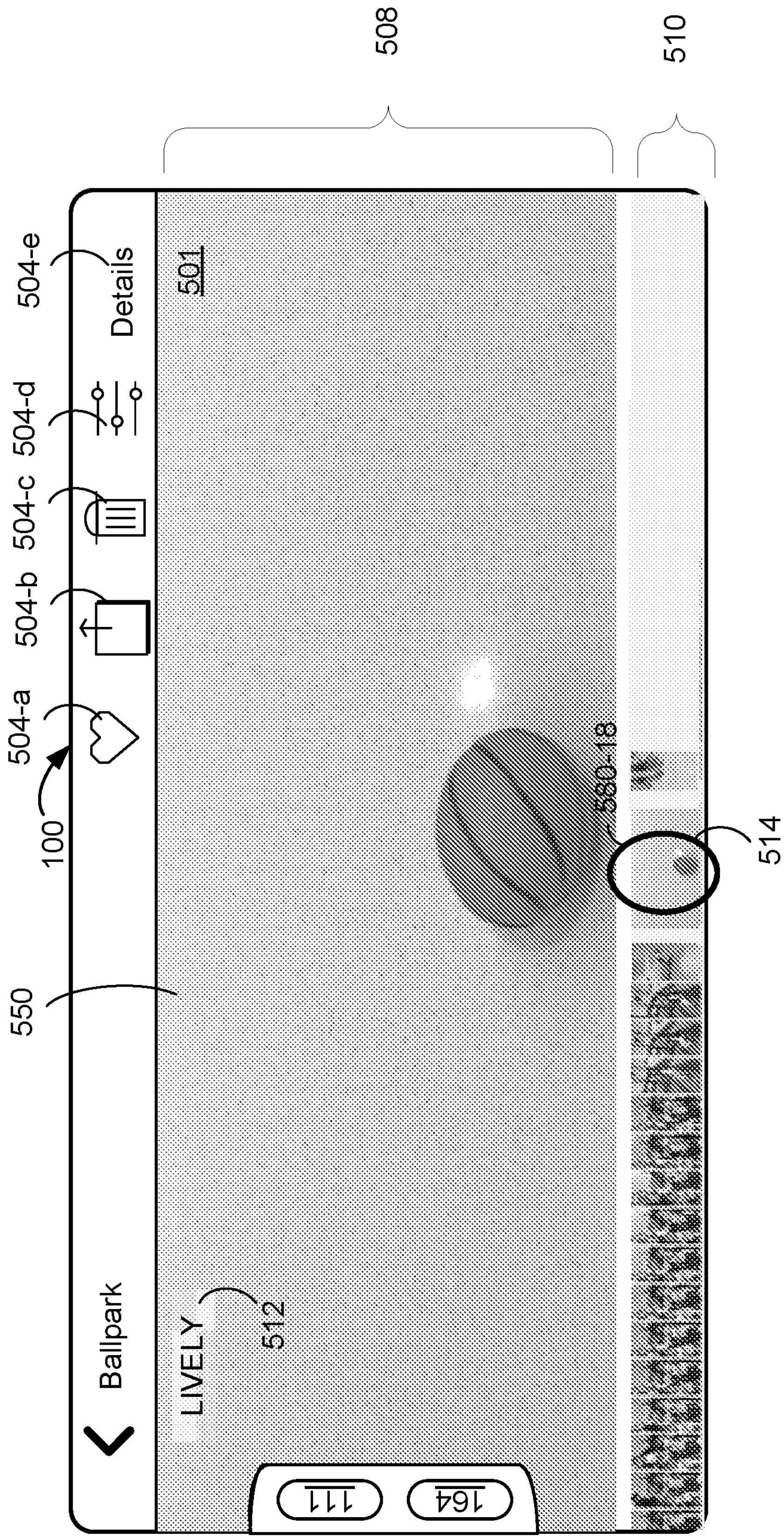
Figure 5D:
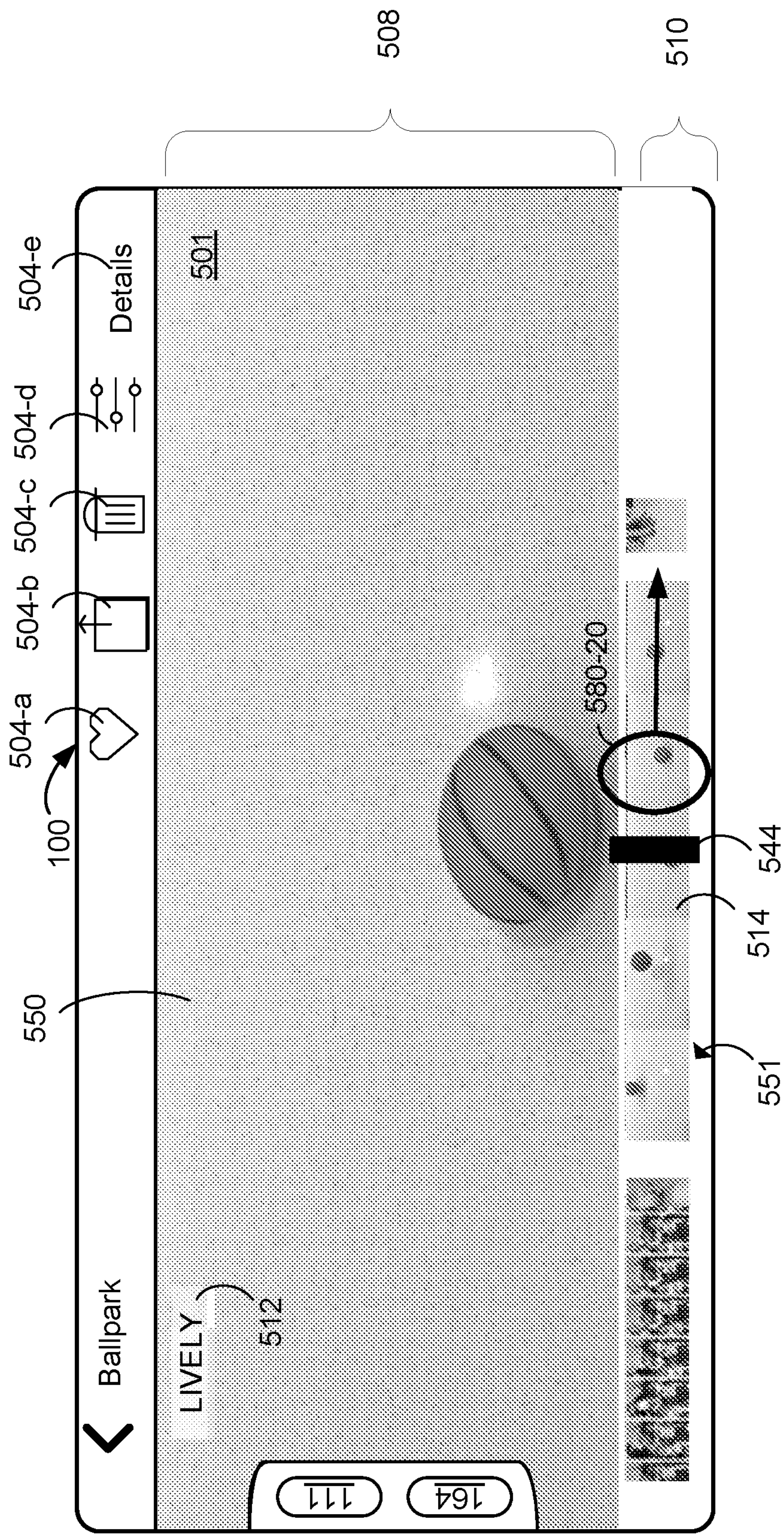
Figure 5D:
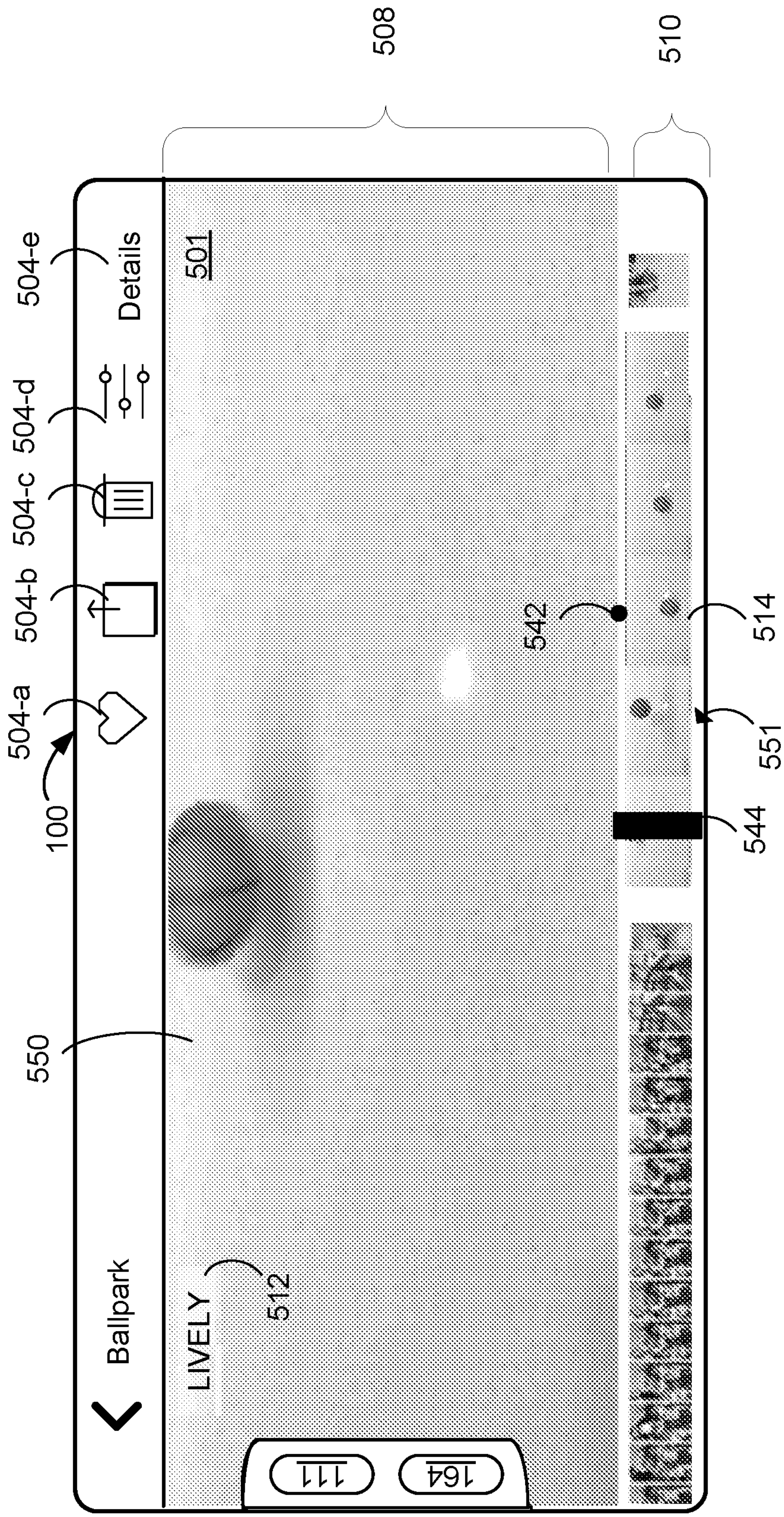
Figure 5D:
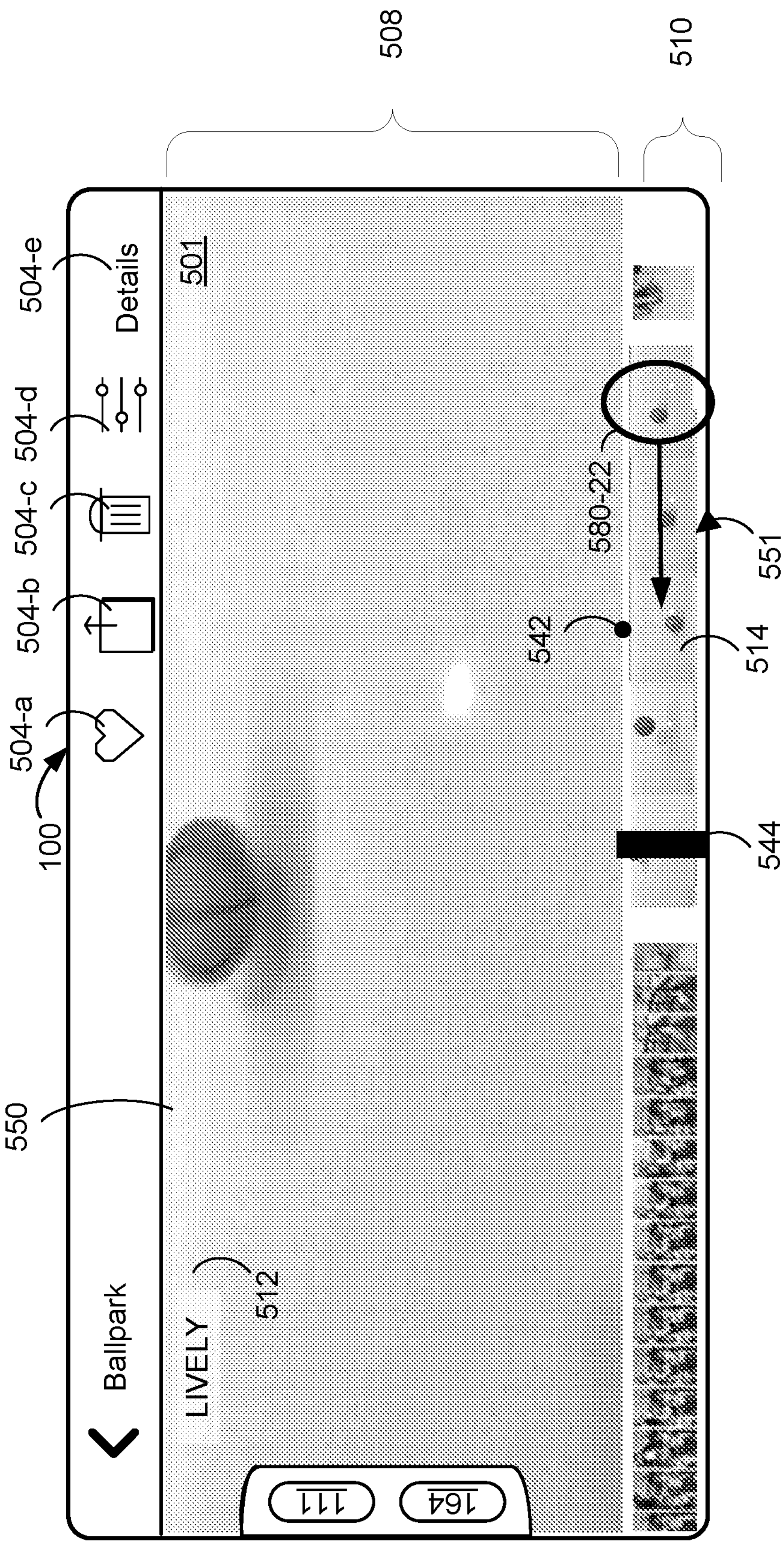
Figure 5D:
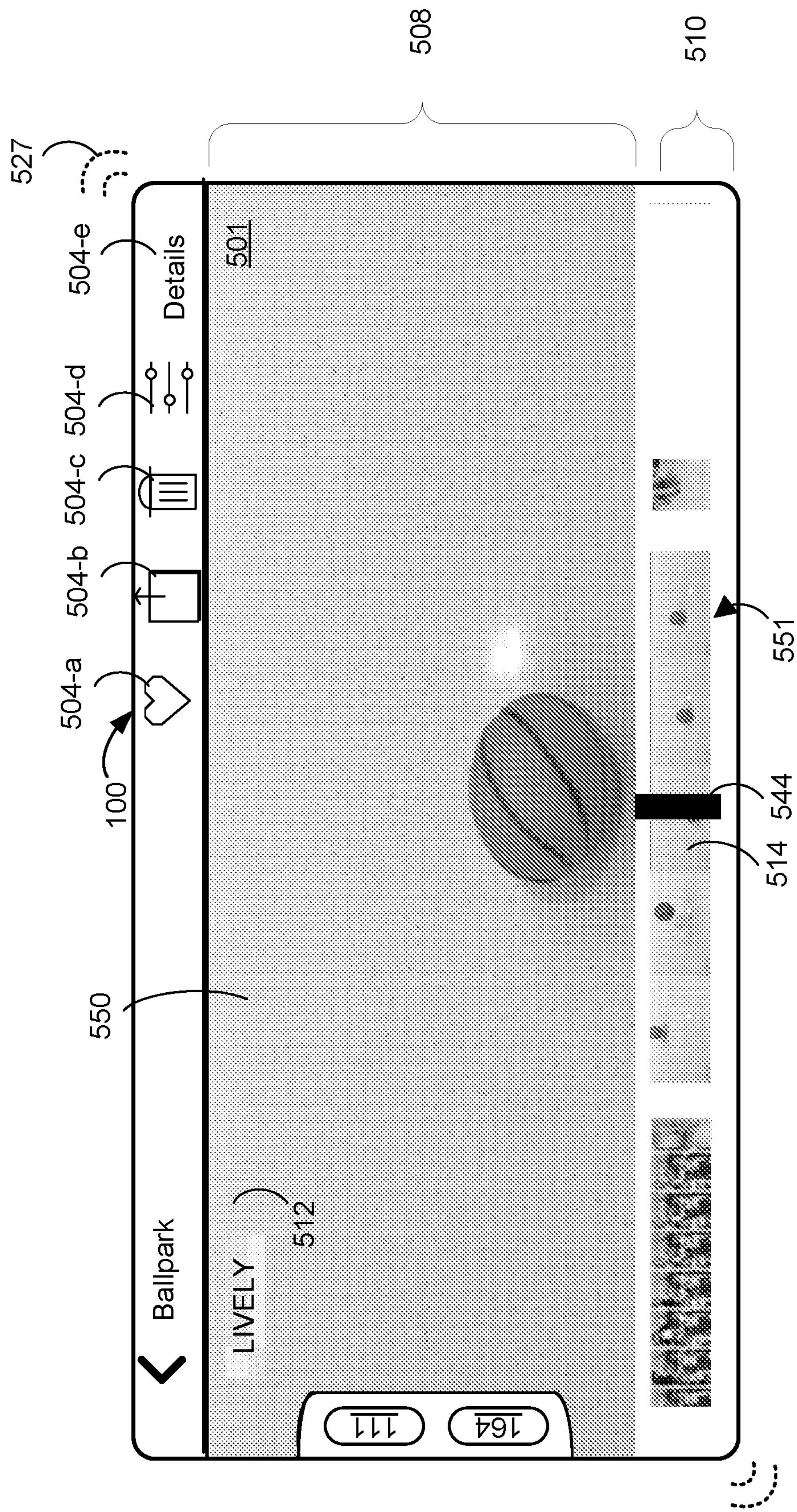
Figure 5D:
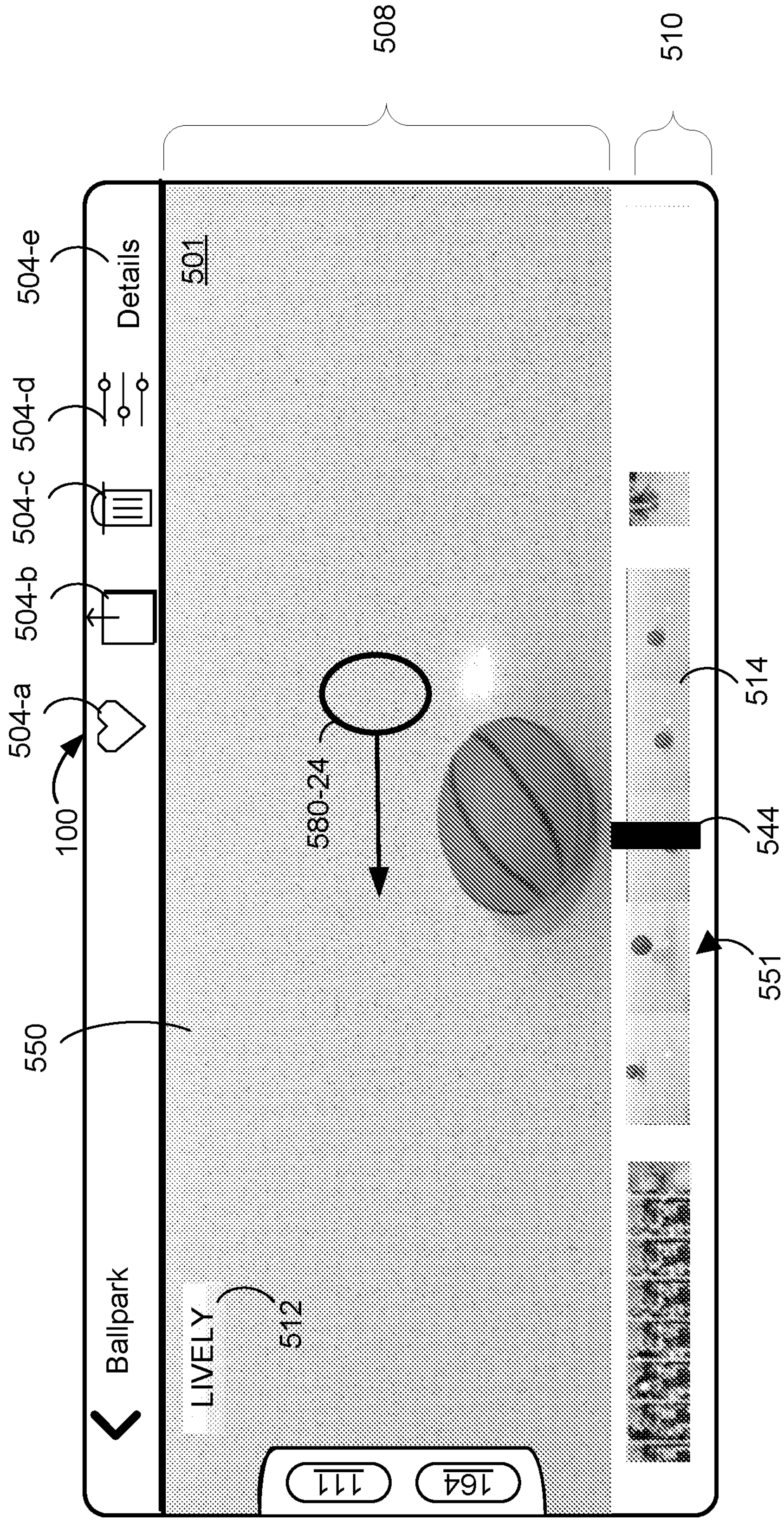
Figure 5D:
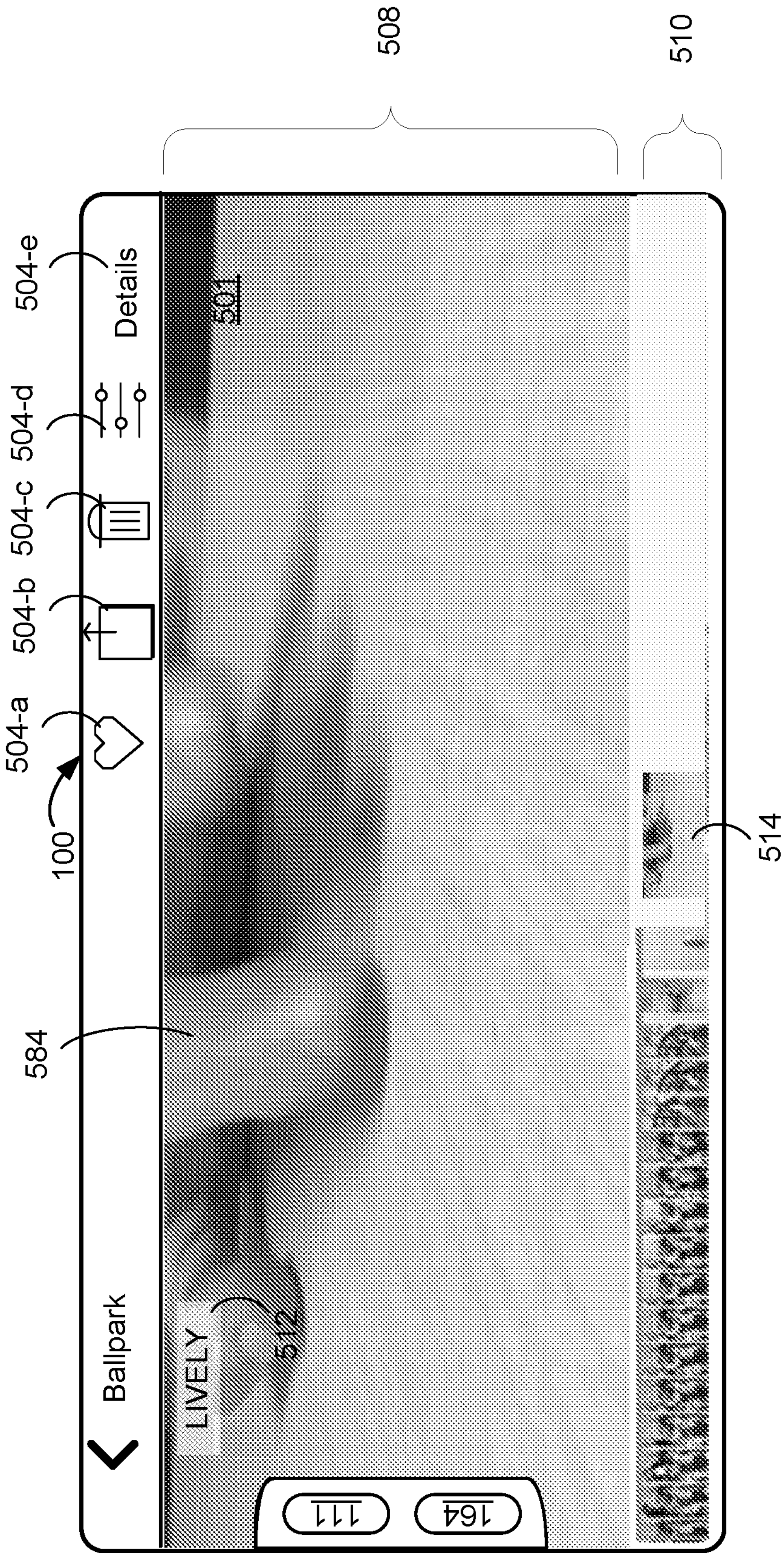
Figure 5D:
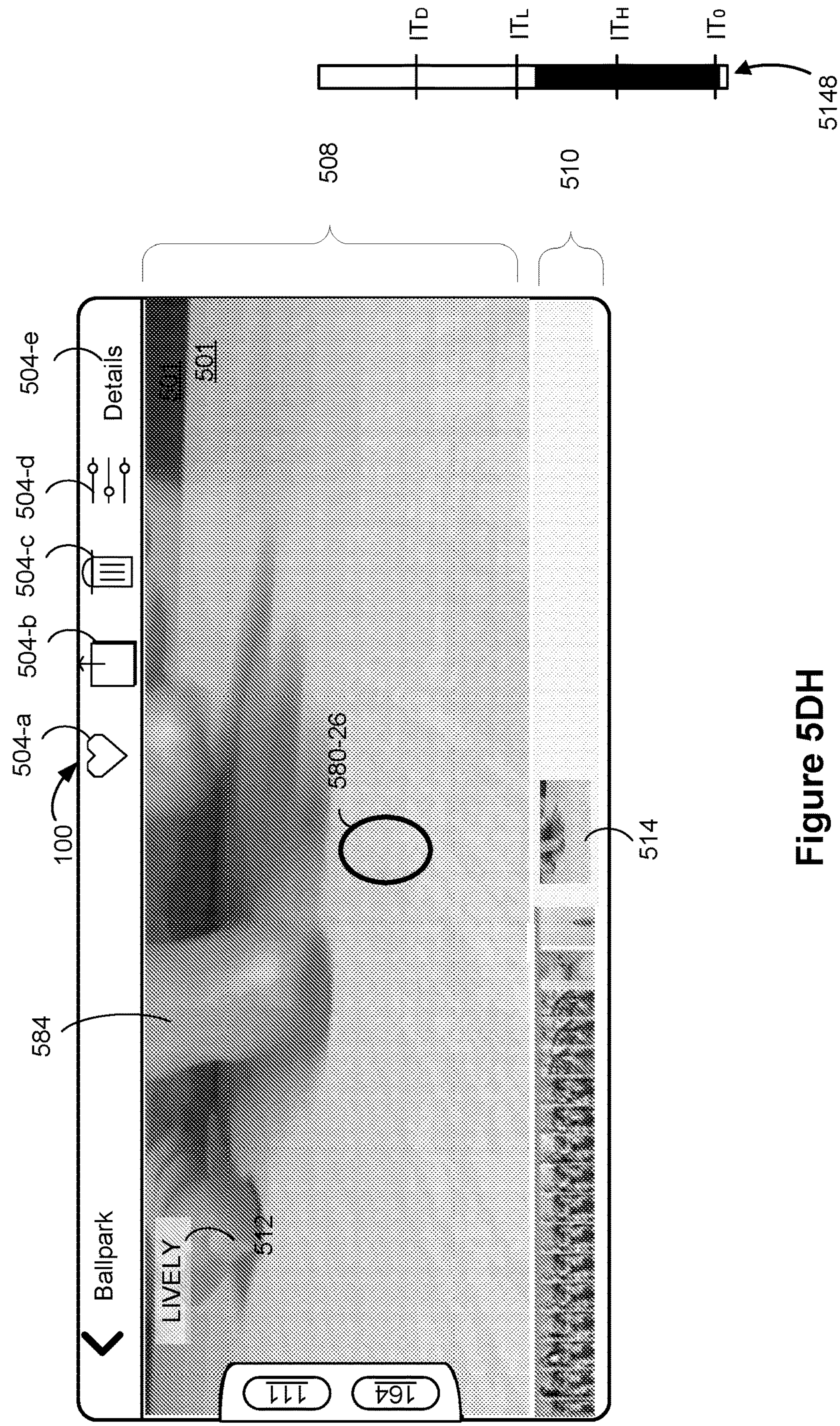
Figure 5D:
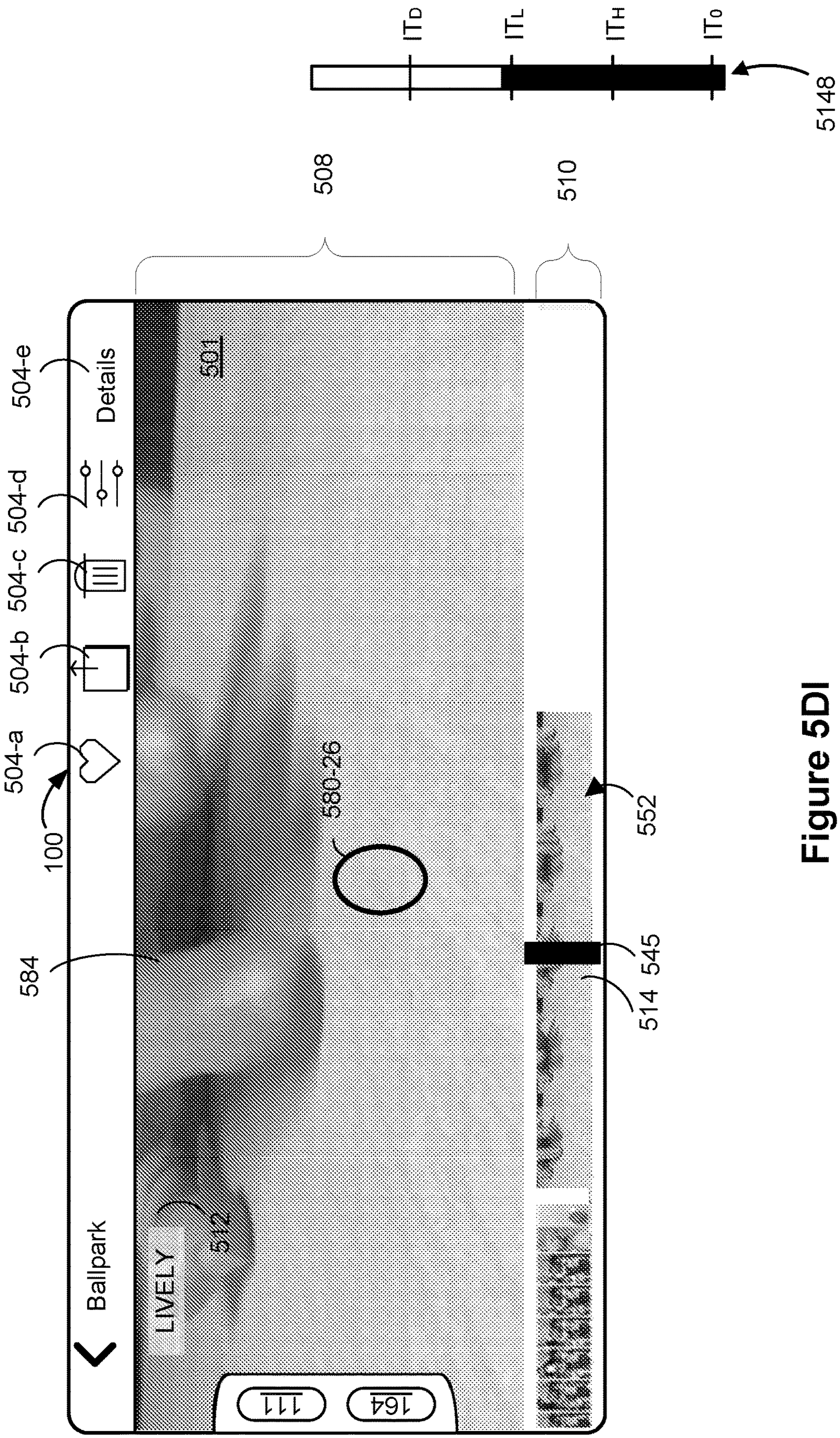
Figure 5D:
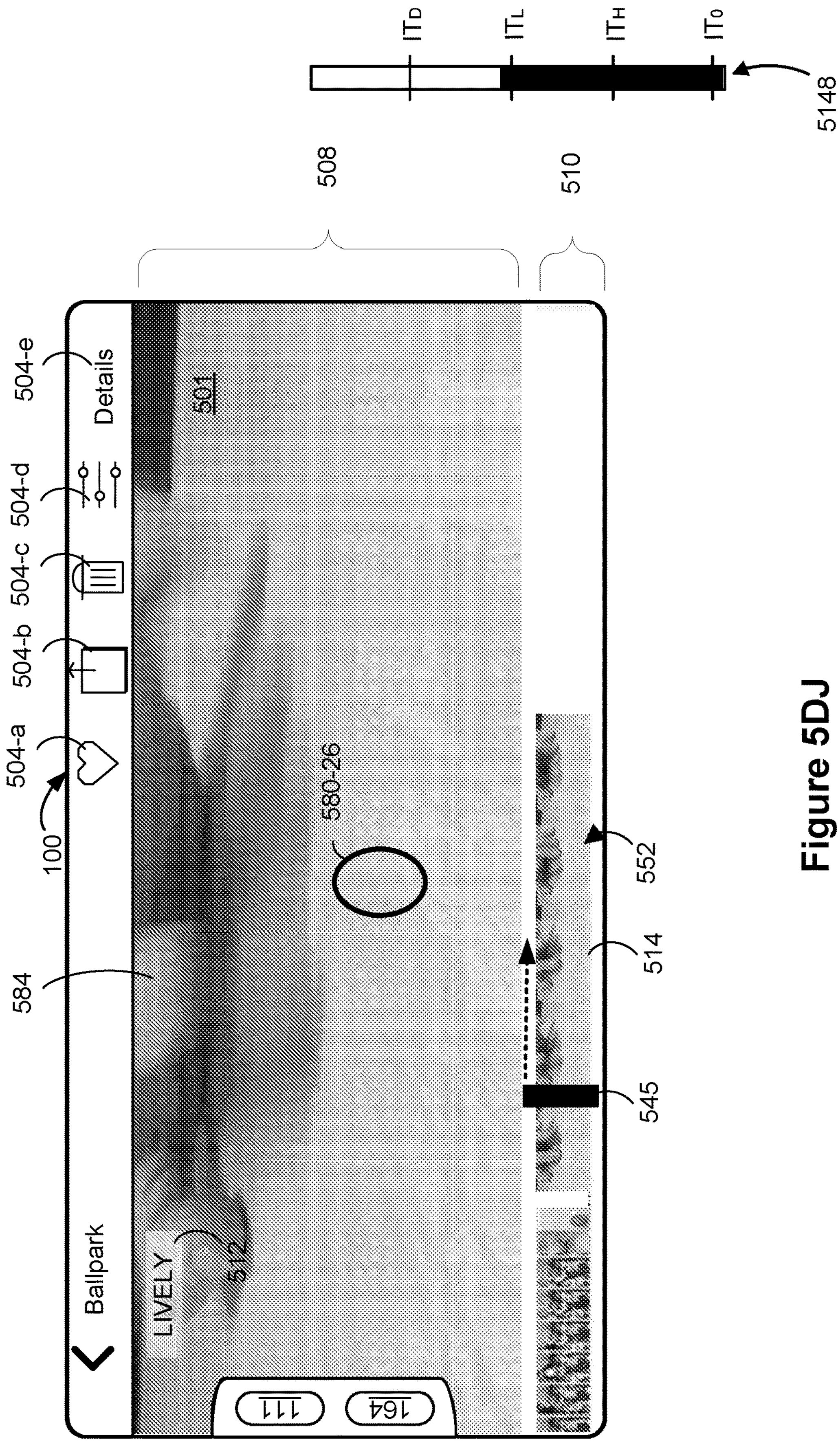
Figure 5D:
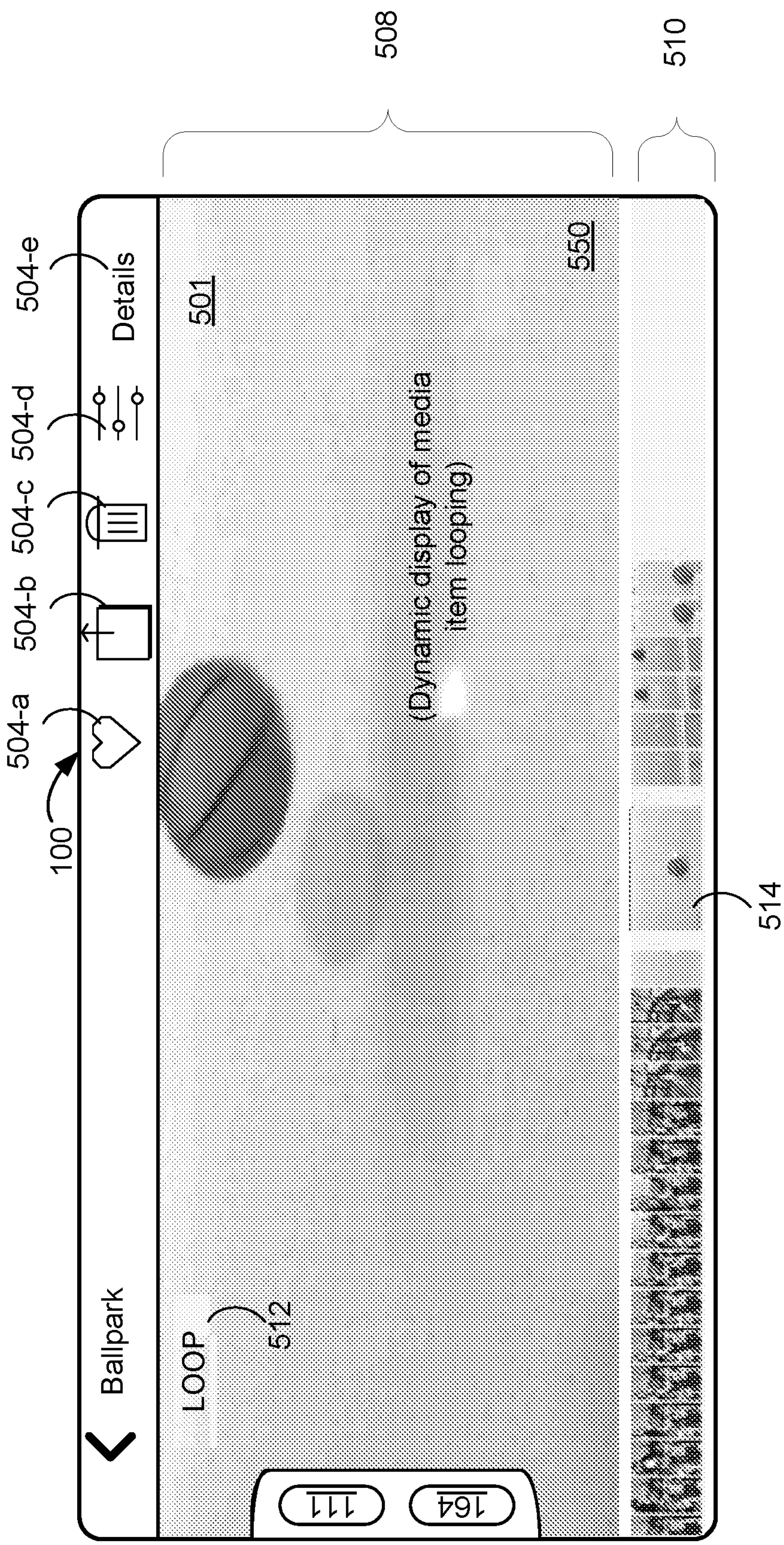
Figure 5D:
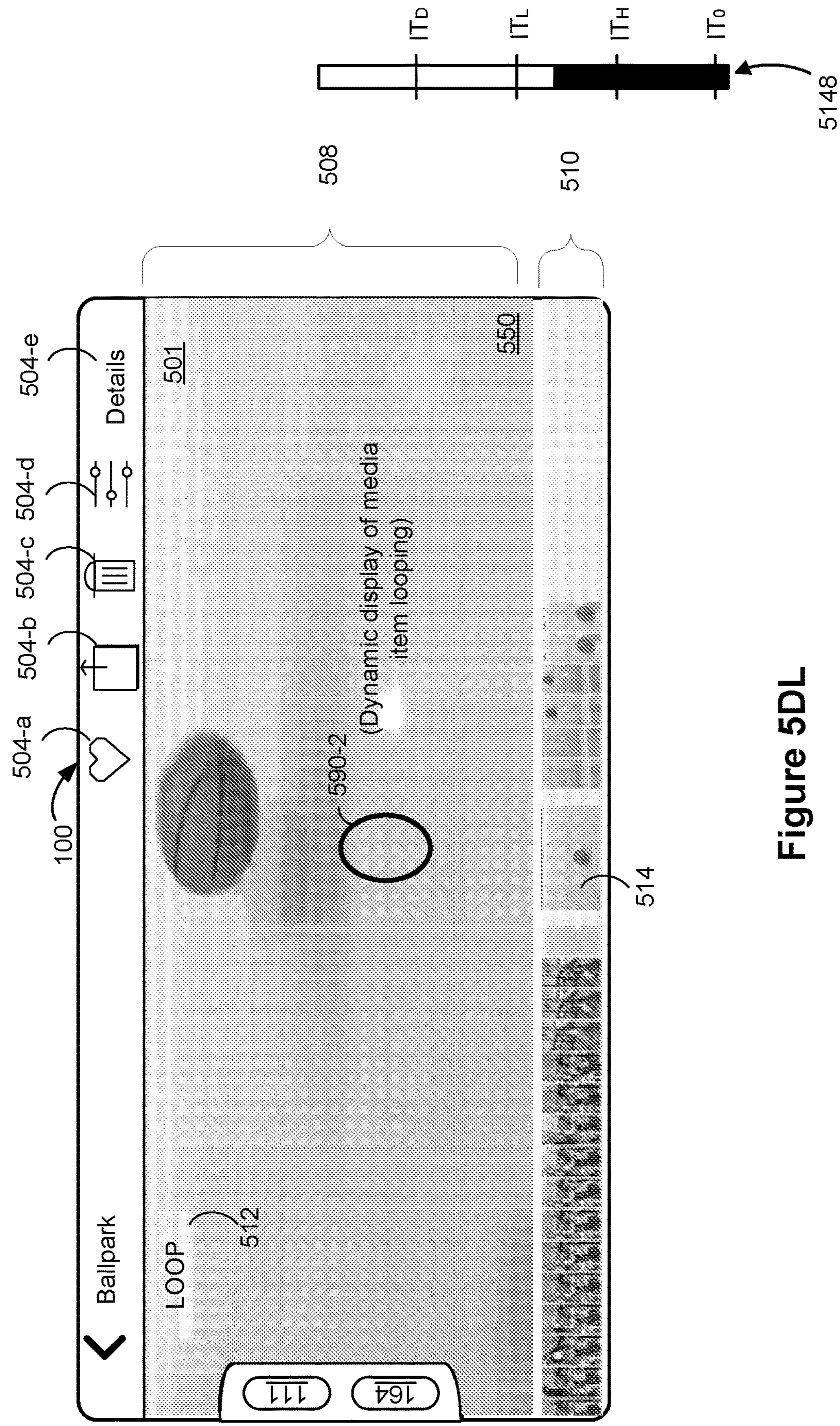
Figure 5D:
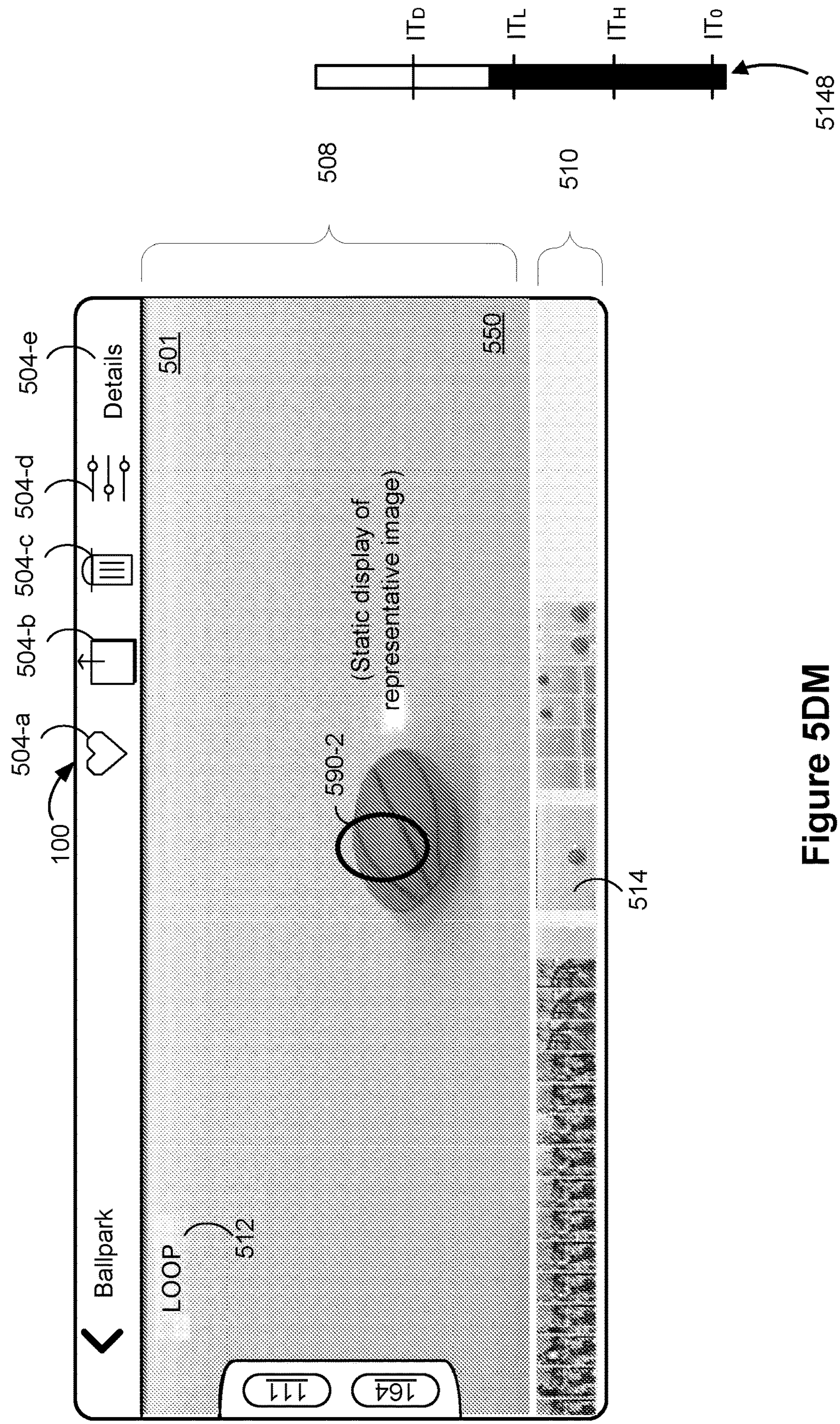
Figure 5D:
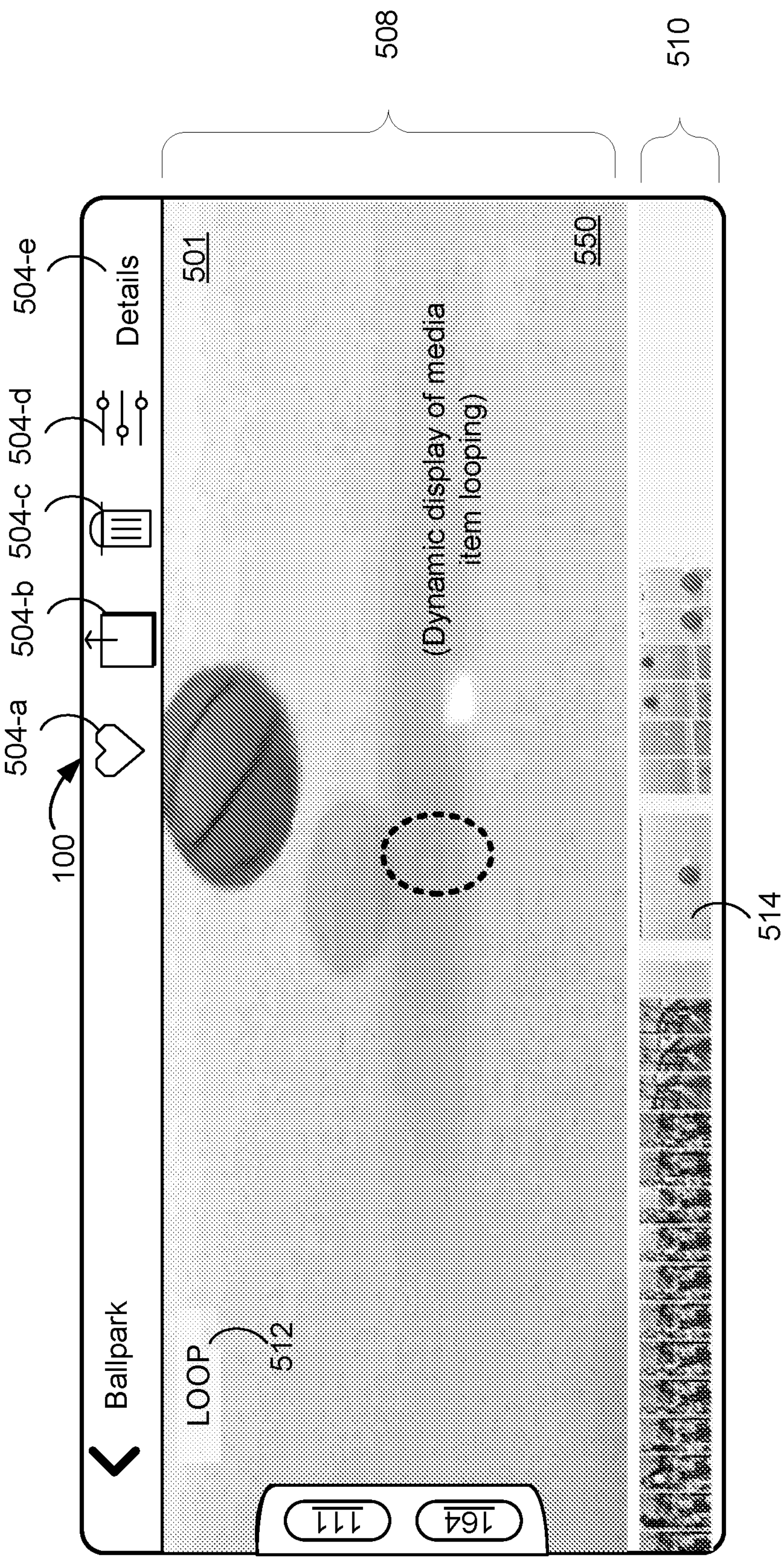
Figure 5D:
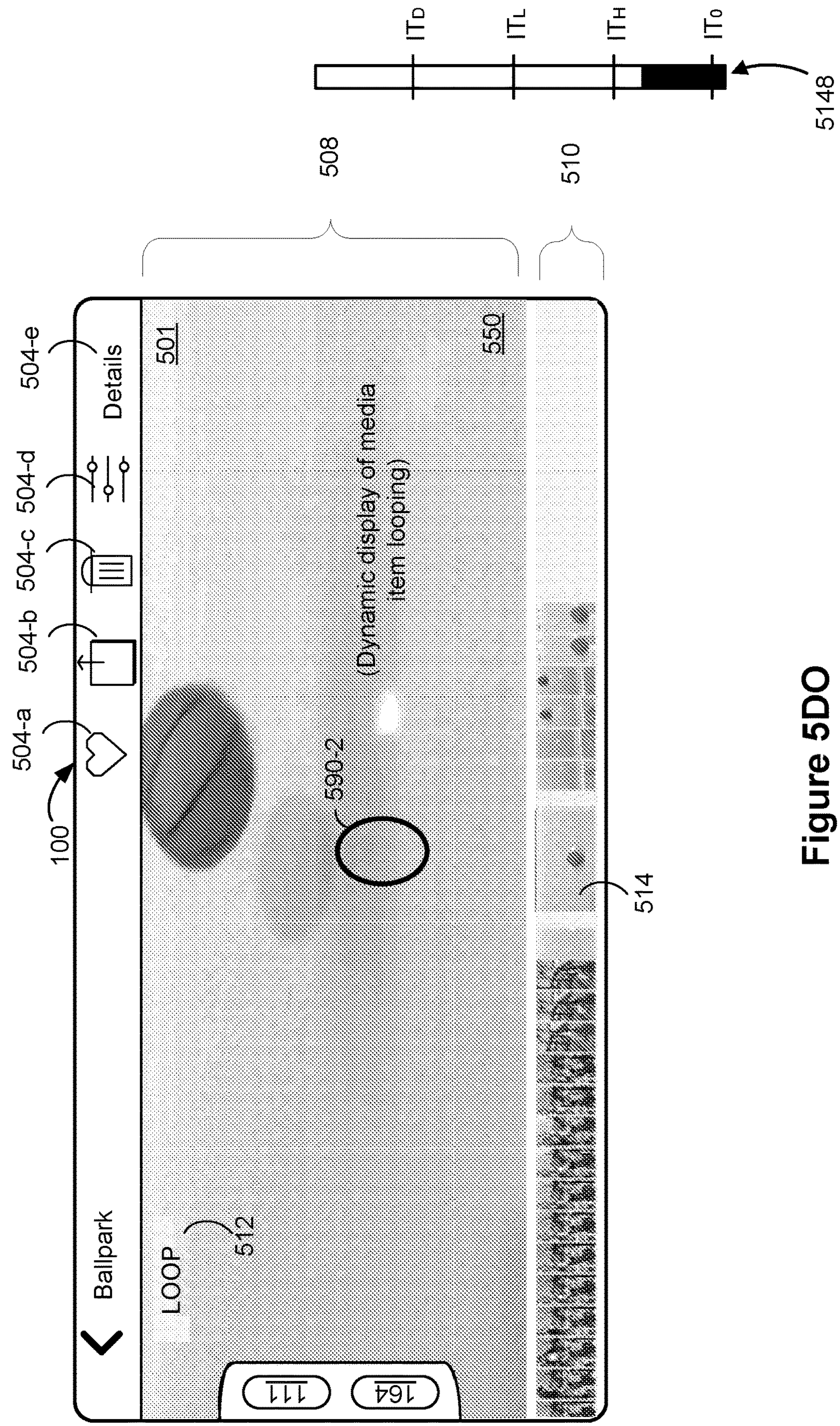
Figure 5D:
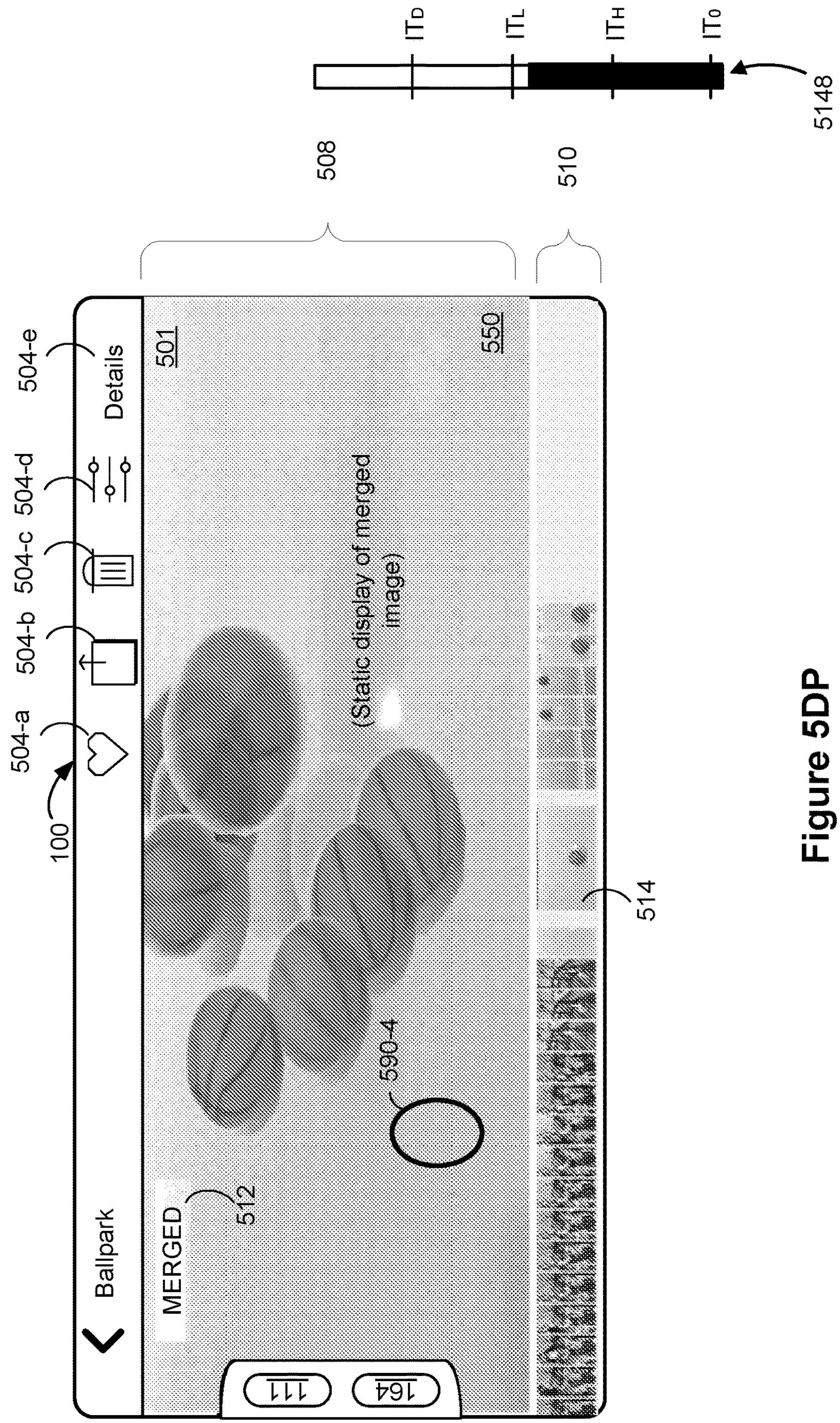
Figure 5D:
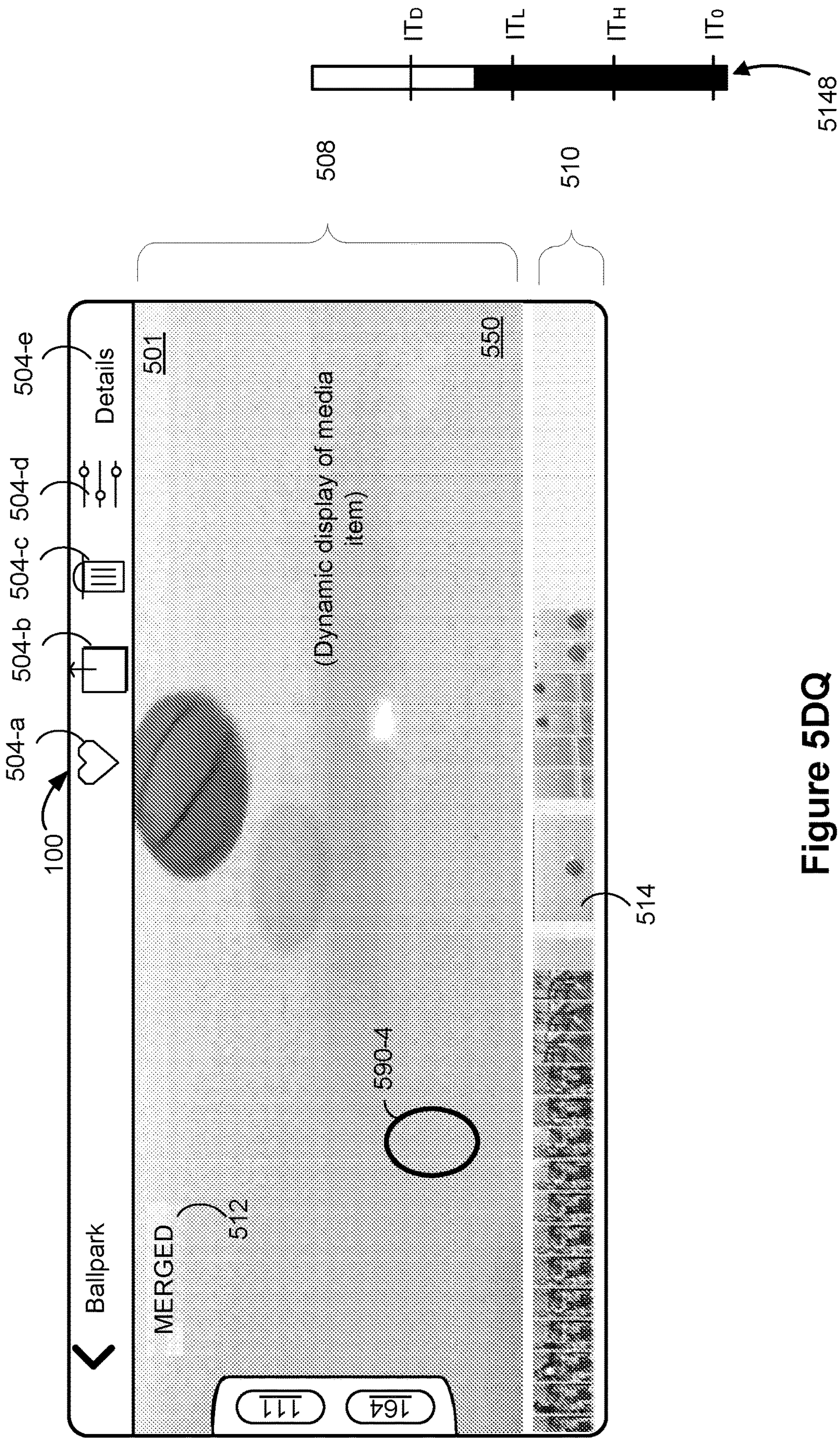
Figure 5D:
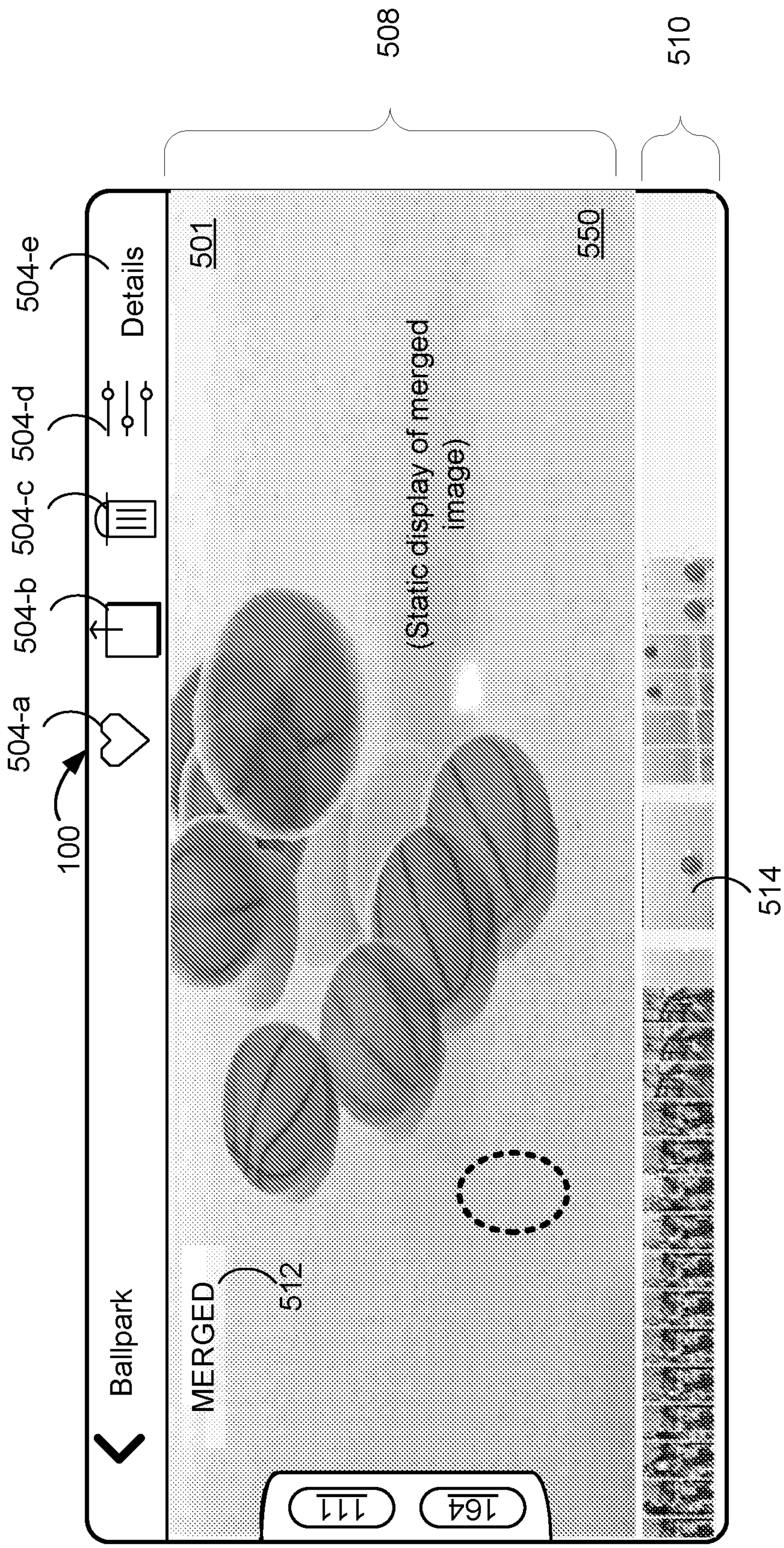
Figure 5D:
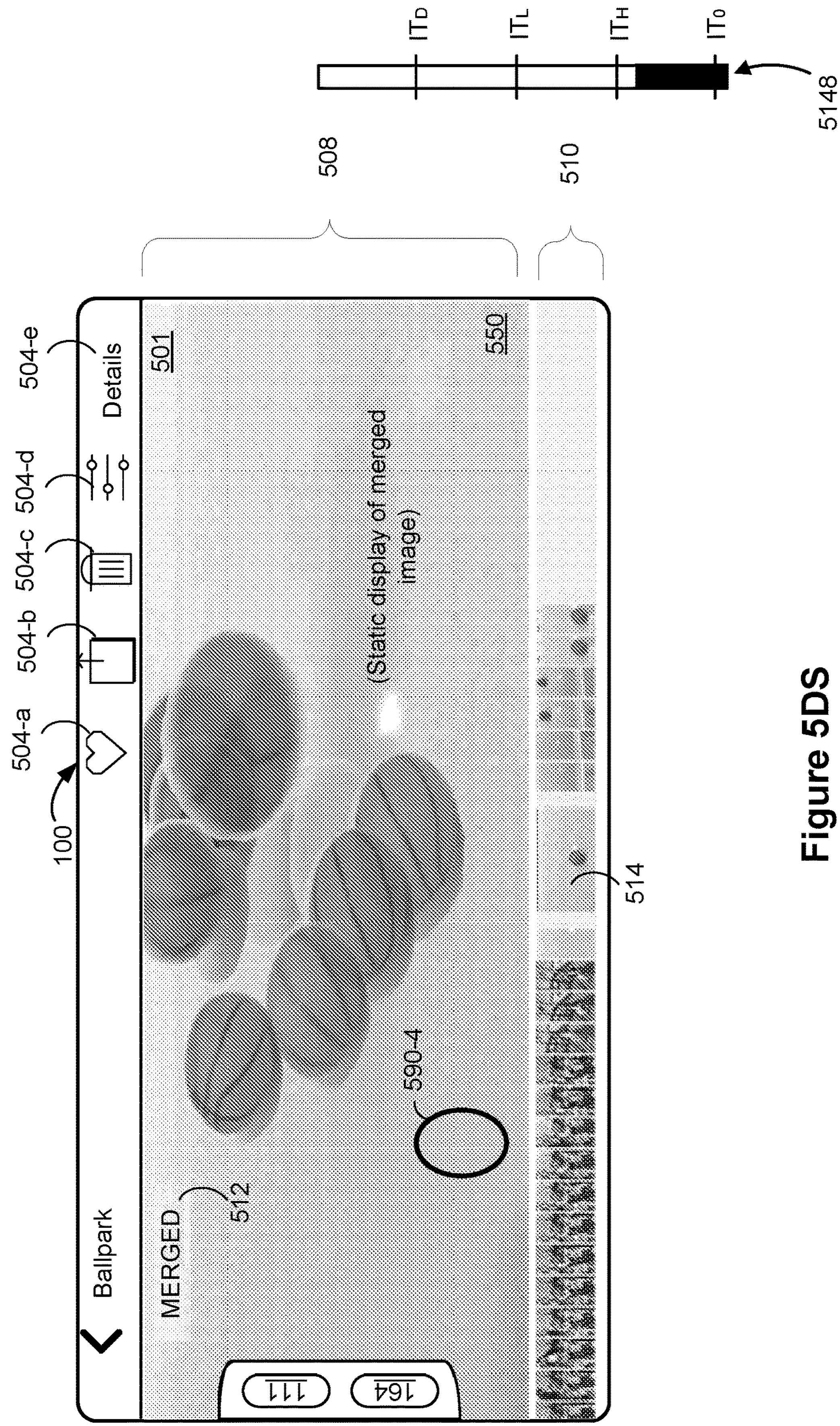
Figure 5D:
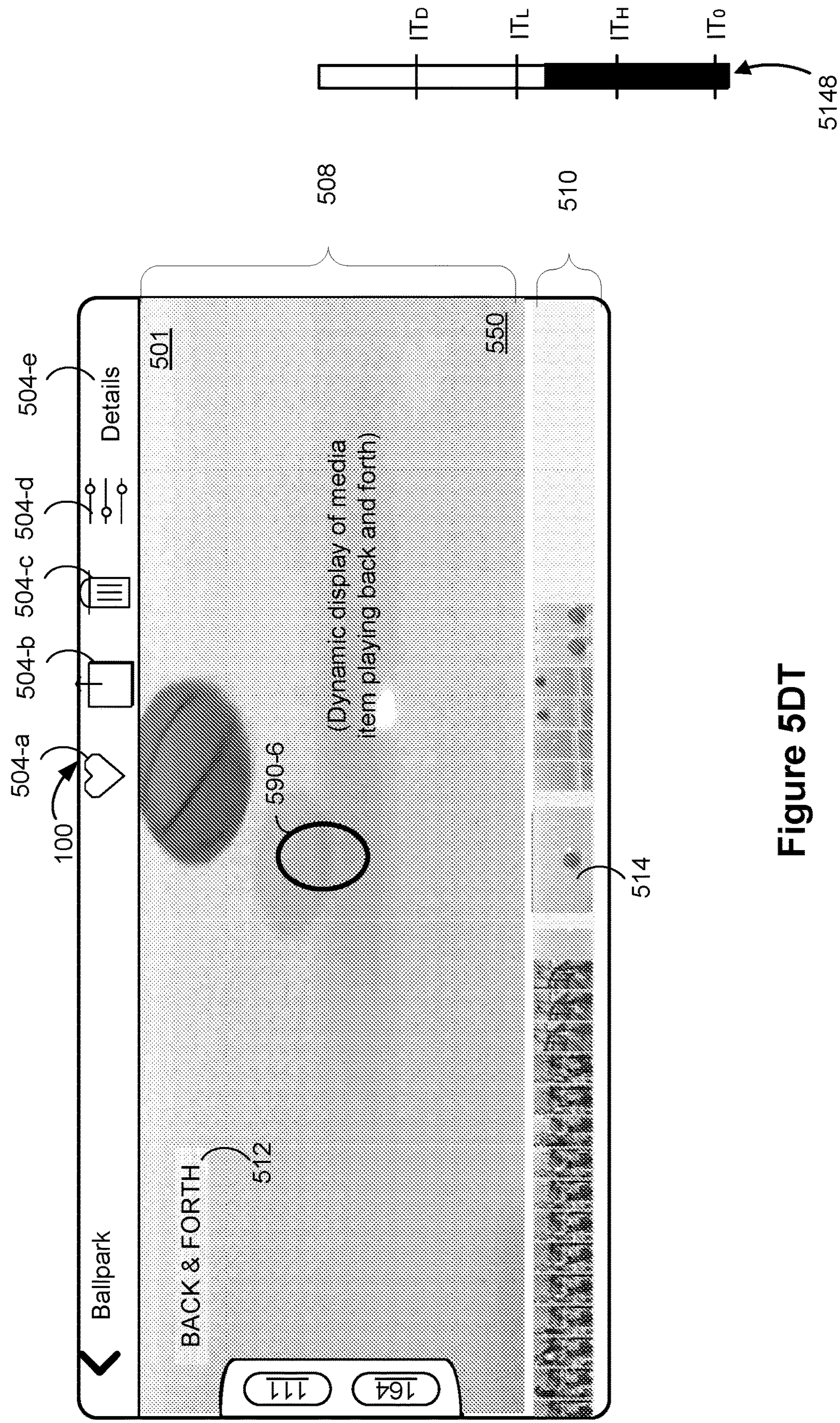
Figure 5D:
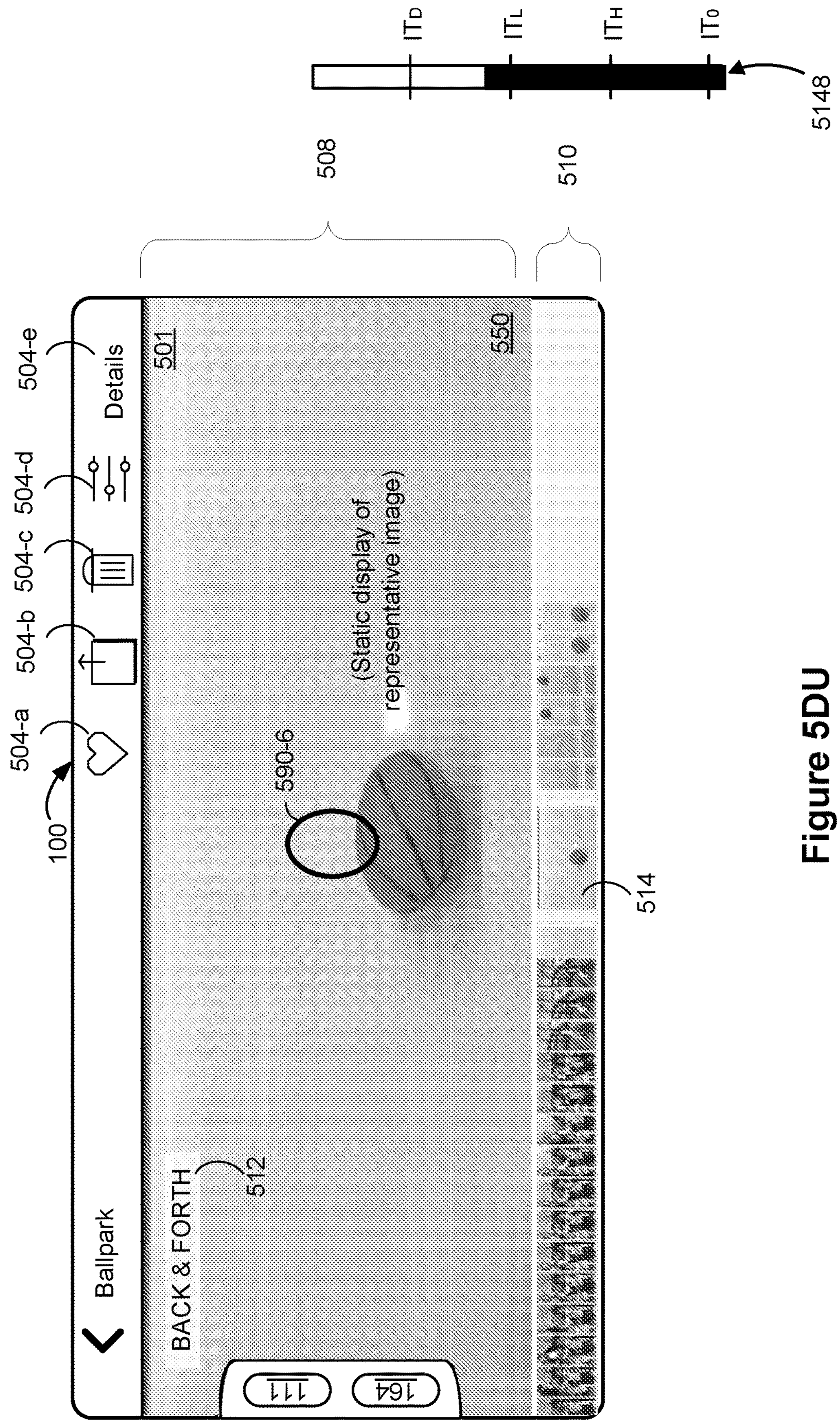
Figure 5D:
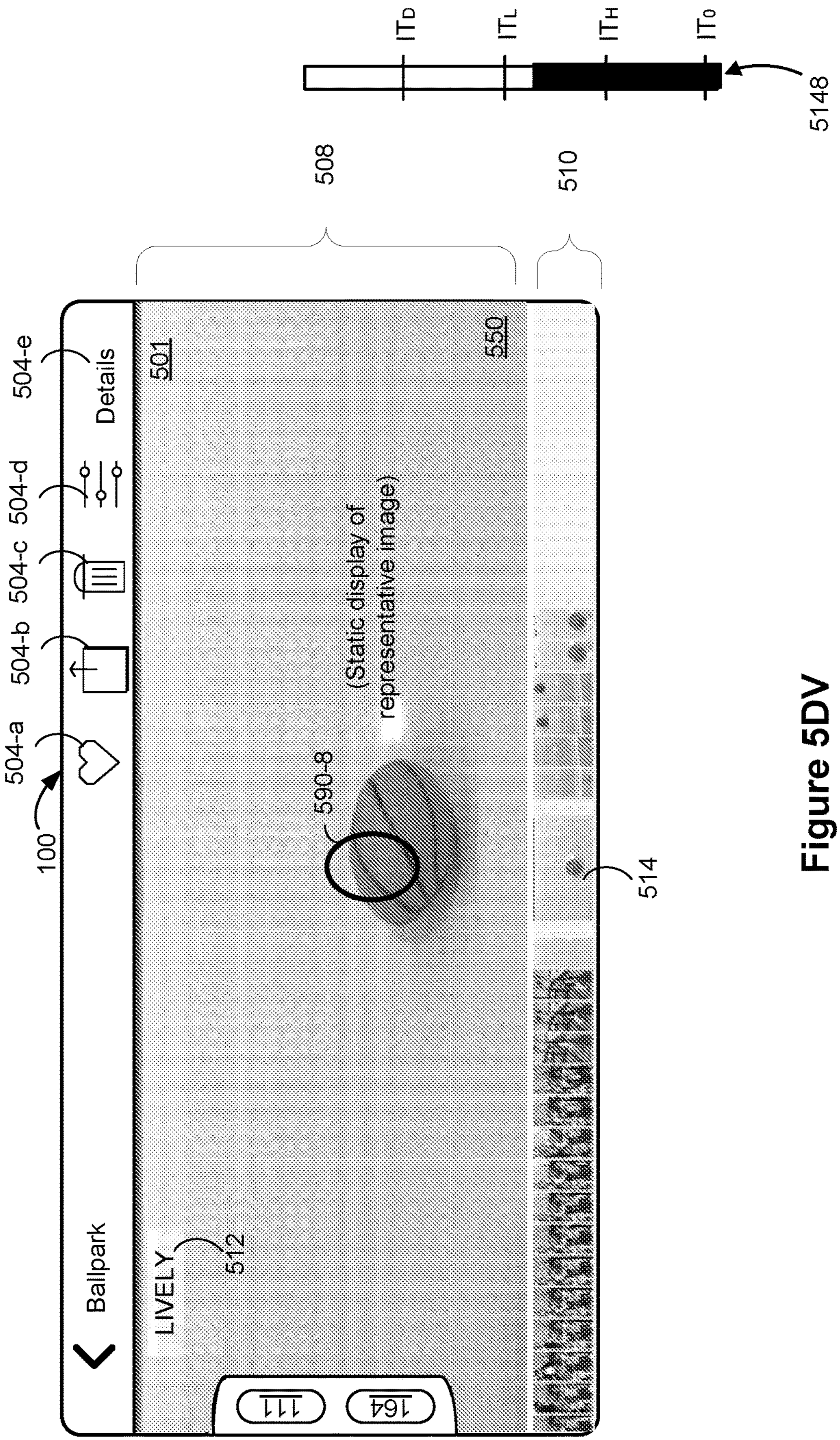
Figure 5D:
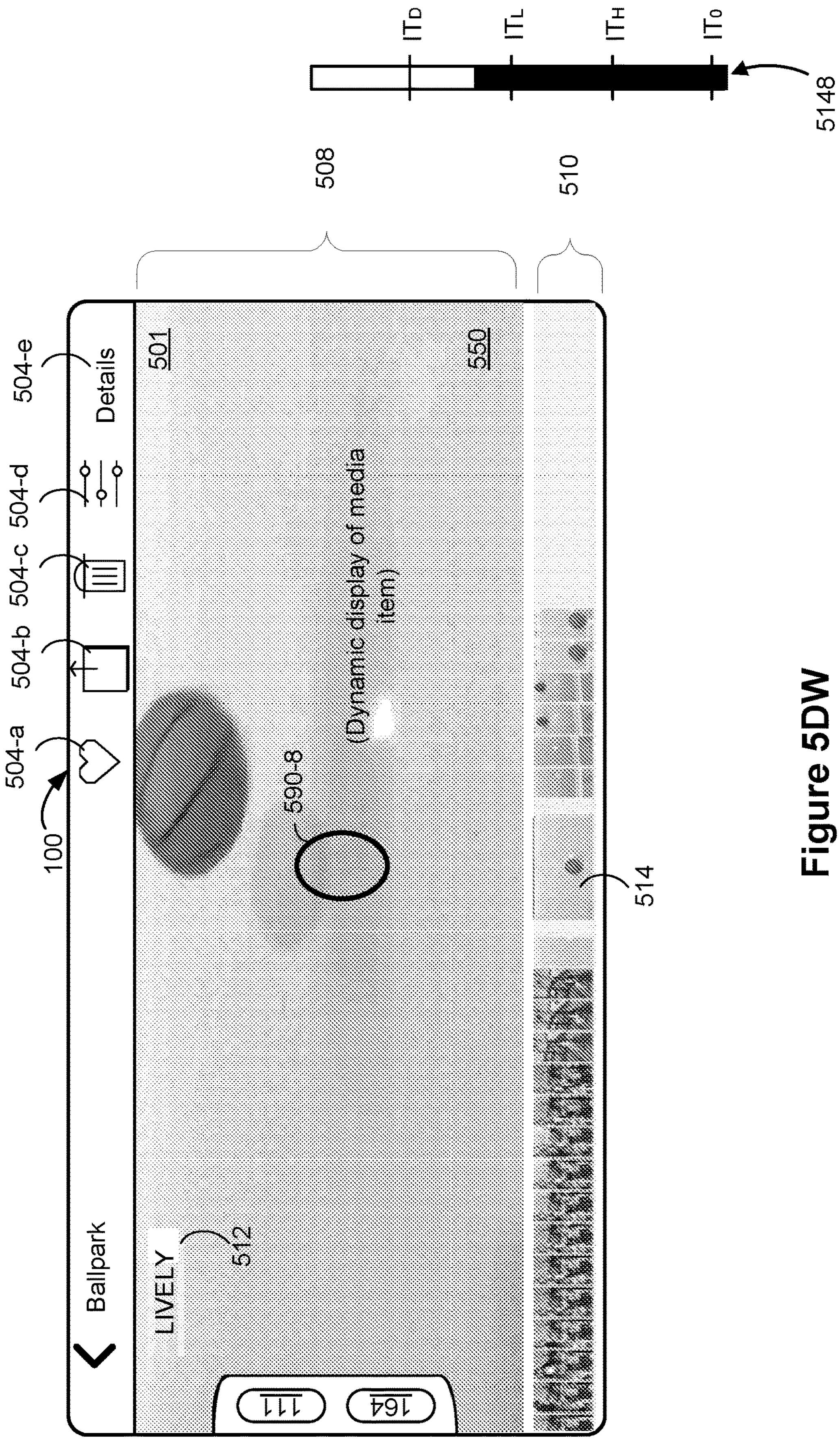
Figure 7C:
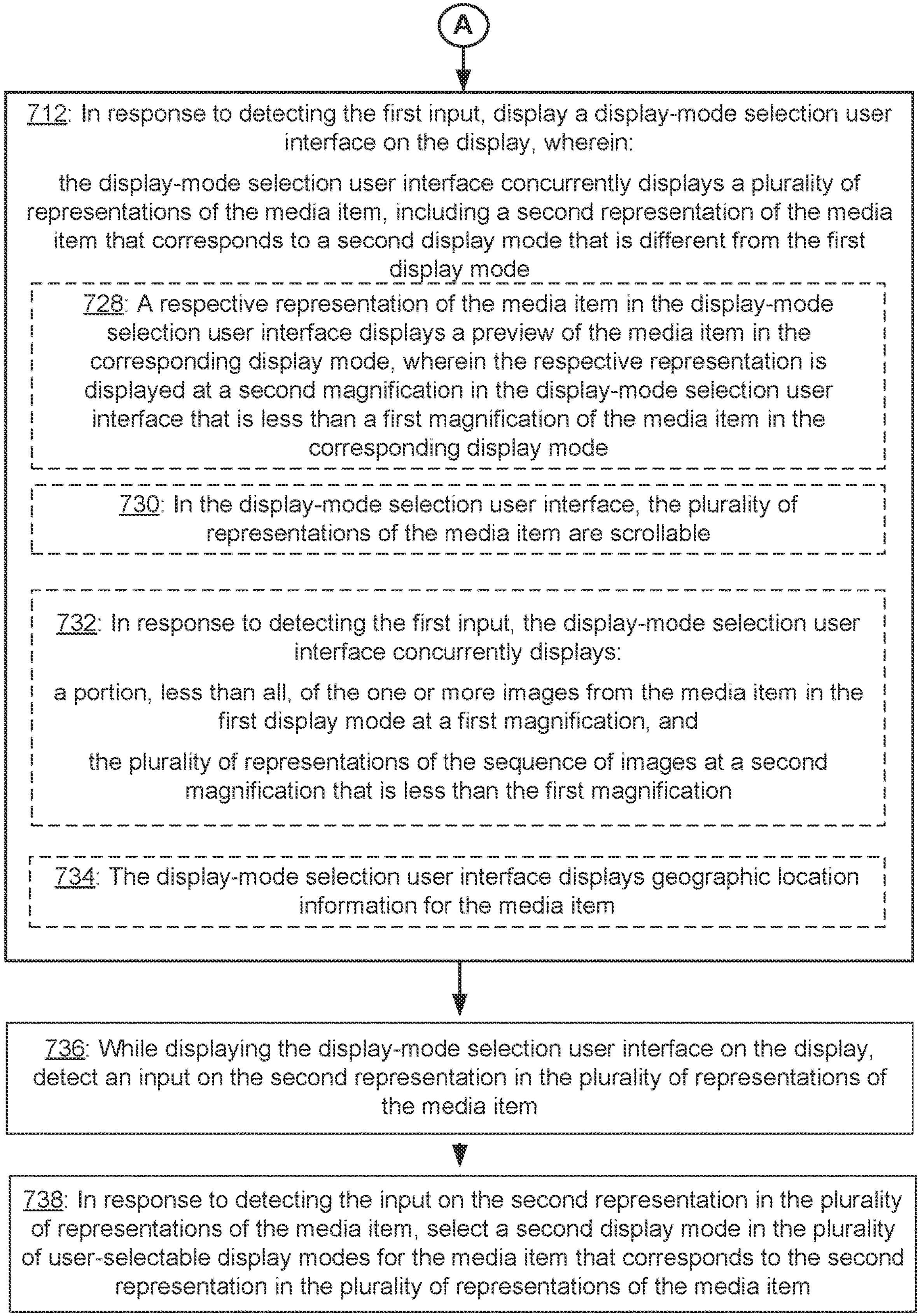

FIGS. 5U-5BE illustrate example user interfaces for media editing, in accordance with some embodiments. In FIG. 5U, while displaying the media item display user interface 501 in "lively" mode, the device 100 detects a tap 502-9 at edit control 504-*d*. In response, the device 100 displays the media item edit user interface 503-1 shown in FIG. 5V. The media item edit user interface 503-1 is similar to FIG. 5I, which illustrates the "loop" mode edit user interface 503-2, except a static representative image of media item 550 is shown in edit display area 523. In FIG. 5W, in response to detecting drag by contact 502-10 at begin-trim affordance 516, the device 100 updates the edit display area 523 to show a new initial image in the sequence, as the drag by contact 502-10 is continued by the user, as shown in FIGS. 5X-5Z. The begin-trim affordance 516 also moves in response to detecting the drag 502-10. In some embodiments, as shown in FIG. 5Y, the device 100 prevents the begin-trim affordance 516 from moving beyond the representative image selection affordance 520 and instead provides a haptic response 527. In FIG. 5AA, upon liftoff of the contact 502-10, the device 100 redisplays the representative image in the edit display area 523. In response to detecting a tap by contact 502-11 on done control 505-*a*, the device 100 saves the trimmed media item 550 because a portion of the sequence of images associated with media item 550 was trimmed, as indicated by the position of begin-trim affordance 516.

FIG. 5AB follows subsequent to FIG. 5Z, where the device 100 continues to detect the drag by contact 502-10. In FIG. 5AB, if the begin-trim affordance 516 is allowed to move past the position of representative image selection affordance 520 shown in FIG. 5Z, the device 100 displays representative image indicator 542 above the original representative image. In addition, device 100 moves the representative image selection affordance 520 to the image, in the sequence of images, adjacent to the position of the begin-trim affordance 516.

In FIG. 5AC, in response to liftoff of the contact 502-10 (with liftoff indicated by the dotted oval), the device 100 displays a "Make Key Photo" confirmation affordance 525 near the new position of the representative image selection affordance 520. In response to detecting a tap 502-11 at the confirmation affordance 525, as shown in FIG. 5AD, the device 100 sets the image associated with the representative image selection affordance 520 as the new representative image of media item 550, as shown in FIG. 5AE. In response to detecting a tap 502-12 remote from the confirmation affordance 525, as shown in FIG. 5AF, the device 100 does not set the new image associated with the representative image selection affordance 520 as the new representative image of media item 550, as shown in FIG. 5AG. In this example, the begin-trim affordance 516 and the representative image selection affordance 520 move back to the representative image indicated by the original position of the representative image selection affordance 520.

In FIG. 5AH, which follows FIG. 5AE, the device 100 detects a tap 502-14 at done control 505-*a*. In response, the device 100 saves the new trimmed media item, exits the media editing user interface 503 and displays the media item display user interface 501. In some embodiments, e.g., if the editing of the media item is destructive, in response to detecting a tap 502-14 at done control **505-*a*, the device 100 displays save new media item menu 526, as shown in FIG. 5AI. In FIG. 5AJ, in response to detecting a tap gesture 502-16 at a "Trim Original" option of save new media item menu 526, the device 100 saves the trimmed media item, exits the media editing user interface 503 and displays the trimmed media item in the media item display user interface 501, as shown in FIG. 5AK. In FIG. 5AL, in response to detecting a tap gesture 502-18 at a "Save as New" option of save new media item menu 526, the device 100 keeps media item 550, saves the trimmed media item as a new media item, exits the media editing user interface 503 and displays the media item display user interface 501, as shown in FIG. 5AM. In FIG. 5AM, both a representation of the original (untrimmed) media item 514 and a representation of the new (trimmed) media item 515 are shown in the media item collection area 510**.

FIGS. 5AN-5AP illustrate an example user interface for editing a merged photo, in accordance with some embodiments. In FIG. 5AN, the device 100 is displaying a media item edit user interface 503-4 for the "merged" image mode. In this mode, the device 100 displays a merged still image of the sequence of images associated with media item 550 in edit display area 523. In FIG. 5AO, in response to detecting an input by contact 502-20 at begin-trim affordance 516, the device 100 displays the image adjacent to the begin-trim affordance 516 in the edit display area 523 (instead of the merged image). Upon liftoff, the device 100 returns to displaying the merged still image in edit display area 523, as shown in FIG. 5AP.

FIG. 5AO follows from FIG. 5X, except that the device 100 detects a liftoff of drag gesture 502-10. In response, the device 100 displays the representative image of media item 550 in edit display area 523. Next, the device 100 detects a drag gesture by contact 502-22 at representative image selection affordance 520, as shown in FIGS. 5AR-5AX. FIGS. 5AS-5AU show that, as the image selection affordance 520 is scrolled horizontally, additional images in the sequence of images in the media item are concurrently shown in the image selection affordance 520 and display area 523. At liftoff, the device 100 detects that the position of the liftoff of contact 502-22 is near the original position of the representative image. In response, the device 100 snaps the representative image selection affordance 520 to the original representative image.

FIGS. 5AY-5BA illustrate example user interfaces for switching between media item editing modes 503, in accordance with some embodiments. In FIG. 5AY, while in the media item edit user interface 503-1 for the lively mode, the device 100 displays the representative image of the media item in edit display area 523. The device 100 detects an input by contact 502-24 (e.g., a tap or press) at display mode indicator 512, while the media item is in "lively" edit mode. In response, as shown in FIG. 5AZ, the device 100 displays an edit mode selection menu 528 with edit modes associated with the media item 550. In response to detecting a tap 502-26 on the "loop" edit mode option, the device 100 displays the sequence of images associated with the media item 550 in a "loop" edit mode 503-2, as shown in FIG. 5BA.

FIGS. 5BB-5BE illustrate example user interfaces for editing a media item using end-trim affordance 518, in accordance with some embodiments. In FIG. 5BB, while displaying media item edit user interface 503-1, the device 100 detects a drag by contact 502-28 at end-trim affordance 518. In response, the device 100 moves the end-trim affordance 518 and displays the image, in the image sequence area 524, adjacent to the end-trim affordance 518, in the edit display area 523, as shown in FIGS. 5BB-5BC. In response to detecting a liftoff of contact 502-28, the device 100 displays the representative image in the edit display area 523, as shown in FIG. 5BD. In FIG. 5BE, in response to detecting a tap 502-30 on "done" control **505-*a*, the device 100 creates and saves the trimmed media item based on the positions of the begin-trim affordance 516 and end-trim affordance 518**.

FIGS. 5BF-5BR illustrate example user interfaces for displaying additional information regarding a media item, in accordance with some embodiments. In FIG. 5BF, the device 100 displays a media item display user interface 501 in "lively" display mode for media item 550. In response to detecting an upward swipe 560-2, as shown in FIG. 5BG, the device 100 displays a display mode selection user interface 511 including "lively" display mode representation 540-1, "loop" display mode representation 540-2, "back & forth" display mode representation 540-3, and a "merged" display mode representation 540-4, as shown in FIG. 5BH. The device 100 also displays a display mode selection indicator 541 around "lively" display mode representation 540-1 to indicate that the "lively" display mode representation 540-1 is the currently selected display mode. In response to detecting a tap 560-4 at "loop" display mode representation 540-2, the device 100 switches to the "loop" display mode in display area 508, hides the display mode selection user interface 511 and displays the entire display area 508, as shown in FIG. 5BI. In response to detecting an upward swipe 560-6, the device 100 displays the display mode selection user interface 511 shown in FIG. 5BH, except that the display mode selection indicator 541 is positioned around the "loop" display mode representation 540-2. In response to detecting a leftward swipe by contact 560-8, as shown in FIG. 5BJ, or alternatively a tap at display mode extended list indicator 540-5, the device 100 slides the representations shown in display mode selection user interface 511 and displays a new "movie" display mode representation 540-6, as shown in FIG. 5BK. While displaying the display mode selection user interface 511, in response to detecting an upward swipe 560-10 in FIG. 5BL, the device 100 displays a map 562 illustrating the location 564 at which the media item was generated by the device 100, as shown in FIG. 5BM. In response to detecting upward swipe 560-12 in FIG. 5BM, the device 100 displays additional information associated with the media item 550, as shown in FIG. 5BN.

In FIG. 5BO, which is displayed subsequent to FIG. 5BH, the device 100 displays the display mode selection user interface 511, and displays a media item 550 in a "loop" display mode. In response to detecting a tap 560-14 at the "loop" display mode representation 540-2, the device 100 hides the display mode selection user interface 511 and displays the entire display area 508.

FIGS. 5BP-5BR illustrate example user interfaces for displaying the display mode selection user interface 511 while the device 100 is in a portrait mode, in accordance with some embodiments. In FIG. 5BP, the device 100 displays two representations, "lively" display mode representation 540-1 and "loop" display mode representation 540-2 at display mode selection user interface 511. In response to detecting a leftward swipe 560-16, as shown in FIG. 5BP, or a tap at display mode extended list indicator 540-5, the device 100 displays two new representations, "back & forth" display mode representation 540-3 and "merged" display mode representation 540-4 at display mode selection user interface 511, as shown in FIG. 5BQ. In FIG. 5BR, in response to detecting a tap 560-18 at "details" control 504-*e*, the device 100 displays the media item 550 in media item display user interface 501 in the merged mode.

FIGS. 5BS-5CM illustrate example user interfaces for editing a media item, in accordance with some embodiments. In FIG. 5BS, the device 100 displays a media item display user interface 501. In response to detecting a tap 560-2 at edit control 504-*d*, as shown in FIG. 5BT, the device 100 displays a media item edit user interface 503-1, as shown in FIG. 5BU. The media item edit user interface 503-1 includes a media item 550 displayed in a "lively" display mode in edit display area 523. In response to detecting a drag by contact 570-4 at representative image selection affordance 520, as shown in FIG. 5BV-5BW, the device 100 updates the image shown in edit display area 523 and also updates the position of representative image selection affordance 520 in the image sequence area 524 to correspond to the horizontal position of contact 570-4. In addition, when the representative image selection affordance 520 is moved to a position other than the original representative image, the device 100 displays a representative image indicator 542 at a location above the original representative image in the image sequence area 524, as shown in FIG. 5BW. In FIG. 5BX, if the contact 570-4 returns to a position of the original representative image, the device 100 forgoes displaying the representative image indicator 542 and provides a haptic response 527. In FIG. 5BY, if the contact 570-4 shown in FIG. 5BV continues rightward, and contacts, a trim affordance, such as begin-trim affordance 516, in some embodiments, the device 100 does not provide a haptic response. In FIG. 5BZ, the drag 570-4 continues before final liftoff in FIG. 5CA. In response to detecting lift off, the device 100 displays a confirmation affordance 525 near or at the current position of the representative image selection affordance 520. In response to detecting a tap 570-6 on the confirmation affordance 525, as shown in FIG. 5CB, the device 100 sets the image in the image sequence area 524 associated with the representative image selection affordance 520 as the new representative image of media item 550, as shown in FIG. 5CC. Alternatively, in response to detecting a tap 570-8 remote from the confirmation affordance 525, as shown in FIG. 5CD, the device 100 does not set the image in the image sequence area 524 associated with the representative image selection affordance 520 as the new representative image of media item 550, as shown in FIG. 5CE.

Subsequent to FIG. 5CC, at FIG. 5CF, the device 100 detects a drag by contact 570-10 on representative image selection affordance 520. If the drag 570-10 moves the representative image selection affordance 520 away from the new representative image in the representative image sequence 524, a new representative image indicator 543 is displayed at a location above the new representative image in the image sequence area 524, as shown in FIG. 5CF. If the drag 570-10 returns the representative image selection affordance 520 to the new representative image in the image sequence area 524, as shown in FIG. 5CG, the device 100 provides a haptic response 527. At FIG. 5CH, after liftoff of contact 570-10, the representative image selection affordance 520 is positioned at the new representative image. In response to detecting a drag by contact 570-12 on begin-trim affordance 516, the device 100 moves the begin-trim affordance 516. In some embodiments, as shown in FIG. 5CI, in response to detecting that the drag 570-12 moved the begin-trim affordance 516 to the representative image selection affordance 520, the device 100 prevents the begin-trim affordance 516 from moving past the representative image selection affordance 520 and provides a haptic response 527. After liftoff of contact 570-12, the device detects a drag by contact 570-14 on representative image affordance 520 towards begin-trim affordance 516, as shown in FIG. 5CJ. In response, the device 100 moves the begin-trim affordance 516 along with the representative image affordance 520 as shown in FIG. 5CK.

FIGS. 5CK-5CM illustrate example user interfaces for selectively providing a haptic response when dragging a representative image selection affordance 520 over a representative image. In FIG. 5CK, the device 100 detects a drag by contact 570-15 on representative image selection affordance 520. In response, the device 100 moves the representative image selection affordance 520. In FIG. 5CL, the device 100 provides a haptic response 527 if the speed of a drag gesture 570-15, as represented by a length of arrow 572, is below a speed threshold. In FIG. 5CM, the device 100 foregoes providing a haptic response if the speed of a drag gesture 570-15, as represented by length of arrow 574, exceeds a speed threshold.

FIGS. 5CN-5DJ illustrate example user interfaces for displaying and playing media items, in accordance with some embodiments. In FIG. 5CN, the device 100 displays a media item display user interface 501 showing a representative image for an original media item 550, in display area 508, while in the "lively" display mode. In FIG. 5CO, the device 100 detects a swipe gesture by contact 580-2. In response, the device 100 slides the original media item 550 off the screen and slides new media item 584, which sequentially follows original media item 550 in the collection of media items, onto the screen, as shown in FIG. 5CP. In FIG. 5CP, the new media item 584 has a same display mode, i.e., "lively", as the original media item 550. As shown in FIG. 5CP, while continuing to detect the swipe gesture by contact 580-2, the device 100 only displays the initial image in the new media item 584 because the new media item 584 is in the lively display mode. In FIGS. 5CQ-5CR, in response to detecting liftoff of contact 580-2, the device sequentially plays the sequence of images associated with new media item 584 from the initial image to the representative image as the new media item 584 slides onto the screen.

FIG. 5CS is similar to FIG. 5CP, except the new media item 584 is in a "loop" display mode. As shown in FIG. 5CS, while detecting the swipe by contact 580-4, the device 100 loops the sequence of images associated with new media item 584 as the new media item 584 slides onto the screen because the new media item 584 is in the "loop" display mode.

FIG. 5CT is similar to FIGS. 5CP and 5CS, except the new media item 584 is in a "back & forth" display mode. As shown in FIG. 5CT, while detecting the swipe by contact 580-6, the device 100 plays the sequence of images associated with new media item 584 in a back and forth pattern as the new media item 584 slides onto the screen because the new media item 584 is in the "back & forth" display mode.

FIG. 5CU is similar to FIGS. 5CP and 5CS, except the new media item 586 sequentially precedes the original media item 550 in the collection of media items and the new media item 586 is in a "back & forth" display mode. As shown in FIG. 5CU, while detecting the swipe by contact 580-8, the device 100 plays the sequence of images associated with new media item 586 in a back and forth pattern as the new media item 586 slides onto the screen because the new media item 586 is in the "back & forth" display mode.

FIG. 5CV is similar to FIG. 5CP, except the new media item 584 is in a "merged" display mode. As shown in FIG. 5CV, while detecting the swipe by contact 580-10, the device 100 displays a static merged image for new media item 584. In response to liftoff of contact 580-10, the device 100 plays at least a portion (e.g., one quarter, one half, or three quarters) of the sequence of images associated with new media item 584 and then displays the merged image.

FIG. 5CW is similar to 5CV, except the new media item 586 sequentially precedes the original media item 550 in the collection of media items. As shown in FIG. 5CW, while detecting the swipe by contact 580-12, the device 100 displays a static merged image for new media item 586. In FIG. 5CX, in response to liftoff of contact 580-12, the device 100 plays at least a portion (e.g., one quarter, one half, or three quarters) of the sequence of images associated with new media item 586 and then displays the merged image.

FIG. 5CY is similar to 5CW, except the new media item 586 is in a "lively" display mode. While detecting the swipe by contact 580-14, the device 100 displays the initial image of the new media item 586 because the new media item 586 is in the "lively" display mode. In response to detecting liftoff of contact 580-14, the device 100 sequentially plays the sequence of images associated with new media item 586 from the initial image to the representative image as the new media item 586 slides onto the screen.

FIG. 5CZ is similar to 5CY, except the new media item 586 is in a "loop" display mode. While detecting the swipe 580-16, the device 100 displays the sequence of images associated with the new media item 586 looping as the new media item 586 slides onto the screen because the new media item 586 is in the "loop" display mode.

In FIG. 5DA, the device 100 detects a tap by contact 580-18 at the representation 514 of media item 550 in media item collection area 510. In response, the device 100 displays an expanded representation 551 of media item 550 in media item collection area 510, which shows at least some of the other images associated with media item 550, as shown in FIG. 5DB. The device 100 also displays a scrubber bar 544. In response to detecting a swipe by contact 580-20 and swipe 580-22, as shown in FIG. 5DB-5DE, the device 100 scrubs through the expanded representation 551 of media item 550, moving relative to the scrubber bar 544 accordingly, and displays images in the sequence of images associated with the media item in the display area 508. When the scrubber bar 544 is positioned away from the representative image 514, a representative image indicator 542 is displayed above the representative image 514, as shown in FIG. 5DC. When the scrubber bar 544 returns near the representative image 514, at a slow speed, the device 100 generates a haptic response 527 and snaps to the representative image 514, as shown in FIG. 5DD-5DE.

In FIG. 5DF, the device 100 detects a swipe by contact 580-24 in the display area 508. In response, the device 100 displays a new media item 584 that sequentially follows original media item 550 in the collection of media items in area 508 and shrinks the expanded representation 551 of media item 550 back down to a single image (e.g., a thumbnail image of the representative image of media item 550), as shown in FIG. 5DG.

In FIGS. 5DG-5DJ, in response to detecting a press input by contact 580-26 that exceeds an intensity threshold (e.g., $IT_L$), the device 100 displays an expanded representation 552 of media item 584 in media item collection area 510, which shows at least some of the other images associated with media item 584. In response to detecting the press input by contact 580-26 that exceeds an intensity threshold (e.g., $IT_L$), the device 100 also displays a playhead 545 that moves over the expanded representation of media item 584 in media item collection area 510 to show a current playback position in the sequence of images in the media item 584 that is being shown in area 508.

FIGS. 5DK-5DW illustrate example user interfaces for displaying sequences of images associated with a media item, according to a display mode of the media item, in accordance with some embodiments. In FIG. 5DK, the device 100 displays a media item 550 in a "looping" mode on the media item display user interface 501, as indicated by display mode indicator 512, where the sequence of images associated with the media item are sequentially and repeatedly displayed looping in display area 508. In response to a press input by contact 590-2 that exceeds a light press intensity threshold, as shown in FIGS. 5DL-5DM, the device 100 displays the representative image of media item 550 in a static display. In FIG. 5DN, after liftoff of contact 590-2, the device 100 reverts back to displaying the media item 550 in a dynamic "looping" mode. Alternatively, in FIG. 5DO, after a decrease in intensity of contact 590-2, the device 100 reverts back to displaying the media item in a dynamic "looping" mode.

In FIG. 5DP, the device 100 displays a media item 550 in a "merged" mode in the media item display user interface 501, as indicated by display mode indicator 512, where the sequence of images associated with the media item are simultaneously displayed in display area 508 as a static merged image. In response to a press input by contact 590-4 that exceeds a light press intensity threshold, as shown in FIGS. 5DP-5DQ, the device 100 sequentially displays the sequence of images associated with the media item. In FIG. 5DR, after liftoff of contact 590-4, the device 100 reverts back to displaying the media item 550 as a static merged image. Alternatively, in FIG. 5DS, after a decrease in intensity of contact 590-4, the device 100 reverts back to displaying the media item 550 as a static merged image.

In FIG. 5DT, the device 100 displays a media item in a "back & forth" mode on the media item display user interface 501, as indicated by display mode indicator 512, where the sequence of images associated with the media item 550 are sequentially and repeatedly displayed in display area 508 in a back and forth manner. In response to a press input by a contact 590-6 that exceeds a light press intensity threshold, as shown in FIGS. 5DT-5DU, the device 100 displays the representative image associated with the media item. After detecting liftoff (or, in some embodiments, a decrease in intensity) of contact 590-6, the device 100 reverts back to repeatedly playing the sequence of images associated with the media item 550 in display area 508 in a back and forth manner.

In FIG. 5DV, the device 100 displays a media item in a "lively" mode on the media item display user interface 501, as indicated by display mode indicator 512, where the representative image associated with a media item is displayed in display area 508. In response to a press input by a contact 590-8 that exceeds a light press intensity threshold, as shown in FIGS. 5DV-5DW, the device 100 sequentially displays the sequence of images associated with the media item. After liftoff (or, in some embodiments, a decrease in intensity) of contact 590-6, the device 100 reverts back to displaying the representative image.

FIGS. 6A-6F are flow diagrams of a method 600 for editing a media item that has multiple display modes in accordance with some embodiments. Method 600 is performed at an electronic device (e.g., device 300, FIG. 3, or portable multifunction device 100, FIG. 1A) with a display, a touch-sensitive surface, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to edit a media item that has multiple display modes. Providing an editing user interface that is tailored to a currently selected display mode of the media item makes it easy to see how the edits will affect the media item in the current display mode. The method reduces the number, extent, and/or nature of the inputs from a user when editing a media item that has multiple display modes, thereby creating a more efficient human-machine interface. For battery-operated electronic devices, enabling a user to edit a media item that has multiple display modes faster and more efficiently conserves power and increases the time between battery charges.

The device displays (602), in a first user interface on the display, one or more images from a media item that corresponds to a sequence of images in a respective display mode, wherein the respective display mode is one of a plurality of user-selectable display modes for the media item that corresponds to the sequence of images; (e.g., a lively-photo display mode, a loop display mode, a long-exposure display mode, a back-and-forth display mode, a movie display mode, a strobe-effect display mode, or other display mode for displaying the media item that is selectable by a user). For example, FIG. 5U illustrates a media item display user interface 501 in a "lively" mode.

While displaying the one or more images from the media item in the respective display mode, the device detects (604) a first input (e.g., a tap gesture by a contact on an edit affordance, such as tap 502-9 at edit control **504-*d* as shown in FIG. 5**U).

In response to detecting the first input, the device displays (606) an editing user interface for the respective display mode on the display. For example, FIG. 5V illustrates media item edit user interface 503-1 for "lively" mode. The editing user interface for the respective display mode is one of a plurality of editing user interfaces for the media item that corresponds to the sequence of images. A given editing user interface in the plurality of editing user interfaces is tailored to a corresponding display mode for the media item. For example, the editing user interface for the lively-photo display mode for the media item displays a representative image of the media item in a first area (e.g., edit display area 523 in FIG. 5V), because the representative image is what is displayed in the lively-photo display mode without user interaction. For example, the editing user interface for the loop display mode displays the media item looping in the first area (e.g., edit display area 523 in FIG. 5I) because the media item looping is what is displayed in the loop display mode without user interaction. For example, the editing user interface for the back-and-forth display mode displays the media item playing back-and-forth in the first area (e.g., edit display area 523 in FIG. 5N) because the media item playing back-and-forth is what is displayed in the back-and-forth display mode without user interaction. For example, the editing user interface for the merged display mode for the media item displays a merged image of the media item in the first area (e.g., edit display area 523 in FIG. 5T), because the merged image is what is displayed in the merged display mode without user interaction.

In some embodiments, a given editing user interface in the plurality of editing user interfaces includes affordances that are tailored to a corresponding display mode for the media item. For example, the editing user interface for the lively-photo display mode for the media item includes a representative-image-selection affordance 520 (FIG. 5V) that is configured to adjust the representative image (e.g., a key photo) in the lively-photo display mode. In some embodiments, the editing user interface for the loop display mode does not have the representative-image-selection affordance because the representative image cannot be adjusted in the loop display mode for the media item (e.g., FIG. 5I). In some other embodiments, the editing user interface for the loop display mode has the representative-image-selection affordance to adjust the representative image of the media item (e.g., FIG. 5J).

In some embodiments, a given editing user interface is displayed in response to detecting an input that corresponds to a request to edit the media item while the corresponding display mode for the media item is active. For example, the editing user interface for the lively-photo display mode is displayed in response to detecting a tap gesture on "edit" icon **504-*d* (FIG. 5U) when the lively-photo display mode for the media item is active, as shown in FIGS. 5U-5V. For example, the editing user interface for the loop display mode is displayed in response to detecting a tap gesture on "edit" icon 504-*d* (FIG. 5H) when the loop display mode for the media item is active, as shown in FIGS. 5H and 5I, or 5H and 5J. And so on. The editing user interface for the respective display mode is configured to change which images are included in the media item when the media item is displayed in the respective display mode (e.g., the editing user interface for the respective display mode is configured to trim the sequence of images in the media item that are displayed in the respective display mode to a subset, less than all, of the sequence of images). In some embodiments, the trimming reduces the number of images in the sequence of images from the media item that are displayed in the respective display mode, without removing images in the sequence of images from the media item (e.g., non-destructive editing). In some embodiments, the trimming permanently removes images in the sequence of images from the media item (e.g., destructive editing). In some embodiments, the trimming of the media item in the respective display mode is also applied to (carries over) to other display modes for the media item. In some embodiments, the trimming of the media item in the respective display mode is not applied to other display modes for the media item, so that trimming can be tailored to each display mode for the media item. The editing user interface for the respective display mode concurrently displays: a first (predefined) area that is configured to display images in the sequence of images (e.g., area 523, FIG. 5V). In some embodiments, for some display modes, the first area displays images in the sequence of images one at a time, with a respective image filling the first area when the respective image is played. In some embodiments, for some display modes, the first area displays images in the sequence of images merged into a single image that fills the first area. The editing user interface for the respective display modes concurrently displays: a second (predefined) area (e.g., area 521, FIG. 5V), distinct from the first area, that includes representations of images in the sequence of images (e.g., reduced scale representations of a plurality of images in the media item's sequence of images are displayed in a slider in the second area), a user-adjustable begin-trim affordance (e.g., begin handle 516, FIG. 5V) that indicates a first boundary for playback through the sequence of images (e.g., the begin-trim affordance delimits a beginning image in a subset of the sequence of images via a position of the begin-trim affordance in the second area), and a user-adjustable end-trim affordance (e.g., end handle 518, FIG. 5**V) that indicates a second boundary for playback through the sequence of images (e.g., the end-trim affordance delimits an ending image in the subset of the sequence of images via a position of the end-trim affordance in the second area).

In some embodiments, the first area displays (608) a preview of the media item that shows how the media item will be displayed in the respective display mode (e.g., by automatically playing the sequence of images repeatedly in the first area in the editing user interface for some display modes or by merging multiple images into a single image in the first area in the editing user interface for other display modes), wherein the preview includes content from multiple images in the sequence of images. For example, FIG. 5I shows a media item edit user interface 503-2 with images from media item 550 looping in edit display area 523. For example, FIG. 5T shows a media item edit user interface 503-4 with a static merged image of media item 550 shown in edit display area 523. Providing a preview that is tailored to a currently selected display mode of the media item makes it easy to see how the edits will affect the media item in the current display mode. This enhances the operability of the device and makes the editing user interface more efficient (e.g., by providing feedback that helps the user to determine which inputs will produce the result intended by the user and reducing user mistakes when operating/interacting with the device).

In some embodiments, the editing user interface for the respective display mode concurrently displays (610) a plurality of image adjustment affordances (e.g., 505-*a*-505-*h*, FIG. 5V) which, when activated, provide access to image adjustment functions (e.g., cropping, rotating, filtering, lighting, markup, magic wand, cancel, save/done, and/or other image editing functions). Providing quick access to these image editing functions enhances the operability of the device and makes the editing user interface more efficient (e.g., by reducing the number, extent, and/or nature of the inputs from a user needed to edit the media item).

In some embodiments, the editing user interface includes (612) a volume affordance that, when activated, toggles sound for the media item on and off (e.g., Mute toggle 505-*f*, FIG. 5V). Providing an affordance for turning the sound for the media item off while editing enhances the operability of the device and makes the editing user interface more efficient (e.g., by providing or eliminating sound, as needed, while operating/interacting with the editing user interface).

While displaying the editing user interface for the respective display mode: the device adjusts (edits) (614) the media item in accordance with one or more editing inputs (e.g., detected inputs that are directed to a range-trim affordance, such as the begin-trim affordance 516 or the end-trim affordance 518; representative-image-selection affordance 520; and/or other affordances in the editing user interface for the respective display mode); and detects an input to exit the editing user interface for the respective display mode (e.g., tap by contact 502-11, FIG. 5AA).

The device exits (616) the editing user interface for the respective display mode. For example, after a tap by contact 502-11 in FIG. 5AA, the device displays media item display user interface 501, as shown in FIG. 5AK.

The device displays (618) the edited media item in the respective display mode in the first user interface (e.g., in response to detecting the input to exit the editing user interface for the respective display mode). In some embodiments, in response to detecting activation of a "Done" button (e.g., with a tap gesture), the device saves the changes made in the editing user interface for the respective display mode and displays the edited media item in the respective display mode (e.g., in the first user interface). For example, after a tap by contact 502-14 in FIGS. 5AH, the device displays media item display user interface 501, as shown in FIG. 5AK, that includes the trimmed media item 550.

In some embodiments, in response to detecting activation of a "Done" button (e.g., with a tap gesture), the device displays activateable options (e.g., "Trim Original," "Save as New Clip," and "Cancel," as shown in FIG. 5AI). In some embodiments, in response to detecting activation of the "Trim Original" option (e.g., with a tap gesture), the device applies the changes made in the editing user interface to the media item, saves the changes, and displays the edited media item in the respective display mode (e.g., see FIGS. 5AJ-5AK). In some embodiments, in response to detecting activation of the "Save as New Clip" option (e.g., with a tap gesture), the device creates a new media item that includes the changes made in the editing user interface to the original media item, saves the new media item, and displays the new media item in the respective display mode (e.g., see FIG. 5AL-5AM).

In some embodiments, while displaying the editing user interface for the respective display mode, the device detects (620) an input that corresponds to adjustment of the begin-trim affordance (e.g., detecting a drag gesture on the begin-trim affordance in the second area); and, while detecting the input that corresponds to adjustment of the begin-trim affordance, ceasing to display a preview of the media item in the respective display mode in the first area and displaying, in the first area, a representation of an image that corresponds to a location of the begin-trim affordance in the representations of the sequence of images. Similarly, while detecting an input that corresponds to adjustment of the end-trim affordance, the device ceases to display a preview of the media item in the respective display mode in the first area and displays, in the first area, a representation of an image that corresponds to a location of the end-trim affordance in the representations of the sequence of images. More generally, while detecting an input that corresponds to adjustment of a range-trim affordance, the device ceases to display a preview of the media item in the respective display mode in the first area and displays, in the first area, a representation of an image that corresponds to a location of the range-trim affordance in the representations of the sequence of images. For example, as shown in FIGS. 5W-5Z, adjusting begin-trim affordance 516 changes the image displayed in edit display area 523. Showing a representation of an image that corresponds to a location of a range-trim affordance while adjusting the range-trim affordance makes it easy to precisely trim the media item. This enhances the operability of the device and makes the editing user interface more efficient (e.g., by providing feedback that helps the user to determine which inputs will produce the result intended by the user and reducing user mistakes when operating/interacting with the editing user interface).

In some embodiments, the device detects (622) an end of the input that corresponds to adjustment of the begin-trim affordance (e.g., detecting lift-off of a contact from the begin-trim affordance); and, in response to detecting the end of the input that corresponds to adjustment of the begin-trim affordance, displays a second preview of the media item in the respective display mode in the first area, wherein the second preview includes a subset, less than all, of the images in the sequence of images, wherein the subset does not include images in the sequence of images that occur before an image that corresponds to a current position of the begin-trim affordance (e.g., see FIG. 5AH). Similarly, in response to detecting an end of an input on the end-trim affordance, the device displays a second preview of the media item in the respective display mode in the first area, wherein the second preview includes a subset, less than all, of the images in the sequence of images, wherein the subset does not include images in the sequence of images that occur after an image that corresponds to a current position of the end-trim affordance. Providing an updated preview that is tailored to a currently selected display mode of the media item, in response to detecting the end of the input (e.g., detecting lift-off), makes it easy to see how the range-trim edit will affect the media item in the current display mode. This enhances the operability of the device and makes the editing user interface more efficient (e.g., by providing feedback that helps the user to determine which inputs will produce the result intended by the user and reducing the number of inputs when operating/interacting with the editing user interface).

In some embodiments, trimming the sequence of images in the media item also trims (624) corresponding audio in the media item. Trimming both the images and the corresponding audio in response to the same input enhances the operability of the device and makes the editing user interface more efficient (e.g., by reducing the number of inputs when operating/interacting with the editing user interface).

In some embodiments, in accordance with a determination that the respective display mode is a loop display mode, the editing user interface for the respective display mode that is displayed in response to detecting the first input is an editing user interface for the loop display mode, and the device displays (626) the sequence of images looping in the first area in the editing user interface for the loop display mode (e.g., see 503-2 in FIG. 5I); while displaying the sequence of images looping in the first area in the editing user interface for the loop display mode, the device detects an input on the begin-trim affordance; and, while detecting the input on the begin-trim affordance: the device ceases to loop the sequence of images in the first area; and adjusts the position of the begin-trim affordance in the second area in accordance with the input on the begin-trim affordance; and displays, in the first area, an image in the sequence of images that corresponds to the position of the begin-trim affordance in the second area. Similarly, while detecting an input on the end-trim affordance, the device ceases to loop the sequence of images in the first area; adjusts the position of the end-trim affordance in the second area in accordance with the input on the end-trim affordance; and displays, in the first area, an image in the sequence of images that corresponds to the position of the end-trim affordance in the second area. More generally, while detecting an input on a range-trim affordance, the device ceases to loop the sequence of images in the first area; adjusts the position of the range-trim affordance in the second area in accordance with the input on the range-trim affordance; and displays, in the first area, an image in the sequence of images that corresponds to the position of the range-trim affordance in the second area. Providing a dynamic preview of the loop display mode of the media item makes it easy to see how the edits will affect the media item in the loop display mode. This enhances the operability of the device and makes the editing user interface more efficient (e.g., by providing feedback that helps the user to determine which inputs will produce the result intended by the user and reducing user mistakes when operating/interacting with the device). In turn, switching to showing a representation of an image that corresponds to a location of a range-trim affordance while adjusting the range-trim affordance makes it easy to precisely trim the media item. This also enhances the operability of the device and makes the editing user interface more efficient (e.g., by providing feedback that helps the user to determine which inputs will produce the result intended by the user and reducing user mistakes when operating/interacting with the editing user interface).

In some embodiments, the device detects (628) an end of the input on the begin-trim affordance (e.g., detecting lift-off of a contact from the begin-trim affordance); and, in response to detecting the end of the input on the begin-trim affordance, displays a subset, less than all, of the images in the sequence of images looping in the first area, wherein the subset does not include images in the sequence of images that occur before an image that corresponds to the current position of the begin-trim affordance. Similarly, in response to detecting an end of an input on the end-trim affordance, the device displays a subset, less than all, of the images in the sequence of images looping in the first area, wherein the subset does not include images in the sequence of images that occur after an image that corresponds to the current position of the end-trim affordance. In some embodiments, the editing user interface for the loop display mode does not include a representative-image-selection affordance that is configured to select a representative image in the sequence of images via a position of the representative-image-selection affordance in the second area. Providing an updated preview of the media item looping, in response to detecting the end of the input (e.g., detecting lift-off), makes it easy to see how the range-trim edit will affect the media item in the loop mode. This enhances the operability of the device and makes the editing user interface more efficient (e.g., by providing feedback that helps the user to determine which inputs will produce the result intended by the user and reducing the number of inputs when operating/interacting with the editing user interface).

In some embodiments, in accordance with a determination that the respective display mode is a back-and-forth display mode, the respective editing user interface that is displayed in response to detecting the first input is an editing user interface for the back-and-forth display mode, and the device displays (630) the sequence of images repeatedly playing forward and then backward in the first area in the editing user interface for the back-and-forth display mode (e.g., see FIG. 5N). While displaying the sequence of images repeatedly playing forward and then backward in the first area in the editing user interface for the back-and-forth display mode, the device detects an input on the begin-trim affordance; and, while detecting the input on the begin-trim affordance: ceases to play the sequence of images forward and then backward in the first area; adjusts the position of the begin-trim affordance in the second area in accordance with the input on the begin-trim affordance; and displays, in the first area, an image in the sequence of images that corresponds to the position of the begin-trim affordance in the second area. Similarly, while detecting an input on the end-trim affordance, the device ceases to play the sequence of images forward and then backward in the first area; adjusts the position of the end-trim affordance in the second area in accordance with the input on the end-trim affordance; and displays, in the first area, an image in the sequence of images that corresponds to the position of the end-trim affordance in the second area. More generally, while detecting an input on a range-trim affordance, the device ceases to play the sequence of images forward and then backward in the first area; adjusts the position of the range-trim affordance in the second area in accordance with the input on the range-trim affordance; and displays, in the first area, an image in the sequence of images that corresponds to the position of the range-trim affordance in the second area. Providing a dynamic preview of the back-and-forth display mode of the media item makes it easy to see how the edits will affect the media item in the back-and-forth display mode. This enhances the operability of the device and makes the editing user interface more efficient (e.g., by providing feedback that helps the user to determine which inputs will produce the result intended by the user and reducing user mistakes when operating/interacting with the device). In turn, switching to showing a representation of an image that corresponds to a location of a range-trim affordance while adjusting the range-trim affordance makes it easy to precisely trim the media item. This also enhances the operability of the device and makes the editing user interface more efficient (e.g., by providing feedback that helps the user to determine which inputs will produce the result intended by the user and reducing user mistakes when operating/interacting with the editing user interface).

In some embodiments, the device detects (632) an end of the input on the begin-trim affordance (e.g., detecting lift-off of a contact from the begin-trim affordance); and, in response to detecting the end of the input on the begin-trim affordance, displays a subset, less than all, of the images in the sequence of images playing forward and then backward in the first area, wherein the subset does not include images in the sequence of images that occur before an image that corresponds to the current position of the begin-trim affordance. Similarly, in response to detecting an end of an input on the end-trim affordance, the device displays a subset, less than all, of the images in the sequence of images playing forward and then backward in the first area, wherein the subset does not include images in the sequence of images that occur after an image that corresponds to the current position of the end-trim affordance. In some embodiments, the editing user interface for the back-and-forth display mode does not include a representative-image-selection affordance that is configured to select a representative image in the sequence of images via a position of the representative-image-selection affordance in the second area. Providing an updated preview of the media item going back-and-forth, in response to detecting the end of the input (e.g., detecting lift-off), makes it easy to see how the range-trim edit will affect the media item in the back-and-forth display mode. This enhances the operability of the device and makes the editing user interface more efficient (e.g., by providing feedback that helps the user to determine which inputs will produce the result intended by the user and reducing the number of inputs when operating/interacting with the editing user interface)

In some embodiments, in accordance with a determination that the respective display mode is a merged display mode, the respective editing user interface that is displayed in response to detecting the first input is an editing user interface for the merged display mode (e.g., a long-exposure mode, a strobe mode, or other mode that displays a merged image using multiple images in the sequence of images in the media item), and the device displays (634) a (single) merged image in the first area in the editing user interface for the merged display mode, wherein the merged image includes concurrently displayed content from multiple images in the sequence of images (e.g., see FIG. 5T). While displaying the merged image in the first area in the editing user interface for the merged display mode, the device detects an input on the begin-trim affordance; and, while detecting the input on the begin-trim affordance: the device ceases to display the merged image in the first area; adjusts the position of the begin-trim affordance in the second area in accordance with the input on the begin-trim affordance; and displays, in the first area, an image in the sequence of images that corresponds to the position of the begin-trim affordance in the second area (e.g., see FIGS. 5AN-5AO). Similarly, while detecting an input on the end-trim affordance, the device ceases to display the merged image in the first area; adjusts the position of the end-trim affordance in the second area in accordance with the input on the end-trim affordance; and displays, in the first area, an image in the sequence of images that corresponds to the position of the end-trim affordance in the second area. More generally, while detecting an input on a range-trim affordance, the device ceases to display the merged image in the first area; adjusts the position of the range-trim affordance in the second area in accordance with the input on the range-trim affordance; and displays, in the first area, an image in the sequence of images that corresponds to the position of the range-trim affordance in the second area. Providing a preview of the merged display mode of the media item makes it easy to see how the edits will affect the media item in the merged display mode. This enhances the operability of the device and makes the editing user interface more efficient (e.g., by providing feedback that helps the user to determine which inputs will produce the result intended by the user and reducing user mistakes when operating/interacting with the device). In turn, switching to showing a representation of an image that corresponds to a location of a range-trim affordance while adjusting the range-trim affordance makes it easy to precisely trim the media item. This also enhances the operability of the device and makes the editing user interface more efficient (e.g., by providing feedback that helps the user to determine which inputs will produce the result intended by the user and reducing user mistakes when operating/interacting with the editing user interface).

In some embodiments, the device detects (636) an end of the input on the begin-trim affordance (e.g., detecting lift-off of a contact from the begin-trim affordance); and, in response to detecting the end of the input on the begin-trim affordance, displays a (single) merged image made from a subset, less than all, of the images in the sequence of images in the first area, wherein the subset does not include images in the sequence of images that occur before an image that corresponds to the current position of the begin-trim affordance (e.g., see FIGS. 5AO-5AP). Similarly, in response to detecting an end of an input on the end-trim affordance, the device displays an updated (single) merged image made from a subset, less than all, of the images in the sequence of images in the first area, wherein the subset does not include images in the sequence of images that occur after an image that corresponds to the current position of the end-trim affordance. Providing an updated preview of the merged image, in response to detecting the end of the input (e.g., detecting lift-off), makes it easy to see how the range-trim edit will affect the media item in the merged mode. This enhances the operability of the device and makes the editing user interface more efficient (e.g., by providing feedback that helps the user to determine which inputs will produce the result intended by the user and reducing the number of inputs when operating/interacting with the editing user interface).

In some embodiments, the sequence of images in the media item was taken by a camera; the sequence of images includes a representative image; the sequence of images includes one or more images acquired by the camera after acquiring the representative image; and the sequence of images includes one or more images acquired by the camera before acquiring the representative image; and in accordance with a determination that the respective display mode is a lively-photo display mode, the device displays (638) in the second area a representative-image-selection affordance that is configured to select a representative image in the sequence of images via a position of the representative-image-selection affordance in the second area (e.g., representative image selection affordance 520 in area 521 in FIG. 5V). Providing an affordance for adjusting the representative image of the media item enhances the operability of the device and makes the editing user interface more efficient.

In some embodiments, in accordance with a determination that the respective display mode is the lively-photo display mode, the respective editing user interface that is displayed in response to detecting the first input is an editing user interface for the lively-photo display mode, and the device displays (640) the representative image of the sequence of images in the first area in the editing user interface for the lively-photo display mode; while displaying the representative image in the first area in the editing user interface for the lively-photo display mode, detects an input on the begin-trim affordance; and, while detecting the input on the begin-trim affordance: ceases to display the representative image in the first area; adjusts the position of the begin-trim affordance in the second area in accordance with the input on the begin-trim affordance; and displays, in the first area, an image in the sequence of images that corresponds to the position of the begin-trim affordance in the second area (e.g., see FIGS. 5W-5AA). Similarly, while detecting an input on the end-trim affordance, the device ceases to display the representative image in the first area; adjusts the position of the end-trim affordance in the second area in accordance with the input on the end-trim affordance; and displays, in the first area, an image in the sequence of images that corresponds to the position of the end-trim affordance in the second area (e.g., see FIGS. 5BB-5D). More generally, while detecting an input on a range-trim affordance, the device ceases to display the representative image in the first area; adjusts the position of the range-trim affordance in the second area in accordance with the input on the range-trim affordance; and displays, in the first area, an image in the sequence of images that corresponds to the position of the range-trim affordance in the second area. Providing a preview of the lively-photo display mode of the media item makes it easy to see how the edits will affect the media item in the lively-photo display mode. This enhances the operability of the device and makes the editing user interface more efficient (e.g., by providing feedback that helps the user to determine which inputs will produce the result intended by the user and reducing user mistakes when operating/interacting with the device). In turn, switching to showing a representation of an image that corresponds to a location of a range-trim affordance while adjusting the range-trim affordance makes it easy to precisely trim the media item. This also enhances the operability of the device and makes the editing user interface more efficient (e.g., by providing feedback that helps the user to determine which inputs will produce the result intended by the user and reducing user mistakes when operating/interacting with the editing user interface)

In some embodiments, the device detects (642) an end of the input on the begin-trim affordance (e.g., detecting lift-off of a contact from the begin-trim affordance); and, in response to detecting the end of the input on the begin-trim affordance, displays the representative image in the first area (e.g., FIGS. 5Z-5AA). Similarly, in response to detecting an end of an input on the end-trim affordance, the device displays the representative image. Providing an updated preview of the media item in the lively-photo display mode, in response to detecting the end of the input (e.g., detecting lift-off), makes it easy to see how the range-trim edit will affect the media item in the lively-photo display mode. This enhances the operability of the device and makes the editing user interface more efficient (e.g., by providing feedback that helps the user to determine which inputs will produce the result intended by the user and reducing the number of inputs when operating/interacting with the editing user interface).

In some embodiments, while displaying the editing user interface for the lively-photo display mode, the device detects (644) an input directed to a respective range-trim affordance (e.g., the begin-trim affordance or the end-trim affordance), wherein: the input that starts while the respective range-trim affordance is at a start location; and the input has a respective magnitude (e.g., detecting a drag gesture by a contact (or a cursor) that starts on the begin-trim affordance and that includes a component of motion along a slider that includes reduced scale representations of a plurality of images in the sequence of images); and, in response to detecting the input directed to the respective range-trim affordance: in accordance with a determination that the respective magnitude of the input corresponds to movement of the respective range-trim affordance by a first amount that is less than the distance between the start location of the respective range-trim affordance and the representative-image-selection affordance, the device moves the respective range-trim affordance by the first amount (without moving the representative-image-selection affordance); and, in accordance with a determination that the respective magnitude of the input corresponds to movement of the respective range-trim affordance by a second amount greater than the distance between the start location of the respective range-trim affordance and the representative-image-selection affordance, the device moves the respective range-trim affordance by the second amount and also moving the representative-image-selection affordance (e.g., see FIGS. 5X-5Y and 5AA). In some embodiments, the device moves the begin-trim affordance along the slider in accordance with a component of movement of a contact (in a drag gesture) along the slider. In some embodiments, once the begin-trim affordance is at, over, or next to the representation of the current representative image, continued movement of the contact along the slider will continue to move the begin-trim affordance and will also change the current representative image in the media item to an image that corresponds to the current position of the begin-trim affordance. Moving a range-trim affordance in this manner allows for simultaneous changes to both the range of the media item and the representative image of the media item with a single input, which reduces the number of inputs needed to perform these operations and makes the editing user interface more efficient. In some embodiments, the begin-trim affordance cannot move past the representation in the second area that corresponds to the current representative image in the sequence of images. In some embodiments, once the begin-trim affordance is at, over, or next to the representation of the current representative image, continued movement of the contact along the slider will not continue to move the begin-trim affordance and will not change the current representative image in the media item. Moving a range-trim affordance in this manner enhances the operability of the device and makes the user-device interface more efficient (e.g., by preventing the user from accidentally changing the representative image with the range-trim affordance). Similarly, in some embodiments, the device moves the end-trim affordance along the slider in accordance with a component of movement of a contact (in a drag gesture) along the slider. In some embodiments, once the end-trim affordance is at, over, or next to the representation of the current representative image, continued movement of the contact along the slider will continue to move the end-trim affordance and will also change the current representative image in the media item to an image that corresponds to the current position of the end-trim affordance. In some embodiments, the end-trim affordance cannot move past the representation in the second area that corresponds to the current representative image in the media item. In some embodiments, once the end-trim affordance is at, over, or next to the representation of the current representative image, continued movement of the contact along the slider will not continue to move the end-trim affordance and will not change the current representative image in the media item.

In some embodiments, while detecting an input directed to the representative-image-selection affordance, the device displays (646), in the second area, an indicator for the current representative image of the media item (e.g., dot 542 in FIG. 5AB is displayed adjacent to the reduced scale representation of the current representative image in the media item) when a location of the representative-image-selection affordance in the second does not correspond to a representation of the current representative image of the media item. In some embodiments, when the editing user interface is initially displayed, the representative-image-selection affordance is displayed at a location that corresponds to a representation of the representative image of the media item and no dot is displayed, as shown in FIG. 5W. In some embodiments, when the representative-image-selection affordance moves away from the location that corresponds to the representation of the representative image of the media item (e.g., in response to a drag gesture on the representative-image-selection affordance), the dot is displayed at or adjacent to the location that corresponds to the representation of the representative image of the media item, as shown in FIGS. 5AQ-5AV. In some embodiments, if the representative-image-selection affordance is moved away from its initial location, the indicator is displayed and if it is moved back to the initial location the indicator ceases to be displayed. Displaying an indicator for the current representative image of the media item in this manner provides improved visual feedback to a user and helps the user to return to the current representative image if the user decides not to change the current representative image. This enhances the operability of the device and makes the user-device interface more efficient (e.g., by providing feedback that helps the user to determine which inputs will produce the result intended by the user and reducing user mistakes when operating/interacting with the device).

In some embodiments, while detecting an input directed to the representative-image-selection affordance, in accordance with a determination that the representative-image-selection affordance is within a predetermined distance (greater than zero) to a position that corresponds to the representation of the current representative image of the media item, the device snaps (648) the representative-image-selection affordance to the position that corresponds to the representation of the current representative image of the media item (e.g., see FIGS. 5AW-5AX). Snapping the representative-image-selection affordance in this manner helps the user to return to the current representative image if the user decides not to change the current representative image. This enhances the operability of the device and makes the user-device interface more efficient (e.g., by providing feedback that helps the user to determine which inputs will produce the result intended by the user and reducing user mistakes when operating/interacting with the device).

In some embodiments, the electronic device has one or more tactile output generators, and the device generates (650) a tactile output when the representative-image-selection affordance snaps to the position that corresponds to the representation of the current representative image of the media item (e.g., see haptic response 527 in FIG. 5AX). Providing haptic feedback in this manner enhances the operability of the device and makes the user-device interface more efficient (e.g., by alerting the user that the representative-image-selection affordance has returned to a position that corresponds to the representation of the current representative image, thereby helping the user to achieve an intended outcome and reducing user mistakes when operating/interacting with the device).

In some embodiments, while displaying the editing user interface for the respective display mode, the device detects (652) an input to display editing user interface options; in response to detecting the input to display editing user interface options, displays a plurality of editing-display-mode affordances, including a first editing-display-mode affordance; detects an input on the first editing-display-mode affordance; and, in response to detecting the input on the first editing-display-mode affordance, changes the editing user interface from the editing user interface for the respective display mode to an editing user interface for a display mode that corresponds to the first editing-display-mode affordance. For example, activating (e.g., with a tap gesture) display mode indicator icon 512 (FIG. 5AY) causes display of menu 528 (FIG. 5AZ), which includes editing display mode options for the media item. In turn, activating (e.g., with a tap gesture) editing display mode option 529-1 (FIG. 5AZ) causes the editing user interface for lively-photo display mode (FIG. 5AZ) to change to the editing user interface for loop display mode (FIG. 5BA). Providing an ability to easily change between editing user interfaces for different display modes of a media item enhances the operability of the device and makes the user-device interface more efficient (e.g., by helping the user navigate to an editing mode that corresponds to a given display mode for the media item, so that the user can preview the impact of edits to that display mode).

In some embodiments, an electronic device with a display and a touch-sensitive surface displays, in a first user interface on the display, one or more images from a media item that corresponds to a sequence of images in a respective display mode, the respective display mode being one of a plurality of user-selectable display modes for the sequence of images (e.g., a lively-photo display mode, a loop display mode, a long-exposure display mode, a back-and-forth display mode, a movie display mode, a strobe-effect display mode, or other display mode for displaying the sequence of images that is selected by a user) (e.g., see FIG. 5U). While displaying the one or more images from the media item, the device detects a first input (e.g., a tap gesture by a contact on an edit affordance) (e.g., see tap 502-9 at edit control 504-*d* in FIG. 5U). In response to detecting the first input, the device displays an editing user interface for the media item (e.g., see FIG. 5V). The editing user interface for the media item is configured to change which images are included in the media item (e.g., trim the sequence of images to a subset, less than all, of the sequence of images). The editing user interface for the media item displays a first (predefined) area that includes a representation of the media item that includes content from multiple images in the sequence of images (e.g., by playing the sequence of images over time or by merging multiple images in to a single image) (e.g., see edit display area 523 in FIG. 5V). In some embodiments, the first area displays images in the sequence of images one at a time, with a respective image filling the first area when the respective image is displayed. The editing user interface for the media item concurrently displays, with the first area, a second (predefined) area, distinct from the first area, that includes representations of images in the sequence of images, (e.g., a slider that, optionally, includes reduced scale representations of a plurality of images in the sequence of images) (e.g., see area 521 in FIG. 5V) and a plurality of editing affordances for selecting different images in the sequence of images as reference points for the media item (e.g., beginning image, end image, and/or representative image), including: a user-adjustable begin-trim affordance (e.g., begin handle 516, FIG. 5V) that delimits a beginning image in the subset of the sequence of images via a position of the begin-trim affordance in the second area, and a user-adjustable end-trim affordance (e.g., end handle 518, FIG. 5V) that delimits an ending image in the subset of the sequence of images via a position of the end-trim affordance in the second area. In some embodiments, the editing user interface for the media item concurrently displays a plurality of image adjustment affordances which, when activated, provide access to image adjustment functions (e.g., cropping, rotating, filtering, lighting, markup, magic wand, cancel, save/done, and/or other image editing functions) (e.g., affordances 505-*a*-505*h* in FIG. 5V). While displaying the editing user interface for the respective display mode, the device detects a second input that corresponds to adjustment of a respective editing affordance of the plurality of editing affordances (e.g., detecting a drag gesture that adjusts the position of the begin-trim affordance or the end-trim affordance in the second area) (e.g., see FIGS. 5W-5X). In response to detecting the second input, the device ceases to display the representation of the media item that includes content from multiple images in the sequence of images in the first region and displays, in the first region, a representation of an image that corresponds to a location of the respective editing affordance in the representation of the sequence of images (e.g., see FIGS. 5W-5X).

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6F. For example, the contacts, gestures, user interface objects, range-trim affordances, display modes, media items, representative-image-selection affordances, tactile outputs, and animations described above with reference to method 600 optionally have one or more of the characteristics of the contacts, gestures, user interface objects, range-trim affordances, display modes, media items, representative-image-selection affordances, tactile outputs, and animations described herein with reference to other methods described herein (e.g., methods 700, 800, 900, and 1000). For brevity, these details are not repeated here.

FIGS. 7A-7D are flow diagrams of a method for navigating to and selecting a display mode for a media item that has multiple display modes in accordance with some embodiments. Method 700 is performed at an electronic device (e.g., device 300, FIG. 3, or portable multifunction device 100, FIG. 1A) with a display, a touch-sensitive surface, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to navigate to and select a display mode for a media item that has multiple display modes. The method reduces the number, extent, and/or nature of the inputs from a user when navigating among multiple display modes for a media item, thereby creating a more efficient human-machine interface. For battery-operated electronic devices, enabling a user to navigate among multiple display modes for a media item faster and more efficiently conserves power and increases the time between battery charges.

The device displays (702), in a first user interface on the display, one or more images from a media item that corresponds to a sequence of images in a first display mode, wherein, the first display mode is one of a plurality of user-selectable display modes for the media item that corresponds to the sequence of images (e.g., a lively-photo display mode, a loop display mode, a long-exposure display mode, a back-and-forth display mode, a movie display mode, a strobe-effect display mode, or other display mode for displaying the media item that is selected by a user) (e.g., see FIG. 5BF).

In some embodiments, the one or more images from the media item are displayed (704) at a first magnification in the first user interface; and a respective representation of the media item is displayed in the display-mode selection user interface at a second magnification that is less than the first magnification (e.g., see FIGS. 5BF and 5BH). Displaying the representations of the media item in the display-mode selection user interface at lower magnification than the media item in the first user interface (e.g., a media item playback interface) allows multiple representations to be concurrently shown and selectable in the display-mode selection user interface, while also permitting easier viewing of the (larger) media item in the first user interface. This enhances the operability of the device and makes the user-device interface more efficient.

In some embodiments, the media item that corresponds (706) to the sequence of images is a first media item in a collection of media items (e.g., a media library, folder, album, or camera roll); the collection of media items is arranged in an order based on predetermined criteria (e.g., date/time of creation, date/time of last edit, name, size, etc. of media items in the collection); one or more prior media items precede the first media item in the order; one or more subsequent media items follow the first media item in the order; the electronic device replaces display of the first media item with display of a subsequent media item in the collection in response to detecting a swipe in a second direction (e.g., leftward); and the electronic device replaces display of the first media item with display of a prior media item in the collection in response to detecting a swipe in a third direction that is different from the second direction (e.g., rightward). Using swipe gestures (e.g., leftward and rightward) provides an efficient input to navigate between media items in a collection of media items, as described further herein with reference to method 800. This enhances the operability of the device and makes the user-device interface more efficient (e.g., by providing feedback that helps the user to determine which inputs will produce the result intended by the user and reducing user mistakes when operating/interacting with the device).

While displaying the one or more images from the media item in the first display mode, the device detects (708) a first input (e.g., detecting a swipe gesture by a contact on a currently displayed image in the sequence of images) (e.g., see FIG. 5BG).

In some embodiments, the first input is (710) a swipe in a first direction (e.g., an upward swipe gesture by a contact) (e.g., upward swipe 560-2 in FIG. 5BG). A swipe gesture (e.g., an upward swipe gesture) provides an efficient, intuitive input to navigate from the first user interface (e.g., a media item playback interface) to the display-mode selection user interface that avoids cluttering the UI with additional displayed controls, which enhances the operability of the device and makes the user-device interface more efficient (e.g., by providing feedback that helps the user to determine which inputs will produce the result intended by the user and reducing user mistakes when operating/interacting with the device) which, additionally, reduces power usage and improves battery life of the device by enabling the user to use the device more quickly and efficiently.

In response to detecting the first input, the device displays (712) a display-mode selection user interface on the display (e.g., a user interface configured to select a display mode for the media item that corresponds to the sequence of images), wherein: the display-mode selection user interface concurrently displays a plurality of representations of the media item, including a second representation of the media item that corresponds to a second display mode that is different from the first display mode (e.g., see display-mode selection user interface 511 in FIG. 5BH). In some embodiments, for a given representation of the media item, text stating the corresponding display mode (or another display-mode identifier) is displayed adjacent to the given representation.

In some embodiments, the plurality of representations of the media item includes (714) a first representation of the media item that corresponds to the first display mode (e.g., "Lively" indicator 540-1 for "Lively" display mode in FIG. 5BH). In some embodiments, a respective representation of the media item corresponds to a respective display mode in the plurality of user-selectable display modes for the media item. In some embodiments, for a given representation of the media item, text stating the corresponding display mode (or another display-mode identifier) is displayed adjacent to the given representation. Displaying a representation of the media item in the display-mode selection user interface that corresponds to the mode that is currently being displayed in the first user interface helps provide context for navigation and provides a path back to the first user interface with the media item displayed in the same mode. This enhances the operability of the device and makes the user-device interface more efficient (e.g., by providing feedback that helps the user to determine which inputs will produce the result intended by the user and reducing user mistakes when operating/interacting with the device).

In some embodiments, the plurality of representations of the media item displayed in response to detecting the first input are selected (716) based on an analysis of the images in the sequences of images and predetermined requirements of a plurality of different candidate display modes (e.g., the device only displays/suggests a loop representation if the device determines that the sequence of images in the media item meet loop representation criteria). Automatically selecting the representations of the media item for display in the display-mode selection user interface, where a given representation corresponds to a particular display mode for the media item, helps a user to navigate to better display modes for the media item. This enhances the operability of the device and makes the user-device interface more efficient (e.g., by automatically showing just the representations of display mode options for the media item that are likely to be of interest to a user).

In some embodiments, the plurality of user-selectable display modes for the media item includes (718) a lively-photo display mode that is configured to play back the sequence of images in the media item in response to detecting an input on a representative image in the sequence of images (e.g., a next image input or a press input that includes an increase in intensity of a contact over an intensity threshold) (e.g., see FIG. 5BH). In some embodiments, playing back the sequence of images in response to detecting the input includes starting from a currently displayed image (e.g., a representative image) that is in the middle of the sequence of images. In some embodiments, playing back the sequence of images in response to detecting the input includes crossfading to a prior (e.g., chronologically first) image in the sequence of images and playing back from the first image. In some embodiments, playing back the sequence of images in response to detecting the input includes starting to play from the currently displayed image and then crossfading to the first image and playing through the sequence of images from the first image).

In some embodiments, the plurality of user-selectable display modes for the media item includes (720) a loop display mode that is configured to (repeatedly) display the sequence of images in the media item in a loop (e.g., sequentially displaying the images from a start to an end of the sequence and then starting at the beginning of the sequence again) (e.g., "Loop" indicator 540-2 for "Loop" display mode in FIG. 5BH).

In some embodiments, the plurality of user-selectable display modes for the media item includes (722) a back-and-forth display mode that is configured to display the sequence of images in the media item repeatedly playing forward and then backward (e.g., sequentially displaying the images forward from a start to an end of the sequence and then starting from the end and playing backward to the start of the sequence) (e.g., "Back & Forth" indicator 540-3 for "Back & Forth" display mode in FIG. 5BH).

In some embodiments, the plurality of user-selectable display modes for the media item includes (724) a merged image display mode that is configured to display a single merged image that includes content from a plurality of images in the sequence of images (e.g., "Merged" indicator 540-4 for "Merged" display mode in FIG. 5BH).

In some embodiments, the single merged image includes content of a same object that appears at a same location in a plurality of images in the sequence of images that are merged together to obscure features that are in motion in between different images and simulate the effect of a long exposure time during image capture.

In some embodiments, the single merged image includes content of a same object that appears at different locations in a plurality of images in the sequence of images and the different locations of the object in the plurality of images are emphasized to simulate the effect of multiple exposures with a strobe light so that the moving object appears multiple times in the merged image).

In some embodiments, while in a merged display mode (e.g., the long-exposure display mode), detecting the same input that initiates playback in lively-photo display mode (e.g., a swipe, a press input that includes an increase in intensity of a contact over an intensity threshold, or a long press on the displayed merged image) will crossfade from the merged image to playback of the sequence of images in the media item and then cross fade back to the merged image.

In some embodiments, the plurality of user-selectable display modes for the media item includes (726) a movie display mode that is configured to play back the sequence of images in the media item, with playback starting at the earliest image in the sequence of images, in response to a detecting tap input on a representation of the sequence of images (e.g., instead of detecting a swipe, a long press or a press input). In some embodiments, an editing user interface for the movie display mode includes controls that let media items be saved as just video files (e.g., a GIF, MOV, MP4, WMV, or AVI file), rather than as media items that contain both still images (e.g., JPEG) and video (e.g., MOV) (e.g., "Movie" indicator 540-6 for "Movie" display mode in FIG. 5BK).

In some embodiments, a respective representation of the media item in the display-mode selection user interface displays (728) a preview of the media item in the corresponding display mode, wherein the respective representation is displayed at a second magnification in the display-mode selection user interface that is less than a first magnification of the media item in the corresponding display mode (e.g., see FIG. 5BH). For example, a first representation of a media item that corresponds to the loop display mode displays the sequence of images in the media item looping at the second, reduced magnification. For example, a second representation that corresponds to the back-and-forth display mode displays the sequence of images repeatedly playing forward and then backward at the second, reduced magnification. For example, a third representation that corresponds to the long exposure display mode displays the sequence of images as a single merged image at the second, reduced magnification. For example, a fourth representation that corresponds to the strobe display mode displays a subset of the sequence of images as a single merged image at the second, reduced magnification. In some embodiments, these previews of corresponding display modes are displayed concurrently at the second magnification (e.g., as a set of thumbnail images, with a preview of a particular display mode applied to each thumbnail image). Displaying reduced scale representations of the media item in the display-mode selection user interface as previews of the corresponding display modes provides context for navigation. This enhances the operability of the device and makes the user-device interface more efficient (e.g., by providing feedback that helps the user to determine which inputs will produce the result intended by the user and reducing user mistakes when operating/interacting with the device).

In some embodiments, in the display-mode selection user interface, the plurality of representations of the media item are (730) scrollable (e.g., see FIG. 5BJ-5BK). In some embodiments, the representations of the media item are displayed in a row and are configured to scroll horizontally in response to detecting a drag or swipe gesture along the row. In some embodiments, the representations of the media item are displayed in a column and are configured to scroll vertically in response to detecting a drag or swipe gesture along the column. Having scrollable representations of the media item in the display-mode selection user interface lets a user see additional display mode navigation options on devices with small displays. This enhances the operability of the device and makes the user-device interface more efficient (e.g., on devices with small displays).

In some embodiments, in response to detecting the first input, the display-mode selection user interface concurrently displays (732) a portion, less than all, of the one or more images from the media item in the first display mode at a first magnification, and the plurality of representations of the sequence of images at a second magnification that is less than the first magnification (e.g., see FIG. 5BH). Displaying a portion (e.g., a bottom portion) of the media item in the first display mode at the first magnification in the display-mode selection user interface provides context for navigation back to the first user interface from the display-mode selection user interface (e.g., using a swipe down gesture to return to the first user interface). This enhances the operability of the device and makes the user-device interface more efficient (e.g., by providing feedback that helps the user to determine which inputs will produce the result intended by the user).

In some embodiments, the display-mode selection user interface displays (734) geographic location information for the media item (e.g., see FIG. 5BM). In some embodiments, the display-mode selection user interface displays additional information associated with the sequence of images in the media item, such as information about the people in the sequence of images (e.g., based on facial recognition of the people), a map showing the location where the sequence of images was taken, a link to other photos taken at or near the same location, a link to other photos taken at or near the same time (e.g., taken on the same day), and/or other related content. In some embodiments, the display-mode selection user interface includes additional information associated with the media item (e.g., a map corresponding to the location of the media item, collections of photos that contain the media item, people who appear in the images in the media item, an option to display related images, an option to display images from the same day, etc.) Displaying such information for the media item in the display-mode selection user interface provides context for the media item and provides quick navigation paths to additional information related to the media item. This enhances the operability of the device and makes the user-device interface more efficient (e.g., by providing quick access to additional information related to the media item).

While displaying the display-mode selection user interface on the display, the device detects (736) an input on the second representation in the plurality of representations of the media item (e.g., tap 560-4 at "Loop" indicator 540-2 as shown in FIG. 5BH).

In response to detecting the input on the second representation in the plurality of representations of the media item, the device selects (738) a second display mode in the plurality of user-selectable display modes for the media item that corresponds to the second representation in the plurality of representations of the media item. In some embodiments, the second representation of the media is visually distinguished from the other representations (e.g., by highlighting, putting a box around, etc.) to indicate that the display mode that corresponds to the second representation is selected (e.g., display mode selection indicator 541 in FIG. 5BJ).

In some embodiments, the device displays (740), in the first user interface on the display, an indicator of the first display mode (e.g., displaying "Lively" indicator 540-1 in FIG. 5BH, "Loop" indicator 540-2 in FIG. 5BH, "Long Exposure" indicator 540-3 in FIG. 5BH, or "Back-and-Forth" indicator 540-4 in FIG. 5BH). Displaying an indicator of the first display mode in the first user interface helps provide context for navigation. This enhances the operability of the device and makes the user-device interface more efficient (e.g., by providing feedback that helps the user to determine which inputs will produce the result intended by the user and reducing user mistakes when operating/interacting with the device).

In some embodiments, in response to detecting the input on the second representation in the plurality of representations of the media item: the device ceases (742) to display the display-mode selection user interface; and displays (e.g., in the first user interface on the display) one or more images from the media item in the (selected) second display mode that corresponds to the second representation in the plurality of representations of the media item (e.g., see FIGS. 5BH-5BI). Selecting a particular display mode, exiting the display-mode selection user interface, and displaying the media item in the selected display mode in response to a single input on a given representation of the media item (e.g., a tap gesture on the given representation) reduces the number of inputs needed to perform these operations and makes the navigation more efficient.

In some embodiments, in response to detecting the input on the second representation in the plurality of representations of the media item: the device displays (744) (e.g., in the first user interface on the display) an indicator of the (selected) second display mode that corresponds to the second representation in the plurality of representations of the media item (e.g., displaying "Loop" indicator 540-2 in FIG. 5BH). Displaying an indicator of the selected display mode helps provide context for navigation. This enhances the operability of the device and makes the user-device interface more efficient (e.g., by providing feedback that helps the user to determine which inputs will produce the result intended by the user and reducing user mistakes when operating/interacting with the device).

In some embodiments, after selecting the second display mode in the plurality of user-selectable display modes for the media item that corresponds to the second representation in the plurality of representations of the media item, while the second display mode that corresponds to the second representation is selected, the device detects (746) a second input (e.g., a tap gesture on a "Done" icon, a downward swipe, a double tap gesture on the second representation, 540-2 or a tap 560-14 as shown in FIG. 5BO), or other input for exiting the display-mode selection user interface); and, in response to detecting the second input: ceases to display the display-mode selection user interface; and displays (e.g., in the first user interface on the display) the one or more images from the media item in the (selected) second display mode that corresponds to the second representation in the plurality of representations of the media item. In some embodiments, in response to detecting the second input, the device also displays an indicator of the selected display mode that corresponds to the second representation in the plurality of representations of the sequence of images. Requiring another input after selecting a desired display mode to leave the display-mode selection user interface reduces inadvertent navigation away from the display-mode selection user interface. This enhances the operability of the device and makes the user-device interface more efficient (e.g., by providing feedback that helps the user to determine which inputs will produce the result intended by the user and reducing user mistakes when operating/interacting with the device).

In some embodiments, while displaying, in the first user interface on the display, the one or more images from the media item in the first display mode, in accordance with a (automatic) determination that a second display mode for the media item meets recommendation criteria, the device displays (748) a suggestion to switch from the first display mode to the second display mode (e.g., including instructions for accessing the display-mode selection user interface). Automatically suggesting an alternative display mode for the media item helps a user to navigate to better display modes for the media item. This enhances the operability of the device and makes the user-device interface more efficient.

It should be understood that the particular order in which the operations in FIGS. 7A-7D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7D. For example, the contacts, gestures, user interface objects, range-trim affordances, display modes, media items, representative-image-selection affordances, tactile outputs, and animations described above with reference to method 700 optionally have one or more of the characteristics of the contacts, gestures, user interface objects, range-trim affordances, display modes, media items, representative-image-selection affordances, tactile outputs, and animations described herein with reference to other methods described herein (e.g., methods 600, 800, 900, and 1000). For brevity, these details are not repeated here.

FIGS. 8A-8F are flow diagrams of a method for changing a representative image for a media item that corresponds to a sequence of images in accordance with some embodiments. Method 800 is performed at an electronic device (e.g., device 300, FIG. 3, or portable multifunction device 100, FIG. 1A) with a display, a touch-sensitive surface, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to change a representative image for a media item that corresponds to a sequence of images. The method reduces the number, extent, and/or nature of the inputs from a user when changing a representative image for a media item, thereby creating a more efficient human-machine interface. For battery-operated electronic devices, enabling a user to change a representative image for a media item faster and more efficiently conserves power and increases the time between battery charges.

The device displays (802), in a first user interface on the display, a representation of a media item that corresponds to a sequence of images, the media item including a representative image from the sequence of images (e.g., displaying the representative image from the sequence of images) (e.g., see FIG. 5BS). In some embodiments, the media item includes images that were captured in response to a single activation of a shutter button, such as a tap on a virtual shutter button, a click of a physical shutter button or a long press input on a virtual or physical shutter button) in a first display mode (e.g., a lively-photo display mode).

While displaying the representation of the media item that corresponds to the sequence of images in the first display mode, the device detects (804) a first input (e.g., a tap gesture by a contact on an edit affordance) (e.g., see FIG. 5BT).

In response to detecting the first input, the device displays (806) an editing user interface for the media item in the first display mode on the display (e.g., see FIG. 5BU). In some embodiments, the editing user interface is configured to trim the sequence of images in the media item that are displayed in the lively-photo display mode to a subset, less than all, of the sequence of images and the editing interface is configured to select a new representative image for the media item in the lively-photo display mode. The editing user interface concurrently displays: a first (predefined) area that is configured to sequentially display images in the sequence of images at a first magnification (e.g., edit display area 523 as shown in FIG. 5BU). In some embodiments, the first area displays images in the sequence of images one at a time, with a respective image filling the first area when the respective image is displayed. The editing user interface concurrently displays: a second (predefined) area (e.g., area 521 as shown in FIG. 5BU), distinct from the first area, that includes representations of images in the sequence of images at a second magnification that is less than the first magnification, (e.g., in a slider that includes reduced scale representations of a plurality of images in the sequence of images in the media item) a user-adjustable representative-image-selection affordance (e.g., key-image frame 520, FIG. 5BU) that is configured to select a new representative image in the sequence of images via a position of the representative-image-selection affordance in the second area, a plurality of range-trim affordances including: a user-adjustable begin-trim affordance (e.g., begin handle 516, FIG. 5BU) that indicates a first boundary for playback through the sequence of images (e.g., the begin-trim affordance delimits a beginning image in a subset of the sequence of images via a position of the begin-trim affordance in the second area), and a user-adjustable end-trim affordance (e.g., end handle 518, FIG. 5BU) that indicates a second boundary for playback through the sequence of images (e.g., the end-trim affordance delimits an ending image in the subset of the sequence of images via a position of the end-trim affordance in the second area).

In some embodiments, the sequence of images in the media item was taken (808) by a camera (e.g., a camera that is part of the electronic device or a camera that is separate from the electronic device); the sequence of images includes one or more images acquired by the camera after acquiring the representative image; and the sequence of images includes one or more images acquired by the camera before acquiring the representative image.

While displaying the editing user interface, the device detects (810) a second input directed to the representative-image-selection affordance (e.g., detecting a drag gesture by a contact (or a cursor) that starts on the representative-image-selection affordance and that includes a component of motion along a slider that includes reduced scale representations of a plurality of images in the sequence of images) (e.g., drag by contact 570-4 shown in FIG. 5BV).

While detecting the second input directed to the representative-image-selection affordance: the device moves (812) the representative-image-selection affordance in the second area in accordance with the second input (e.g., moving the representative-image-selection affordance along the slider in accordance with a component of movement of a contact (in a drag gesture) along the slider); displays a visually emphasized representation of an image in the second area that corresponds to a current position of the representative-image-selection affordance in the second area (e.g., surrounding the representation of the image with the representative-image-selection affordance, enlarging the representation of the image relative to other representations in the slider in the second area, and/or changing the image that is displayed within the representative-image-selection affordance as the representative-image-selection affordance moves along the representations of images in the sequence of images in the slider); and displays, in the first area, an image from the sequence of images that corresponds to the current position of the representative-image-selection affordance in the second area. (e.g., at the same time that the representation of an image in the second area that corresponds to the current position of the representative-image-selection affordance in the second area is highlighted, the corresponding image is displayed at a higher magnification in the first area) (e.g., see FIGS. 5BW-5BX)

In some embodiments, the representation of an image in the second area that corresponds to the current position of the representative-image-selection affordance in the second area and the image, in the first area, that corresponds to the current position of the representative-image-selection affordance update (814) as the position of the representative-image-selection affordance moves in the second area (e.g., see FIGS. 5BW-5BX). Providing concurrent updating of the image in the first area and the representation in the second area as the position of the representative-image-selection affordance moves provides visual feedback that helps select a new representative image. This enhances the operability of the device and makes the user-device interface more efficient (e.g., by providing feedback that helps the user to determine which inputs will produce the result intended by the user to select a new representative image).

In some embodiments, the device detects (816) an end of the second input; and, (e.g., detecting lift off of a contact that was providing the second input) in response to detecting the end of the second input, the device displays a representative-image-confirmation affordance (e.g., displaying "Make key photo (representative image)" in FIG. 5CA in response to detecting liftoff of contact 570-4 in FIG. 5BZ). In some embodiments, the representative-image-confirmation affordance is displayed adjacent to the position of the representative-image-selection affordance at the end of the second input. In some embodiments, the representative-image-selection affordance remains at the location where it was moved to in response to the second input even after the second input ends (e.g., until another input is detected or until a predetermined amount of time has elapsed). Displaying a representative-image-confirmation affordance when an input ends provides visual feedback that helps guide a user during selection of a new representative image. This enhances the operability of the device and makes the user-device interface more efficient (e.g., by providing feedback that helps the user to determine which inputs will produce the result intended by the user to select a new representative image and reducing user mistakes when operating/interacting with the device).

In some embodiments, while displaying the representative-image-confirmation affordance, the device detects (818) an input directed to the representative-image-confirmation affordance (e.g., detecting a tap gesture on the representative-image-confirmation affordance or a hidden hit region for the representative-image-confirmation affordance); and, in response to detecting the input directed to the representative-image-confirmation affordance, updating the representative image in the media item to the image that corresponds to the current position of the representative-image-selection affordance in the second area. For example, a tap gesture 570-6 on "Make key photo" in FIG. 5CB confirms selection of the image, displayed in the first area, which corresponds to the current position of the representative-image-selection affordance as the updated representative image for the media item. Requiring a confirmation input after provisionally selecting a new representative image for a media item reduces inadvertent or unwanted selections of a new representative image. This enhances the operability of the device and makes the user-device interface more efficient (e.g., by providing feedback that helps the user to determine which inputs will produce the result intended by the user and reducing user mistakes when operating/interacting with the device).

In some embodiments, while displaying the representative-image-confirmation affordance, the device detects (820) an input that is not directed to the representative-image-confirmation affordance (e.g., detecting a tap gesture in the editing user interface at a location that is away from the representative-image-confirmation affordance or a hidden hit region for the representative-image-confirmation affordance); and, in response to detecting the input that is not directed to the representative-image-confirmation affordance, foregoing updating the representative image in the media item to the image that corresponds to the current position of the representative-image-selection affordance in the second area. For example, a tap gesture 570-8 away from "Make key photo" in FIG. 5CD cancels selection of the image, displayed in the first area, that corresponds to the current position of the representative-image-selection affordance as the updated representative image for the media item. Thus, in some embodiments, the device detects an input while the representative-image-confirmation affordance is displayed and, in response to detecting the input, in accordance with a determination that the input is directed to the representative-image-confirmation affordance, the device updates the representative image in the media item to the image that corresponds to the current position of the representative-image-selection affordance in the second area. And, in accordance with a determination that the input is not directed to the representative-image-confirmation affordance, the device foregoes updating the representative image in the media item to the image that corresponds to the current position of the representative-image-selection affordance in the second area. As noted above, requiring a confirmation input after provisionally selecting a new representative image for a media item reduces inadvertent or unwanted selections of a new representative image. This enhances the operability of the device and makes the user-device interface more efficient (e.g., by providing feedback that helps the user to determine which inputs will produce the result intended by the user and reducing user mistakes when operating/interacting with the device).

In some embodiments, in response to detecting the input that is not directed to the representative-image-confirmation affordance: the device ceases (822) to display the representative-image-confirmation affordance, and moves the position of the representative-image-selection affordance in the second area to (or adjacent to) a representation of the representative image (e.g., the image in the media item that was the representative image prior to detecting the second input) (e.g., see FIGS. 5CD-5CE). When selection of a new representative image is not confirmed, the device automatically undoes the changes to the user interface that were made to show provisional selection of a new representative image reduces the number inputs needed from a user, thereby creating a more efficient human-machine interface.

In some embodiments, while displaying the editing user interface, the device detects (824) a third input directed to a respective range-trim affordance (e.g., the begin-trim affordance or the end-trim affordance), wherein: the third input that starts while the respective range-trim affordance is at a start location; and the third input has a respective magnitude (e.g., detecting a drag gesture by a contact (or a cursor) that starts on the begin-trim affordance and that includes a component of motion along a slider that includes reduced scale representations of a plurality of images in the sequence of images); and, in response to detecting the third input directed to the respective range-trim affordance: in accordance with a determination that the respective magnitude of the third input corresponds to movement of the respective range-trim affordance by a first amount that is less than the distance between the start location of the respective range-trim affordance and the representative-image-selection affordance, moves the respective range-trim affordance by the first amount; and, in accordance with a determination that the respective magnitude of the third input corresponds to movement of the respective range-trim affordance by an second amount greater than the distance between the start location of the respective range-trim affordance and the representative-image-selection affordance, moves the respective range-trim affordance adjacent to the representative-image-selection affordance (e.g., see FIGS. 5CH-5CJ).

In some embodiments, the device moves the begin-trim affordance along the slider in accordance with a component of movement of a contact (in a drag gesture) along the slider. In some embodiments, once the begin-trim affordance is at, over, or next to the representation of the current representative image, continued movement of the contact along the slider will continue to move the begin-trim affordance and will also change the current representative image in the media item to an image that corresponds to the current position of the begin-trim affordance (e.g., see FIGS. 5Y, 5AB, and 5AC). Moving a range-trim affordance in this manner allows for simultaneous changes to both the range of the media item and the representative image of the media item with a single input, which reduces the number of inputs needed to perform these operations and makes the editing user interface more efficient.

In some embodiments, the begin-trim affordance cannot move past the representation in the second area that corresponds to the current representative image in the sequence of images. In some embodiments, once the begin-trim affordance is at, over, or next to the representation of the current representative image, continued movement of the contact along the slider will not continue to move the begin-trim affordance and will not change the current representative image in the media item. Moving a range-trim affordance in this manner enhances the operability of the device and makes the user-device interface more efficient (e.g., by preventing the user from accidentally changing the representative image with the range-trim affordance).

Similarly, in some embodiments, the device moves the end-trim affordance along the slider in accordance with a component of movement of a contact (in a drag gesture) along the slider. In some embodiments, once the end-trim affordance is at, over, or next to the representation of the current representative image, continued movement of the contact along the slider will continue to move the end-trim affordance and will also change the current representative image in the media item to an image that corresponds to the current position of the end-trim affordance.

In some embodiments, the end-trim affordance cannot move past the representation in the second area that corresponds to the current representative image in the media item. In some embodiments, once the end-trim affordance is at, over, or next to the representation of the current representative image, continued movement of the contact along the slider will not continue to move the end-trim affordance and will not change the current representative image in the media item.

In some embodiments, while detecting the second input directed to the representative-image-selection affordance, the device displays (826), in the second area, an indicator for the current representative image of the media item (e.g., dot 542 in FIG. 5CD is displayed adjacent to the reduced scale representation of the current representative image in the media item). Displaying an indicator for the current representative image of the media item provides improved visual feedback to a user and helps the user to return to the current representative image if the user decides not to change the current representative image. This enhances the operability of the device and makes the user-device interface more efficient (e.g., by providing feedback that helps the user to determine which inputs will produce the result intended by the user and reducing user mistakes when operating/interacting with the device).

In some embodiments, while detecting the second input directed to the representative-image-selection affordance, the device foregoes displaying (828), in the second area, the indicator for the current representative image of the media item when the representative-image-selection affordance is at a location that corresponds to a representation of the representative image of the media item (e.g., see FIGS. 5CK-5CL). In some embodiments, when the editing user interface is initially displayed, the representative-image-selection affordance is displayed at a location that corresponds to a representation of the representative image of the media item and no dot is displayed, as shown in FIG. 5BU. In some embodiments, when the representative-image-selection affordance moves away from the location that corresponds to the representation of the representative image of the media item (e.g., in response to a drag gesture on the representative-image-selection affordance), the dot is displayed at or adjacent to the location that corresponds to the representation of the representative image of the media item, as shown in FIGS. 5BY-5CA. In some embodiments, if the representative-image-selection affordance is moved away from its initial location, the indicator is displayed and if it is moved back to the initial location the indicator ceases to be displayed. Displaying an indicator for the current representative image of the media item in this manner provides improved visual feedback to a user and helps the user to return to the current representative image if the user decides not to change the current representative image. This enhances the operability of the device and makes the user-device interface more efficient (e.g., by providing feedback that helps the user to determine which inputs will produce the result intended by the user and reducing user mistakes when operating/interacting with the device).

In some embodiments, in response to detecting the input directed to the representative-image-confirmation affordance, the device displays (830), in the second area, an indicator for the original representative image of the sequence of images (e.g., dot 542 in FIG. 5BY is displayed adjacent to the reduced scale representation of the original representative image of the media item). In some embodiments, after the representative image of the media item has been changed, an indicator is displayed in the second area at or adjacent to a reduced scale representation of the original representative image of the media item. In some embodiments, the indicator for the original representative image is displayed concurrently with the indicator for the current representative image (e.g., if the current representative image is different from the original representative image and the representative-image-selection affordance is displayed away from the location of the current representative image or the location of the original representative image, as shown by dots 542 and 543 in FIG. 5CF). Displaying an indicator for the original representative image of the media item provides improved visual feedback to a user and helps the user to return to the original representative image. This enhances the operability of the device and makes the user-device interface more efficient (e.g., by providing feedback that helps the user to determine which inputs will produce the result intended by the user and reducing user mistakes when operating/interacting with the device).

In some embodiments, the electronic device has one or more tactile output generators, and while detecting the second input directed to the representative-image-selection affordance, the device generates (832) a tactile output when the representative-image-selection affordance moves over a location that corresponds to a representation of the representative image of the media item (e.g., see haptic response 527 shown in FIG. 5CL). In some embodiments, the device produces a tactile output when the representative-image-selection affordance goes over a reduced scale representation of the original representative image of the media item. In some embodiments, the tactile output is generated when the representative-image-selection affordance is moved past the location of the original representative image at a speed below a threshold speed, and the tactile output is not generated when the representative-image-selection affordance is moved past the location of the original representative image at a speed above the threshold speed (e.g., see FIGS. 5CL and 5CM). Providing haptic feedback in this manner enhances the operability of the device and makes the user-device interface more efficient (e.g., by alerting the user that the representative-image-selection affordance has returned to a position that corresponds to the representation of the original representative image, thereby helping the user to achieve an intended outcome and reducing user mistakes when operating/interacting with the device).

In some embodiments, the electronic device has one or more tactile output generators, and after updating the representative image in the sequence of images, while in the editing user interface and detecting an input directed to the representative-image-selection affordance, the device generates (834) a tactile output when the representative-image-selection affordance moves over a location that corresponds to a representation of the updated representative image of the media item (e.g., see FIG. 5CI). In some embodiments, the device produces a tactile output when the representative-image-selection affordance goes over a reduced scale representation of the current representative image of the media item. In some embodiments, the tactile output is generated when the representative-image-selection affordance is moved past the location of the current representative image at a speed below a threshold speed and the tactile output is not generated when the representative-image-selection affordance is moved past the location of the current representative image at a speed above the threshold speed. Providing haptic feedback in this manner enhances the operability of the device and makes the user-device interface more efficient (e.g., by alerting the user that the representative-image-selection affordance has returned to a position that corresponds to the representation of the updated representative image, thereby helping the user to achieve an intended outcome and reducing user mistakes when operating/interacting with the device).

In some embodiments, the electronic device has one or more tactile output generators, and while in the editing user interface and detecting an input directed to a respective range-trim affordance, the device generates (836) a tactile output when the respective range-trim affordance is moved to a location that corresponds to a representation of the representative image of the media item (e.g., FIG. 5CL). In some embodiments, the device produces a tactile output when the begin-trim affordance is over a reduced scale representation of the current representative image of the media item. Similarly, in some embodiments, the device produces a tactile output when the end-trim affordance is over the reduced scale representation of the current representative image of the media item. In some embodiments, the device generates the tactile output when it receives an input that corresponds to a request move the respective range-trim affordance to or beyond a location of the representation of the representative image of the media item. Providing haptic feedback in this manner enhances the operability of the device and makes the user-device interface more efficient (e.g., by alerting the user that a range-trim affordance has moved to a location that corresponds to a representation of the representative image of the media item, thereby helping the user to achieve an intended outcome and reducing user mistakes when operating/interacting with the device).

In some embodiments, the device detects (838) an input corresponding to a request to move the representative-image-selection affordance to a location beyond a range-trim affordance; and in response to detecting the input corresponding to the request to move the representative image selection affordance, moves the range-trim affordance (e.g., to a same location as the representative-image-selection affordance or adjacent to the representative-image-selection affordance) (e.g., see FIGS. 5CJ-5CK). Moving the representative-image-selection affordance in this manner allows for simultaneous changes to both the range of the media item and the representative image of the media item with a single input, which reduces the number of inputs needed to perform these operations and makes the editing user interface more efficient.

In some embodiments, the device detects (840) an input corresponding to a request to move the representative-image-selection affordance to a location beyond a range-trim affordance; and in response to detecting the input corresponding to the request to move the representative image selection affordance: in accordance with a determination that the range-trim affordance is not at an end of the sequence of images, moves the range-trim affordance (e.g., to a same location as the representative-image-selection affordance); and in accordance with a determination that the range-trim affordance is at an end of the sequence of images, forgoes moving the range-trim affordance (e.g., see FIGS. 5CJ-5CK). Moving the representative-image-selection affordance in this manner allows for simultaneous changes to both the range of the media item and the representative image of the media item with a single input, which reduces the number of inputs needed to perform these operations and makes the editing user interface more efficient.

In some embodiments, the device detects (842) an input that corresponds to a request to move the representative-image-selection affordance relative to a range-trim affordance; and, in response to detecting the input that corresponds to the request to move the representative-image-selection affordance relative to the range-trim affordance: in accordance with a determination that the input that corresponds to the request to move the representative-image-selection affordance relative to the range-trim affordance is a request to move the range-trim affordance to a location that is beyond the representative-image-selection affordance (e.g., a drag input that starts on the range-trim affordance and moves over the representative-image-selection affordance), the device moves the range-trim affordance adjacent to the representative-image-selection affordance and generates a tactile output (e.g., FIG. 5CI); and in accordance with a determination that the input that corresponds to the request to move the representative-image-selection affordance to relative to the range-trim affordance is a request to move the representative-image-selection affordance to a location that is beyond the range-trim affordance (e.g., a drag input that starts on the representative-image-selection affordance and moves over the range-trim affordance), the device moves the representative-image-selection affordance adjacent to the range-trim affordance without generating a tactile output (e.g., FIGS. 5CJ-5CK). Providing haptic feedback in this manner enhances the operability of the device and makes the user-device interface more efficient (e.g., by providing haptic feedback in some circumstances where it will assist a user, but not in other circumstances where it may provide too much feedback or it may confuse a user, thereby helping the user to achieve an intended outcome and reducing user mistakes when operating/interacting with the device).

In some embodiments, the device detects (844) an input that corresponds to a request to edit the sequence of images (e.g., changing a start point, an end point, or a representative image of the sequence of images in the media item); and, in response to detecting the input that corresponds to the request to edit the sequence of images: in accordance with a determination that the input that corresponds to the request to edit the sequence of images is a request to move the representative-image-selection affordance adjacent to or beyond a representation of the current representative image (e.g., a drag input that starts on the representative-image-selection affordance and moves adjacent to or past a reduce scale representation of the current representative image of the media item in the slider), moves the representative-image-selection affordance (e.g., adjacent to the range-trim affordance) and conditionally generates a tactile output based on whether or not a speed of movement of the input is above a respective speed threshold (e.g., if the drag input has a speed that is above the respective speed threshold when moving past or adjacent to the reduced scale representation of the current representative image, the device generates a corresponding tactile output, and if the drag input has a speed that is below the respective speed threshold when moving past or adjacent to the reduced scale representation of the current representative image, the device forgoes generating a corresponding tactile output, or vice versa) (e.g., FIGS. 5CM-5CN); and in accordance with a determination that the input that corresponds to the request to edit the sequence of images is a request to move a range-trim affordance to a location that is beyond the representation of the current representative image (e.g., a drag input that starts on the range-trim affordance and moves adjacent to or past a reduce scale representation of the current representative image of the media item in the slider such as the representative-image-selection affordance), moves the range-trim affordance (e.g., adjacent to the representative-image-selection affordance) and generates a tactile output without regard to the speed of movement of the input (e.g., the tactile output is generated independent of whether the drag input is above or below the movement speed threshold) (e.g., see FIG. 5CH). Providing haptic feedback in this manner enhances the operability of the device and makes the user-device interface more efficient (e.g., by providing haptic feedback in some circumstances where it will assist a user, but not in other circumstances where it may provide too much feedback or it may confuse a user, thereby helping the user to achieve an intended outcome and reducing user mistakes when operating/interacting with the device).

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 8A-8F. For example, the contacts, gestures, user interface objects, range-trim affordances, display modes, media items, representative-image-selection affordances, tactile outputs, and animations described above with reference to method 800 optionally have one or more of the characteristics of the contacts, gestures, user interface objects, range-trim affordances, display modes, media items, representative-image-selection affordances, tactile outputs, and animations described herein with reference to other methods described herein (e.g., methods 600, 700, 900, and 1000). For brevity, these details are not repeated here.

FIGS. 9A-9I are flow diagrams of a method for navigating through a collection of media items, where the media items have multiple user-selectable display modes, in accordance with some embodiments. Method 900 is performed at an electronic device (e.g., device 300, FIG. 3, or portable multifunction device 100, FIG. 1A) with a display, a touch-sensitive surface, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, method 900 provides an intuitive way to navigate through a collection of media items, where the media items have multiple user-selectable display modes. The method creates a more efficient human-machine interface for such navigation. For battery-operated electronic devices, enabling a user to navigate through such a collection of media items more efficiently conserves power and increases the time between battery charges.

The device displays (902), in a first user interface on the display, a representation of a first media item that corresponds to a sequence of images (e.g., images that were captured in response to a single activation of a shutter button, such as a tap on a virtual shutter button, a click of a physical shutter button or a long press input on a virtual or physical shutter button) in a first display mode (e.g., a lively-photo display mode) of a plurality of user-selectable display modes, wherein: the first media item is part of a collection of media items (e.g., in a media library, folder, album, or camera roll); the collection of media items is arranged in an order based on predetermined criteria (e.g., date/time of creation, date/time of last edit, name, size, etc. of media items in the collection); one or more prior media items precede the first media item in the order; and one or more subsequent media items follow the first media item in the order (e.g., see FIG. 5CN).

In some embodiments, the plurality of user-selectable display modes for a respective media item includes a lively-photo display mode. If the respective media item is in the lively-photo display mode, the electronic device displays a representative image of a sequence of images in the respective media item while a touch input is detected that causes the respective media item to be displayed on the display. In response to detecting an end of the touch input that causes the respective media item to be displayed on the display (e.g., detecting liftoff of a contact in the touch input), the device plays back images in the sequence of images in the respective media item, starting at the representative image, then crossfades to a beginning image in the sequence of images and plays through the sequence of images from the beginning image, and then redisplays the representative image. In some embodiments, the second sequence of images continue to play back from the respective image while the subsequent media item slides onto the display (after the end of the touch input is detected). Playing back a subsequent (or prior) media item in lively-photo display mode in this manner brings the subsequent (or prior) media item "to life" during navigation, which indicates to the user that the subsequent (or prior) media item is in lively-photo display mode. This helps a user to navigate and view media items in the collection in their selected display modes more efficiently.

In some embodiments, the plurality of user-selectable display modes for a respective media item includes (904) a back-and-forth display mode that is configured to display a sequence of images in the respective media item repeatedly playing forward and then backward (e.g., see FIG. 5CT). When the respective media item is in the back-and-forth display mode, the sequence of images in the respective media starts playing forward and then backward while a touch input is detected that causes the respective media item to be displayed on the display (e.g., a swipe/drag gesture that causes the respective media item to scroll onto the display); and the sequence of images in the respective media repeatedly plays forward and then backward after the touch input that causes the respective media item to be displayed on the display ends (e.g., after detecting lift off of a contact that was providing the swipe/drag gesture). In some embodiments, the touch input scrolls the respective media item onto the display and the respective media item starts playing forward and then backward when it has scrolled one quarter, one third, one half, or some other predefined amount onto the display. In some embodiments, the second sequence of images continue to play back-and-forth while the subsequent media item slides onto the display (either before or after the end of the touch input is detected). Playing back a subsequent (or prior) media item in back-and-forth display mode in this manner starts the subsequent (or prior) media item going back-and-forth during navigation, which indicates to the user that the subsequent (or prior) media item is in back-and-forth display mode. This helps a user to navigate and view media items in the collection in their selected display modes more efficiently.

In some embodiments, the plurality of user-selectable display modes for a respective media item includes (906) a merged image display mode that is configured to display a single merged image that includes concurrently displayed content from a plurality of images in a sequence of images in a respective media item (e.g., see FIG. 5CV). When the respective media item is in the merged image display mode, the electronic device displays the single merged image while a touch input is detected that causes the respective media item to be displayed on the display (e.g., a swipe/drag gesture that causes the respective media item to scroll onto the display). In response to detecting an end of the touch input that causes the respective media item to be displayed on the display (e.g., detecting liftoff of a contact in the swipe/drag gesture), the electronic device plays back a plurality of images in the sequence of images in the respective media item, (e.g., crossfading from the single merged image to a respective image in the sequence of images and then playing through the sequence of images from the respective image, where the respective image is one of: a beginning image in the sequence of images in the respective media item, a representative image in the sequence of images in the respective media item, or an end image in the sequence of images in the respective media item) and then redisplays the single merged image. In some embodiments, the second sequence of images continues to play back while the subsequent media item slides onto the display (after the end of the touch input is detected). In some embodiments, playing back images in the sequence of images includes starting playing back of images in the sequence of images at the beginning image in the sequence of images; then playing through all or part (e.g., one quarter, one half, or three quarters of) the sequence of images; and then redisplaying the merged image. Playing back a subsequent (or prior) media item in merged display mode in this manner during navigation indicates to the user that the subsequent (or prior) media item is in merged display mode. This helps a user to navigate and view media items in the collection in their selected display modes more efficiently.

In some embodiments, the collection of media items includes media items that contain just a single still image. For such a media item, just the single still image is displayed in response to detecting a touch input that causes the media item to be displayed on the display (e.g., a swipe gesture on a prior media item or a tap gesture on a reduced scale representation of the still image in the collection-navigation control).

In some embodiments, the plurality of user-selectable display modes for a respective media item includes a movie display mode. If the respective media item is in the movie display mode, the electronic device displays a representative image of a sequence of images in the respective media item while a touch input is detected that causes the respective media item to be displayed on the display. The media item does not play back in response to detecting an end of the touch input that causes the respective media item to be displayed on the display (e.g., detecting liftoff of a contact in the touch input). A tap gesture on the media item while in the movie display mode causes the media to be played back in the movie mode, with playback starting at the earliest image in the sequence of images in the media item. In some embodiments, a play affordance is displayed on or near the representation of the media item to indicate that at tap input will trigger playback of the media item In some embodiments, when navigating to one or more media items using inputs directed to the collection-navigation control, the one or more media item are not played back during the navigation.

While displaying the representation of the first media item (e.g., displaying a representative image from the sequence of images in the first media item), the device detects (908) a touch input that includes movement in a respective direction on the touch-sensitive surface (e.g., a swipe gesture by a contact) (e.g., see FIG. 5CO).

In response to detecting the touch input: in accordance with a determination that the movement is movement in a first direction (e.g., leftward) and that a subsequent media item that corresponds to a second sequence of images is designated as being displayed in the first display mode (e.g., a lively photo display mode), the device displays (910) the subsequent media item in the first display mode, including displaying content from a plurality of images in the second sequence of images in a manner determined based on the first display mode (e.g., see FIG. 5CP); and in accordance with a determination that the movement is movement in the first direction (e.g., leftward) and that the subsequent media item is designated as being displayed in a second display mode (e.g., a loop display mode) that is different from the first display mode, displays the subsequent media item in the second display mode, including displaying content from a plurality of images in the second sequence of images in a manner determined based on the second display mode (e.g., see FIG. 5CS).

In some embodiments, the first display mode is (912) a lively-photo display mode; and displaying the subsequent media item in the first display mode includes: displaying at least a portion of a respective image from the second sequence of images while detecting the touch input (e.g., see FIG. 5CP). In some embodiments, the respective image is a first image in the second sequence of images. In some embodiments, the respective image is a last image in the second sequence of images. In some embodiments, the respective image is an image that occurs before a representative image in the second sequence of images. In some embodiments, the respective image is an image that occurs after the representative image in the second sequence of images. In some embodiments, the respective image is the representative image. Displaying the subsequent media item in the first display mode also includes: detecting an end of the touch input; and, (e.g., detecting lift off of a contact that was providing the touch input); and in response to detecting the end of the touch input, playing back images in the second sequence of images starting at the respective image. In some embodiments, playing back images in the second sequence of images includes, starting playing back images in the second sequence of images at the beginning image in the second sequence of images and playing through the second sequence of images from the beginning image up to the representative image. In some embodiments, playing back images in the second sequence of images includes, starting playing back images in the second sequence of images at the respective image, then crossfading to a beginning image in the second sequence of images and playing through the second sequence of images from the beginning image, and then displaying a representative image.

In some embodiments, the second display mode is (914) a loop display mode; and displaying the subsequent media item in the second display mode includes: displaying the second sequence of images looping while detecting at least a portion of the touch input (e.g., the touch input scrolls a portion or all of the subsequent media item onto the display and the subsequent media item starts looping when it has scrolled one quarter, one third, one half, or some other predefined amount onto the display); and continuing to display the second sequence of images looping after detecting an end of the touch input (e.g., detecting lift off of a contact that was providing the touch input) (e.g., see FIG. 5CS).

In some embodiments, the plurality of user-selectable display modes for a respective media item includes (916) a loop display mode that is configured to (repeatedly) display a sequence of images in the respective media item in a loop (e.g., sequentially displaying the images from a start to an end of the sequence and then starting at the beginning of the sequence again); if the respective media item is in the loop display mode, the sequence of images in the respective media starts looping while a touch input is detected that causes the respective media item to be displayed on the display (e.g., a swipe/drag gesture that causes the respective media item to scroll onto the display); and the sequence of images in the respective media continues looping after the touch input that causes the respective media item to be displayed on the display ends (e.g., after detecting lift off of a contact that was providing the swipe/drag gesture) (e.g., see FIG. 5CS). In some embodiments, if the respective media item is in the loop display mode, the touch input scrolls the respective media item onto the display and the respective media item starts looping when it has scrolled one quarter, one third, one half, or some other predefined amount onto the display. In some embodiments, the second sequence of images continue to loop while the subsequent media item slides onto the display (either before or after the end of the touch input is detected) Playing back a subsequent (or prior) media item in loop display mode in this manner starts the subsequent (or prior) media item looping during navigation, which indicates to the user that the subsequent (or prior) media item is in loop display mode. This helps a user to navigate and view media items in the collection in their selected display modes more efficiently.

In some embodiments, in response to detecting the touch input: in accordance with a determination that the movement is movement in a second direction that is opposite to the first direction (e.g., rightward) and that a prior media item that corresponds to a third sequence of images is designated as being displayed in the first display mode (e.g., a lively-photo display mode), the device displays (916) the prior media item in the first display mode, including displaying content from a plurality of images in the third sequence of images in a manner determined based on the first display mode; and in accordance with a determination that the movement is movement in the second direction (e.g., rightward) and that the prior media item is designated as being displayed in the second display mode (e.g., a loop display mode) that is different from the first display mode, displays the prior media item in the second display mode, including displaying content from a plurality of images in the third sequence of images in a manner determined based on the second display mode (e.g., see FIG. 5CU).

In some embodiments, in response to detecting the touch input: in accordance with a determination that the movement is movement in the first direction (e.g., leftward) and that the subsequent media item is designated as being displayed in a third display mode (e.g., a back-and-forth display mode or a merged display mode) that is different from the first display mode and the second display mode, the device displays (918) the subsequent media item in the third display mode, including displaying content from a plurality of images in the second sequence of images in a manner determined based on the third display mode; and in accordance with a determination that the movement is movement in the second direction (e.g., rightward) and that the prior media item is designated as being displayed in the third display mode (e.g., a back-and-forth display mode or a merged display mode), displays the prior media item in the third display mode, including displaying content from a plurality of images in the third sequence of images in a manner determined based on the third display mode (e.g., see FIGS. 5CU and 5CW).

In some embodiments, in response to detecting the touch input: in accordance with a determination that the movement is movement in the first direction (e.g., leftward) and that the subsequent media item is designated as being displayed in a fourth display mode (e.g., a merged display mode or a back-and-forth display mode) that is different from the first display mode, the second display mode, and the third display mode, the device displays (520) the subsequent media item in the fourth display mode, including displaying content from a plurality of images in the second sequence of images in a manner determined based on the fourth display mode; and in accordance with a determination that the movement is movement in the second direction (e.g., rightward) and that the prior media item is designated as being displayed in the fourth display mode (e.g., a merged display mode or a back-and-forth display mode), displays the prior media item in the fourth display mode, including displaying content from a plurality of images in the third sequence of images in a manner determined based on the fourth display mode (e.g., see FIG. 5CV).

In some embodiments, in response to detecting the touch input, in accordance with a determination that the movement is movement in a third direction (e.g., upward), different from the first direction, the device displays (922) a user interface (e.g., a display-mode selection user interface) that includes: additional information about the first media item, and one or more display-mode-selection affordances that are configured to select a different display mode for the first media item (e.g., a plurality of activateable reduced-scale representations of the first media item, where a given display-mode-selection affordance illustrates a corresponding user-selectable display mode for the first media item). In some embodiments, the user interface is a display-mode selection user interface that is configured to let a user select one of a plurality of user-selectable display modes for a media item that corresponds to a sequence of images (e.g., a lively-photo display mode, a loop display mode, a long-exposure display mode, a back-and-forth display mode, a movie display mode, a strobe-effect display mode, or another display mode for displaying the sequence of images that is selected by a user) (e.g., FIGS. 5BG-5BH). In some embodiments, while the first media item is in the first display mode, selecting a display-mode-selection affordance that corresponds to the second display mode switches the display mode of the first media item from the first display mode to the second display mode. Examples of display-mode-selection affordances are described in greater detail with reference to method 700. Displaying display-mode-selection affordances in this manner provides an intuitive way to navigate to and select a display mode for a media item that has multiple display modes. Displaying additional information for the media item in a display-mode selection user interface provides context for the media item and provides quick navigation paths to additional information related to the media item. This enhances the operability of the device and makes the user-device interface more efficient (e.g., by providing quick access to additional information related to the media item).

In some embodiments, in response to detecting the touch input, in accordance with a determination that the movement is movement in a fourth direction (e.g., downward), different from the first direction, the device displays (924) a user interface that concurrently displays representations of a plurality of media items in the collection, including representations of the first media item, one or more of the prior media items, and/or one or more of the subsequent media items (e.g., displaying still thumbnails of representative images for a plurality of media items in the collection) (e.g., a collection of media items are shown in FIG. 5B). Switching to this different view of the collection of media items (e.g., an array of thumbnail images of the media items), where the thumbnails are static images from the media items (e.g., representative images and/or merged images) in response to a touch input in a fourth direction (e.g., downward) helps to navigate to other media items in the collection more quickly.

In some embodiments, the representation of the first media item is displayed at a first magnification in the first user interface, and the device concurrently displays (926) with the representation of the first media item, in the first user interface, a collection-navigation control (e.g., media item collection area 510 in FIG. 5DA) that is configured to navigate through the collection of media items (e.g., switching which representation of a media item is displayed in a preview area based on a tap or swipe input on the control), wherein: the collection-navigation control includes smaller representations of media items in the collection (e.g., a slider, strip or other area that includes reduced scale representations of a plurality of media items that are displayed at a second magnification that is less than the first magnification); the collection-navigation control includes a first smaller representation of the first media item (e.g., a representation of the first media item displayed at the second magnification) (e.g., a single, representative image from the first media item). The device detects an input corresponding to the first media item (e.g., an input such as a tap, long press, or deep press, on the representation of the first media item displayed at the first magnification, or an input such as a tap, long press, or deep press, on the smaller representation of the first media item displayed in the collection-navigation control) and, in response to detecting the input corresponding to the first media item (e.g., a tap on the first smaller representation of the first media item displayed in the collection-navigation control), displays an expanded representation of the first media item in the collection-navigation control (e.g., displaying, in the collection-navigation control, the representative image and additional images from the sequence of images in the first media item) (e.g., expanded representation 551 in FIG. 5DB). In some embodiments, an input on the representation of the first media item displayed at the first magnification (e.g., a tap or deep press) also plays back the first media item in the currently selected display mode for the first media item (e.g., a lively-photo display mode). Displaying an expanded representation of the first media item in the collection-navigation control in this manner provides visual feedback to the user that first media item can be played back via the collection-navigation control. This visual feedback enhances the operability of the device and makes the user-device interface more efficient.

In some embodiments, in response to detecting the input corresponding to the first media item, the device displays (928) a scrubbing indicator in the expanded representation of the first media item in the collection-navigation control (e.g., a playhead, scrubber bar, playback position indicator, or other scrubbing indicator, such as scrubber 544 in FIG. 5DB). In some embodiments, the scrubbing indicator is displayed at a location corresponding to a representative image in the sequence of images. The device detects an input directed to a portion of the collection-navigation control (e.g., detecting a drag gesture by a contact that starts on the scrubbing indicator that has a component of motion along the expanded representation of the first media item, or detecting a drag gesture that starts on the collection-navigation control); and, while detecting the input directed to the portion of the collection-navigation control (e.g., an input directed to the scrubbing indicator or an input directed to the collection-navigation control): the device changes a relative position of expanded representation of the first media item in the collection-navigation control and the scrubbing indicator in accordance with the input directed to the portion of the collection-navigation control (e.g., moving the playback-scrubbing indicator in the expanded representation of the first media item in accordance with a component of motion of a contact in the input along the expanded representation of the first media item, or moving the expanded representation of the first media item while maintaining the playback-scrubbing indicator at a fixed location on the display); and the device displays, at the first magnification, an image in the sequence of images for the first media item that corresponds to a current location of the scrubbing indicator in the expanded representation of the first media item in the collection-navigation control (e.g., see FIGS. 5DB-5DE). In some embodiments, as the relative position of the expanded representation of the first media item in the collection-navigation control and the scrubbing indicator changes, the image of the sequence of images changes to correspond to the position of the scrubbing indicator within the expanded representation of the first media item in the collection navigation control. In some embodiments, when the expanded representation of the sequence of images would move beyond a location that was occupied by the scrubbing indicator, the scrubbing indicator is dragged along instead and the expanded representation of the sequence of images springs back when the input ends. Interacting with an expanded representation of the first media item in the collection-navigation control in this manner provides a user with precise control of viewing of the images in the first media item. This precise control enhances the operability of the device and makes the user-device interface more efficient.

In some embodiments, while detecting the input directed to the portion of the collection-navigation control (e.g., the scrubbing indicator, or the expanded representation of the first media item): in accordance with a determination that the scrubbing indicator is within a predetermined distance (greater than zero) to a position that corresponds to a representation of a representative image of the sequence of images of the first media item, the device snaps (930) (e.g., the scrubbing indicator or the collection-navigation control) to the position that corresponds to the representation of the representative image of the sequence of images of the first media item (e.g., see FIG. 5DE). This snapping helps the user to return to the representative image during scrubbing of the media item. This enhances the operability of the device and makes the user-device interface more efficient (e.g., by providing feedback that helps the user to determine which inputs will produce the result intended by the user and reducing user mistakes when operating/interacting with the device).

In some embodiments, the electronic device has (932) one or more tactile output generators, and the device, while detecting the input directed to the portion of the collection-navigation control (e.g., the scrubbing indicator, or the expanded representation of the first media item): in accordance with a determination that the scrubbing indicator is within a predetermined distance (greater than zero) to a position that corresponds to a representation of a representative image of the sequence of images of the first media item: snaps (e.g., the scrubbing indicator or the collection-navigation control) to the position that corresponds to the representation of the representative image of the sequence of images of the first media item, and generates a tactile output when the scrubbing indicator snaps to the position (e.g., see FIG. 5DE). Providing haptic feedback during snapping enhances the operability of the device and makes the user-device interface more efficient (e.g., by alerting the user that the scrubbing indicator or the collection-navigation control has snapped to a position that corresponds to the representation of the representative image, thereby helping the user to achieve an intended outcome and reducing user mistakes when operating/interacting with the device).

In some embodiments, the electronic device has (934) one or more tactile output generators, the input directed to the portion of the collection-navigation control includes movement that brings the scrubbing indicator within a predefined distance (greater than zero) of the portion of the expanded representation of the first media item that corresponds to a representative image of the sequence of images of the first media item, and the device, while detecting the input directed to the portion of the collection-navigation control (e.g., the scrubbing indicator, or the expanded representation of the first media item): in accordance with a determination that the movement meets snapping criteria, wherein the snapping criteria includes a requirement that relative movement between the expanded representation of the first media item and the scrubbing indicator is less than a predefined speed when the scrubbing indicator is within the predefined distance (greater than zero) of the portion of the expanded representation of the first media item that corresponds to the representative image of the sequence of images of the first media item, in order for the snapping criteria to be met, updates the collection-navigation control so that the scrubbing indicator is at the portion of the expanded representation of the first media item that corresponds to the representation of the representative image of the sequence of images of the first media item (e.g., snapping the scrubbing indicator to the portion of the expanded representation of the first media item that corresponds to a representative image of the sequence of images of the first media item or snapping the expanded representation of the first media item that corresponds to a representative image of the sequence of images of the first media item to the scrubbing indicator to the portion), and generates a corresponding tactile output; and (e.g., if the drag input has a speed that is below the respective speed threshold when moving towards the reduced scale representation of the current representative image of the first media item, the device generates a corresponding tactile output, and if the drag input has a speed that is above the respective speed threshold when moving towards the reduced scale representation of the current representative image of the first media item, the device forgoes generating a corresponding tactile output, or vice versa) in accordance with a determination that the movement does not meet the snapping criteria, updates the collection-navigation control so that the scrubbing indicator is at a position relative to the expanded representation of the first media item selected based on the movement without generating a corresponding tactile output (e.g., moving the expanded representation of the first media item without snapping to the scrubbing indicator, or moving the scrubbing indicator without snapping to the expanded representation of the first media item). Providing haptic feedback in this manner enhances the operability of the device and makes the user-device interface more efficient (e.g., by providing haptic feedback in some circumstances where it will assist a user, but not in other circumstances where it may provide too much feedback or it may confuse a user, thereby helping the user to achieve an intended outcome and reducing user mistakes when operating/interacting with the device)

In some embodiments, while displaying the scrubbing indicator in the expanded representation of the first media item in the collection-navigation control, the device detects (936) an input to navigate to another media item in the collection (e.g., detecting a swipe gesture on the representation of the first media item at the first magnification (e.g., see FIG. 5DF) or detecting a tap gesture on another media item in the collection-navigation control, or detecting a swipe gesture on the collection-navigation control); and, in response to detecting the input to navigate to another media item in the collection, ceases to display the expanded representation of the first media item in the collection-navigation control (and displaying the prior (original) representation of the first media item in the collection-navigation control (such as a single, representative image from the first media item)) (e.g., see FIGS. 5DF-5DG). Ceasing to display the expanded representation of the first media item in the collection-navigation control provides visual feedback to the user that the device has navigated to another media item. This visual feedback enhances the operability of the device and makes the user-device interface more efficient (e.g., by providing navigation context to the user).

In some embodiments, while displaying the scrubbing indicator in the expanded representation of the first media item in the collection-navigation control: in accordance with a determination that scrubbing indicator is located away from a position that corresponds to a representation of a representative image of the sequence of images of the first media item, the device displays (938) an indicator (e.g., a dot, such as dot 542 in FIG. 5DD) of the representative image of the sequence of images of the first media item; and, in accordance with a determination that the scrubbing indicator is located at the position that corresponds to the representation of the representative image of the sequence of images of the first media item, forgoes display of the indicator of the representative image of the sequence of images of the first media item. In some embodiments, the collection-navigation control displays a dot or other indicator next to the current representative image of the first media item, and the dot disappears when the scrubbing indicator is located at the current representative image of the first media item. Displaying an indicator of the representative image of the media item in this manner provides improved visual feedback to a user and helps the user to return to the representative image during scrubbing of the media item. This enhances the operability of the device and makes the user-device interface more efficient (e.g., by providing feedback that helps the user to determine which inputs will produce the result intended by the user and reducing user mistakes when operating/interacting with the device).

In some embodiments, while displaying the representation of the first media item in the first display mode, the first user interface concurrently displays (940): a first (predefined) area that is configured to sequentially display images in the sequence of images in the first media item at a first magnification (e.g., see FIG. 5DH). In some embodiments, the first area displays images in the sequence of images one at a time, with a respective image filling the first area when the respective image is displayed. The first user interface concurrently displays: a second (predefined) area, distinct from the first area, that includes representations of media items in the collection of media items at a second magnification that is less than the first magnification, (e.g., in a slider that includes reduced scale representations of a plurality of media items) and the device: concurrently displays a representative image from the sequence of images of the first media item in the first area and a representation of the representative image from the sequence of images of the first media item in the second area; while concurrently displaying the representative image from the sequence of images of the first media item in the first area and the representation of the representative image from the sequence of images of the first media item in the second area, detects an input (e.g., detecting a press gesture by a contact 580-26 on the representative image from the sequence of images in the first area in FIG. 5DH); and in response to detecting the input: plays back the sequence of images of the first media item in the first display mode in the first area, and displays, in the second area, the representation of the representative image of the first media item, representations of additional images in the sequence of images of the first media item, and a scrubbing indicator that shows a current playback position in the sequence of images being shown in the first area. In some embodiments, during playback of the sequence of images in the first area, a portion of the second area (which displays just the representation of the representative image of the sequence of images in the first media item prior to playback) expands (e.g., horizontally) to concurrently display representations of additional images in the sequence of images in the first media item, as well as a scrubbing indicator that shows a current position in the sequence of images being shown in the first area, as shown in FIGS. 5DH-5DJ. Displaying an expanded representation of the first media item in the collection-navigation control in this manner provides visual feedback to the user about a current position in the sequence of images being shown in the first area. This visual feedback enhances the operability of the device and makes the user-device interface more efficient by providing navigation context to the user.

In some embodiments, the scrubbing indicator is (942) initially displayed at a location of the representation of the representative image of the first media item in the second area (e.g., see FIG. 5DI). Displaying the scrubbing indicator initially at the location of the representation of the representative image provides visual feedback to the user about a current position in the sequence of images being shown in the first area. This visual feedback enhances the operability of the device and makes the user-device interface more efficient by providing navigation context to the user.

It should be understood that the particular order in which the operations in FIGS. 9A-9I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9I. For example, the contacts, gestures, user interface objects, range-trim affordances, display modes, media items, representative-image-selection affordances, tactile outputs, and animations described above with reference to method 900 optionally have one or more of the characteristics of the contacts, gestures, user interface objects, range-trim affordances, display modes, media items, representative-image-selection affordances, tactile outputs, and animations described herein with reference to other methods described herein (e.g., methods 600, 700, 800, and 1000). For brevity, these details are not repeated here.

FIGS. 10A-10C are flow diagrams of a method for showing the correspondence between a dynamic representation of a media item and a static representation of the media item, where the media item has a plurality of user-selectable display modes, in accordance with some embodiments. Method 1000 is performed at an electronic device (e.g., device 300, FIG. 3, or portable multifunction device 100, FIG. 1A) with a display, a touch-sensitive surface, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, method 1000 provides an intuitive way to show the correspondence between a dynamic representation of a media item (e.g., dynamic playback of the sequence of images in a media item) and a static representation of the media item (e.g., a representative image or merged image from the sequence of images in the media item), where the media item has a plurality of user-selectable display modes. The method creates a more efficient human-machine interface for navigating and viewing media items in a collection in their selected display modes. For battery-operated electronic devices, enabling a user to navigate and view media items in their selected display modes more efficiently conserves power and increases the time between battery charges.

The device displays (1002), in a first user interface on the display, a first representation of a first media item that corresponds to a sequence of images (e.g., images that were captured in response to a single activation of a shutter button, such as a tap on a virtual shutter button, a click of a physical shutter button or a long press input on a virtual or physical shutter button) in a respective display mode (e.g., a lively-photo display mode) of a plurality of user-selectable display modes (e.g., see FIG. 5DK). In some embodiments, the first representation is a representation of the media item that is displayed when the user is viewing the first media item but not interacting with the first media item (e.g., not performing a press input or a swipe input or using an editing user interface to edit the first media item).

While displaying, on the display, the first representation of the first media item in the respective display mode, the device detects (1004) a touch input on the touch-sensitive surface at a location that corresponds to the representation of the first media item (e.g., see FIG. 5DL).

In response to detecting the touch input, and while the touch input continues to be detected on the touch-sensitive surface at a location that corresponds to the representation of the first media item: in accordance with a determination that the touch input meets representation-change criteria that are based on a magnitude of a respective property of the touch and that the respective display mode of the first media item is in a display mode in which the first representation of the first media item is a dynamic representation of the first media item (e.g., looping or back-and-forth) changes over time (e.g., automatically, without user input), the device replaces (1006) display of the first representation of the media item with a static representation of the first media item that does not change over time (e.g., a representative image of the sequence of images); and in accordance with a determination that the touch input does not meet representation-change criteria, maintains display of the first representation of the first media item as a dynamic representation (e.g., see FIG. 5DM).

In some embodiments, the respective property of the touch is (1008) intensity of the touch, and the representation-change criteria include a requirement that a characteristic intensity of the touch increase above a respective threshold in order for the representation-change criteria to be met (e.g., see FIG. 5DM). Using intensity of a touch input to switch from display of a dynamic representation of the media item to display of a static representation of the media item provides additional control options for display of the media item without requiring additional displayed controls, which enhances the operability of the device and makes the user-device interface more efficient.

In some embodiments, the respective property of the touch is (1010) a duration of the touch, and the representation-change criteria include a requirement that the touch move no more than a predetermined amount for a predetermined amount of time in order for the representation-change criteria to be met. Using duration of a touch input to switch from display of a dynamic representation of the media item to display of a static representation of the media item provides additional control options for display of the media item without requiring additional displayed controls, which enhances the operability of the device and makes the user-device interface more efficient.

In some embodiments, in response to detecting the touch input, in accordance with a determination that the touch input meets the representation-change criteria and that the respective display mode of the first media item is in a second display mode in which the first representation of the first media item is a static representation of the first media item that does not change over time (e.g., a representative image for a lively photo or a merged image for a long exposure), the device replaces (1012) display of the first representation of the media item with a dynamic representation of the first media item (e.g., play through the sequence of media items starting from a beginning of the sequence of images or starting from a representative image of the sequence of images) that changes over time (e.g., automatically, without user input) (e.g., see FIGS. 5DP-5DQ).

In some embodiments, the first representation of the first media item is (1014) a dynamic representation of the first media item; the dynamic representation of the first media item includes playing through the sequence of images from a beginning of the sequence of images to an end of the sequence of images and then starting back at the beginning of the sequence of images; and (e.g., starting with the representative image or starting with a beginning image in the sequence of images) the static representation of the first media item is a representative image from the sequence of images (e.g., see FIGS. 5DK-5DM). Showing the correspondence between a looping media item and a representative image of the same media item helps a user to navigate and view media items in a collection in their selected display modes more efficiently, thereby enhancing the operability of the device and making the user-device interface more efficient.

In some embodiments, the first representation of the first media item is (1016) a dynamic representation of the first media item; the dynamic representation of the first media item includes playing through the sequence of images from a beginning of the sequence of images to an end of the sequence of images and then playing through the sequence of images from the end of the sequence of images to the beginning of the sequence of images; and (e.g., starting with the representative image or starting with a beginning image in the sequence of images) the static representation of the first media item is a representative image from the sequence of images (e.g., see FIGS. 5DT-5DU). Showing the correspondence between a media item playing back-and-forth and a representative image of the same media item helps a user to navigate and view media items in a collection in their selected display modes more efficiently, thereby enhancing the operability of the device and making the user-device interface more efficient.

In some embodiments, the first representation of the first media item is (1018) a static representation of the first media item; the static representation of the first media item is a representative image from the sequence of images; and the dynamic representation of the first media item includes playing through the sequence of images (e.g., starting with the representative image or starting with a beginning image in the sequence of images) (e.g., see FIGS. 5DV-5DW). Showing the correspondence between a static representative image of a media item and dynamic playback of the same media item helps a user to navigate and view media items in a collection in their selected display modes more efficiently, thereby enhancing the operability of the device and making the user-device interface more efficient.

In some embodiments, the first representation of the first media item is (1020) a static representation of the first media item; the static representation of the first media item is an image that includes concurrently displayed content from two or more images in the sequence of images; and the dynamic representation of the first media item includes playing through the sequence of images (e.g., starting with the representative image or starting with a beginning image in the sequence of images) (e.g., FIGS. 5DP-5DQ). Showing the correspondence between a static merged image of a media item and dynamic playback of the sequence of images same media item helps a user to navigate and view media items in a collection in their selected display modes more efficiently, thereby enhancing the operability of the device and making the user-device interface more efficient.

In some embodiments, the representative image for a sequence of images of a media item can be set via an editing user interface as described above with reference to methods 600 and 800. In some embodiments, the beginning and/or ending image for a sequence of images of a media item can be set via an editing user interface as described above with reference to methods 600 and 800.

In some embodiments, when the touch input met representation-change criteria and display of a static representation of the media item was replaced with display of a dynamic representation of the first media item: while displaying the dynamic representation of the first media item on the display, the device detects (1022) an end of the touch input (e.g., liftoff of the touch from the touch-sensitive surface); and in response to detecting the end of the touch input, replacing display of the dynamic representation of the media item with display of the static representation of the first media item (e.g., the transition from static representation to dynamic representation is maintained as long as the touch input remains on the display) (e.g., see FIGS. 5DQ and 5DR). Switching from display of a dynamic representation of the media item back to display of a static representation of the media item upon detecting an end of the touch input enables one touch input to switch what is displayed in both directions, from dynamic to static and from static back to dynamic, thereby enhancing the operability of the device and makes the user-device interface more efficient.

In some embodiments, when the touch input met representation-change criteria and display of a static representation of the media item was replaced with display of a dynamic representation of the first media item: while displaying the dynamic representation of the first media item on the display, the device detects (1024) a reduction in intensity of the touch input; and in response to detecting the reduction in intensity of the touch input: in accordance with a determination that the reduction in intensity of the input is below a respective intensity threshold, replacing display of the dynamic representation of the media item with display of the static representation of the first media item; and (e.g., the transition from static representation to dynamic representation is maintained as long as the touch input remains on the display) in accordance with a determination that the reduction in intensity of the input is not below the respective intensity threshold, maintains display of the dynamic representation of the media item (e.g., see FIGS. 5DQ and 5DS). Switching from display of a dynamic representation of the media item back to display of a static representation of the media item upon detecting a decrease in intensity of the touch input enables one touch input to switch what is displayed in both directions, from dynamic to static and from static back to dynamic, thereby enhancing the operability of the device and makes the user-device interface more efficient.

In some embodiments, when the touch input met representation-change criteria and display of a dynamic representation of the media item was replaced with display of a static representation of the first media item: while displaying the static representation of the first media item, the device detects (1026) an end of the touch input (e.g., liftoff of the touch from the touch-sensitive surface); and in response to detecting the end of the touch input, replaces display of the static representation of the media item with display of the dynamic representation of the first media item (e.g., the transition from dynamic representation to static representation is maintained as long as the touch input remains on the display) (e.g., see FIGS. 5DM-5DN). Switching from display of a static representation of the media item back to display of a dynamic representation of the media item upon detecting an end of the touch input enables one touch input to switch what is displayed in both directions, from static to dynamic and from dynamic back to static, thereby enhancing the operability of the device and makes the user-device interface more efficient.

In some embodiments, when the touch input met representation-change criteria and display of a dynamic representation of the media item was replaced with display of a static representation of the first media item: while displaying the dynamic representation of the first media item, the device detects (1028) a reduction in intensity of the touch input; and in response to detecting the reduction in intensity of the touch input: in accordance with a determination that the reduction in intensity of the input is below a respective intensity threshold, replaces display of the static representation of the media item with display of the dynamic representation of the first media item; and (e.g., the transition from static representation to dynamic representation is maintained as long as the touch input remains on the display) in accordance with a determination that the reduction in intensity of the input is not below the respective intensity threshold, maintains display of the static representation of the media item (e.g., see FIGS. 5DM and 5DO). Switching from display of a static representation of the media item back to display of a dynamic representation of the media item upon detecting a decrease in intensity of the touch input enables one touch input to switch what is displayed in both directions, from static to dynamic and from dynamic back to static, thereby enhancing the operability of the device and makes the user-device interface more efficient.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10C. For example, the contacts, gestures, user interface objects, range-trim affordances, display modes, media items, representative-image-selection affordances, tactile outputs, and animations described above with reference to method 1000 optionally have one or more of the characteristics of the contacts, gestures, user interface objects, range-trim affordances, display modes, media items, representative-image-selection affordances, tactile outputs, and animations described herein with reference to other methods described herein (e.g., methods 600, 700, 800, and 900). For brevity, these details are not repeated here.

The operations described above with reference to FIGS. 6A-6F, 7A-7D, 8A-8F, and 9A-9I are, optionally, implemented by components depicted in FIGS. 1A-1B. For example, operations are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a display and a touch-sensitive surface:

displaying, in a first user interface on the display, a representation of a first media item that corresponds to a sequence of images in a first display mode of a plurality of user-selectable display modes, wherein:

the first media item is part of a collection of media items;

the collection of media items is arranged in an order based on predetermined criteria;

one or more prior media items precede the first media item in the order; and one or more subsequent media items follow the first media item in the order;

while displaying the representation of the first media item, detecting a touch input that includes movement in a respective direction on the touch-sensitive surface;

in response to detecting the touch input:

in accordance with a determination that the movement is movement in a first direction and that a subsequent media item that corresponds to a second sequence of images is designated as being displayed in the first display mode, displaying the subsequent media item in the first display mode, including displaying content from a plurality of images in the second sequence of images in a manner determined based on the first display mode; and in accordance with a determination that the movement is movement in the first direction and that the subsequent media item is designated as being displayed in a second display mode, of the plurality of user-selectable display modes, that is different from the first display mode, displaying the subsequent media item in the second display mode, including displaying content from a plurality of images in the second sequence of images in a manner determined based on the second display mode.

2. The method of claim 1, including in response to detecting the touch input:

in accordance with a determination that the movement is movement in a second direction that is opposite to the first direction and that a prior media item that corresponds to a third sequence of images is designated as being displayed in the first display mode, displaying the prior media item in the first display mode, including displaying content from a plurality of images in the third sequence of images in a manner determined based on the first display mode; and in accordance with a determination that the movement is movement in the second direction and that the prior media item is designated as being displayed in the second display mode that is different from the first display mode, displaying the prior media item in the second display mode, including displaying content from a plurality of images in the third sequence of images in a manner determined based on the second display mode.

3. The method of claim 2, including in response to detecting the touch input:

in accordance with a determination that the movement is movement in the first direction and that the subsequent media item is designated as being displayed in a third display mode, of the plurality of user-selectable display modes, that is different from the first display mode and the second display mode, displaying the subsequent media item in the third display mode, including displaying content from a plurality of images in the second sequence of images in a manner determined based on the third display mode; and in accordance with a determination that the movement is movement in the second direction and that the prior media item is designated as being displayed in the third display mode, displaying the prior media item in the third display mode, including displaying content from a plurality of images in the third sequence of images in a manner determined based on the third display mode.

4. The method of claim 3, including in response to detecting the touch input:

in accordance with a determination that the movement is movement in the first direction and that the subsequent media item is designated as being displayed in a fourth display mode, of the plurality of user-selectable display modes, that is different from the first display mode, the second display mode, and the third display mode, displaying the subsequent media item in the fourth display mode, including displaying content from a plurality of images in the second sequence of images in a manner determined based on the fourth display mode; and in accordance with a determination that the movement is movement in the second direction and that the prior media item is designated as being displayed in the fourth display mode, displaying the prior media item in the fourth display mode, including displaying content from a plurality of images in the third sequence of images in a manner determined based on the fourth display mode.

5. The method of claim 1, including in response to detecting the touch input, in accordance with a determination that the movement is movement in a third direction, different from the first direction, displaying a user interface that includes:

additional information about the first media item, and one or more display-mode-selection affordances that are configured to select a different display mode for the first media item.

6. The method of claim 1, including in response to detecting the touch input, in accordance with a determination that the movement is movement in a fourth direction, different from the first direction, displaying a user interface that concurrently displays representations of a plurality of media items in the collection, including representations of the first media item, one or more of the prior media items, and/or one or more of the subsequent media items.

7. The method of claim 1, wherein:

the first display mode is a live-photo display mode; and displaying the subsequent media item in the first display mode includes:

displaying at least a portion of a respective image from the second sequence of images while detecting the touch input;

detecting an end of the touch input; and, in response to detecting the end of the touch input, playing back images in the second sequence of images starting at the respective image.

8. The method of claim 1, wherein:

the second display mode is a loop display mode; and displaying the subsequent media item in the second display mode includes:

displaying the second sequence of images looping while detecting at least a portion of the touch input; and continuing to display the second sequence of images looping after detecting an end of the touch input.

9. The method of claim 1, wherein:

the plurality of user-selectable display modes for a respective media item includes a back-and-forth display mode that is configured to display a sequence of images in the respective media item repeatedly playing forward and then backward; and when the respective media item is in the back-and-forth display mode, the sequence of images in the respective media item starts playing forward and then backward while a touch input is detected that causes the respective media item to be displayed on the display; and the sequence of images in the respective media item repeatedly plays forward and then backward after the touch input that causes the respective media item to be displayed on the display ends.

10. The method of claim 1, wherein:

the plurality of user-selectable display modes for a respective media item includes a merged image display mode that is configured to display a single merged image that includes concurrently displayed content from a plurality of images in a sequence of images in a respective media item; and when the respective media item is in the merged image display mode, the electronic device displays the single merged image while a touch input is detected that causes the respective media item to be displayed on the display; and, in response to detecting an end of the touch input that causes the respective media item to be displayed on the display, the electronic device plays back a plurality of images in the sequence of images in the respective media item, and then redisplays the single merged image.

11. The method of claim 1, wherein the representation of the first media item is displayed at a first magnification in the first user interface, and the method includes:

concurrently displaying with the representation of the first media item, in the first user interface, a collection-navigation control that is configured to navigate through the collection of media items, wherein:

the collection-navigation control includes smaller representations of media items in the collection;

the collection-navigation control includes a first smaller representation of the first media item;

detecting an input corresponding to the first media item; and, in response to detecting the input corresponding to the first media item, displaying an expanded representation of the first media item in the collection-navigation control.

12. The method of claim 11, including:

in response to detecting the input corresponding to the first media item, displaying a scrubbing indicator in the expanded representation of the first media item in the collection-navigation control;

detecting an input directed to a portion of the collection-navigation control; and, while detecting the input directed to the portion of the collection-navigation control:

changing a relative position of the expanded representation of the first media item in the collection-navigation control and the scrubbing indicator in accordance with the input directed to the portion of the collection-navigation control; and displaying, at the first magnification, an image in the sequence of images for the first media item that corresponds to a current location of the scrubbing indicator in the expanded representation of the first media item in the collection-navigation control.

13. The method of claim 12, including:

while displaying the scrubbing indicator in the expanded representation of the first media item in the collection-navigation control, detecting an input to navigate to another media item in the collection; and in response to detecting the input to navigate to another media item in the collection, ceasing to display the expanded representation of the first media item in the collection-navigation control.

14. The method of claim 12, including:

while displaying the scrubbing indicator in the expanded representation of the first media item in the collection-navigation control:

in accordance with a determination that the scrubbing indicator is located away from a position that corresponds to a representation of a representative image of the sequence of images of the first media item, displaying an indicator of the representative image of the sequence of images of the first media item; and in accordance with a determination that the scrubbing indicator is located at the position that corresponds to the representation of the representative image of the sequence of images of the first media item, forgoing display of the indicator of the representative image of the sequence of images of the first media item.

15. The method of claim 12, including:

while detecting the input directed to the portion of the collection-navigation control:

in accordance with a determination that the scrubbing indicator is within a predetermined distance to a position that corresponds to a representation of a representative image of the sequence of images of the first media item, snapping to the position that corresponds to the representation of the representative image of the sequence of images of the first media item.

16. The method of claim 12, wherein the electronic device has one or more tactile output generators, and the method includes:

while detecting the input directed to the portion of the collection-navigation control:

in accordance with a determination that the scrubbing indicator is within a predetermined distance to a position that corresponds to a representation of a representative image of the sequence of images of the first media item:

snapping to the position that corresponds to the representation of the representative image of the sequence of images of the first media item, and generating a tactile output when the scrubbing indicator snaps to the position.

17. The method of claim 12, wherein the electronic device has one or more tactile output generators, the input directed to the portion of the collection-navigation control includes movement that brings the scrubbing indicator within a predefined distance of the portion of the expanded representation of the first media item that corresponds to a representative image of the sequence of images of the first media item, and the method includes:

while detecting the input directed to the portion of the collection-navigation control:

in accordance with a determination that the movement meets snapping criteria, wherein the snapping criteria includes a requirement that relative movement between the expanded representation of the first media item and the scrubbing indicator is less than a predefined speed when the scrubbing indicator is within the predefined distance of the portion of the expanded representation of the first media item that corresponds to the representative image of the sequence of images of the first media item, in order for the snapping criteria to be met, updating the collection-navigation control so that the scrubbing indicator is at the portion of the expanded representation of the first media item that corresponds to the representation of the representative image of the sequence of images of the first media item, and generating a corresponding tactile output; and in accordance with a determination that the movement does not meet the snapping criteria, updating the collection-navigation control so that the scrubbing indicator is at a position relative to the expanded representation of the first media item selected based on the movement without generating a corresponding tactile output.

18. The method of claim 1, wherein while displaying the representation of the first media item in the first display mode, the first user interface concurrently displays:

a first area that is configured to sequentially display images in the sequence of images in the first media item at a first magnification; and a second area, distinct from the first area, that includes representations of media items in the collection of media items at a second magnification that is less than the first magnification; and the method includes:

concurrently displaying a representative image from the sequence of images of the first media item in the first area and a representation of the representative image from the sequence of images of the first media item in the second area;

while concurrently displaying the representative image from the sequence of images of the first media item in the first area and the representation of the representative image from the sequence of images of the first media item in the second area, detecting an input; and in response to detecting the input:

playing back the sequence of images of the first media item in the first display mode in the first area; and displaying, in the second area:

the representation of the representative image of the first media item;

representations of additional images in the sequence of images of the first media item; and a scrubbing indicator that shows a current playback position in the sequence of images being shown in the first area.

19. The method of claim 18, wherein the scrubbing indicator is initially displayed at a location of the representation of the representative image of the first media item in the second area.

20. An electronic device, comprising:

one or more processors;

a touch-sensitive surface;

memory; and one or more programs, wherein the one or more programs are stored in the memory and configured to be executed by the one or more processors, the one or more programs including instructions for:

displaying, in a first user interface on the display, a representation of a first media item that corresponds to a sequence of images in a first display mode of a plurality of user-selectable display modes, wherein:

the first media item is part of a collection of media items;

the collection of media items is arranged in an order based on predetermined criteria;

one or more prior media items precede the first media item in the order; and one or more subsequent media items follow the first media item in the order;

while displaying the representation of the first media item, detecting a touch input that includes movement in a respective direction on the touch-sensitive surface;

in response to detecting the touch input:

in accordance with a determination that the movement is movement in a first direction and that a subsequent media item that corresponds to a second sequence of images is designated as being displayed in the first display mode, displaying the subsequent media item in the first display mode, including displaying content from a plurality of images in the second sequence of images in a manner determined based on the first display mode; and in accordance with a determination that the movement is movement in the first direction and that the subsequent media item is designated as being displayed in a second display mode, of the plurality of user-selectable display modes, that is different from the first display mode, displaying the subsequent media item in the second display mode, including displaying content from a plurality of images in the second sequence of images in a manner determined based on the second display mode.

21. A non-transitory computer readable storage medium storing one or more programs, the one or more programs comprising instructions that, when executed by an electronic device with a display and a touch-sensitive surface, cause the electronic device to:

display, in a first user interface on the display, a representation of a first media item that corresponds to a sequence of images in a first display mode of a plurality of user-selectable display modes, wherein:

the first media item is part of a collection of media items;

the collection of media items is arranged in an order based on predetermined criteria;

one or more prior media items precede the first media item in the order; and one or more subsequent media items follow the first media item in the order;

while displaying the representation of the first media item, detect a touch input that includes movement in a respective direction on the touch-sensitive surface;

in response to detecting the touch input:

in accordance with a determination that the movement is movement in a first direction and that a subsequent media item that corresponds to a second sequence of images is designated as being displayed in the first display mode, display the subsequent media item in the first display mode, including displaying content from a plurality of images in the second sequence of images in a manner determined based on the first display mode; and in accordance with a determination that the movement is movement in the first direction and that the subsequent media item is designated as being displayed in a second display mode, of the plurality of user-selectable display modes, that is different from the first display mode, display the subsequent media item in the second display mode, including displaying content from a plurality of images in the second sequence of images in a manner determined based on the second display mode.

22. The electronic device of claim 20, wherein the one or more programs include instructions for, in response to detecting the touch input:

in accordance with a determination that the movement is movement in a second direction that is opposite to the first direction and that a prior media item that corresponds to a third sequence of images is designated as being displayed in the first display mode, displaying the prior media item in the first display mode, including displaying content from a plurality of images in the third sequence of images in a manner determined based on the first display mode; and in accordance with a determination that the movement is movement in the second direction and that the prior media item is designated as being displayed in the second display mode that is different from the first display mode, displaying the prior media item in the second display mode, including displaying content from a plurality of images in the third sequence of images in a manner determined based on the second display mode.

23. The electronic device of claim 22, wherein the one or more programs include instructions for, in response to detecting the touch input:

in accordance with a determination that the movement is movement in the first direction and that the subsequent media item is designated as being displayed in a third display mode, of the plurality of user-selectable display modes, that is different from the first display mode and the second display mode, displaying the subsequent media item in the third display mode, including displaying content from a plurality of images in the second sequence of images in a manner determined based on the third display mode; and in accordance with a determination that the movement is movement in the second direction and that the prior media item is designated as being displayed in the third display mode, displaying the prior media item in the third display mode, including displaying content from a plurality of images in the third sequence of images in a manner determined based on the third display mode.

24. The electronic device of claim 23, wherein the one or more programs include instructions for, in response to detecting the touch input:

in accordance with a determination that the movement is movement in the first direction and that the subsequent media item is designated as being displayed in a fourth display mode, of the plurality of user-selectable display modes, that is different from the first display mode, the second display mode, and the third display mode, displaying the subsequent media item in the fourth display mode, including displaying content from a plurality of images in the second sequence of images in a manner determined based on the fourth display mode; and in accordance with a determination that the movement is movement in the second direction and that the prior media item is designated as being displayed in the fourth display mode, displaying the prior media item in the fourth display mode, including displaying content from a plurality of images in the third sequence of images in a manner determined based on the fourth display mode.

25. The electronic device of claim 20, wherein the one or more programs include instructions for, in response to detecting the touch input, in accordance with a determination that the movement is movement in a third direction, different from the first direction, displaying a user interface that includes:

additional information about the first media item, and one or more display-mode-selection affordances that are configured to select a different display mode for the first media item.

26. The electronic device of claim 20, wherein the one or more programs include instructions for, in response to detecting the touch input, in accordance with a determination that the movement is movement in a fourth direction, different from the first direction, displaying a user interface that concurrently displays representations of a plurality of media items in the collection, including representations of the first media item, one or more of the prior media items, and/or one or more of the subsequent media items.

27. The electronic device of claim 20, wherein:

the first display mode is a live-photo display mode; and displaying the subsequent media item in the first display mode includes:

displaying at least a portion of a respective image from the second sequence of images while detecting the touch input;

detecting an end of the touch input; and, in response to detecting the end of the touch input, playing back images in the second sequence of images starting at the respective image.

28. The electronic device of claim 20, wherein:

the second display mode is a loop display mode; and displaying the subsequent media item in the second display mode includes:

displaying the second sequence of images looping while detecting at least a portion of the touch input; and continuing to display the second sequence of images looping after detecting an end of the touch input.

29. The electronic device of claim 20, wherein:

the plurality of user-selectable display modes for a respective media item includes a back-and-forth display mode that is configured to display a sequence of images in the respective media item repeatedly playing forward and then backward; and when the respective media item is in the back-and-forth display mode, the sequence of images in the respective media item starts playing forward and then backward while a touch input is detected that causes the respective media item to be displayed on the display; and the sequence of images in the respective media item repeatedly plays forward and then backward after the touch input that causes the respective media item to be displayed on the display ends.

30. The electronic device of claim 20, wherein:

the plurality of user-selectable display modes for a respective media item includes a merged image display mode that is configured to display a single merged image that includes concurrently displayed content from a plurality of images in a sequence of images in a respective media item; and when the respective media item is in the merged image display mode, the electronic device displays the single merged image while a touch input is detected that causes the respective media item to be displayed on the display; and, in response to detecting an end of the touch input that causes the respective media item to be displayed on the display, the electronic device plays back a plurality of images in the sequence of images in the respective media item, and then redisplays the single merged image.

31. The electronic device of claim 20, wherein the representation of the first media item is displayed at a first magnification in the first user interface, and the one or more programs includes instructions for:

concurrently displaying with the representation of the first media item, in the first user interface, a collection-navigation control that is configured to navigate through the collection of media items, wherein:

the collection-navigation control includes smaller representations of media items in the collection;

the collection-navigation control includes a first smaller representation of the first media item;

detecting an input corresponding to the first media item; and, in response to detecting the input corresponding to the first media item, displaying an expanded representation of the first media item in the collection-navigation control.

32. The electronic device of claim 31, wherein the one or more programs include instructions for:

in response to detecting the input corresponding to the first media item, displaying a scrubbing indicator in the expanded representation of the first media item in the collection-navigation control;

detecting an input directed to a portion of the collection-navigation control; and, while detecting the input directed to the portion of the collection-navigation control:

changing a relative position of the expanded representation of the first media item in the collection-navigation control and the scrubbing indicator in accordance with the input directed to the portion of the collection-navigation control; and displaying, at the first magnification, an image in the sequence of images for the first media item that corresponds to a current location of the scrubbing indicator in the expanded representation of the first media item in the collection-navigation control.

33. The electronic device of claim 32, wherein the one or more programs include instructions for:

while displaying the scrubbing indicator in the expanded representation of the first media item in the collection-navigation control, detecting an input to navigate to another media item in the collection; and in response to detecting the input to navigate to another media item in the collection, ceasing to display the expanded representation of the first media item in the collection-navigation control.

34. The electronic device of claim 32, wherein the one or more programs include instructions for:

while displaying the scrubbing indicator in the expanded representation of the first media item in the collection-navigation control:

in accordance with a determination that the scrubbing indicator is located away from a position that corresponds to a representation of a representative image of the sequence of images of the first media item, displaying an indicator of the representative image of the sequence of images of the first media item; and in accordance with a determination that the scrubbing indicator is located at the position that corresponds to the representation of the representative image of the sequence of images of the first media item, forgoing display of the indicator of the representative image of the sequence of images of the first media item.

35. The electronic device of claim 32, wherein the one or more programs include instructions for:

while detecting the input directed to the portion of the collection-navigation control:

in accordance with a determination that the scrubbing indicator is within a predetermined distance to a position that corresponds to a representation of a representative image of the sequence of images of the first media item, snapping to the position that corresponds to the representation of the representative image of the sequence of images of the first media item.

36. The electronic device of claim 32, wherein the electronic device has one or more tactile output generators, and the one or more programs include instructions for:

while detecting the input directed to the portion of the collection-navigation control:

in accordance with a determination that the scrubbing indicator is within a predetermined distance to a position that corresponds to a representation of a representative image of the sequence of images of the first media item:

snapping to the position that corresponds to the representation of the representative image of the sequence of images of the first media item, and generating a tactile output when the scrubbing indicator snaps to the position.

37. The electronic device of claim 32, wherein the electronic device has one or more tactile output generators, the input directed to the portion of the collection-navigation control includes movement that brings the scrubbing indicator within a predefined distance of the portion of the expanded representation of the first media item that corresponds to a representative image of the sequence of images of the first media item, and the one or more programs include instructions for:

while detecting the input directed to the portion of the collection-navigation control:

in accordance with a determination that the movement meets snapping criteria, wherein the snapping criteria includes a requirement that relative movement between the expanded representation of the first media item and the scrubbing indicator is less than a predefined speed when the scrubbing indicator is within the predefined distance of the portion of the expanded representation of the first media item that corresponds to the representative image of the sequence of images of the first media item, in order for the snapping criteria to be met, updating the collection-navigation control so that the scrubbing indicator is at the portion of the expanded representation of the first media item that corresponds to the representation of the representative image of the sequence of images of the first media item, and generating a corresponding tactile output; and in accordance with a determination that the movement does not meet the snapping criteria, updating the collection-navigation control so that the scrubbing indicator is at a position relative to the expanded representation of the first media item selected based on the movement without generating a corresponding tactile output.

38. The electronic device of claim 20, wherein while displaying the representation of the first media item in the first display mode, the first user interface concurrently displays:

a first area that is configured to sequentially display images in the sequence of images in the first media item at a first magnification; and a second area, distinct from the first area, that includes representations of media items in the collection of media items at a second magnification that is less than the first magnification; and the one or more programs include instructions for:

concurrently displaying a representative image from the sequence of images of the first media item in the first area and a representation of the representative image from the sequence of images of the first media item in the second area;

while concurrently displaying the representative image from the sequence of images of the first media item in the first area and the representation of the representative image from the sequence of images of the first media item in the second area, detecting an input; and in response to detecting the input:

playing back the sequence of images of the first media item in the first display mode in the first area; and displaying, in the second area:

the representation of the representative image of the first media item;

representations of additional images in the sequence of images of the first media item; and a scrubbing indicator that shows a current playback position in the sequence of images being shown in the first area.

39. The electronic device of claim 38, wherein the scrubbing indicator is initially displayed at a location of the representation of the representative image of the first media item in the second area.

40. The non-transitory computer readable storage medium of claim 21, wherein the one or more programs include instructions, which when executed by the electronic device, cause the electronic device to, in response to detecting the touch input:

in accordance with a determination that the movement is movement in a second direction that is opposite to the first direction and that a prior media item that corresponds to a third sequence of images is designated as being displayed in the first display mode, display the prior media item in the first display mode, including displaying content from a plurality of images in the third sequence of images in a manner determined based on the first display mode; and in accordance with a determination that the movement is movement in the second direction and that the prior media item is designated as being displayed in the second display mode that is different from the first display mode, display the prior media item in the second display mode, including displaying content from a plurality of images in the third sequence of images in a manner determined based on the second display mode.

41. The non-transitory computer readable storage medium of claim 40, wherein the one or more programs include instructions, which when executed by the electronic device, cause the electronic device to, in response to detecting the touch input:

in accordance with a determination that the movement is movement in the first direction and that the subsequent media item is designated as being displayed in a third display mode, of the plurality of user-selectable display modes, that is different from the first display mode and the second display mode, display the subsequent media item in the third display mode, including displaying content from a plurality of images in the second sequence of images in a manner determined based on the third display mode; and in accordance with a determination that the movement is movement in the second direction and that the prior media item is designated as being displayed in the third display mode, display the prior media item in the third display mode, including displaying content from a plurality of images in the third sequence of images in a manner determined based on the third display mode.

42. The non-transitory computer readable storage medium of claim 41, wherein the one or more programs include instructions, which when executed by the electronic device, cause the electronic device to, in response to detecting the touch input:

in accordance with a determination that the movement is movement in the first direction and that the subsequent media item is designated as being displayed in a fourth display mode, of the plurality of user-selectable display modes, that is different from the first display mode, the second display mode, and the third display mode, display the subsequent media item in the fourth display mode, including displaying content from a plurality of images in the second sequence of images in a manner determined based on the fourth display mode; and in accordance with a determination that the movement is movement in the second direction and that the prior media item is designated as being displayed in the fourth display mode, display the prior media item in the fourth display mode, including displaying content from a plurality of images in the third sequence of images in a manner determined based on the fourth display mode.

43. The non-transitory computer readable storage medium of claim 21, wherein the one or more programs include instructions, which when executed by the electronic device, cause the electronic device to, in response to detecting the touch input, in accordance with a determination that the movement is movement in a third direction, different from the first direction, display a user interface that includes:

additional information about the first media item, and one or more display-mode-selection affordances that are configured to select a different display mode for the first media item.

44. The non-transitory computer readable storage medium of claim 21, wherein the one or more programs include instructions, which when executed by the electronic device, cause the electronic device to, in response to detecting the touch input, in accordance with a determination that the movement is movement in a fourth direction, different from the first direction, display a user interface that concurrently displays representations of a plurality of media items in the collection, including representations of the first media item, one or more of the prior media items, and/or one or more of the subsequent media items.

45. The non-transitory computer readable storage medium of claim 21, wherein:

the first display mode is a live-photo display mode; and displaying the subsequent media item in the first display mode includes:

displaying at least a portion of a respective image from the second sequence of images while detecting the touch input;

detecting an end of the touch input; and, in response to detecting the end of the touch input, playing back images in the second sequence of images starting at the respective image.

46. The non-transitory computer readable storage medium of claim 21, wherein:

the second display mode is a loop display mode; and displaying the subsequent media item in the second display mode includes:

displaying the second sequence of images looping while detecting at least a portion of the touch input; and continuing to display the second sequence of images looping after detecting an end of the touch input.

47. The non-transitory computer readable storage medium of claim 21, wherein:

the plurality of user-selectable display modes for a respective media item includes a back-and-forth display mode that is configured to display a sequence of images in the respective media item repeatedly playing forward and then backward; and when the respective media item is in the back-and-forth display mode, the sequence of images in the respective media item starts playing forward and then backward while a touch input is detected that causes the respective media item to be displayed on the display; and the sequence of images in the respective media item repeatedly plays forward and then backward after the touch input that causes the respective media item to be displayed on the display ends.

48. The non-transitory computer readable storage medium of claim 21, wherein:

the plurality of user-selectable display modes for a respective media item includes a merged image display mode that is configured to display a single merged image that includes concurrently displayed content from a plurality of images in a sequence of images in a respective media item; and when the respective media item is in the merged image display mode, the electronic device displays the single merged image while a touch input is detected that causes the respective media item to be displayed on the display; and, in response to detecting an end of the touch input that causes the respective media item to be displayed on the display, the electronic device plays back a plurality of images in the sequence of images in the respective media item, and then redisplays the single merged image.

49. The non-transitory computer readable storage medium of claim 21, wherein the representation of the first media item is displayed at a first magnification in the first user interface, and the one or more programs include instructions, which when executed by the electronic device, cause the electronic device to:

concurrently display with the representation of the first media item, in the first user interface, a collection-navigation control that is configured to navigate through the collection of media items, wherein:

the collection-navigation control includes smaller representations of media items in the collection;

the collection-navigation control includes a first smaller representation of the first media item;

detect an input corresponding to the first media item; and, in response to detecting the input corresponding to the first media item, display an expanded representation of the first media item in the collection-navigation control.

50. The non-transitory computer readable storage medium of claim 49, wherein the one or more programs include instructions, which when executed by the electronic device, cause the electronic device to:

in response to detecting the input corresponding to the first media item, display a scrubbing indicator in the expanded representation of the first media item in the collection-navigation control;

detect an input directed to a portion of the collection-navigation control; and, while detecting the input directed to the portion of the collection-navigation control:

change a relative position of the expanded representation of the first media item in the collection-navigation control and the scrubbing indicator in accordance with the input directed to the portion of the collection-navigation control; and display, at the first magnification, an image in the sequence of images for the first media item that corresponds to a current location of the scrubbing indicator in the expanded representation of the first media item in the collection-navigation control.

51. The non-transitory computer readable storage medium of claim 50, wherein the one or more programs include instructions, which when executed by the electronic device, cause the electronic device to:

while displaying the scrubbing indicator in the expanded representation of the first media item in the collection-navigation control, detect an input to navigate to another media item in the collection; and in response to detecting the input to navigate to another media item in the collection, cease to display the expanded representation of the first media item in the collection-navigation control.

52. The non-transitory computer readable storage medium of claim 50, wherein the one or more programs include instructions, which when executed by the electronic device, cause the electronic device to:

while displaying the scrubbing indicator in the expanded representation of the first media item in the collection-navigation control:

in accordance with a determination that the scrubbing indicator is located away from a position that corresponds to a representation of a representative image of the sequence of images of the first media item, display an indicator of the representative image of the sequence of images of the first media item; and in accordance with a determination that the scrubbing indicator is located at the position that corresponds to the representation of the representative image of the sequence of images of the first media item, forgo display of the indicator of the representative image of the sequence of images of the first media item.

53. The non-transitory computer readable storage medium of claim 50, wherein the one or more programs include instructions, which when executed by the electronic device, cause the electronic device to:

while detecting the input directed to the portion of the collection-navigation control:

in accordance with a determination that the scrubbing indicator is within a predetermined distance to a position that corresponds to a representation of a representative image of the sequence of images of the first media item, snap to the position that corresponds to the representation of the representative image of the sequence of images of the first media item.

54. The non-transitory computer readable storage medium of claim 50, wherein the electronic device has one or more tactile output generators, and the one or more programs include instructions, which when executed by the electronic device, cause the electronic device to:

while detecting the input directed to the portion of the collection-navigation control:

in accordance with a determination that the scrubbing indicator is within a predetermined distance to a position that corresponds to a representation of a representative image of the sequence of images of the first media item:

snap to the position that corresponds to the representation of the representative image of the sequence of images of the first media item, and generate a tactile output when the scrubbing indicator snaps to the position.

55. The non-transitory computer readable storage medium of claim 50, wherein the electronic device has one or more tactile output generators, the input directed to the portion of the collection-navigation control includes movement that brings the scrubbing indicator within a predefined distance of the portion of the expanded representation of the first media item that corresponds to a representative image of the sequence of images of the first media item, and the one or more programs include instructions, which when executed by the electronic device, cause the electronic device to:

while detecting the input directed to the portion of the collection-navigation control:

in accordance with a determination that the movement meets snapping criteria, wherein the snapping criteria includes a requirement that relative movement between the expanded representation of the first media item and the scrubbing indicator is less than a predefined speed when the scrubbing indicator is within the predefined distance of the portion of the expanded representation of the first media item that corresponds to the representative image of the sequence of images of the first media item, in order for the snapping criteria to be met, update the collection-navigation control so that the scrubbing indicator is at the portion of the expanded representation of the first media item that corresponds to the representation of the representative image of the sequence of images of the first media item, and generate a corresponding tactile output; and in accordance with a determination that the movement does not meet the snapping criteria, update the collection-navigation control so that the scrubbing indicator is at a position relative to the expanded representation of the first media item selected based on the movement without generating a corresponding tactile output.

56. The non-transitory computer readable storage medium of claim 21, wherein while displaying the representation of the first media item in the first display mode, the first user interface concurrently displays:

a first area that is configured to sequentially display images in the sequence of images in the first media item at a first magnification; and a second area, distinct from the first area, that includes representations of media items in the collection of media items at a second magnification that is less than the first magnification; and the one or more programs include instructions, which when executed by the electronic device, cause the electronic device to:

concurrently display a representative image from the sequence of images of the first media item in the first area and a representation of the representative image from the sequence of images of the first media item in the second area;

while concurrently displaying the representative image from the sequence of images of the first media item in the first area and the representation of the representative image from the sequence of images of the first media item in the second area, detect an input; and in response to detecting the input:

play back the sequence of images of the first media item in the first display mode in the first area; and display, in the second area:

the representation of the representative image of the first media item;

representations of additional images in the sequence of images of the first media item; and a scrubbing indicator that shows a current playback position in the sequence of images being shown in the first area.

57. The non-transitory computer readable storage medium of claim 56, wherein the scrubbing indicator is initially displayed at a location of the representation of the representative image of the first media item in the second area.

* * * * *